US007783585B2

(12) United States Patent
Sabe et al.

(10) Patent No.: US 7,783,585 B2
(45) Date of Patent: Aug. 24, 2010

(54) DATA PROCESSING DEVICE, DATA PROCESSING METHOD, AND PROGRAM

(75) Inventors: Kohtaro Sabe, Tokyo (JP); Kazumi Aoyama, Saitama (JP); Jun Yokono, Tokyo (JP); Kenichi Hidai, Tokyo (JP); Kuniaki Noda, Tokyo (JP)

(73) Assignee: Sony Corporation, Tokyo (JP)

( * ) Notice: Subject to any disclaimer, the term of this patent is extended or adjusted under 35 U.S.C. 154(b) by 678 days.

(21) Appl. No.: 11/697,238

(22) Filed: Apr. 5, 2007

(65) Prior Publication Data

US 2007/0250461 A1 Oct. 25, 2007

(30) Foreign Application Priority Data

Apr. 6, 2006 (JP) .......................... P2006-105552
Aug. 8, 2006 (JP) .......................... P2006-215946

(51) Int. Cl.
*G06E 1/00* (2006.01)
*G06E 3/00* (2006.01)
*G06F 15/18* (2006.01)
*G06G 7/00* (2006.01)

(52) U.S. Cl. ...................................... 706/16
(58) Field of Classification Search .............. 706/16, 706/21
See application file for complete search history.

(56) References Cited

U.S. PATENT DOCUMENTS 5,761,386 A * 6/1998 Lawrence et al. ............. 706/20

7,613,663 B1 * 11/2009 Commons et al. ............. 706/15

FOREIGN PATENT DOCUMENTS

JP 2006-162898 6/2006

OTHER PUBLICATIONS

Koskela, Timo et al., "Temporal Sequence Processing using Recurrent SOM". Proceedings KES 1998, 1998 Second International Conference on Knowledge-Based Intelligent Electronic Systems, Apr. 21-23, 1998, vol. 1, p. 290.*
Carpinteiro, Otávio Augusto S. et al., "A Hierarchical Self-Organizing Map Model for Sequence Recognition," Proceeding of ICANN98, the 8th International Conference on Artificial Neural Networks, Sep. 1988.
Masami Ikeda et al., Time Series Recognition by a Self Organizing Multi-Layered Neural Network, Information and Communication Engineers Technical Study Reports, vol. 99 No. 684, IEICE Technical Report, Japan , Mar. 13, 2000, Abstract.

* cited by examiner

*Primary Examiner*—Donald Sparks
*Assistant Examiner*—Vincent M Gonzales
(74) *Attorney, Agent, or Firm*—Finnegan, Henderson, Farabow, Garrett & Dunner, L.L.P.

(57) ABSTRACT

A data processing device for processing time-sequence data includes a learning unit for performing self-organizing learning of a SOM (self-organization map) making up a hierarchical SOM in which a plurality of SOMs are connected so as to construct a hierarchical structure, using, as SOM input data which is input to the SOM, a time-sequence of node information representing a winning node of a lower-order SOM which is at a lower hierarchical level from the SOM.

26 Claims, 57 Drawing Sheets

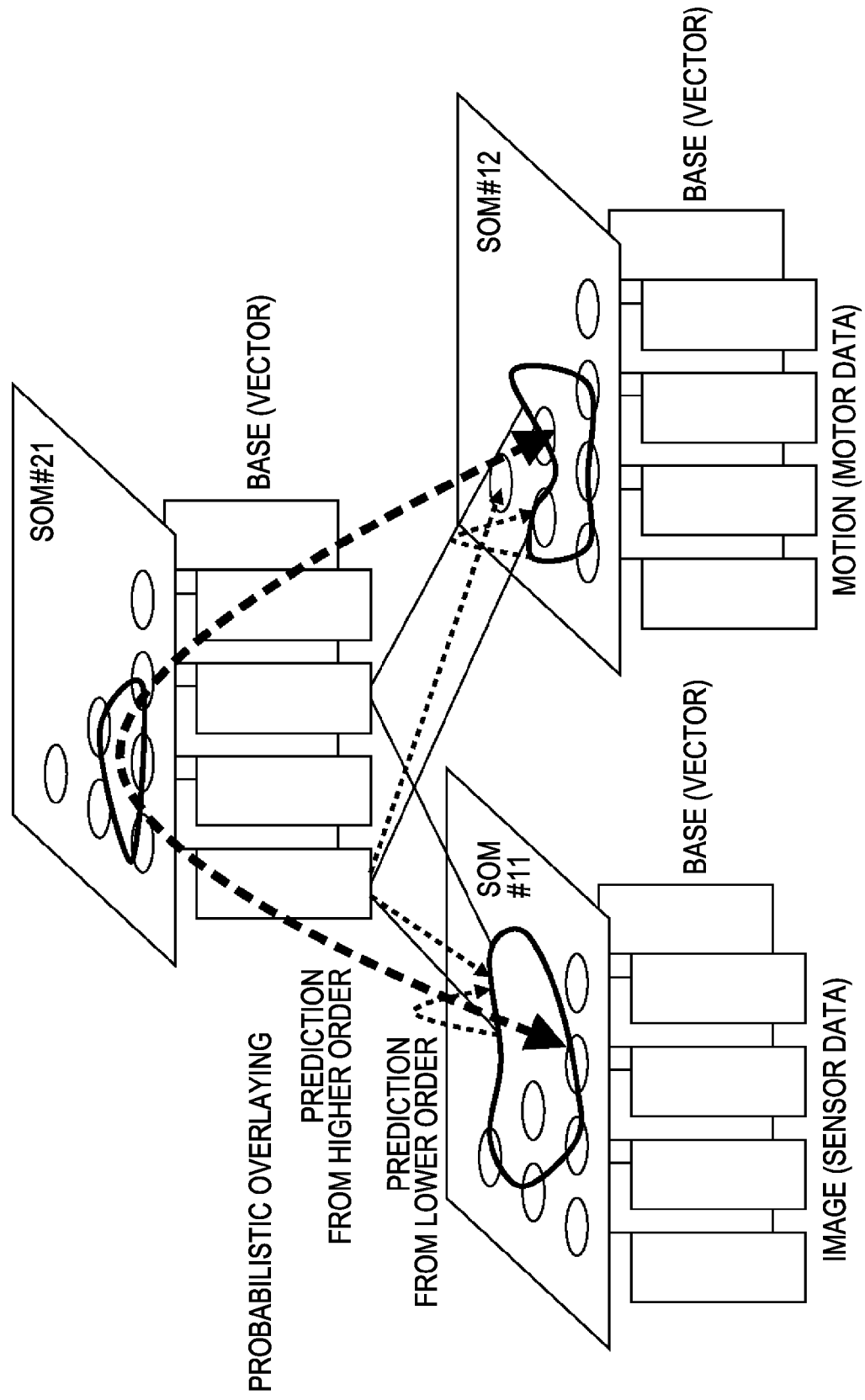

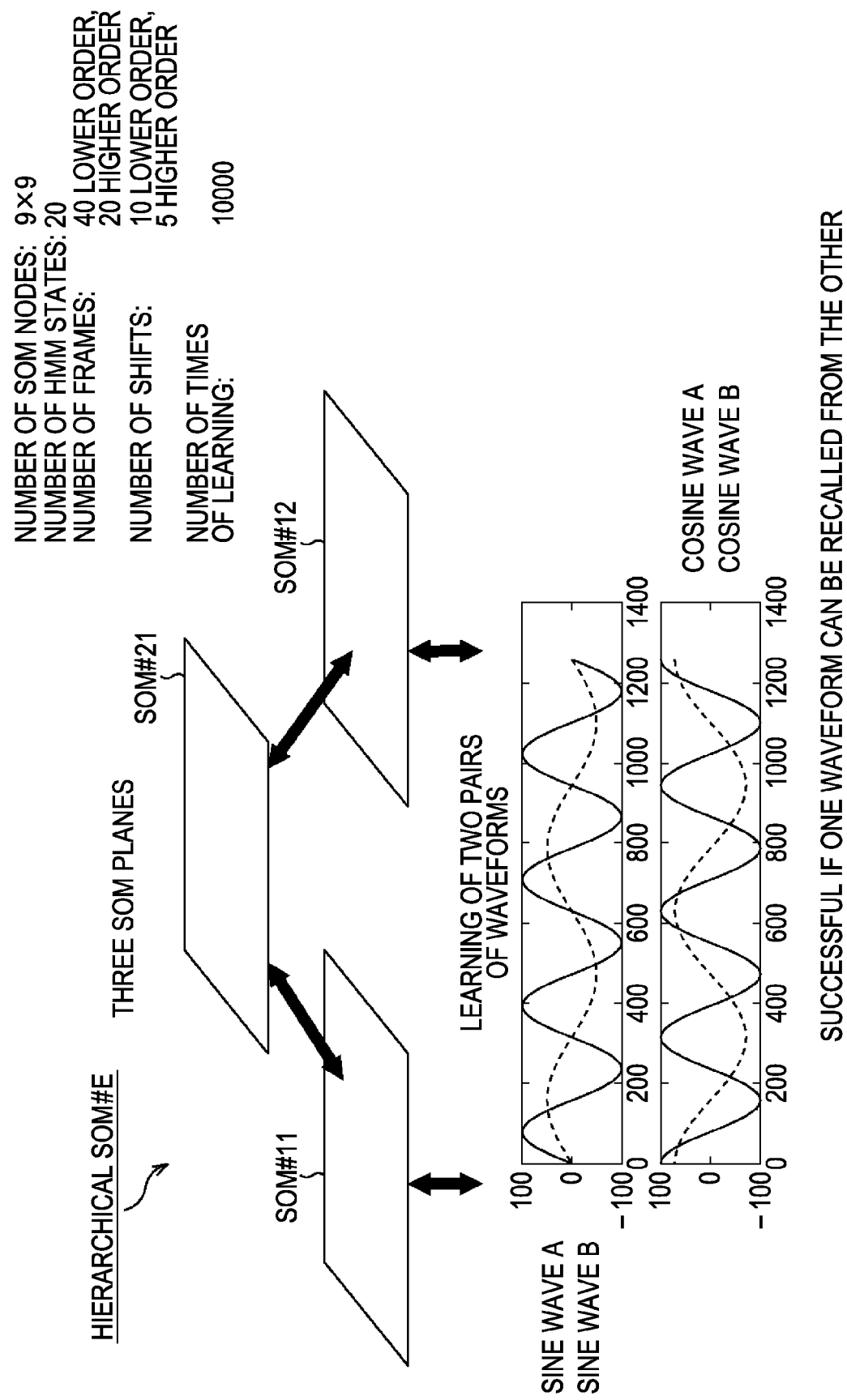

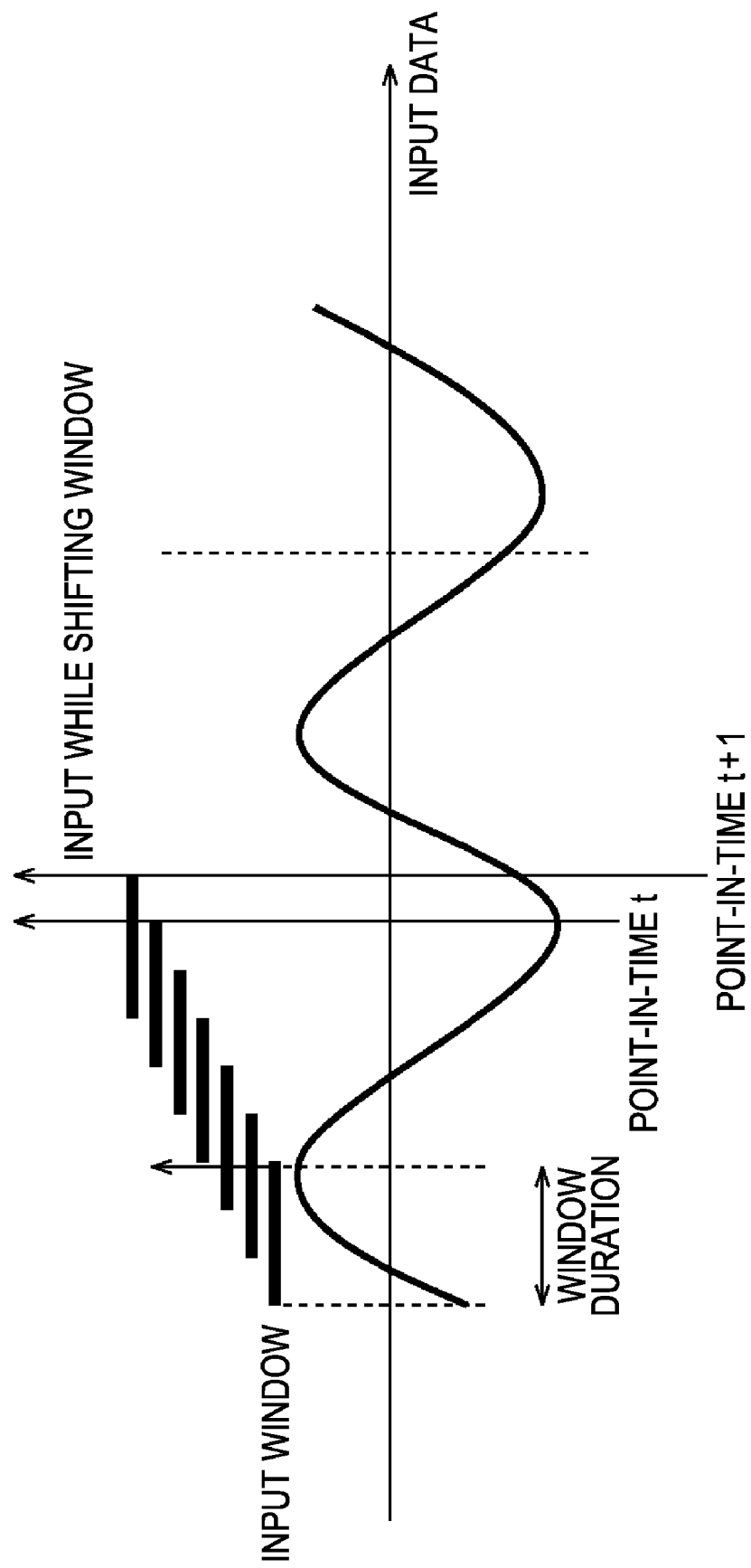

FIG. 37

| | |
|---|---|
| S501) | MAKE RANDOM SELECTION FROM INPUT DATA STREAM |
| S502) | CLIP WINDOW IN ORDER OF TIME FROM START OF SELECTED DATA |
| S503) | DETERMINE WINNING NODE OF WINDOW (NODE WITH SMALLEST ERROR) |
| S504) | WINNING NODE AND NEARBY NODES LEARN WITH WINDOW DATA (SOM LEARNING) |
| S505) | PERFORM PREDICTION LEARNING FROM PREVIOUS WINNING NODE TO CURRENT WINNING NODE (Connect Hebb LEARNING) |
| S506) | NARROW DOWN PROXIMITY FUNCTIONS ACCORDING TO NUMBER OF TIMES OF LEARNING |
| S507) | END IF NUMBER OF TIMES OF LEARNING HAS REACHED PREDETERMINED NUMBER (10000 TIMES) |
| S508) | CLIP NEXT WINDOW, AND RETURN TO S503 |
| S509) | SELECT NEXT DATA STREAM, AND RETURN TO S502 |

FIG. 39

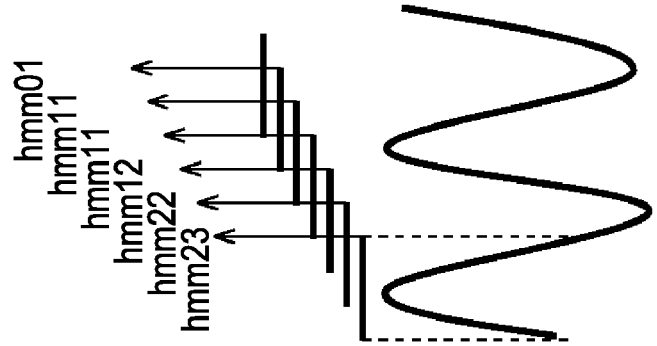

S521) CLIP TRAINING DATA IN RANDOM, AND PERFORM SELF-ORGANIZATION OF LOWER-ORDER LAYER SOM
(FOR EXAMPLE, ITERATION OF 10000 TIMES)

S522) RECOGNIZE TRAINING DATA USING COMPLETED HMM-SOM, AND OUTPUT RECOGNIZED LABEL AS POSITION (x, y) OF NODE

AT THIS TIME, RECOGNITION IS PERFORMED EVERY SHIFT AMOUNT, IN AN OVERLAPPING MANNER
(SEE DRAWING TO RIGHT)

S523) COLLECT AS MANY SETS OF NODE POSITION DATA AS THERE ARE LOWER-ORDER LAYERS, AND CONNECT

S524) RANDOMLY CLIP DATA OF CONNECTED HIGHER-ORDER LAYERS, AND PERFORM SELF-ORGANIZING LEARNING

S525) PERFORM PREDICTION LEARNING BY SEQUENTIALLY INPUTTING INPUT OF EACH HIERARCHICAL LEVEL

FIG. 41

S541) AT POINT-IN-TIME t, THE INPUT TIME-SEQUENCE DATA S(t) IS INPUT TO THE INPUT BUFFER OF THE LOWEST HIERARCHICAL LEVEL SOM
S542) IN ORDER FROM LOWER-ORDER SOMS TO HIGHER-ORDER SOMS, TAKE A SOM WHICH HAS NOT YET BEEN THE SOM OF INTEREST AS THE SOM OF INTEREST
S543)  IF Mod (t, shift)==0, THAT IS, AT THE SAMPLING TIMING,
S544)   READ OUT DATA HAVING LENGTH OF WINDOW DURATION FROM INPUT BUFFER, AND DETERMINE WINNING NODE
S545)   INPUT POSITION (x, y) OF WINNING NODE TO INPUT BUFFER OF HIGHER-ORDER SOM
S546)   DISCARD DATA FROM THE INPUT BUFFER, OF AN AMOUNT EQUIVALENT TO THE AMOUNT OF SHIFTING, FROM THE OLDEST DATA
S547)  RETURN TO S543, AND PROCESS NEXT SOM
S548) IN ORDER FROM HIGHER-ORDER SOMS TO LOWER-ORDER SOMS, TAKE A SOM WHICH HAS NOT YET BEEN THE SOM OF INTEREST AS THE SOM OF INTEREST
S549)  IF THERE IS A SOM OF HIGHER ORDER THAN SELF,
S550)   EXTRACT PREDICTION INFORMATION FOR NEXT POINT-IN-TIME FROM PREDICTION BUFFER AT HIGHER ORDER
S551)   OBTAIN B CANDIDATES FOR PREDICTION NODE THAT ARE OF HIGHER ORDER THAN THE CURRENT WINNING NODE
S552)   OF THE B CANDIDATES, TAKE THE CANDIDATE HAVING THE CLOSEST POSITION TO THE PREDICTION INFORMATION RETRIEVED FROM THE PREDICTION BUFFER TO BE THE PREDICTION NODE
S553)  IF THERE IS NO SOM OF HIGHER ORDER THAN SELF,
S554)   EMPLOY CURRENT WINNING NODE WITH HIGHEST PROBABILITY TO SERVE AS PREDICTION NODE, AS PREDICTION NODE
S555)  IF THERE IS A SOM OF LOWER ORDER THAN SELF,
S556)   TAKE PROTOTYPE OF PREDICTION NODE AS SEQUENCE OF PREDICTION INFORMATION (PREDICTION TIME-SEQUENCE DATA) OF LOWER-ORDER SOM, AND IF THERE ARE TWO OR MORE LOWER-ORDER SOMS, DIVIDE THE PREDICTION INFORMATION SEQUENCES AMONG THE SOMS
S557)   SEQUENCE OF PREDICTION INFORMATION OF LOWER ORDER SOM IS GENERATED, THE AMOUNT THEREOF BEING FOR THE WINDOW DURATION, BUT REDUNDANT PORTIONS ARE DELETED AND AN AMOUNT CORRESPONDING TO THE NEWEST SHIFT AMOUNT IS INPUT TO THE PREDICTION BUFFER
S558)  RETURN TO S548 AND PROCESS NEXT SOM
S559) TAKE PROTOTYPE OF PREDICTION NODE OF LOWEST-ORDER SOM AS PREDICTION TIME-SEQUENCE DATA, AND OUTPUT AN AMOUNT EQUIVALENT TO NEWEST SHIFT AMOUNT
S560) RETURN TO S541, AND PROCESS NEXT POINT-IN-TIME

ALGORITHM 1

FIG. 44
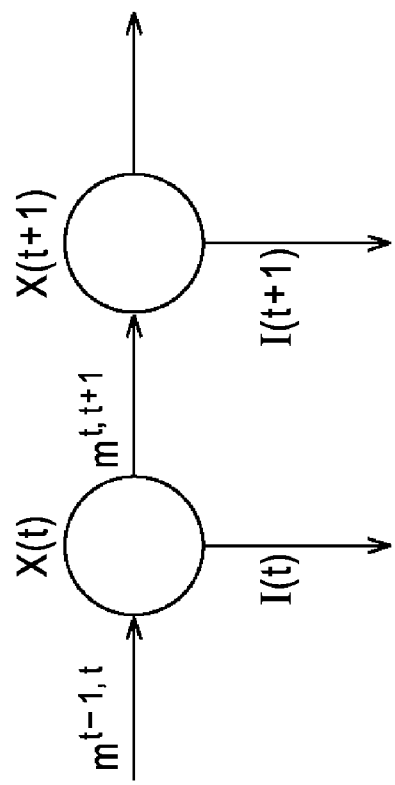
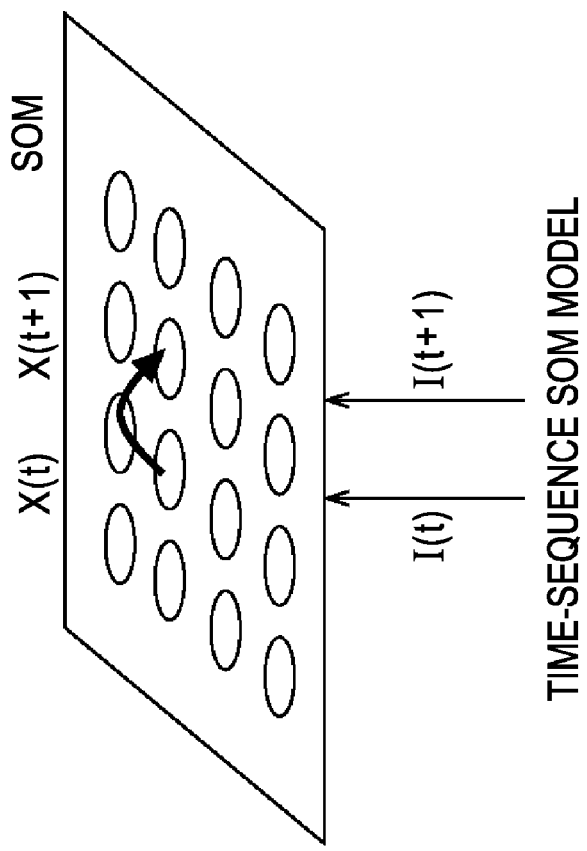
TIME-SEQUENCE SOM MODEL
CAUSE-AND-EFFECT MODEL
BELIEF PROPAGATION
$$m_i^{t,t+1} = \underbrace{P(I(t)|X_i(t))}_{\text{likelihood}} \sum_j \underbrace{P(X_i(t)|X_j(t-1))}_{\text{prediction}} m_j^{t-1,t}$$

LOOPY BP OF 2 LAYER
DYNAMIC GRAPH MODEL

FIG. 48

— METHOD FOR DETERMINING WINNING NODE —

CALCULATE ERROR AT EACH NODE (OBSERVATION VALUE $I_k(t)$ AND PROTOTYPE $u_i$)

$$e_i = (I_k(t) - u_i)^2$$

NODE #i WITH SMALLEST ERROR IS WINNING NODE

ASSUMING THE NOISE $n(0, \sigma^2)$ OF ADDITIVITY OF NORMAL DISTRIBUTION WITH AN AVERAGE OF 0 AND VARIANCE OF $\sigma^2$ AS TO OBSERVATION VALUE $I_k(t)$ (WHEREIN $s(t)$ IS ORIGINAL SIGNAL)

$$I_k(t) = s(t) + n(0, \sigma^2)$$

THE PROBABILITY OF SIGNAL $I_k(t)$ BEING OBSERVED AT EACH NODE #i CAN BE OBTAINED AS FOLLOWS.

$$P(I_k(t) | X_i(t)) = \frac{1}{\sqrt{2\pi}\sigma} \exp\left\{ \frac{-(I_k(t) - u_i)^2}{2\sigma^2} \right\}$$

FIG. 49

| | |
|---|---|
| S601) | INITIALIZE STATE PROBABILITY P(X(t)) OF EACH NODE BY UNIFORM DISTRIBUTION AT EACH SOM. |
| S602) | AT POINT-IN-TIME t INPUT TIME-SEQUENCE DATA S(t) TO INPUT BUFFER OF LOWEST-ORDER LEVEL SOM. |
| S603) | SELECT A SOM OF INTEREST, IN ORDER FROM LOWER-ORDER SOMS TO HIGHER-ORDER SOMS. |
| S604) | IF NOT Mod(t, shift)==0, I.E., IF NOT SAMPLING TIMING, RETURN TO S603. |
| S605) | READ OUT DATA OF AN AMOUNT EQUIVALENT TO WINDOW DURATION FROM INPUT BUFFER, AND CREATE OBSERVATION VALUE $I_k(t)$. OBTAIN OBSERVATION LIKELIHOOD $P(I_k(t)|X(t))$ FOR EACH NODE. |
| S606) | UPDATE EACH NODE STATE PROBABILITY WITH $P(X(t))=(P(I_k(t)|X(t)))P(X(t))/Z$. Z IS A NORMALIZATION FACTOR, WHEREIN $Z=\sum_i P(X_i)$. |
| S607) | DETERMINE NODE WITH THE HIGHEST STATE PROBABILITY TO BE THE WINNING NODE, AND INPUT POSITION (x, y) TO INPUT BUFFER OF HIGHER-ORDER SOM. |
| S608) | DISCARD DATA EQUIVALENT TO AMOUNT OF SHIFTING FROM INPUT BUFFER, FROM THE OLDEST DATA. |
| S609) | RETURN TO S603, AND PROCESS THE NEXT SOM. |
| S610) | SELECT THE SOM OF INTEREST IN THE ORDER FROM HIGHER-ORDER SOMS TO LOWER-ORDER SOMS. |
| S611) | IF NOT Mod(t, shift)==0, I.E., IF NOT SAMPLING TIMING, RETURN TO S610. |
| S612) | MULTIPLY UPDATED STATE PROBABILITY $P(X(t+1))$ BY TRANSITION PROBABILITY TO OBTAIN STATE PROBABILITY AT NEXT POINT-IN-TIME. $P(X(t+1))=P(X(t+1)|X(t))P(X(t))$ |
| S613) | IF THERE IS A HIGHER ORDER SOM THAN SELF, |
| S614) | WITH THE PREDICTION NODE OF THE HIGHER-ORDER SOM AS $Y_{win}(t+1)$, THE OBSERVATION LIKELIHOOD OF THE HIGHER ORDER SOM IS USED TO UPDATE THE STATE PROBABILITY. $P(X(t+1))=P(X(t+1)|Y_{win}(t+1)) * P(X(t+1))$, OR $P(X(t+1))=(P(X(t+1)|Y(t+1))P(Y(t+1))) * P(X(t+1))$ OF HIGHER ORDER SOM NODE. |
| S615) | TAKE NODE WITH HIGHEST $P(X(t+1))$ AS PREDICTION NODE. |
| S616) | IF THE LOWEST-ORDER SOM, |
| S617) | TAKE PROTOTYPE OF PREDICTION NODE AS PREDICTION TIME-SEQUENCE DATA, AND OUTPUT AN AMOUNT EQUIVALENT TO NEWEST SHIFT AMOUNT. |
| S618) | RETURN TO S610, AND PROCESS NEXT SOM. |
| S619) | SET $P(X(t))=P(X(t+1))$ FOR NEXT POINT-IN-TIME. |
| S620) | RETURN TO S602, AND PROCESS NEXT POINT-IN-TIME. |

ALGORITHM 2

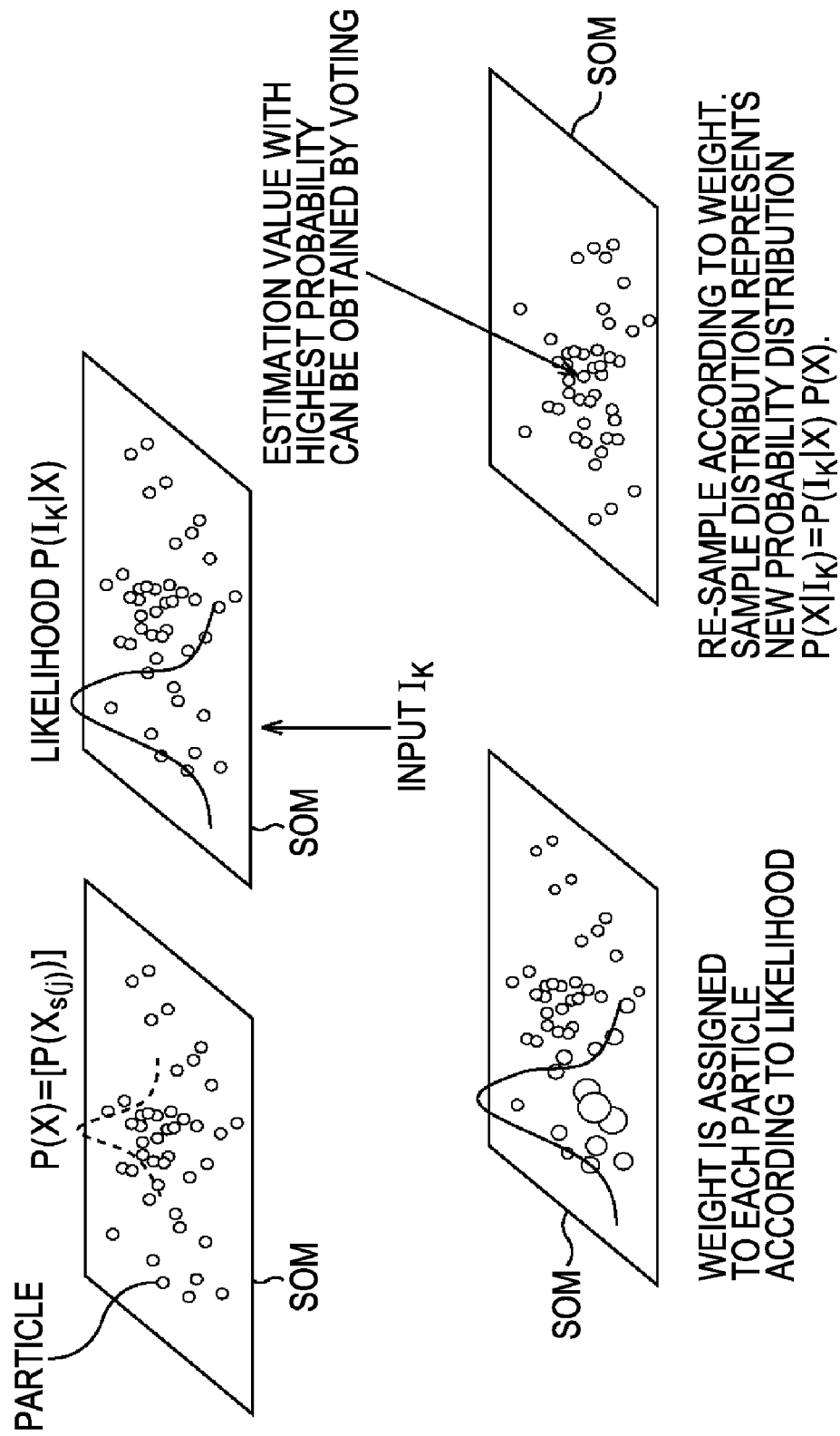

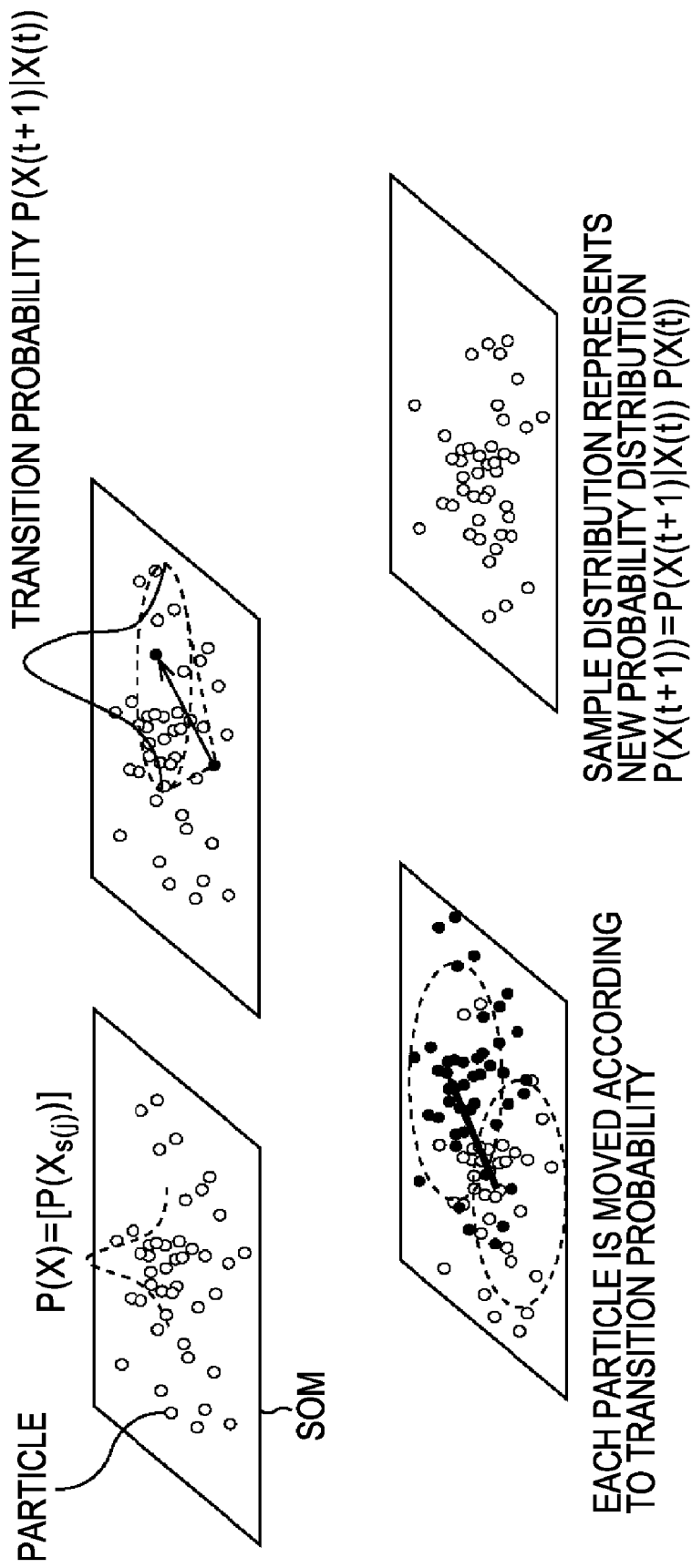

FIG. 52

| | |
|---|---|
| S701) | SCATTER M PARTICLES s(j) IN EACH SOM. PARTICLES CAN ASSUME ANY OF STATES $X_i$, SO STATES WHICH PARTICLES s(j) ASSUME WILL BE REPRESENTED AS $X_{s(j)}$. THE STATE PROBABILITY $P(X_{s(j)}(t))$ IS INITIALIZED TO 1/M. |
| S702) | AT POINT-IN-TIME (t) INPUT TIME-SEQUENCE DATA S(t) IS INPUT TO INPUT BUFFER OF THE LOWEST-ORDER SOM. |
| S703) | SELECT A SOM OF INTEREST, IN ORDER FROM LOWER-ORDER SOMS TO HIGHER-ORDER SOMS. |
| S704) | IF NOT Mod(t, shift)==0, I.E., IF NOT SAMPLING TIMING, RETURN TO S703. |
| S705) | READ OUT DATA OF AN AMOUNT EQUIVALENT TO WINDOW DURATION FROM INPUT BUFFER, AND CREATE OBSERVATION VALUE $I_k(t)$. OBTAIN OBSERVATION LIKELIHOOD $P(I_k(t)|X_{s(j)}(t))$ FOR EACH PARTICLE. |
| S706) | UPDATE EACH PARTICLE STATE PROBABILITY WITH $P(X_{s(j)}(t))=(P(I_k(t)|X_{s(j)}(t))P(X_{s(j)}(t))/Z$. Z IS A NORMALIZATION FACTOR, WHEREIN $Z=\Sigma_j P(X_{s(j)}(t))$. |
| S707) | GENERATE A RANDOM NUMBER, AND SELECT M PARTICLES BASED ON PROBABILITY $P(X_{s(j)}(t))$. |
| S708) | VOTE FOR POSITION (x, y) WHERE EACH PARTICLE IS. |
| S709) | DETERMINE POSITION (x, y) WHERE THE GREATEST NUMBER OF PARTICLES IS TO BE THE WINNING NODE, AND INPUT THE POSITION (x, y) TO THE INPUT BUFFER OF THE HIGHER-ORDER SOM. |
| S710) | DISCARD DATA EQUIVALENT TO AMOUNT OF SHIFTING FROM INPUT BUFFER, FROM THE OLDEST DATA. |
| S711) | RETURN TO S703, AND PROCESS THE NEXT SOM. |
| S712) | SELECT THE SOM OF INTEREST IN THE ORDER FROM HIGHER-ORDER SOMS TO LOWER-ORDER SOMS. |
| S713) | IF NOT Mod(t, shift)==0, I.E., IF NOT SAMPLING TIMING, RETURN TO S712. |
| S714) | GENERATE A RANDOM NUMBER, AND CAUSE TRANSITION OF EACH PARTICLE BASED ON TRANSITION PROBABILITY $P(X(T+1)|X(t))$. $X_{s(j)}(t+1) \leftarrow X_{s(j)}(t)$ |
| S715) | PLACE NEW POSITION TO WHICH MOVEMENT HAS BEEN MADE IN MOVEMENT HISTORY BUFFER, DISCARD OLDEST MOVEMENT HISTORY, AND LET MOVEMENT HISTORY FOR HIGHER-ORDER WINDOW REMAIN. |
| S716) | IF THERE IS A SOM HIGHER ORDER THAN SELF, |
| S717) | WITH THE PREDICTION NODE OF THE HIGHER-ORDER SOM AS $Y_{win}(t+1)$, THE OBSERVATION LIKELIHOOD OF THE HIGHER ORDER SOM IS USED TO UPDATE THE STATE PROBABILITY OF THE PARTICLES. $P(X_{s(j)}(t+1))=P(X_{s(j)}(t+1))P(X_{s(j)}(t+1)|Y_{win}(t+1))$, OR ALL HIGHER-ORDER SOM PARTICLES $Y_{q(m)}(t+1)$ ARE USED SUCH THAT $P(X_{s(j)}(t+1))=P(X_{s(j)}(t+1))(\Sigma_k P(X_{s(j)}(t+1)|Y_{q(m)}(t+1))P(Y_{q(m)}(t+1)))$. |
| S718) | GENERATE A RANDOM NUMBER, AND SELECT M PARTICLES BASED ON PROBABILITY $P(X_{s(j)}(t+1))$. |
| S719) | VOTE FOR POSITION (x, y) WHERE EACH PARTICLE IS, AND DETERMINE POSITION (x, y) WHERE THE GREATEST NUMBER OF PARTICLES IS TO BE THE WINNING NODE. |
| S720) | IF THE LOWEST-ORDER SOM, |
| S721) | TAKE PROTOTYPE OF PREDICTION NODE AS PREDICTION TIME-SEQUENCE DATA, AND OUTPUT AN AMOUNT EQUIVALENT TO NEWEST SHIFT AMOUNT. |
| S722) | RETURN TO S712, AND PROCESS NEXT SOM. |
| S723) | RETURN TO S702, AND PROCESS NEXT POINT-IN-TIME. |

ALGORITHM 3

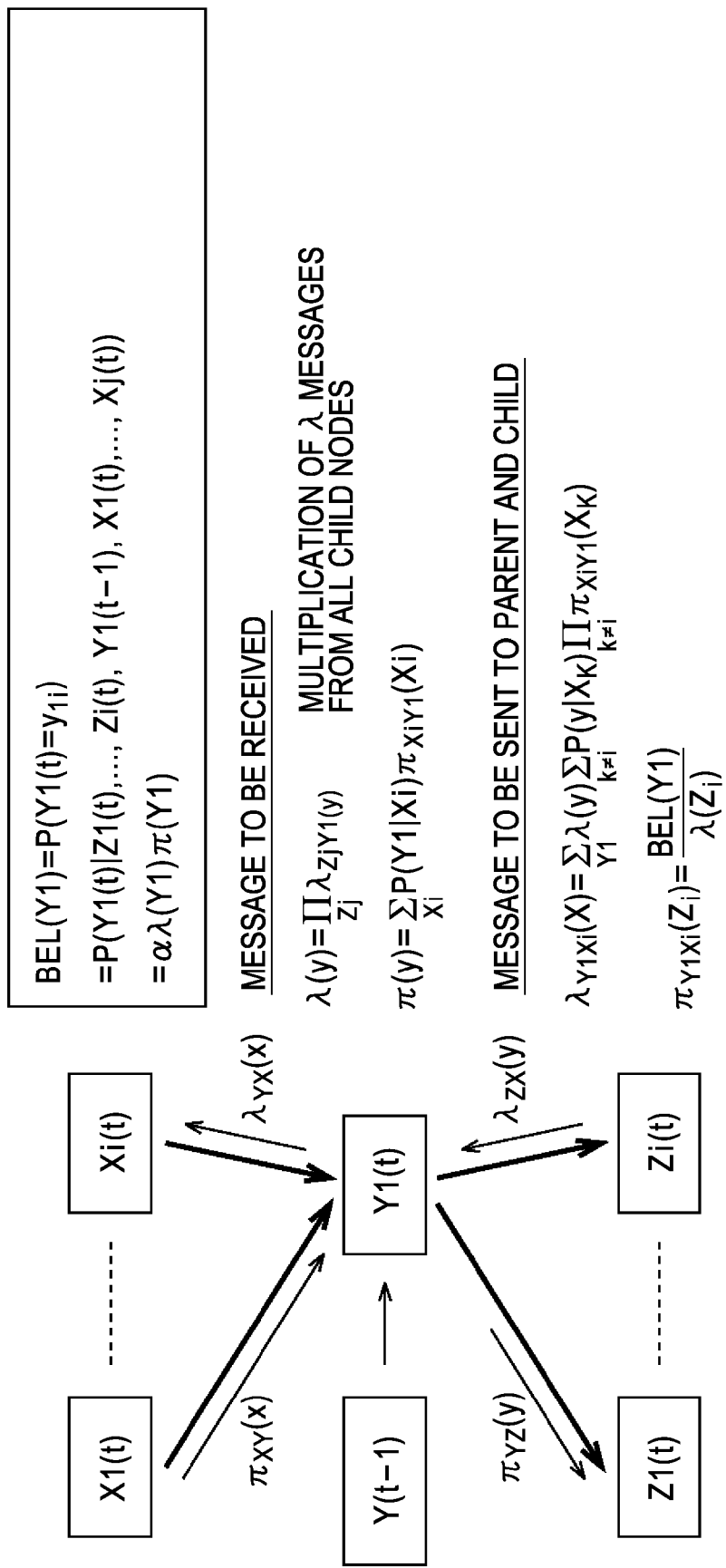

FIG. 54

MESSAGES FOR PROPAGATING BELIEF (PROBABILITY)
($\lambda$ AND $\pi$ MESSAGES)

$P(Y(t)|e) = P(Y(t)|e^+, e^-)$ $= \dfrac{P(e^-|Y(t), e^+)P(Y(t)|e^+)}{P(e^-|e^+)} = \alpha P(e^-|Y(t), e^+) P(Y(t)|e^+)$ $\pi(Y(t)) = \sum\limits_{X} P(Y|X) P(X|e^+)$ $P(X|e^+) = \pi(X)$

IS REGRESSIVELY OBTAINED (A PRIORI PROBABILITY AT THE HIGHEST-ORDER LEVEL)

$\lambda(Y(t)) = P(e^-|Y(t)) = \sum\limits_{Z} P(e^-|Z) P(Z|Y)$ $P(e^-|Z) = \lambda(Z)$ CAN ALSO BE REGRESSIVELY CALCULATED TO THE LOWEST-ORDER LAYER. IN THE EVENT THAT THERE ARE NOT OBSERVATION VALUES, CALCULATED AS A UNIFORM PROBABILITY DISTRIBUTION.

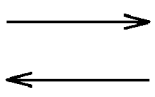
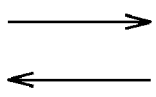

X(t)  e⁺    Y(t)    Z(t)  e⁻

FINAL BELIEF IS $P(Y(t)|e) = \alpha \lambda(Y)\pi(Y)$

BELIEF PROPAGATION FOR POLYTREE

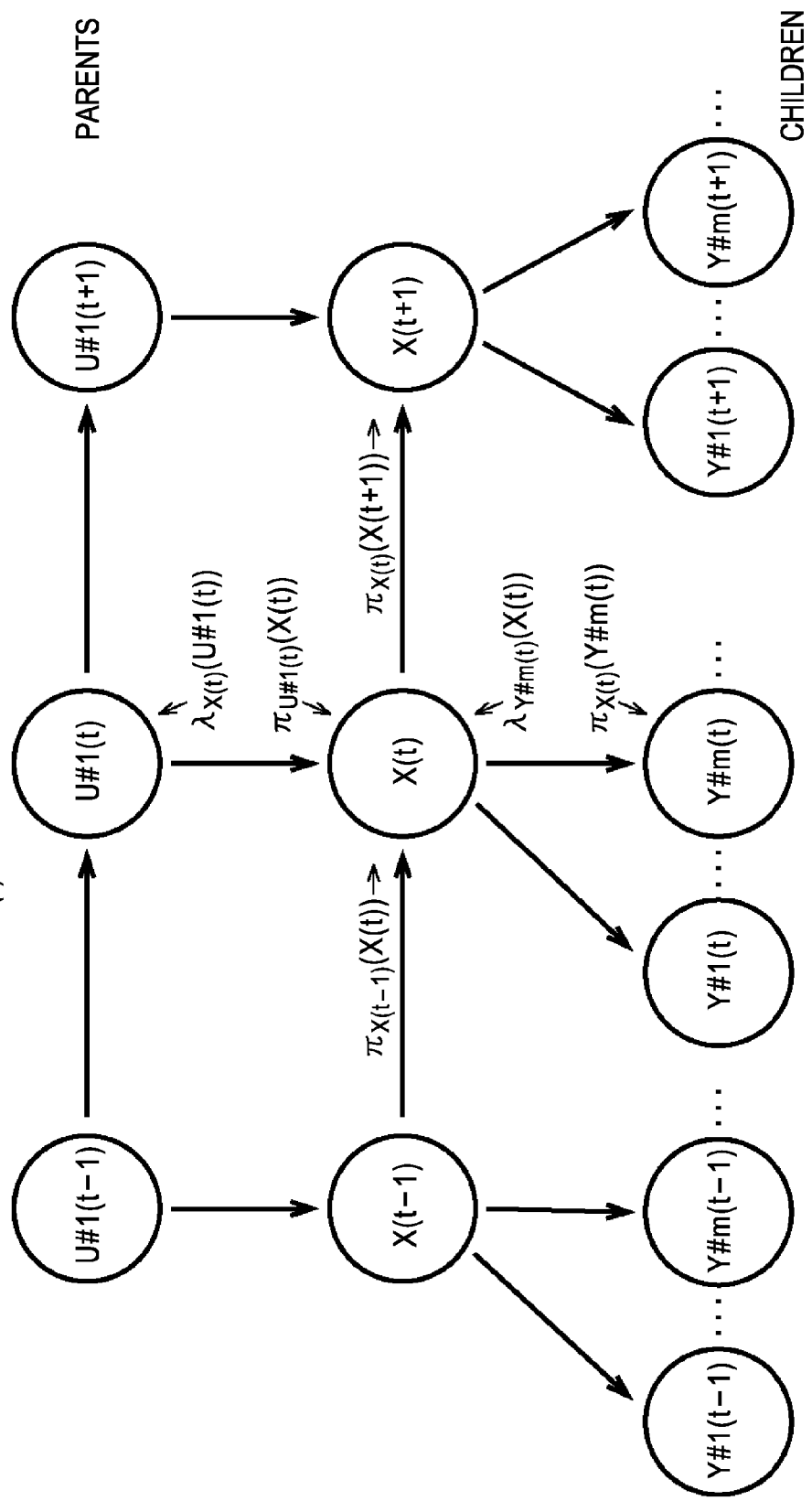

FIG. 57

S801) $\lambda(X(t))$ AND $\pi$ MESSAGES OF EACH NODE OF EACH SOM ARE INITIALIZED WITH A UNIFORM DISTRIBUTION.
S802) AT POINT-IN-TIME t
       INPUT TIME-SEQUENCE DATA S(t) IS INPUT TO INPUT BUFFER OF THE LOWEST-ORDER SOM.
S803) SELECT A SOM OF INTEREST, IN ORDER FROM LOWER-ORDER SOMS TO HIGHER-ORDER SOMS.
S804)  IN THE EVENT THAT THERE IS INPUT OF SOM INPUT DATA TO THE SOM OF INTEREST,
S805)   THE OBSERVATION LIKELIHOOD $P(I(t)|X(t))$ IS OBTAINED AS THE $\lambda$ VALUE OF EACH NODE i.
S806)  IN THE EVENT THAT THERE IS NO INPUT OF SOM INPUT DATA TO THE SOM OF INTEREST
       AND THERE IS A LOWER-ORDER SOM,
S807)   THE PRODUCT OF $\lambda$ MESSAGES FROM LOWER-ORDER SOMS IS TAKEN AS THE $\lambda$ VALUE.
S808)  IN THE EVENT THAT THERE IS NO INPUT OF SOM INPUT DATA TO THE SOM OF INTEREST
       AND THERE ARE NO LOWER-ORDER SOMS, THEN $\lambda(X(t))=1$.
S809)  OBTAIN $\lambda$ MESSAGE USING $\lambda$ VALUE EQUIVALENT TO THE WINDOW SIZE, TOWARD PARENT NODE U.
S810)  $\lambda(X(t))$ EQUIVALENT TO THE WINDOW SIZE IS HELD, AND THE OLD IS DISCARDED.
S811) RETURN TO S803, AND PROCESS NEXT SOM
S812) SELECT A SOM OF INTEREST, IN ORDER FROM HIGHER-ORDER SOMS TO LOWER-ORDER SOMS.
S813)  IF NOT Mod(t, shift)==0, I.E., IF NOT SAMPLING TIMING, RETURN TO S812.
S814)  USE TRANSITION PROBABILITY AND $\pi$ MESSAGE TO OBTAIN $\pi$ VALUE FROM ONE POINT-IN-TIME AGO.
S815)  IF THERE IS A HIGHER-ORDER SOM AND ALSO THIS IS THE SPIKE TIMING OF THE HIGHER-ORDER SOM,
       THE $\pi$ VALUE FROM THE HIGHER-ORDER SOM IS OBTAINED FROM THE LIKELIHOOD AND $\pi$ MESSAGE
S816)  OBTAIN THE $\pi$ VALUE.
S817)  OBTAIN THE STATE PROBABILITY BEL.
S818)  OBTAIN $\pi$ MESSAGE TO NEXT POINT-IN-TIME.
S819)  OBTAIN $\pi$ MESSAGE TO LOWER-ORDER SOM.
       (BEL FROM WHICH $\lambda$ MESSAGE FROM Y#m HAS BEEN REMOVED)
S820)  IF THE LOWEST-ORDER SOM, OBTAIN THE STATE PREDICTION PROBABILITY $P_{prev}$.
S821)  TAKE THAT WITH HIGHEST $P_{prev}$ AS PREDICTION NODE.
S822)  TAKE PROTOTYPE OF PREDICTION NODE AS PREDICTION TIME-SEQUENCE DATA, AND OUTPUT
       AN AMOUNT EQUIVALENT TO NEWEST SHIFT AMOUNT.
S823) RETURN TO S812, AND PROCESS NEXT SOM.
S824) RETURN TO S802, AND PROCESS NEXT POINT-IN-TIME.
                                                                                    ALGORITHM 4

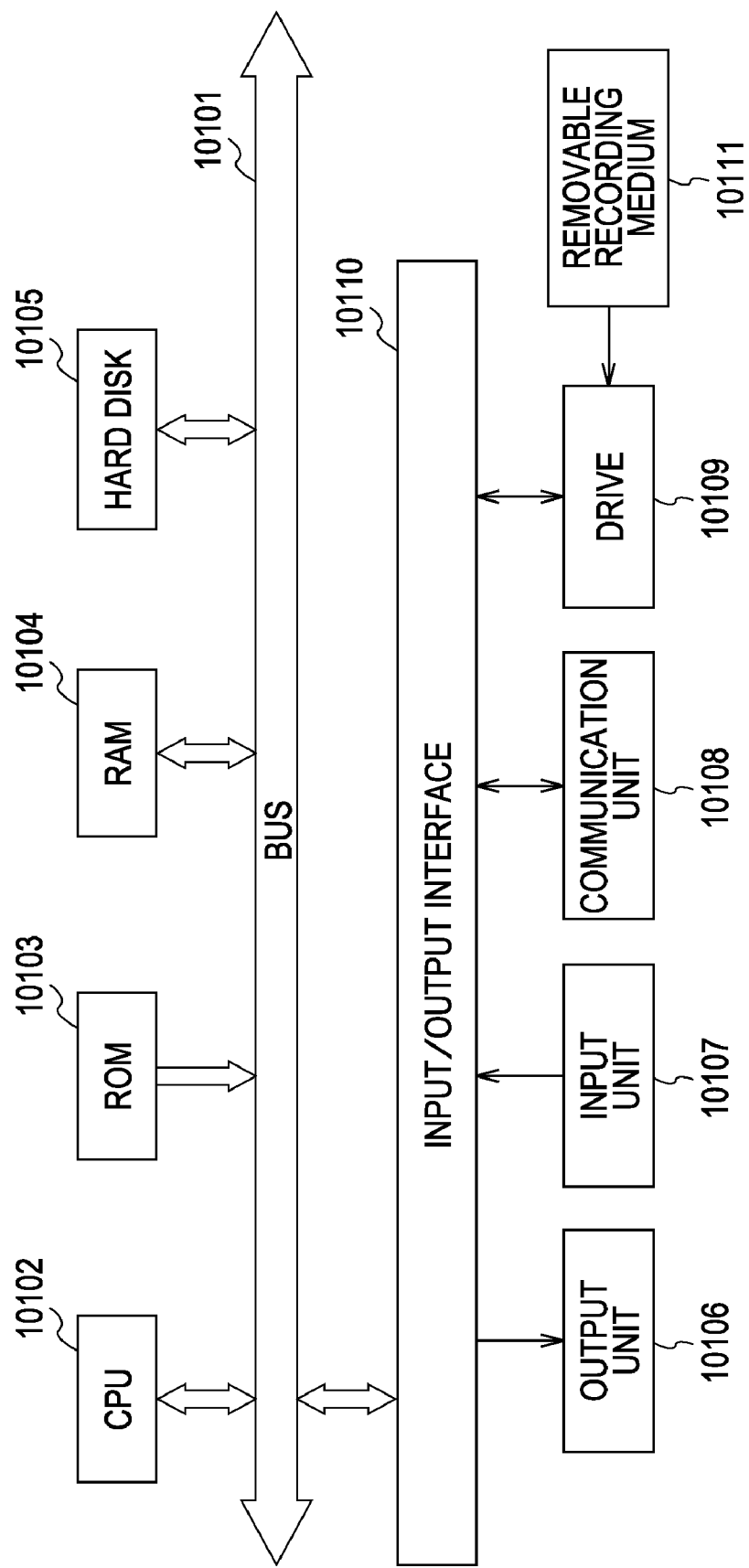

DATA PROCESSING DEVICE, DATA PROCESSING METHOD, AND PROGRAM

CROSS REFERENCES TO RELATED APPLICATIONS

The present invention contains subject matter related to Japanese Patent Application JP 2006-105552 filed in the Japanese Patent Office on Apr. 6, 2006, and Japanese Patent Application JP 2006-215946 filed in the Japanese Patent Office on Aug. 8, 2006, the entire contents of which are incorporated herein by reference.

BACKGROUND OF THE INVENTION

1. Field of the Invention

The present invention relates to a data processing device, a data processing method, and a program, and more particularly relates to a data processing device, a data processing method, and a program whereby a robot, for example, can carry out large-scale learning in a practical manner and act autonomously.

2. Description of the Related Art

Forward models and inverse models can be applied to realize robots which autonomously perform tasks, for example.

FIG. 1 illustrates the concept of forward models and inverse models.

Let us say that there is certain input data serving as time-sequence data (data in time-sequence), and there is an object of control, which outputs output data serving as other time-sequence data, that is provided for the input data. Here, while detailed information relating to the object of control is unknown (i.e., while the interior of the object of control is unknown), the input data provided to the object of control, and the output data obtained from the object of control with regard to the input data, can be observed.

The physical value of the input data provided to the object of control and the output data obtained from the object of control with regard to the input data may be large or small, as long as it is observable. Also, any object (thing) will work as long as input data can be provided thereto and further output data can be obtained as to the input data.

Accordingly, various objects can be the object of control, examples of which include a ball, musical instrument, automobile, gas stove, to mention just a few. For example, in the case of a ball, applying (providing) force as input data yields the position and speed of the ball as output data which changes as to the input data. Also, in the case of an automobile, operating the steering wheel, gas pedal, brake, etc., i.e., providing operations thereof, yields the position and speed of the automobile as output data which changes as to the input data. Further, in the case of a gas stove, operating the size of the flame as input data yields room temperature as output data which changes as to the input data.

It should be noted that the term "data" as used in "input data", "output data", later-described "control data", and so forth, throughout the present Specification, and the drawings, claims, and all other documents attached thereto, is not restricted to the concept of structured or formatted information; rather, this term encompasses all forms of energy and force applied to the object or effected thereby, as long as such can be physically observed, measured, and/or quantified. A specific example of the scope of such input would be to say that the action of operating a valve, for example, in the above-described gas stove, to change the size of the flame would constitute such input data, but the intent of operator to do so would not. More specifically, any physical action of which the physical value is meaningful to, or effectually acts upon the object, is what is meant by this term, and accordingly, verbal instructions given to the gas stove would not be included in this scope if the gas stove is only operable by a twist knob for example, but would be included in this scope if the gas stove were provided with, for example, a microphone, speech recognition functions, command analysis functions, and a mechanism to execute physical action of changing the flame size so as to carry out the verbal command issued by the user. On the other hand, in a rather unlikely case wherein the input data to be applied is to physically throw the gas stove a certain distance, for example, the force applied thereto to that end would be the input data. In this way, the intent, or motive, behind the input data is not unrelated to what constitutes the input data; however, the intent or motive is never part of the input data. Moreover, even in a case wherein control of the object is realized by electroencephalography, such as technology being developed by MIT Media Lab Europe wherein a device or computer can be controlled wirelessly directly from the human brain, the output from the headset would serve as the input data to the object of control, while the intent or motive of the user would not. The scope of the term "data" as used in the present specification is to be thus understood.

With an arrangement wherein input data is thus provided to an object of control and output data is obtained thereby, the modeled object of control is a forward model.

With a forward model, upon inputting input data (upon input data being provided), a prediction value of output data obtained from the object of control as to that input data is output. Accordingly, with a forward model, output data which would be obtained from the object of control as to input data can be predicted even without providing the object of control with actual input data.

On the other hand, an inverse model is a model wherein a target value of output data obtained from the object of control is determined, and the input data to be provided to the object of control so as to obtain the output data of that target value is predicted. While a forward model can be viewed as mapping input data to output data, an inverse model is the opposite thereof.

Hereinafter, the input data to be provided to the object of control so as to obtain output data of the target value with an inverse model will be referred to as "control data" as appropriate.

Forward models and inverse models such as described above can be applied to robots, more particularly to the configuration of robots.

Let us say that a robot has a microphone and camera so as to be capable of input of audio (sound) data and image data, and also has a speaker and actuator (motor) so as to be capable of outputting audio (audio data) and moving an arm by driving the motor following motor data (motor signals).

With such a robot, a traditional approach for outputting audio data as output data or moving a desired arm as output data, in response to input data such as audio data or image data, is to use an audio recognition device or image recognition device and to program (design) beforehand what sort of audio data should be output or what sort of motor data should be output in response to recognition results of the audio data or image data input to the robot.

Conversely, using a forward model enables a robot which outputs desired audio data as output data or moving a desired arm as output data, in response to input data such as audio data or image data to be envisioned as an object of control, and the actual robot to be configured as a forward model of the robot envisioned as the object of control (hereinafter referred to as "anticipated robot" as suitable), as shown in FIG. 2. That is to say, a robot can be configured as a forward model of the anticipated robot, if an actual robot can be made to learn the relation between input data and output data to and from the anticipated robot.

Specifically, input data such as the audio data and image data to be input to the anticipated robot, and output data such as audio data and motor data to be output in response to the respective input data, are prepared beforehand as a set, and provided to an actual robot. If the actual robot can obtain a forward model of the anticipated robot predicting (i.e., outputting) output data corresponding to the input data, using only the set of input data and output data external provided thereto (hereinafter referred to as "teaching data" as suitable), then output data such as desired audio data and motor data and the like can be output in response to input data such as audio data and image data and the like which is actually input.

Also, using an inverse model enables arm control equipment for controlling a robot arm, as the object of control, as shown in FIG. 3.

That is to say, let us say that there is a robot arm here which is moved by a motor which performs driving according to motor data, which is input data, and that the position of the tip of the arm changes accordingly. Further, let us say that, with the center of gravity of the robot as the point of origin thereof, the position of the tip of the arm can be represented with the coordinates (x, y, z) in a three-dimensional coordinate system, in which the forward (frontal) direction of the robot is the x axis, the sideways direction of the robot as the y axis, and the vertical direction thereof as the z axis. In this case, the motor performs driving in accordance with the motor data so as to further change the position of the tip of the arm, such that the tip of the arm traces a certain path, in accordance with the three-dimensional coordinate system. Note that here, the sequence of coordinates of the path which the tip of the arm traces (tip position path) will be referred to as "tip position path data".

In order to cause the arm to trace a desired tip position path, i.e., in order to obtain output of desired tip position path data as the output data, motor data whereby the motor performs driving such that the arm traces such a tip position path needs to be provided to the motor as input data.

Now, if an inverse model can be obtained for predicting motor data serving as input data (control data) whereby certain tip position path data can be obtained as target values, using only teaching data made up of the set of motor data serving as input data and tip position path data serving as output data due to the motor data having been supplied to the motor, the inverse model can be used for arm control equipment for determining motor data corresponding to tip position path data which is the target value.

With arm control equipment serving as an inverse model for an arm, inputting tip position path data as input data to the robot allows the robot to use the arm control equipment to determine the corresponding motor data (control data). The robot then drives the motor thereof following the motor data, whereby the arm of the robot moves so as to trace a path corresponding to the tip position path data which is the input data.

Thus, if a forward model or inverse model can be obtained using only the set of input data and output data (i.e., teaching data), a robot which outputs output data corresponding to the respective input data can be readily configured, using forward and inverse models.

As for a method for obtaining such a forward model or inverse model as described above, there is modeling using a linear system.

With modeling using a linear system, as shown in FIG. 4 for example, with input data to the object of control at point-in-time t as u(t) and output data thereat as y(t), the relation between the output data y(t) and input data u(t), i.e., the object of control is approximated as a linear system obtained from Expression (1) and Expression (2)

$$x(t+1)=Ax(t)+Bu(t) \quad (1)$$

$$y(t)=Cx(t) \quad (2)$$

Here, x(t) is called a state variable of the linear system at the point-in-time t, with A, B, and C being coefficients. To facilitate description here, if we say that the input data u(t) and output data y(t) are one-dimensional vectors (scalar) and the state variable x(t) an n'th dimensional vector (wherein n is an integer value of 2 or higher in this case), A, B, and C are each matrices of constants obtained from an n×n matrix, n×1 matrix, and 1×n matrix, respectively.

With modeling using a linear system, the matrices A, B, and C are determined such that the relation between the observable input data u(t) and the output data y(t) observed when the input data u(t) is provided to the object of control satisfies the Expression (1) and Expression (2), thereby yielding a forward model of the object of control.

However, modeling using a linear system is insufficient for complicated objects of control, i.e., is insufficient for modeling an object of control having non-linear properties, for example.

That is to say, an actual object of control is complicated, and often has non-linear properties, but modeling the object of control by approximating a simple linear system results in great prediction error in the output data predicted as to the input data in a forward model or input data (control data) predicted as to the output data in an inverse model, so prediction with high precision is difficult.

Accordingly, as for a method to often a forward model or inverse model as to an object of control which has non-linear properties, there is a method for using a neural network to lean teaching data, i.e., a set of input data provided to the object of control and output data observed from the object of control when the input data is provided thereto. A neural network is a network configured by mutually connecting man-made elements imitating neurons (neurons), and can learn the relation between externally provided teaching data, i.e., the relation between input data and output data.

However, in order to suitably model the object of control with a neural network, there is the need for the size of the neural network to be great according to the complexity of the object of control. Increasing the size of the neural network markedly increases the time necessary for learning, and also stable learning becomes more difficult. This also holds true in the event that the order of dimension of the input data or output data is great.

On the other hand, in the event of obtaining a forward model or inverse model using only the set of input data and output data (teaching data), there is the need for learning to be performed using the teaching data, and for whether or not the teaching data falls under one of several patterns to be recognized. That is to say, there is the need for patterns of input data and output data serving as teaching data to be learned and recognized.

The technique for learning and recognizing patterns is generally called pattern recognition, and learning under pattern recognition can be classified into learning with a tutor (supervised learning) and learning without a tutor (unsupervised learning).

Supervised learning is a method wherein information is provided regarding to which class learning data of each pattern belongs (called "true label"), and learning data belonging to a pattern is learned for each pattern, with many learning methods using neural networks or the HMM (Hidden Markov Model) having been proposed.

FIG. 5 illustrates an example of supervised learning. With supervised learning, learning data to be used for learning is provided beforehand in anticipated categories (classes), such as categories of phonemes, phonetic categories, word categories, and so forth, for example. For example, in a case of learning audio data of voices "A", "B", and "C", audio data for a great number of each of "A", "B", and "C" is prepared.

On the other hand, anticipated categories are prepared by category for models used for learning as well (models by which learning data of each category is learned). Now, models are defined by parameters. For example, HMMs or the like are used as a model for learning audio data. An HMM is defined by the probability of state transition from one state to another state (including the original state), an output probability density function representing the probability density of observed values output from the HMM, and so forth.

With supervised learning, learning of the models of each category (class) is performed using only the learning data of that category. That is to say, in FIG. 5, learning of the category "A" model is performed using only learning data of the category "A", learning of the category "B" model is performed using only learning data of the category "B", and learning of the category "C" model is performed using only learning data of the category "C".

With supervised learning, there is the above-described need to use learning data of each category perform learning of a model of that category, so learning data is prepared for each category, learning data of that category is provided as to a model for learning the category, and thus a model is obtained for each category. Consequently, accordingly supervised learning, a template (a model of a class (category) represented by the true label) can be obtained for each class, based on the true label.

At the time of recognition, a template which most closely matches data which is the object of recognition (a template with the greatest likelihood) is obtained, and the true label of that template is output as the recognition result.

On the other hand, unsupervised learning is learning performed in a state wherein no true label is provided to learning data of each pattern, and is a learning method which uses a neural network or the like, for example. Unsupervised learning differs greatly from supervised learning in that no true label is provided.

Now, pattern recognition can be viewed as quantization of a signal space where data (signals) to be recognized by the pattern recognition is observed. Particularly, pattern recognition in cases wherein the data to be recognized is vector data may be called vector quantization.

With learning of vector quantization (codebook generation), a representative vector corresponding to a class (referred to as "centroid vector") is situated in the signal space where the data to be recognized is observed.

A representative technique for unsupervised learning of vector quantization is the K-means clustering method. With the K-means clustering method, in an initial state, centroid vectors are randomly situated, a vector serving as learning data is assigned to a centroid vector at the closest distance, and the centroid vectors are updated by an average vector of the learning data assigned to the centroid vectors, with this process being repeatedly performed. Note that a group of centroid vectors is called a codebook.

Now, the method for accumulating a great number of learning data and using all to perform learning is called "batch learning"; K-means clustering is classified in batch learning. As opposed to batch learning, learning wherein each time learning data is observed the learning data is used to perform learning, thereby updating parameters (centroid vector components, output probability density functions defining an HMM, etc.) a little at a time is called "on-line learning".

A known form of on-line learning is SOM (self-organization map) learning, proposed by Teuvo Kohonen. With SOM learning, the weight of an input layer and output layer of a SOM is gradually corrected (updated) by on-line learning.

That is to say, in a SOM, an output layer has multiple nodes, with weight vectors provided to each node of the output layer. In a case wherein the weight vector is a centroid vector, the SOM learning is vector quantization learning.

Specifically, with nodes in an output layer of a SOM, a node of which the distance between a weight vector and a vector serving as the learning data is determined to be the winning node matching that vector best, and the weight vector of the winning node is updated so as to be closer to the vector serving as the learning data. Further, weight vectors nearby the winning node are also updated so as to be closer to the learning data. Consequently, as learning progresses, nodes with similar weight vectors are placed so as to be closer to one another on the output layer, and dissimilar nodes distant one from another. Accordingly, a map is configured on the output layer, corresponding to a pattern included in the learning data, as if it were. This sort of learning wherein similar nodes (nodes of which weight vectors are similar) are grouped close to one another as learning processes so as to configure a map corresponding to a pattern included in the learning data is referred to as "self-organizing learning", or "self organization".

Now, with K-means clustering, only the vector closest to the learning data is updated, so the updating method thereof is called "WTA (winner-take-all)". On the other hand, learning with a SOM is such that not only the weight vector of the nearest node to the learning data (winning node) but also weight vectors of nodes nearby the winning node are also updated, so the updating method thereof is called "SMA (soft-max adaptation)". It is known that while WTA learning tends to fall into localized learning, while the problem of falling into localized learning can be improved with SMA learning.

For more about SOM, see "Self-Organization Map" by Teuvo Kohonen, published by Springer Japan, for example.

Now, research is being performed on a framework for a robot to acquire a structure for perceptive actions through the actions of the robot itself, so as to make the behavior (actions) of the robot in the real world more natural. Note that "perceptive actions" means that a robot or the like perceives (recognizes) an external state (including the state of the robot itself) and acts according to the results of the perception.

In order to case a robot to perform perceptive actions, there is the need to obtain appropriate motor data to serve as motor data supplied to the motor driving the robot, as to sensor data which a sensor detecting the external state outputs, for example.

Generally, sensor data output from a sensor, and motor data supplied to a motor, are both continuous time-sequence data. Also, robots which perform perceptive actions in the real word need to handle data with a great number of dimensions for the sensor data and motor data. Moreover, the behavior of sensor data and motor data handled by the robot is complex, and cannot readily be modeled with a linear system.

Now, the present assignee has already proposed a method for using a time-sequence pattern storage network configured of multiple nodes having a time-sequence pattern model representing a time-sequence pattern, which is a pattern of time-sequence data such as sensor data or motor data, to perform self-organizing learning of time-sequence data such as sensor data and motor data which are time-sequence systems of multi-dimensional vectors, and further to joint the nodes of a time-sequence pattern storage network which has learned time-sequence data which is input data with those of a time-sequence pattern storage network which has learned time-sequence data which is output data, so as to perceive an external state, and generate output data, based on input data, corresponding to actions the robot should take based on the results of perception (e.g., see Japanese Unexamined Patent Application Publication No. 2006-162898).

Now, a time-sequence pattern storage network is common with known SOMs in that it is configured of multiple nodes and can perform learning, and accordingly can be said to be a type of SOM. However, a time-sequence pattern storage network differs from known SOMs in that the nodes have time-sequence pattern models and that time-sequence patterns are held in storage structures of the time-sequence pattern models.

SUMMARY OF THE INVENTION

Now, learning of a time-sequence data can be performed with a neural network by sectioning time-sequence data into fixed lengths, for example. That is to say, sectioning the time-sequence data into fixed lengths and presenting the neural network with a vector, of which the fixed-length time-sequence data is a component, as input, enables time-sequence data to be learnt with a neural network. However, performing large-scale learning wherein the number of dimensions to be presented to the neural network is great with a single neural network is difficult at a practical level, due to the amount of computations drastically increasing.

Thus, there has been found the need to perform large-scale learning in a practical manner.

According to an exemplary embodiment of the present invention, a data processing device for processing time-sequence data includes a learning unit for performing self-organizing learning of a SOM (self-organization map) making up a hierarchical SOM in which a plurality of SOMs are connected so as to construct a hierarchical structure, using, as SOM input data which is input to the SOM, a time-sequence of node information representing a winning node of a lower-order SOM which is at a lower hierarchical level from the SOM.

According to another exemplary embodiment of the present invention, a data processing method or program is a method for processing time-sequence data, or a program for causing a computer to process time-sequence data, and includes the step of performing self-organizing learning of a SOM (self-organization map) making up a hierarchical SOM in which a plurality of SOMs are connected so as to construct a hierarchical structure, using, as SOM input data which is input to the SOM, a time-sequence of node information representing a winning node of a lower-order SOM which is at a lower hierarchical level from the SOM.

With these exemplary embodiments, self-organizing learning of SOMs making up a hierarchical SOM in which a plurality of SOMs are connected so as to construct a hierarchical structure is performed using, as SOM input data, a time-sequence of node information representing a winning node of a lower-order SOM which is at a lower hierarchical level from the SOM. Also, large-scale learning can be performed in a practical manner. Note that the program may be recorded in a recording medium, or transmitted via a transmission medium.

According to another exemplary embodiment of the present invention, a data processing device for processing time-sequence data includes a storage unit for storing a hierarchical SOM in which a plurality of SOMs are connected so as to construct a hierarchical structure, and a recognition generating unit for generating prediction time-sequence data wherein time-sequence data at a point-in-time subsequent to time-sequence data at a certain point in time is predicted, using the hierarchical SOM.

According to another exemplary embodiment of the present invention, a data processing method or program is a method for processing time-sequence data, or a program for causing a computer to process time-sequence data, and includes the step of generating prediction time-sequence data wherein time-sequence data at a point-in-time subsequent to time-sequence data at a certain point in time is predicted, using a hierarchical SOM in which a plurality of SOMs are connected so as to construct a hierarchical structure.

With these exemplary embodiments, prediction time-sequence data is generated wherein time-sequence data at a point-in-time subsequent to time-sequence data at a certain point in time is predicted, using a hierarchical SOM in which a plurality of SOMs are connected so as to construct a hierarchical structure. Also, prediction time-sequence data wherein the time-sequence data at the next point-in-time is predicted, can be generated. Note that the program may be recorded in a recording medium, or transmitted via a transmission medium.

BRIEF DESCRIPTION OF THE DRAWINGS

FIG. 34 is a diagram schematically illustrating a hierarchical SOM;

FIG. 35 is a diagram schematically illustrating a hierarchical SOM used in an experiment;

FIG. 36 is a diagram for describing method for extracting SOM input data in increments of frames;

FIG. 37 is a diagram for describing learning procedures for learning of a lowest-order SOM, of the SOMs making up a hierarchical SOM;

FIG. 39 is a diagram for describing the learning processing for learning of a higher-order SOM which is at a higher hierarchical level than the lowest-order hierarchical level, of the SOMs making up a hierarchical SOM;

FIG. 41 is a diagram for describing first processing procedures (Algorithm 1) for recognition generating processing;

FIG. 44 is a diagram for describing probability (belief) propagation in a single layer;

FIG. 48 is a diagram for describing firing of a SOM and probability distribution;

FIG. 49 is a diagram for describing second processing procedures (Algorithm 2) for recognition generating processing;

FIG. 50 is a diagram for describing how to use a particle filter;

FIG. 51 is a diagram for describing how to use a particle filter;

FIG. 52 is a diagram for describing third processing procedures (Algorithm 3) for recognition generating processing;

FIG. 53 is a diagram for describing a hierarchical SOM to which the solution of a Bayesian network has been applied;

FIG. 54 is a diagram for describing a hierarchical SOM to which the solution of a Bayesian network has been applied;

FIG. 56 is a diagram for describing messages exchanged among SOMs making up a hierarchical SOM to which a Bayesian network having a polytree configuration has been applied;

FIG. 57 is a diagram for describing fourth processing procedures (Algorithm 4) for recognition generating processing; and FIG. 58 is a block diagram illustrating a configuration example of an embodiment of a computer to which the present invention has been applied.

DESCRIPTION OF THE PREFERRED EMBODIMENTS

Figure 1:
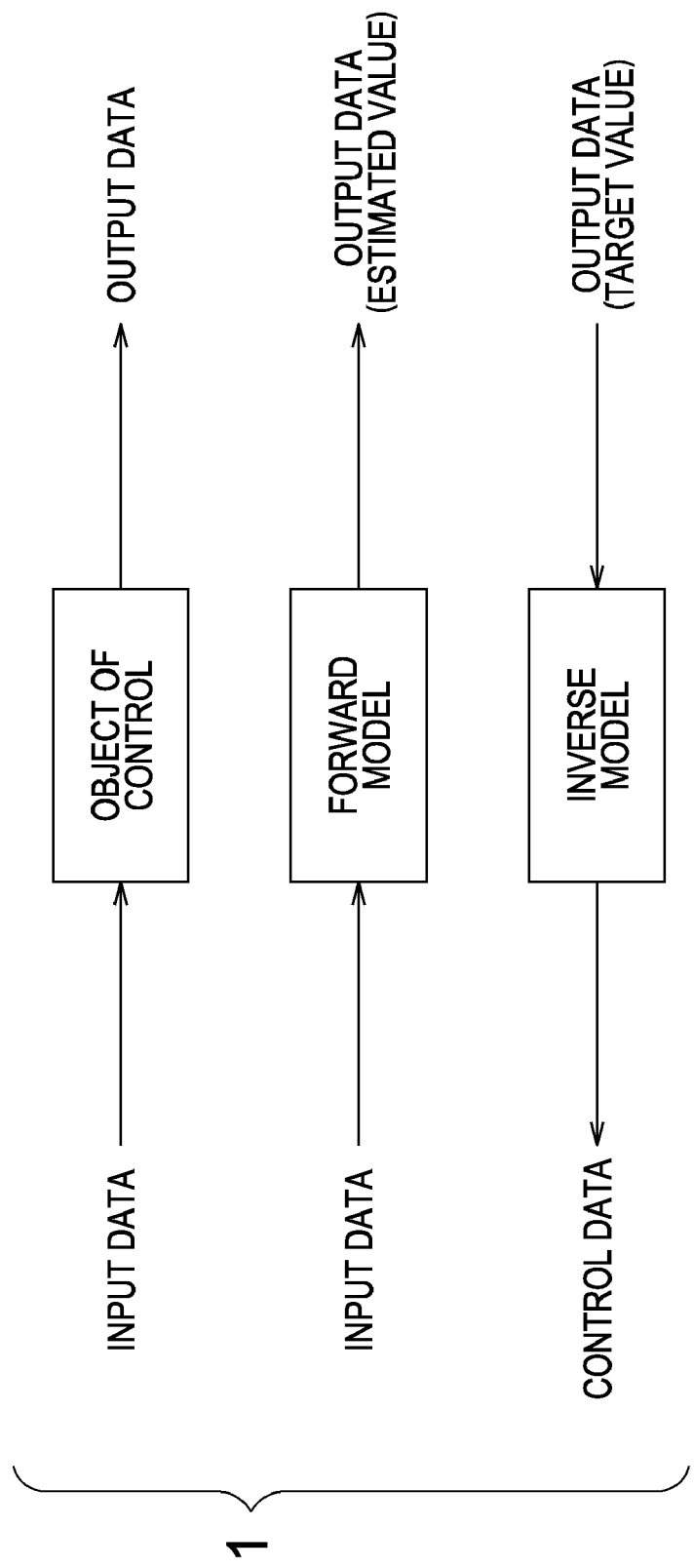
FIG. 1 is a diagram for describing an object of control, and a forward model and inverse model.
Figure 2:
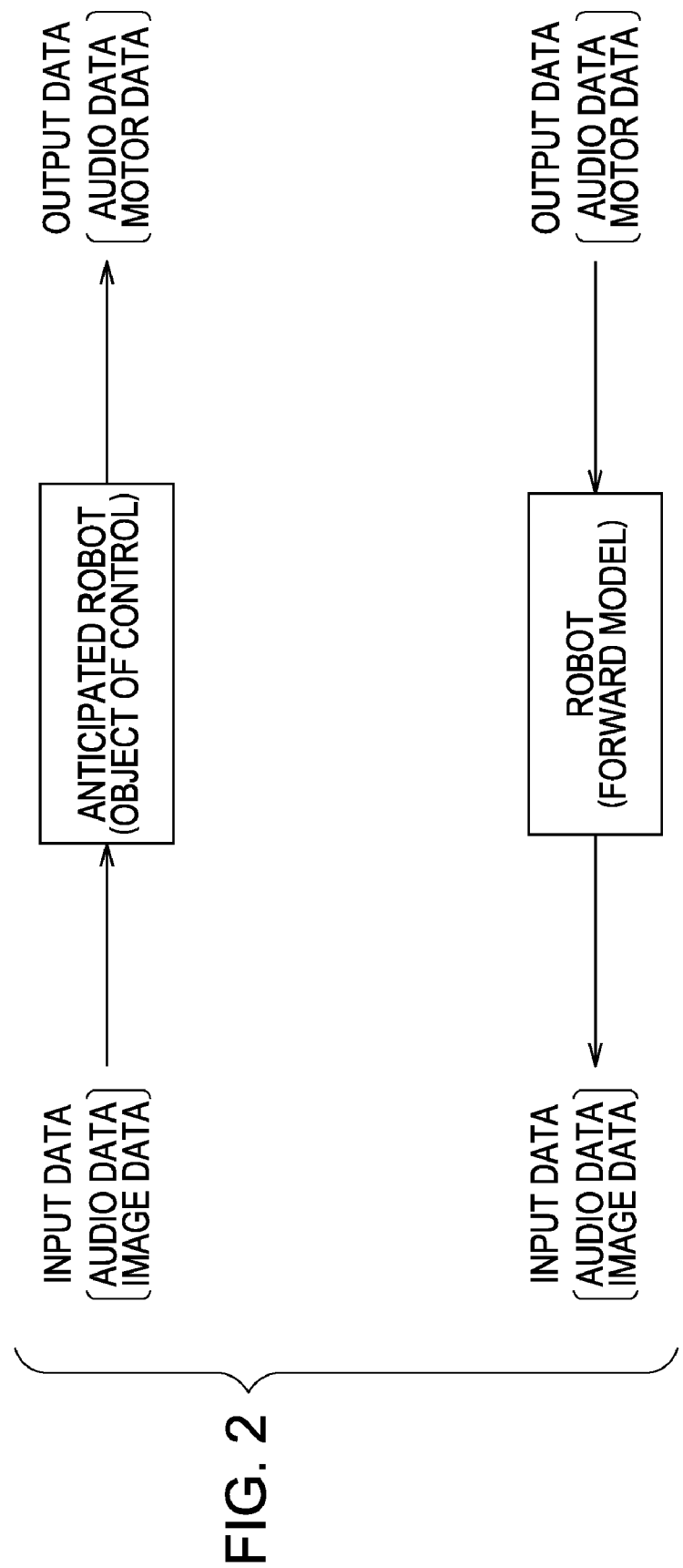
FIG. 2 is a diagram illustrating an anticipated robot as an object of control, and a forward model of the anticipated robot.
Figure 3:
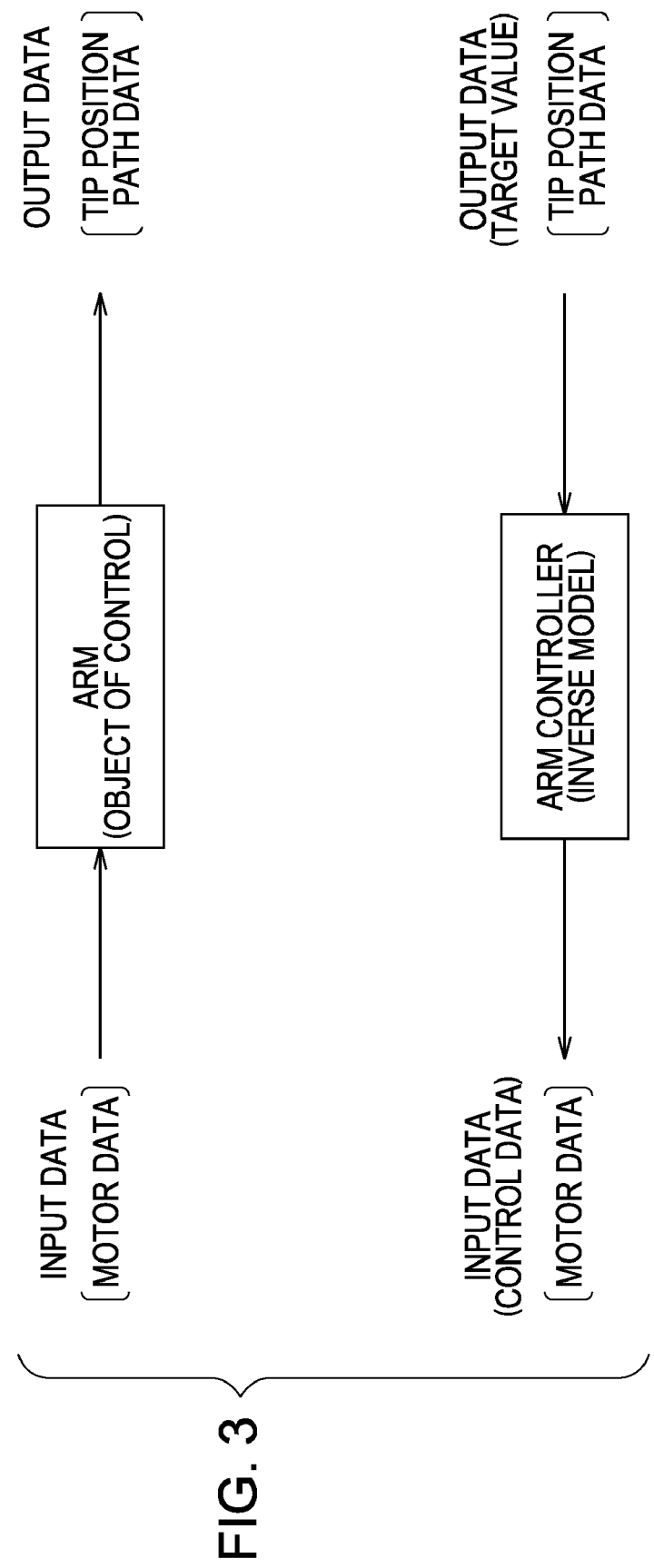
FIG. 3 is a diagram illustrating a robot arm as an object of control, and an arm control device of the arm, using an inverse model.
Figure 4:
FIG. 4 is a diagram for describing modeling using a linear system.

Before describing embodiments of the present invention, the correspondence between the elements of the present invention and the embodiments described in the specification and the drawings is discussed below. This description is intended to assure that embodiments supporting the present invention are described in this specification and the drawings. Thus, even if an element in the specification and the drawings is not described here as an arrangement corresponding to a certain element of the present invention, that does not necessarily mean that the arrangement does not correspond to that element. Conversely, even if an arrangement is described herein as corresponding to a certain element, that does not necessarily mean that the arrangement does not relate to the other elements.

A data processing device according to an embodiment of the present invention is a data processing device for processing time-sequence data (e.g., the data processing device 501 in FIG. 33), including a learning unit (e.g., the learning unit 513 in FIG. 33) for performing self-organizing learning of a SOM (self-organization map) making up a hierarchical SOM in which a plurality of SOMs are connected so as to construct a hierarchical structure, using, as SOM input data which is input to the SOM, a time-sequence of node information representing a winning node of a lower-order SOM which is at a lower hierarchical level from the SOM.

The data processing device may further include a recognition generating unit (e.g., the recognition generating unit 515 in FIG. 33) for generating prediction time-sequence data predicting time-sequence data of a point-in-time subsequent to time-sequence data at a certain point-in-time, using the hierarchical SOM regarding which self-organizing learning and prediction learning has been performed.

A data processing method or program according to an embodiment of the present invention is a method for processing time-sequence data program or a program causing a computer to execute data processing for processing time-sequence data, including the step of performing self-organizing learning of a SOM (self-organization map) making up a hierarchical SOM in which a plurality of SOMs are connected so as to construct a hierarchical structure, using, as SOM input data which is input to the SOM, a time-sequence of node information representing a winning node of a lower-order SOM which is at a lower hierarchical level from the SOM (steps S521 through S525 in FIG. 39).

A data processing device according to another embodiment of the present invention is a data processing device for processing time-sequence data (e.g., the data processing device 501 in FIG. 33), including a storage unit (e.g., the storage unit 511 in FIG. 33) for storing a hierarchical SOM in which a plurality of SOMs are connected so as to construct a hierarchical structure, and a recognition generating unit (e.g., the recognition generating unit 515 in FIG. 33) for generating prediction time-sequence data wherein time-sequence data at a point-in-time subsequent to time-sequence data at a certain point in time is predicted, using the hierarchical SOM.

A data processing method or program according to another embodiment of the present invention is a method for processing time-sequence data program or a program causing a computer to execute data processing for processing time-sequence data, including the step of generating prediction time-sequence data wherein time-sequence data at a point-in-time subsequent to time-sequence data at a certain point in time is predicted, using a hierarchical SOM in which a plurality of SOMs are connected so as to construct a hierarchical structure (e.g., steps S541 through S560 in FIG. 41, steps S601 through S620 in FIG. 49, steps S701 through S723 in FIG. 52, and steps S801 through S824 in FIG. 57).

In embodiments of the present invention, the recognition generating unit may, in an order from a lower hierarchical level toward a higher hierarchical level, obtain a node which is a winning node for each SOM of the hierarchical SOM (e.g., step S544 in FIG. 41); in an order from a higher hierarchical level toward a lower hierarchical level, obtain a prediction node, which is a node predicted to serve as the winning node in the subsequent point-in-time, based on the weight of the winning node for SOMs regarding which there is no higher order SOM which is a higher order hierarchical level SOM (e.g., step S554 in FIG. 41), and obtain a prediction node based on the weight of the winning node and a prediction node of the higher order SOM for SOMs regarding which there is a higher order SOM (e.g., step S552 in FIG. 41); and generate the prediction time-sequence data using, of the plurality of SOMs making up the hierarchical SOM, the prediction node of the lowest hierarchical level (e.g., step S559 in FIG. 41).

Further, in embodiments of the present invention, the recognition generating unit may obtain a node to be a winning node in a SOM, in an order from a lower hierarchical level toward a higher hierarchical level, and take a time-sequence of node information representing the winning node as SOM input data to a higher order SOM which is a SOM of a higher hierarchical level (e.g., steps S544 and S545 in FIG. 41, and step S607 in FIG. 49); and obtain a prediction node which is a node of a SOM predicted to be a winning node at the next point-in-time, in an order from a higher hierarchical level toward a lower hierarchical level, based on a prediction node of a higher order SOM of the SOM (e.g., step S552 in FIG. 41 and step S614 in FIG. 49).

Also, in embodiments of the present invention, the recognition generating unit may further obtain a transition probability which is a probability that a winning node makes transition in a SOM, based on the weight (e.g., step S612 in FIG. 49); and obtain a prediction node of the SOM of interest, based on the transition probability of the SOM of interest and a prediction node of a higher order SOM of the SOM of interest (e.g., step S615 in FIG. 49).

Further, in embodiments of the present invention, the recognition generating unit may, in an order from a lower hierarchical level toward a higher hierarchical level, obtain an observation likelihood that SOM input data will be observed in a node of a SOM making up the hierarchical SOM (e.g., step S605 in FIG. 49), obtain a state probability at the current point-in-time, which represents the probability that a node of a SOM is a winning node, based on the observation likelihood (e.g., step S606 in FIG. 49), obtain the winning node of a SOM, based on the state probability at the current point-in-time (e.g., step S607 in FIG. 49), and take a time-sequence of node information representing a winning node of the SOM of interest as SOM input data to a higher order SOM of the SOM of interest (e.g., step S607 in FIG. 49); in an order from a higher hierarchical level toward a lower hierarchical level, obtain a state probability of the SOM of interest using the weight (e.g., step S612 in FIG. 49), obtain a transition probability of the next point-in-time, based on the transition probability of the SOM of interest and a prediction node of a higher order SOM to the SOM of interest (e.g., step S614 in FIG. 49), and obtain a prediction node of the SOM of interest based on the state probability at the subsequent point-in-time (e.g., step S615 in FIG. 49); and generate the prediction time-sequence data using, of the plurality of SOMs making up the hierarchical SOM, the prediction node of the lowest hierarchical level (e.g., step S617 in FIG. 49).

Embodiments of the present invention will be described below with reference to the drawings, but in preparation, a time-sequence pattern storage network will be described.

Figure 6:
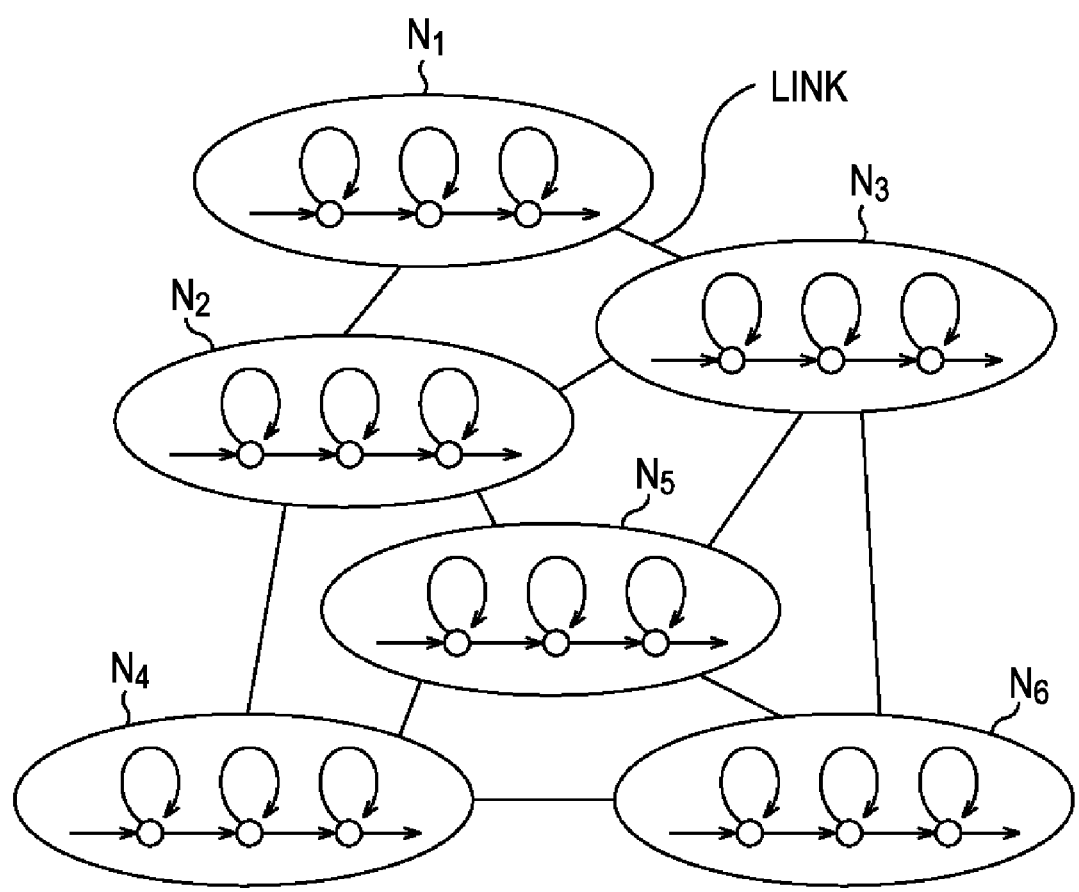
FIG. 6 is a diagram illustrating a first configuration example of a time-sequence pattern storage network.

FIG. 6 schematically illustrates a time-sequence pattern storage network.

A time-sequence pattern storage network is a network configured of multiple nodes having a time-sequence pattern model representing a time-sequence pattern, with the overall network storing as many time-sequence patterns as there are nodes (for performing classification).

In FIG. 6, the time-sequence pattern storage network is configured of six nodes, node $N_1$ through $N_6$.

The nodes $N_i$ (wherein i=1, 2, and so on through 6 in FIG. 6) making up the time-sequence pattern storage network have a time-sequence pattern model representing a time-sequence pattern. Also, the nodes $N_i$ can have a jointed relation with other nodes $N_j$ (wherein j=1, 2, and so on through 6 in FIG. 6). This jointed relation is called linking. In FIG. 6, the node $N_1$ for example has a direct jointed relation with nodes $N_2$ and $N_3$. Also, for example, the node $N_3$ has a direct jointed relation with nodes $N_1$, $N_2$, $N_5$, and $N_6$, and accordingly, the $N_5$ and $N_6$ have an indirect jointed relation with the $N_1$ via the node $N_3$. Note that when considering the jointed relation between two nodes $N_i$ and $N_j$, the jointed relation over the closest distance between the nodes $N_i$ and $N_j$ will be considered.

Figure 5:
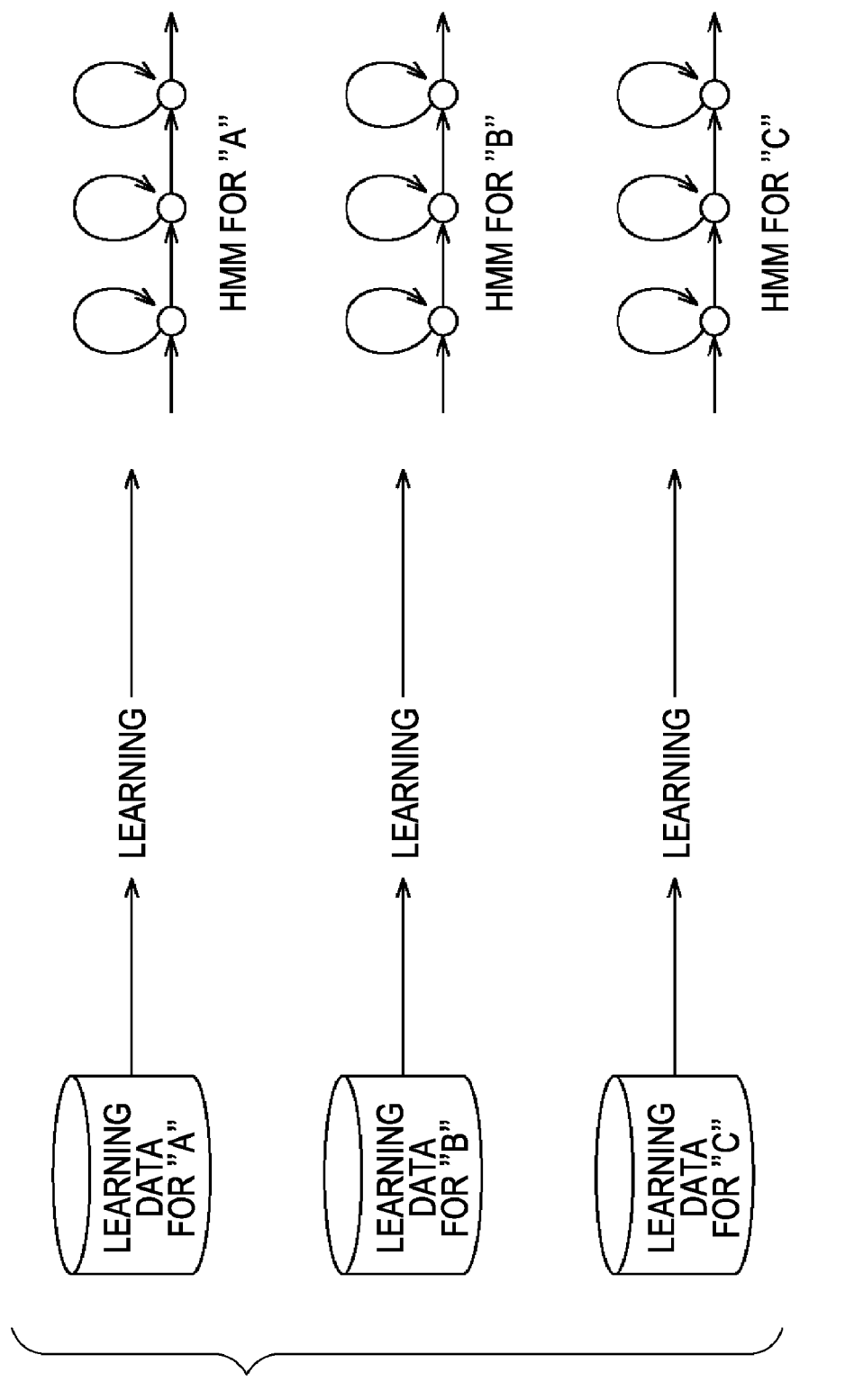
FIG. 5 is a diagram for describing an example of supervised learning.

Leaning with a time-sequence pattern storage network (learning wherein a time-sequence pattern storage network is made to store time-sequence patterns) is carried out using time-sequence data as learning data with which to perform learning. However, this learning with a time-sequence pattern storage network differs greatly from the supervised learning described above with reference to FIG. 5 in that the types of categories and number of categories in the learning data is unknown. Also, there is no true label provided to learning data used in learning with a time-sequence pattern storage network. Accordingly, the supervised learning described with reference to FIG. 5 above cannot be applied thereto.

Thus, supervised learning cannot be applied to learning with a time-sequence pattern storage network, and also, the types of categories and number of categories of the learning data are unknown. Accordingly, learning with a time-sequence pattern storage network is performed in a self-organizing manner by all of the nodes thereof, such that the characteristics of the learning data (time-sequence pattern) can be appropriately represented.

Note that learning with a time-sequence pattern storage network is unsupervised learning. Also, in learning with a time-sequence pattern storage network, a certain node and a certain category do not necessarily correspond one to another in a one-on-one manner. That is to say, with a time-sequence pattern storage network, there are cases wherein learning is performed with one node and one category corresponding one to another in a one-on-one manner, cases wherein learning is performed with multiple nodes corresponding to one category, and further, cases wherein learning is performed with one node corresponding to multiple categories. Accordingly, even in cases wherein the learning data cannot be clearly categorized, learning with a time-sequence pattern storage network can be performed.

Figure 7:
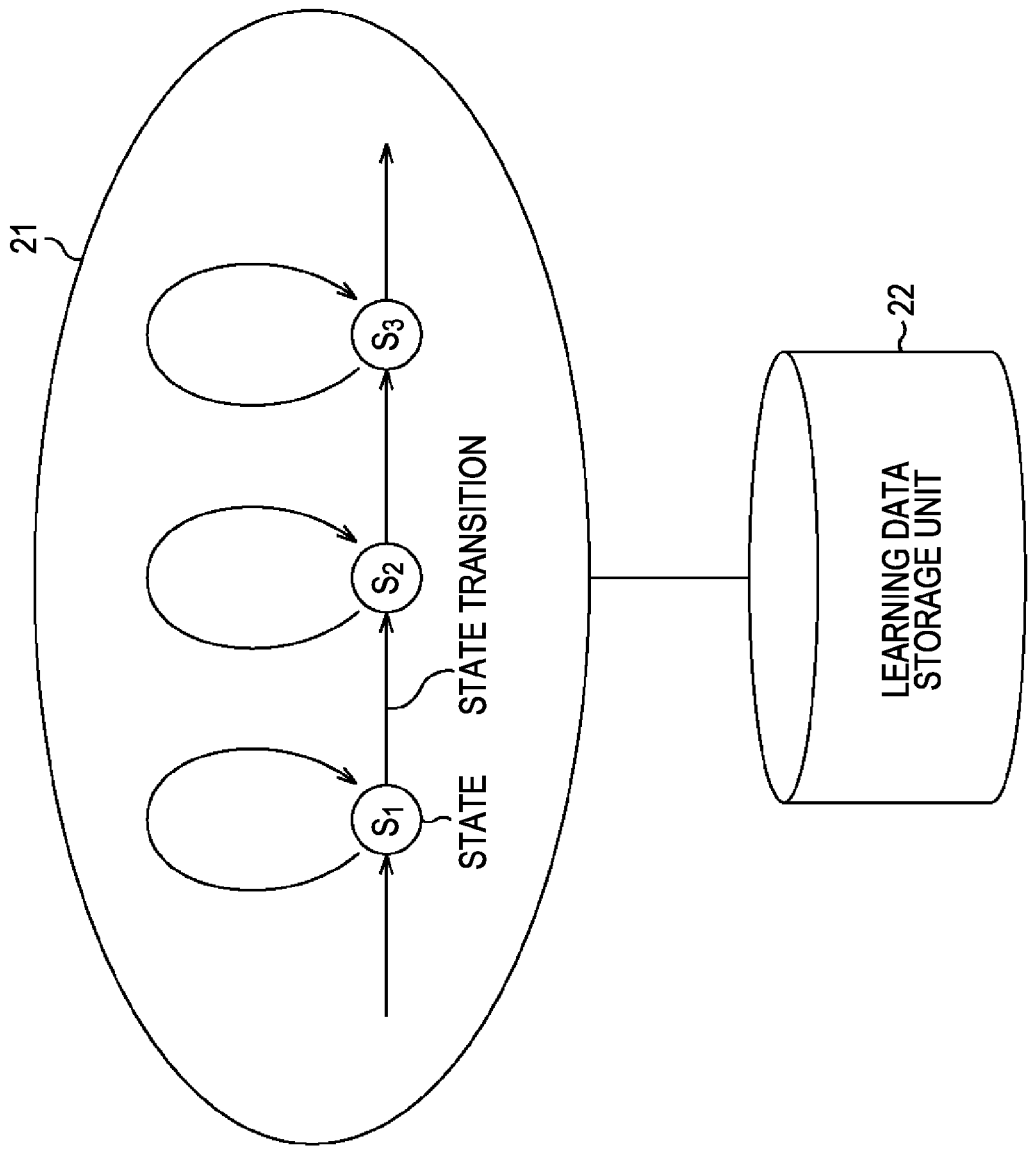
FIG. 7 is a diagram illustrating a configuration example of a node.

Next, FIG. 7 schematically illustrates a configuration example of a node $N_i$ in a time-sequence pattern storage network.

The node $N_i$ is configured of a time-sequence pattern model 21 representing a time-sequence pattern, and a learning data storage unit 22 for storing learning data used for learning the time-sequence pattern model 21.

In FIG. 7, the time-sequence pattern model 21 employed is an HMM (continuous HMM), which is a type of state probability transition model. Also, in FIG. 7, the HMM has three states $S_1$, $S_2$, and $S_3$, in a left-to-right form, wherein each state can only either loop back on itself or make transition to the next state (state to the right). The circles in the time-sequence pattern model 21 in FIG. 7 represent states, and the arrows indicate state transitions. Note that the HMM serving as the time-sequence pattern model 21 is not restricted to a left-to-right type, to a three-state type, etc.

In the event that the time-sequence pattern model 21 is an HMM such as shown in FIG. 7, the HMM serving as the time-sequence pattern model 21 is defined by state transition probability and output probability density function (in the event that the HMM is a discreet HMM, the probability that a discrete symbol, which is a scalar quantity, will be output).

The state transition probability is the probability that a state will make transition in an HMM, and is provided to each state transition indicated by arrows in the time-sequence pattern model 21 in FIG. 7. The output probability density function represents the probability density of a value observed from the HMM at the time of state transition. An example of an output probability density function employed is contaminated normal distribution or the like. Such HMM parameters (state transition probability and output probability density function) can be learned (estimated) with the Baum-Welch method.

At the nodes $N_i$, the statistical properties of the learning data stored in the learning data storage unit 22, i.e., the time-sequence pattern of the learning data stored in the learning data storage unit 22, is learned at the time-sequence pattern model 21, and thus the time-sequence pattern model 21 and the learning data stored in the learning data storage unit 22 are in a correlated relation.

Note that learning with a time-sequence pattern storage network, and by extension learning with the time-sequence pattern model 21 of the node $N_i$, learning is performed by on-line learning, wherein learning is performed each time time-sequence data is provided to the time-sequence pattern storage network. Accordingly, the parameters of the time-sequence pattern storage network, i.e., the parameters of the node $N_i$ time-sequence pattern model 21 (in the event that the time-sequence pattern model 21 is an HMM, the state transition probability and output probability density function as described above) are updated a little at a time, each time time-sequence data is provided to the time-sequence pattern storage network.

That is to say, as described later more specifically, as the learning of the time-sequence pattern storage network processes, the learning data stored in the learning data storage unit 22 is updated by the time-sequence data provided to the time-sequence pattern storage network, and accordingly changes a little at a time. Learning is performed at the time-sequence pattern model 21 by the learning data which changes a little at a time, whereby the parameters of the time-sequence pattern model 21 also change a little at a time.

However, it should be noted at learning with the time-sequence pattern storage network can be performed by batch learning, as well.

Figure 8:
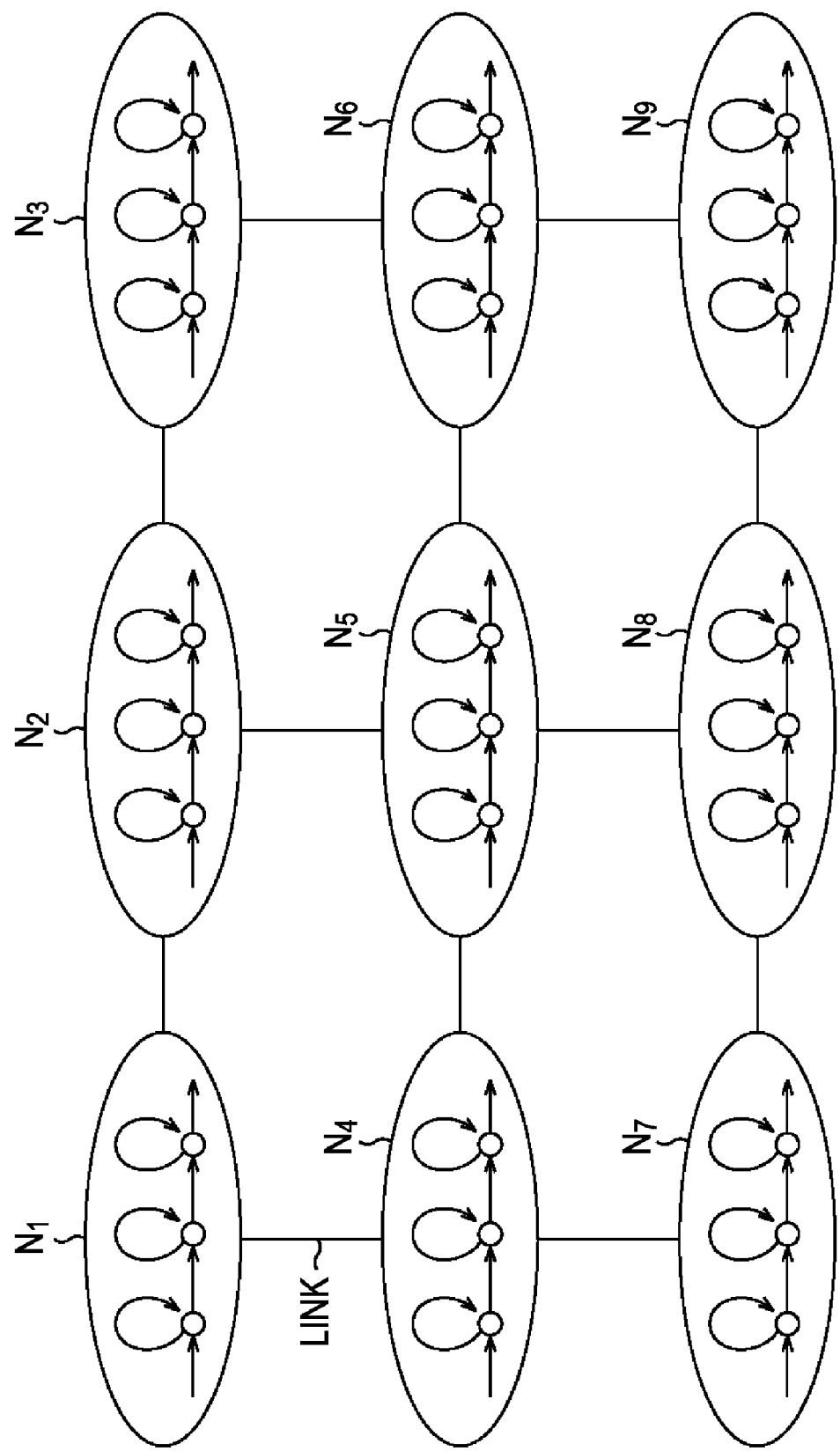
FIG. 8 is a diagram illustrating a second configuration example of a time-sequence pattern storage network.

Next, FIG. 8 schematically illustrates another example of a time-sequence pattern storage network.

In FIG. 8, the time-sequence pattern storage network is configured of nine nodes $N_1$ through $N_9$, with the nine nodes $N_1$ through $N_9$ being arrayed two-dimensionally. That is to say, in FIG. 8, the nine nodes $N_1$ through $N_9$ are arrayed so as to be 3×3 on a two-dimensional plane.

Further, in FIG. 8, each of the nine nodes $N_1$ through $N_9$ arrayed two-dimensionally are linked (in a jointed relation) with the horizontally adjacent nodes and vertically adjacent nodes. Such linking can be said to provide the nodes making up the time-sequence pattern storage network with an array structure that is arrayed spatially two-dimensionally.

With a time-sequence pattern storage network, the distance between two nodes in this space can be defined based on the spatial node placement provided by linking, and the distance between two nodes can be used as an inter-pattern distance (similarity between time-sequence patterns) of the time-sequence patterns, which the time-sequence pattern models 21 of each of the two nodes has.

Note that the inter-pattern distance between the time-sequence patterns represented by the distance between the two nodes can be said to be an inter-pattern distance based on the jointed relation (linking) of the two nodes.

As for the distance between two nodes, the number of links making up the shortest path connecting the two nodes can be employed, for example. In this case, if we take interest in a certain node, a node which has a direct link with that node of interest (in FIG. 8, the nodes horizontally and vertically adjacent to the node of interest) are at the closest distance to the node of interest, and nodes which can arrive at the node of interest by following links behind the nodes having direct links to the node of interest are farther from the node of interest in proportion to the number of links which must be traversed.

Note that the links provided to the nodes are no restricted to the arrangements shown in FIGS. 6 and 8. Also, while the linking shown in FIGS. 6 and 8 illustrate two-dimensional array structures, linking may be such so as to provide a one-dimensional array structure or a three-dimensional array structure. Moreover, nodes do not necessarily have to be provided with links.

Figure 9:
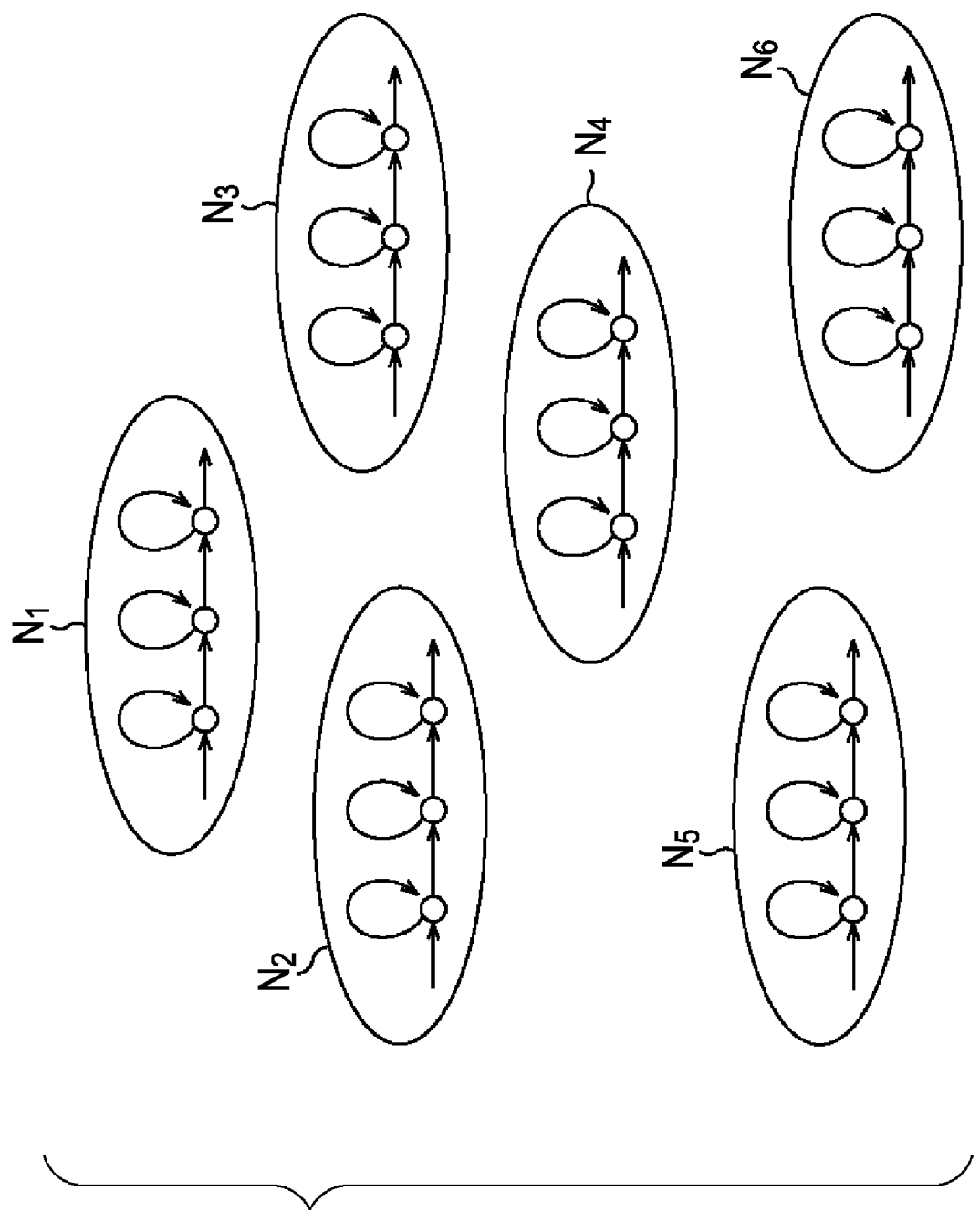
FIG. 9 is a diagram illustrating a third configuration example of a time-sequence pattern storage network.

For example, FIG. 9 schematically illustrates another example of a time-sequence pattern storage network.

In FIG. 9, the time-sequence pattern storage network is configured of six nodes $N_1$ through $N_6$ in the same way as with FIG. 6, but none of these six nodes $N_1$ through $N_6$ have links. Accordingly, the nodes $N_1$ through $N_6$ making up the time-sequence pattern storage network shown in FIG. 9 do not have a spatial array structure provided by linking. Not having a spatial array structure means that a spatially unrestricted array structure has been provided.

Now, in the event that there is no linking between any two nodes, the distance between the two nodes cannot be spatially defined, so inter-pattern distance based on the jointed relation (linking) cannot be used as the inter-pattern distance of the time-sequence patterns represented by each of the two nodes, or more particularly, by the time-sequence pattern models 21 of each. Accordingly, in this case, a value corresponding to order based on the degree of a node, for example, matching the observation value of certain time-sequence data (hereinafter referred to as "matching order" as appropriate) can be sued as the inter-pattern distance.

That is to say, in the event that certain time-sequence data is provided, the similarity of the time-sequence pattern which the node represents as to the time-sequence data can be obtained as the degree to which the node matches. Now, of the nodes making up the time-sequence pattern storage network, the inter-pattern distance between time-sequence patterns representing each of a winning node which is a node closest matching certain time-sequence data, and another node of the time-sequence pattern storage network, can be expressed by a value corresponding to the order of matching of the time-sequence data by the node, i.e., the matching order.

Specifically, of the nodes making up the time-sequence pattern storage network, the matching order of a node which is the winning node is No. 1, and the inter-pattern distance between this node (winning node) and the time-sequence patterns represented by each of the nodes as to the winning node can be said to be 0, which is 1 subtracted from the matching order, for example.

Also, of the nodes making up the time-sequence pattern storage network, the inter-pattern distance between a node of which the matching order is No. 2 and the winning node can be said to be 1, which is 1 subtracted from the matching order, for example. Hereinafter, in the same way, a value obtained by subtracting 1 from the matching order of the node can be used as the inter-pattern distance between that node and the node which is the winning node.

Also note that the inter-pattern distance represented by a value corresponding to the order (matching order) based on the degree of a node matching the time-sequence data can be said to be an inter-pattern distance based on the degree to which the node matches the time-sequence data.

Figure 10:
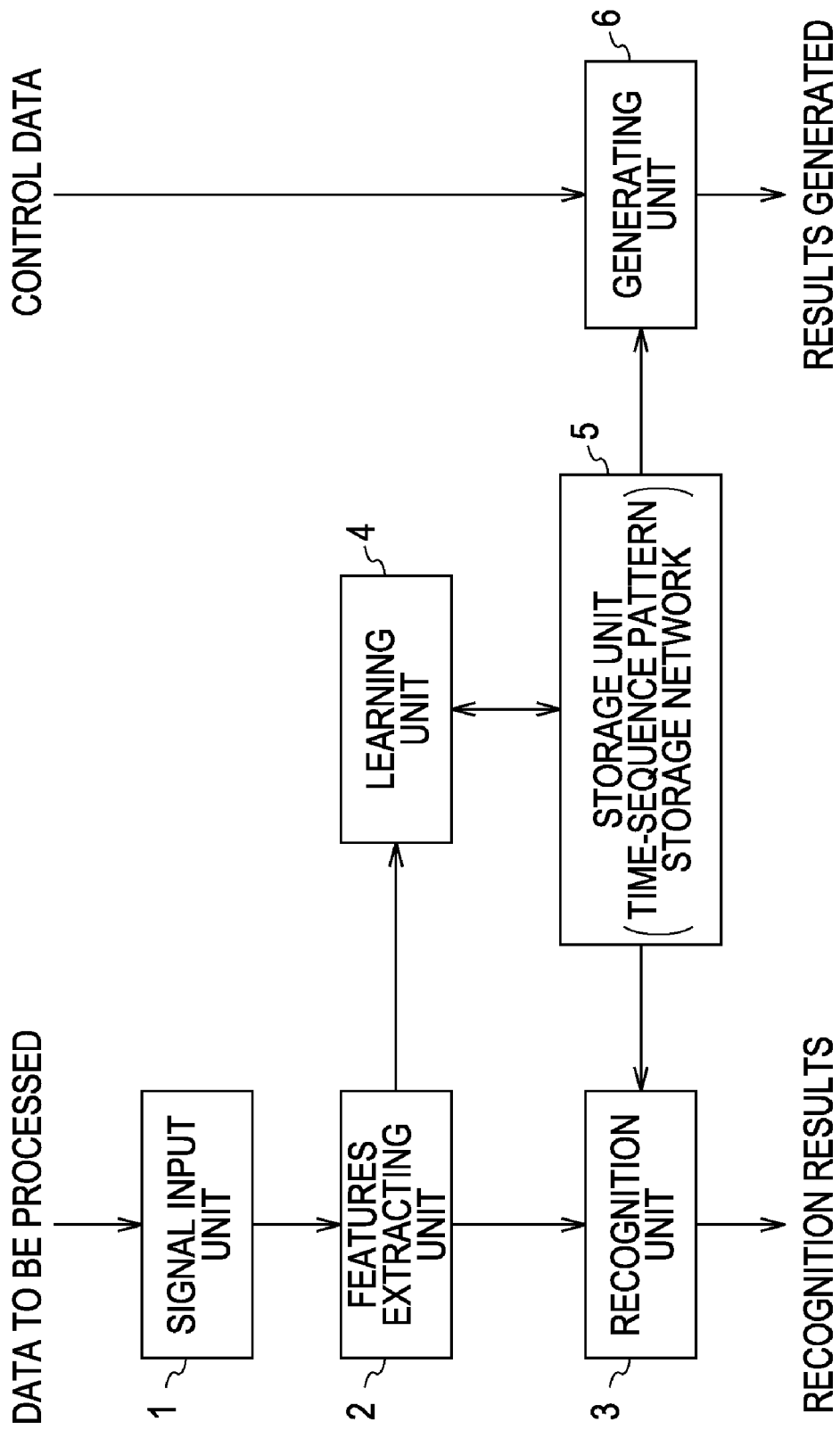
FIG. 10 is a block diagram illustrating a configuration example of a data processing device for performing processing using a time-sequence pattern storage network.

Next, FIG. 10 illustrates a configuration example of a data processing device which performs various types of processing using a time-sequence pattern storage network.

Data, which is to be subjected to later-described learning processing and recognition processing (hereinafter referred to as "data to be processed") is input to a signal input unit 1. The data to be processed here us observation values such as sound (audio), images, brightness of an LED (Light-Emitting Diode), rotational angle or angular velocity of a motor, and so forth, i.e., values (signals) which can be externally observed. Alternatively, data to be processed may be data output from an input device (sensor) which accepts input to a system to which the data processing device shown in FIG. 10 is applied, or may be data provided to an output device which performs some sort of output.

That is to say, in the event that the data processing device shown in FIG. 10 is applied to a robot such as a bipedal robot for example, with the bipedal robot performing some sort of processing in response to an external state, the signal input unit 1 can be configured of a sensor sensing the external state. Specifically, the signal input unit 1 can be configured of a microphone or camera or the like, for example.

In the event that the signal input unit 1 is configured of a microphone, audio generated externally (all sounds, including human voices, animal sounds, sounds of other things, etc.) is input as input data to the bipedal robot (i.e., the system to which the data processing device has been applied), and corresponding audio data is supplied to a features extracting unit 2. Also, in the event that the signal input unit 1 is configured of a camera, external light to the camera is input as input data to the bipedal robot, and corresponding image data is supplied to the features extracting unit 2.

Also, in the event that the bipedal robot is capable of moving a portion equivalent to an arm or leg or the like for example, by a motor serving as an actuator, the signal input unit 1 can be configured of a measuring device for measuring the rotational angle of the motor or the angular velocity thereof (i.e., a sensor for sensing the rotational angle or the angular velocity). Note that a motor which moves a portion of the bipedal robot equivalent to an arm or leg or the like is rotated not only by being provided with driving signals which are electric signals for rotational driving of the motor, but also by external force being applied to the portion equivalent to an arm or leg or the like. the measuring device can measure the rotational angle or the angular velocity of rotations generated in either case.

In the event that the signal input unit 1 is configured of a measuring device, signals representing the rotational angle or the angular velocity of the motor are input to the measuring device as output data from the bipedal robot, and the measurement results thereof are supplied to the feature extracting unit 2.

Note that the data to be processed which is input to the signal input unit 1 may be stationary data (stationary signals) of which temporal change is constant, or may be non-stationary data (non-stationary signals) of which temporal change is not constant.

Also, we will say in the following that audio, which is a type of time-sequence data, for example, will be input to the signal input unit 1. Further, we will say that only audio data of what we will call an "audio section" is supplied from the signal input unit 1 to the feature extracting unit 2. Note that the method for detecting an audio section is not restricted in particular. Also, audio data supplied from the signal input unit 1 to the feature extracting unit 2 is not necessarily restricted to the length of an audio section, as long as it is sectioned into suitable lengths. That is to say, the audio data supplied from the signal input unit 1 to the feature extracting unit 2 may be in phonetic increments of phonemes or the like for example, or may be in increments of words, sentences, from one punctuation mark to another punctuation mark, etc.

Now, the data to be processed which is supplied from the signal input unit 1 to the feature extracting unit 2 is not restricted to audio data, and sectioning thereof is not restricted in particular, either. That is to say, it is sufficient for data to be processed, which has been sectioned into suitable lengths with an optimal method, to be supplied from the signal input unit 1 to the feature extracting unit 2. Also, sections of data to be processed, supplied from the signal input unit 1 to the feature extracting unit 2, may be constant or not constant.

The features extracting unit 2 extracts the feature quantity by sectioning the audio data, which is time-sequence data serving as data to be processed from the signal input unit 1, into data of predetermined section lengths, and analyzing the data, and further supplies the time-sequence data which is the time-sequence of the feature quantity to a recognizing unit 3 and learning unit 4. That is to say, the features extracting unit 2 subjects the audio data from the signal input unit 1 to processing such as frequency analysis at set time intervals, extracts feature quantity such as MFCC (Mel Frequency Cepstrum Coefficient) for example, and supplies the time-sequence data of the MFCC to the recognizing unit 3 and learning unit 4. Note that the time-sequence data supplied from the feature extracting unit 2 to the recognizing unit 3 and learning unit 4 are also externally observable observation values.

The recognizing unit 3 recognizes the time-sequence data supplied from the features extracting unit 2 based on the time-sequence pattern storage network stored in the storage unit 5, and outputs the recognition results thereof.

Now, the learning unit 4 performs learning involving self-organizing updating of the time-sequence pattern storage network stored in the storage unit 5, based on the observation values of the time-sequence data supplied from the features extracting unit 2. That is to say, the learning unit 4 updates the parameters of the time-sequence pattern storage network stored in the storage unit 5, based on the time-sequence data supplied from the features extracting unit 2.

Upon being provided repeatedly with time-sequence data to which a true label has not be provided, the learning unit 4 executes unsupervised learning, wherein feature patterns (time-sequence patterns) in the provided time-sequence data are acquired in a self-organizing manner. Consequently, representative time-sequence patterns are efficiently stored in the time-sequence pattern storage network in the storage unit 5. That is to say, the time-sequence data which the features extracting unit 2 supplies to the recognizing unit 3 and the learning unit 4 can be classified into several patterns (time-sequence patterns), with the learning unit 4 performing learning so as to store the representative time-sequence patterns of the time-sequence data in the time-sequence pattern storage network.

The storage unit 5 stores the time-sequence pattern storage network, with the parameters of the time-sequence pattern storage network being suitably updated by the learning unit 4.

Control data is supplied to a generating unit 6. the control data supplied to the generating unit 6 is such that represents one of time-sequence patterns stored in the time-sequence pattern storage network of the storage unit 5 (e.g., a later-described node label), with the generating unit 6 generating and outputting time-sequence data of the time-sequence pattern which the control data supplied thereof represents, based on the time-sequence pattern storage network of the storage unit 5.

Figure 11:
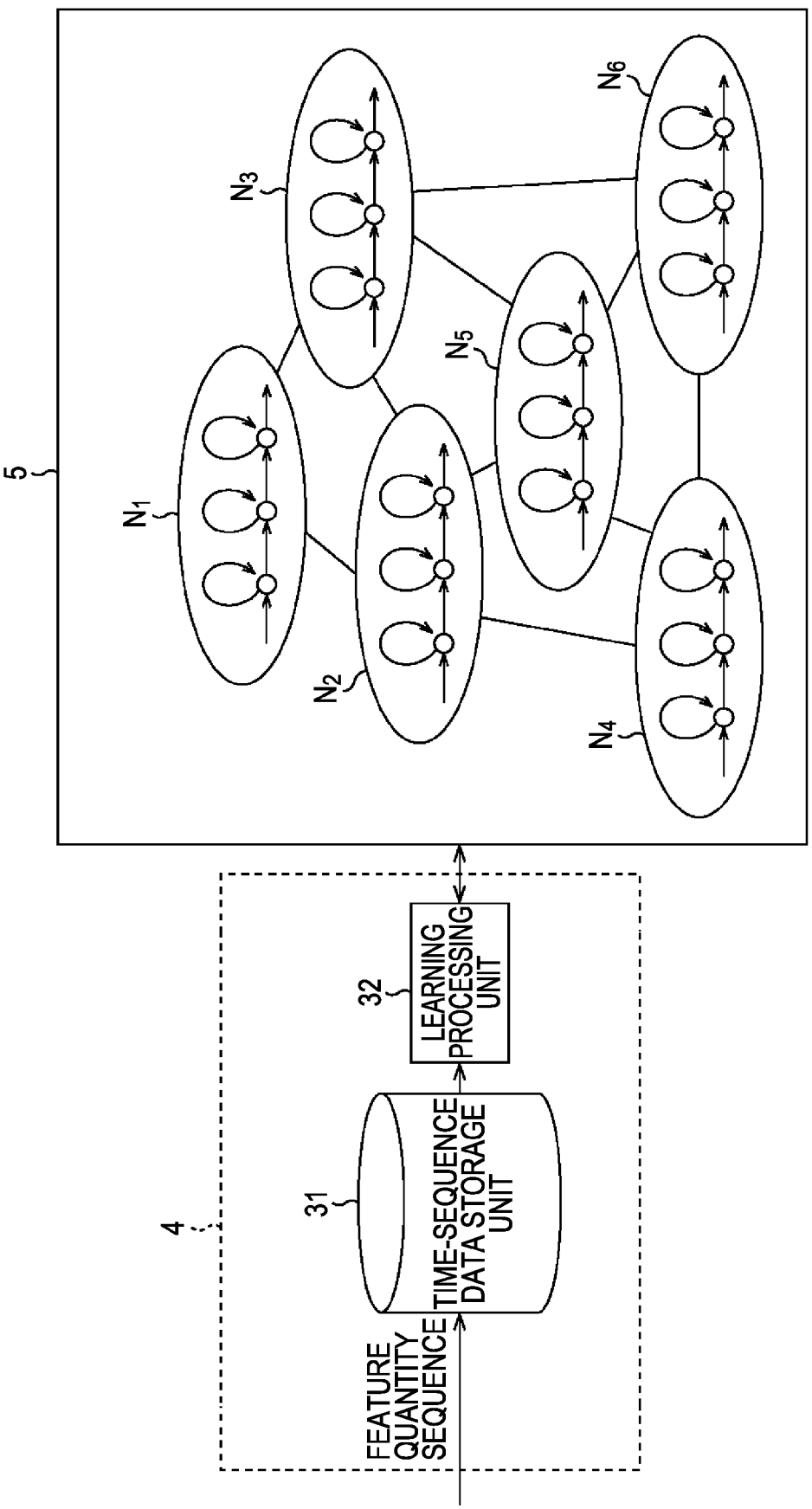
FIG. 11 is a block diagram illustrating a configuration example of a learning unit 4.

Next, FIG. 11 illustrates a configuration example of the learning unit 4 shown in FIG. 10. The learning unit 4 is configured of a time-sequence data storage unit 31 and learning processing unit 32.

The time-sequence data storage unit 31 is supplied with a sequence of feature quantity from the features extracting unit 2, as new time-sequence data (for a single section). The time-sequence data storage unit 31 stores the new time-sequence data from the features extracting unit 2 temporarily (until processing using the new time-sequence data with the learning processing unit 32 ends).

The learning processing unit 32 updates, in a self-organizing manner, the time-sequence pattern storage network stored in the storage unit 5, based on the observation values of the new time-sequence data stored in the time-sequence data storage unit 31.

Figure 12:
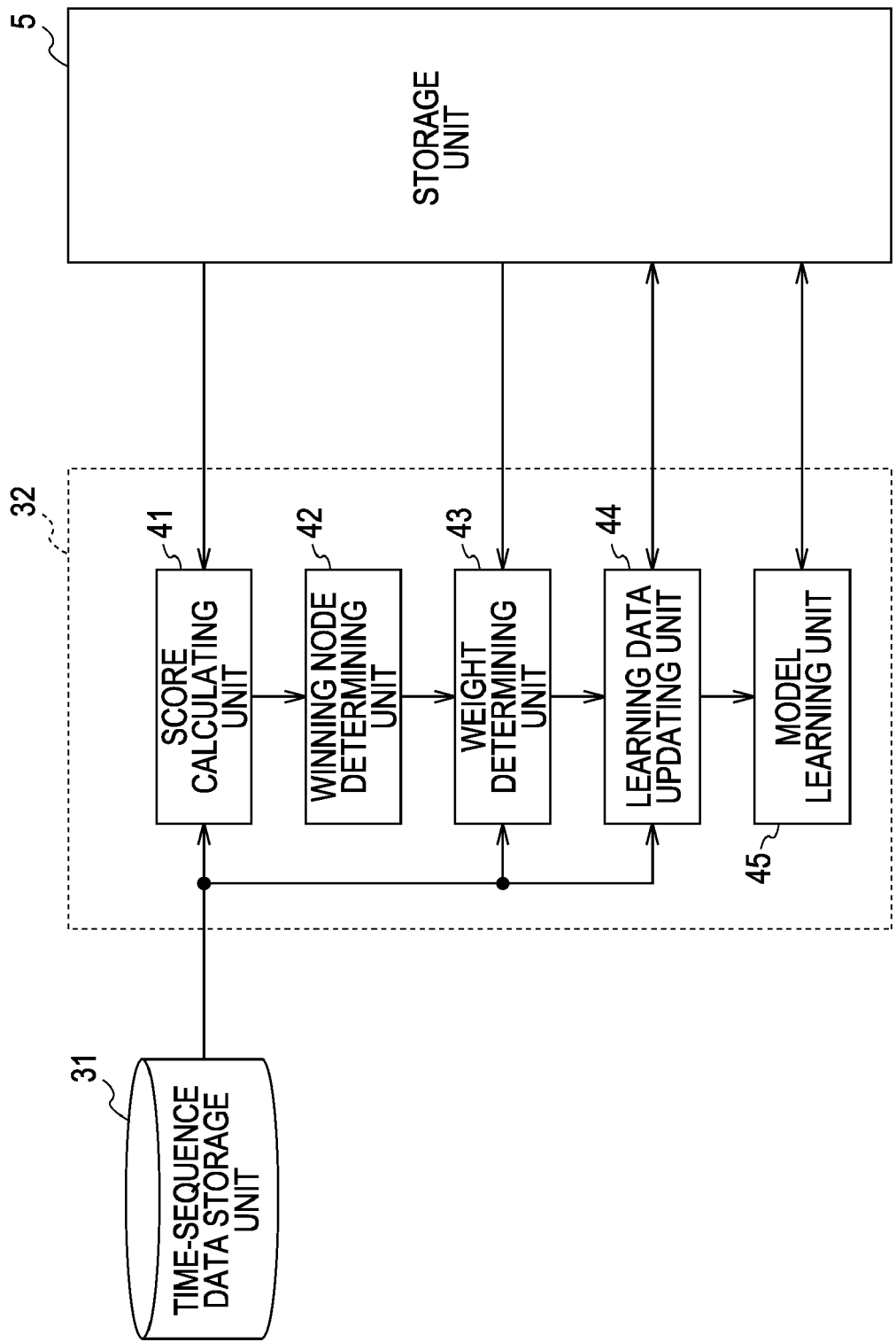
FIG. 12 is a block diagram illustrating a configuration example of a learning processing unit 32.

Next, FIG. 12 illustrates a configuration example of the learning processing unit 32 shown in FIG. 11.

A score calculating unit 41 obtains, regarding each node making up the time-sequence pattern storage network stored in the storage unit 5, the degree of that node matching the observation value of the time-sequence data stored in the time-sequence data storage unit 31, in the form of a score, and supplies the score to a winning node determining unit 42. that is to say, in the event that the time-sequence pattern model 21 which a node has is an HMM such as shown in FIG. 7 for example, the score calculating unit 41 obtains the likelihood of the time-sequence data stored in the time-sequence data storage unit 31 being observed from the HMM serving as the time-sequence pattern model 21 of the node, and supplies this as the score of the node to the winning node determining unit 42.

The winning node determining unit 42 obtains the node most closely matching the time-sequence data stored in the time-sequence data storage unit 31 within the time-sequence pattern storage network stored in the storage unit 5, and determines that node to be the winning node.

That is to say, of the nodes making up the time-sequence pattern storage network stored in the storage unit 5, the winning node determining unit 42 determines the node with the highest score from the score calculating unit 41 to be the winning node. The winning node determining unit 42 then supplies information representing the winning node to a weight determining unit 43.

Now, the nodes making up the time-sequence pattern storage network can be provided with node labels, which are labels for identifying each node. These node labels can be used for information indicating the winning node, and information indicating other nodes. It should be noted that a node label is a label for identifying the node itself, and has nothing to do with a true label which indicates which is true.

The weight determining unit 43 determines later-described updating weighting for each of the nodes making up the time-sequence pattern storage network stored in the storage unit 5, based on the winning node indicated by the node label supplied from the winning node determining unit 42, and supplies this to a learning data updating unit 44.

That is to say, the weight determining unit 43 determines updating weighting of each node making up the time-sequence pattern storage network stored in the storage unit 5 (including the winning node) based on the inter-pattern distance between that node and the winning node, and supplies this to the learning data updating unit 44.

Now, the time-sequence pattern model 21 (FIG. 7) which a node has is updated using the new time-sequence data sorted in the time-sequence data storage unit 31 (FIG. 11), regarding which the updating weight of a node representing the degree of effect of the new time-sequence data which the time-sequence pattern model 21 is subjected to be updating of the time-sequence pattern model 21 of the node. Accordingly, in the event that the updating weight of the node is zero, this means that the time-sequence pattern model 21 of the node is not affected by the new time-sequence data (i.e., is not updated).

Note that for the inter-pattern distance determining the updating weight of each node making up the time-sequence pattern storage network stored in the storage unit 5 at the weight determining unit 43, in the event that the nodes of the time-sequence pattern storage network have links as shown in FIGS. 6 and 8, inter-pattern distance based on the jointed relation between that node and the winning node may be used, and in the event that the nodes of the time-sequence pattern storage network do not have links as shown in FIG. 9, inter-pattern distance based on the degree of matching the new time-sequence data stored in the time-sequence data storage unit 31 (FIG. 11) may be used.

That is to say, the weight determining unit 43 makes reference to the time-sequence pattern storage network stored in the storage unit 5 to obtain the inter-pattern distance based on the jointing relation between each of the nodes of the time-sequence pattern storage network and the winning node indicated by the node label from the winning node determining unit 42, and determines the updating weight for each of the nodes of the time-sequence pattern storage network based on that inter-pattern distance.

Alternatively, the weight determining unit 43 makes reference to the time-sequence pattern storage network stored in the storage unit 5, to obtain a score similar to that which the score calculating unit 41 obtains, for example, as a degree to which each of the nodes of the time-sequence pattern storage network match the new time-sequence data stored in the time-sequence data storage unit 31. Further, the weight determining unit 43 obtains, for each of the nodes of the time-sequence pattern storage network, a value corresponding to the order (matching order) based on the score of the node, as the inter-pattern distance based on the degree of matching the new time-sequence data, and determines the updating weight of each of the nodes of the time-sequence pattern storage network based on the inter-pattern distance.

Note that the score of a node may be obtained with the weight determining unit 43, or may be supplied from the score calculating unit 41 to the weight determining unit 43.

The learning data updating unit 44 updates the learning data stored in the learning data storage unit 22 (FIG. 7) which each node of the time-sequence pattern storage network stored in the storage unit 5 has.

That is to say, the learning data updating unit 44 mixes the learning data already stored in the learning data storage unit 22 of the node and the time-sequence data stored in the time-sequence data storage unit 31 based on the corresponding node updating weight from the weigh determining unit 43, and stores the mixed results as new learning data in the learning data storage unit 22, thereby updating the stored contents of the learning data storage unit 22.

The learning data updating unit 44 updates the learning data stored in the learning data storage unit 22 (FIG. 7) according to the updated weight, as described above, and thereupon supplies a model learning unit 45 with an end notification to the effect that updating thereof has ended.

Upon receiving the end notification from the learning data updating unit 44, the model learning unit 45 uses the learning data stored in the learning data storage unit 22 (FIG. 7) after updating of the learning data thereof by the learning data updating unit 44, to perform learning of the time-sequence pattern model 21 which each node in the time-sequence pattern storage network has, thereby updating the time-sequence pattern model 21.

Accordingly, updating of the time-sequence pattern model 21 which a node has by the model learning unit 45 is performed based on the learning data (more particularly, a part thereof) stored in the learning data storage unit 22 (FIG. 7) which the node has, and the new time-sequence data stored in the time-sequence data storage unit 31. Note that the stored contents of the learning data storage unit 22 are updated according to the updating weight, so updating of the time-sequence pattern model 21 by the model learning unit 45 can be said to be performed based on the updating weight.

Figure 13:
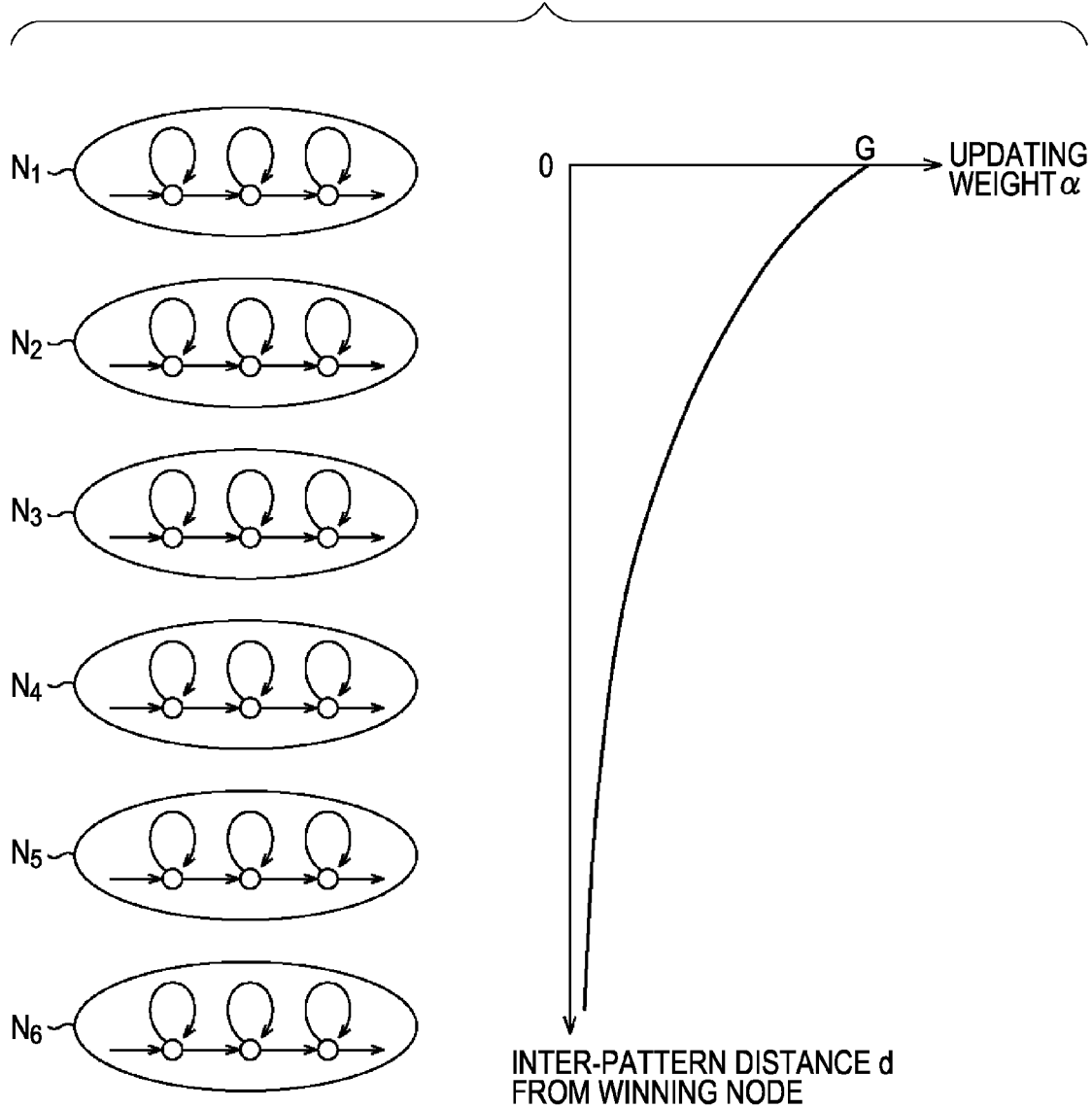
FIG. 13 is a diagram for describing a determining method for determining updating weight.

Next, FIG. 13 illustrates a determining method for determining updating weight at the weight determining unit 43 in FIG. 12.

The weight determining unit 43 determines the updating weight for the node (node updating weight) $\alpha$ according to a curve representing the relation in which the updating weight $\alpha$ decreases as the inter-pattern distance d as to the winning node increases (hereinafter referred to as distance/weight curve), such as shown in FIG. 13 for example. According to the distance/weight curve, the shorter the inter-pattern distance d as to the winning node is, the greater the determined updating weight $\alpha$ is, and the longer the inter-pattern distance d as to the winning node is, the smaller the determined updating weight $\alpha$ is.

In the distance/weight curve shown in FIG. 13, the horizontal axis represents the updating weight $\alpha$, and the vertical axis represents the inter-pattern distance d.

In FIG. 13, the inter-pattern distance d employed is an inter-pattern distance based on the jointing relation of nodes for example, that is to say, the distance from the winning node. The six nodes $N_1$ through $N_6$ making up the time-sequence pattern storage network are shown along the vertical axis at positions corresponding to the distance between each node $N_i$ and the winning node (i.e., at positions on the vertical axis).

In FIG. 13, the six nodes $N_1$ through $N_6$ making up the time-sequence pattern storage network are distanced from the winning node in that order. Of the six nodes $N_1$ through $N_6$ making up the time-sequence pattern storage network, that which has the closest distance to the winning node, i.e., the node $N_1$ of which the distance to the winning node is 0, is the node serving as the winning node.

Now, with this in mind, let us look at FIG. 8 again. In the event that a time-sequence pattern storage network has a two-dimensional array structure such as shown in FIG. 8 for example, and the winning node in this case is node $N_6$ for example, the distance between the winning node $N_6$ and the node $N_6$ is the closest (No. 1) 0, so the inter-pattern distance d between the node $N_6$ and the winning node $N_6$ is also 0. Also, the distance between the winning node $N_6$ and the nodes $N_3$ and $N_5$ is the second closest 1, so the inter-pattern distance d between the winning node $N_6$ and the nodes $N_3$ and $N_5$ or $N_9$ is also 1. Further, the distance between the winning node $N_6$ and the nodes $N_2$, $N_4$ and $N_8$ is the third closest 2, so the inter-pattern distance d between the winning node $N_6$ and the nodes $N_2$, $N_4$ and $N_8$ is also 2. Moreover, the distance between the winning node $N_6$ and the nodes $N_1$ and $N_7$ is the farthest (fourth closest) 3, so the inter-pattern distance d between the winning node $N_6$ and the nodes $N_1$ and $N_7$ is also 3.

On the other hand, with regard to a time-sequence pattern storage network wherein the nodes are not linked, such as shown in FIG. 9 for example, the inter-pattern distance based on the degree of a node matching new time-sequence data, i.e., a value corresponding to the order (matching order) based on the degree of the node matching new time-sequence data, is obtained as the inter-pattern distance d between that node and the winning node. That is to say, in this case, the inter-pattern distance d between the winning node and the node with the highest score (the winning node) is 0, and the inter-pattern distance d between the winning node and the node with the second highest score is 1. Subsequently, in the same way, the inter-pattern distance d between the winning node and a node with the k'th highest score is k−1.

Next, the distance/weight curve such as shown in FIG. 13 for example, representing the relation between the updating weight α and the inter-pattern distance d is provided by Expression (3), for example.

$$\alpha = G\gamma^{\frac{d}{\Delta}} \quad (3)$$

In this Expression (3), G is a constant representing the updating weight of the winning node, and γ is a constant in the range of 0<γ<1. Further, a variable Δ is an attenuation coefficient for adjusting the updating weight α of a node in close proximity to the winning node (a node of which the inter-pattern distance d to the winning node is close), in a case of employing the above-described SMA, as an updating method for updating the time-sequence pattern storage network.

In a case wherein, as described above, 0 is provided for the inter-pattern distance d of the node which is the winning node, and 1, 2, and so on is provided as the inter-pattern distance d for the other nodes in accordance with the distance to the winning node or to the matching order, in the event that G=8, γ=0.5, and Δ=1 for example in Expression (3), 8 (i.e., G) is obtained as the updating weight α of the node which is the winning node. Thereafter, the updating weight α of the node decreases in value, i.e., 4, 2, 1, and so on, as the distance as to the winning node or the matching order increases.

Now, in the event that the attenuation coefficient Δ in Expression (3) is a great value, the change of the updating weight α as to change in the inter-pattern distance d is gentle, and conversely, in the event that the attenuation coefficient Δ is a value close to 0, the change of the updating weight α as to change in the inter-pattern distance d is steep.

Accordingly, adjusting the attenuation coefficient Δ so as to gradually approach 0 from 1 as described above causes the change of the updating weight α as to change in the inter-pattern distance d to become steep, and the updating weight α becomes smaller in value as the inter-pattern distance d increases. Finally, when the attenuation coefficient Δ draws close to 0, the updating weight α of nodes other than the node serving as the winning node is almost 0, and in this case, this situation is almost equivalent to a case of employing the above-described WTA as the updating method for updating the time-sequence pattern storage network.

Accordingly, adjusting the attenuation coefficient Δ enables adjusting of the updating weight α of nodes near the winning node, in the event of employing SMA as the updating method for updating the time-sequence pattern storage network.

An arrangement can be made wherein the value of the attenuation coefficient Δ is great at the time of starting updating (learning) of the time-sequence pattern storage network, and then the value decreases over time, i.e., as the number of times of updating increases. In this case, at the time of starting of updating of the time-sequence pattern storage network, the updating weight α of each node of the time-sequence pattern storage network is determined according to the distance/weight curve which has a gentle change of updating weight α as to inter-pattern distance d, and as updating (learning) progresses, the updating weight α of each node of the time-sequence pattern storage network is determined according to the distance/weight curve of which change of updating weight α as to inter-pattern distance d becomes steeper.

That is to say, in this case, updating of the winning node (more particularly, the time-sequence pattern model 21 thereof) thereof is powerfully influenced by new time-sequence data stored in the time-sequence data storage unit 31 (FIG. 12), regardless of the progress of learning (updating). On the other hand, updating of nodes (more particularly, the time-sequence pattern models 21 thereof) other than the winning node are affected by the new time-sequence data over a relatively wide range of nodes at the time of starting learning, i.e., from nodes with a small inter-pattern distance d as to the winning node, to nodes of which the inter-pattern distance d as to the winning node is somewhat great. As learning processes, updating of nodes other than the winning node gradually comes to be performed so as to be affected by the new time-sequence data only within a narrow range.

The weight determining unit 43 shown in FIG. 12 determines the updating weight α of each node of the time-sequence pattern storage network, and the learning data updating unit 44 updates the learning data stored in the learning data storage unit 22 which each node has, based on the updating weight α of that node.

Figure 14:
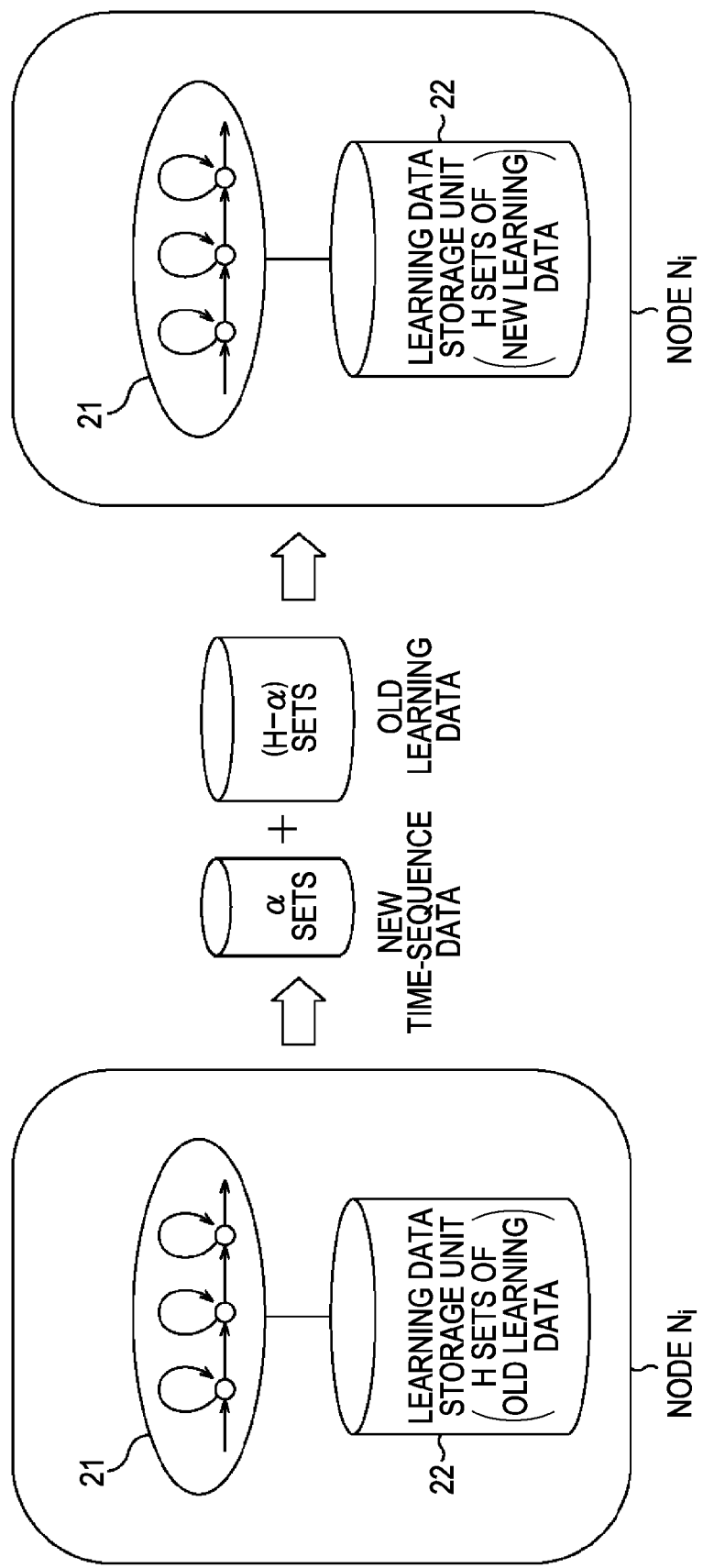
FIG. 14 is a diagram for describing an updating method for updating learning data to be stored in a learning data storage unit 22.

Next, an updating method for updating the learning data stored in the learning data storage unit 22 which a node has will be described with reference to FIG. 14.

Now, let us say that a learning data storage unit 22 which a certain node $N_i$ has already has learning data stored therein, and the time-sequence pattern model 21 of the node $N_i$ is due to learning performed using the learning data already stored in the learning data storage unit 22.

As described above, the learning data updating unit 44 mixes the learning data already stored in the learning data storage unit 22 which the node $N_i$ has (hereinafter referred to as "old learning data"), and the new time-sequence data stored in the time-sequence data storage unit 31 (FIG. 12), according to the updating weight α of the node $N_i$ from the weight determining unit 43, and stores the mixed results thereof in the learning data storage unit 22 as new learning data, thereby updating the stored contents of the learning data storage unit 22 to new learning data.

That is to say, by adding new time-sequence data to the old learning data, the learning data updating unit 44 yields new learning data wherein the old learning data and new time-sequence data are mixed, with addition of new time-sequence data to the old learning data (mixing of the old learning data and the new time-sequence data) being performed according to a ratio corresponding to the updating weight α of the node $N_i$.

Now, updating to the time-sequence pattern model 21 (FIG. 7) of the node $N_i$ is performed by learning using the new learning data, so changing the ratio at which the new time-sequence data and the old learning data are mixed enables the degree (intensity) of effect of the new time-sequence data on the time-sequence pattern model 21 due to updating to be changed.

A value corresponding to the updating weight α of the node $N_i$ is employed for the ratio at which the new time-sequence data and the old learning data are mixed at the node $N_i$, and for example, a value is used wherein the greater the updating weight α is, the greater the percentage of the new time-sequence data is (i.e., the percentage of the old learning data is small).

Specifically, a certain number of sets of time-sequence data (learning data) is stored in the learning data storage unit 22 of the node $N_i$, this certain number being represented by H. In this case, the learning of the time-sequence pattern model 21 of the node $N_i$ is always performed using H sets of learning data (time-sequence data).

In the event that the certain number H of sets of learning data is always stored in the learning data storage unit 22, the number of sets of new learning data obtained by mixing the new time-sequence data and the old learning data needs to be H, and as a method for performing mixing of the new time-sequence data and the old learning data at a ratio corresponding to the updating weight α of the node $N_i$ in this way, there is a method of mixing the new time-sequence data and the old learning data at a ratio of α:H−α.

As for a specific method to mix the new time-sequence data and the old learning data at a ratio of α:H−α, there is a method wherein α sets of new time-sequence data are added to H−α sets of old learning data out of the H sets of old learning data, thereby obtaining H sets of new learning data.

In this case, if we say that the number H of time-sequence data stored in the learning data storage unit 22 is 100 for example, and the updating weight α of the node $N_i$ is 8 for example, the stored contents of the learning data storage unit 22 is updated to 100 new sets of learning data, obtained by adding 8 sets of new time-sequence data to 92 out of the 100 sets of old learning data.

While there is a method of adding the α sets of new time-sequence data to the H−α sets of old learning data out of the H sets of old learning data, by waiting for α sets of new time-sequence data to be obtained, this method does not enable the stored contents of the learning data storage unit 22 to be updated each time a single set of time-sequence data is obtained.

Accordingly, updating of the stored contents of the learning data storage unit 22 can be performed such that each time a single new set of time-sequence data is obtained, α sets of the new time-sequence data are added to the H−α sets of old learning data. That is to say, the single new set of time-sequence data is copied to make α sets of new time-sequence data, and the α sets of new time-sequence data are added to the H−α sets of old learning data obtained by removing α sets of old learning data from the H sets of old learning data, starting from the oldest, thereby updating the stored contents of the learning data storage unit 22. Thus, the stored contents of the learning data storage unit 22 can be obtained each time a single new set of time-sequence data is obtained.

Thus, updating the stored contents of the learning data storage unit 22 means that only the newest H sets of time-sequence data are held as learning data in the learning data storage unit 22 at all times, with the ratio (percentage) of the new time-sequence data in the learning data being adjusted by the updating weigh α.

Next, the learning processing of learning with the time-sequence pattern storage network, performed at the data processing device shown in FIG. 10, will be described with reference to the flowchart shown in FIG. 15.

First, in step S1, the learning processing unit 32 of the learning unit 4 (FIG. 11) performs initialization processing, for initializing parameters of the time-sequence pattern storage network stored in the storage unit 5, i.e., parameters of the HMM for example, serving as the time-sequence pattern model 21 (FIG. 7) which each node of the time-sequence pattern storage network has. This initialization processing yields a suitable initial value for the HMM parameters (state transition probability and output probability density function). Note that there is no particular restriction on what sort of initial values are given to the HMM parameters in the initialization processing.

Subsequently, in step S2, upon a single set of data to be processed, i.e., audio data of a single audio section for example, being input to the signal input unit 1, the signal input unit 1 supplies the data to be processed to the features extracting unit 2. The features extracting unit 2 extracts feature quantity from the data to be processed, and supplies time-sequence data of the feature quantity (a single new set of time-sequence data) to the learning unit 4.

The learning unit 4 (FIG. 11) temporarily stores the new time-sequence data from the features extracting unit 2 in the time-sequence data storage unit 31, and in the following steps S3 through S7, updates (learns) the time-sequence pattern storage network stored in the storage unit 5 in a self-organizing manner, based on the new time-sequence data stored in the time-sequence data storage unit 31 (more particularly, the observation values thereof).

That is to say, at the learning processing unit 32 (FIG. 12) of the learning unit 4, in step S3, the score calculating unit 41 reads out the new time-sequence data stored in the time-sequence data storage unit 31, and obtains a score representing the degree to which a node matches the new time-sequence data, for every node of the time-sequence pattern storage network stored in the storage unit 5.

Specifically, in the event that the time-sequence pattern model 21 (FIG. 7) which a node has is an HMM for example, the log likelihood that new time-sequence data will be observed is obtained as a score. An example of a method for calculating the log likelihood is to use a Viterbi algorithm.

Upon calculating scores for new time-sequence data for all of the nodes which the time-sequence pattern storage network has, the score calculating unit 41 supplies the scores for each of the nodes to the winning node determining unit 42.

In step S4, the winning node determining unit 42 obtains, of the nodes making up the time-sequence pattern storage network, the node with the highest score given from the score calculating unit 41, and determines this node to be the winning node. The winning node determining unit 42 then supplies a node label serving as information representing the winning node to the weight determining unit 43.

In step S5, the weight determining unit determines the updating weight for each of the nodes making up the time-sequence pattern storage network, using the winning node which the node label from the winning node determining unit 42 represents as a reference.

That is to say, as described with FIG. 13, the weight determining unit 43 determines the updating weight α of each node making up the time-sequence pattern storage network, following the distance/weight curve given in Expression (3) wherein the change of the updating weight α, which changes as to change in the inter-pattern distance d, becomes more steep updating (learning) of the time-sequence pattern storage network progresses, and supplies the determined updating weight α to the learning data updating unit 44.

In step S6, the learning data updating unit 44 updates the learning data stored in the learning data storage unit 22 (FIG. 7) which each node in the time-sequence pattern storage network has, according to the updating weight of the corresponding node as supplied from the weight determining unit 43. That is to say, as described with reference to FIG. 14, the learning data updating unit 44 mixes the new time-sequence data stored in the time-sequence data storage unit 31 and the old learning data stored in the learning data storage unit 22 of the node, according to the ratio α:H−α corresponding to the updating weight of that node, thereby obtaining H sets of new learning data, and updating the stored contents of the learning data storage unit 22 with the H sets of new learning data.

Upon updating the stored contents of the learning data storage unit 22 (FIG. 7) of all of the nodes of the time-sequence pattern storage network, the learning data updating unit 44 supplies an end notification to the effect that updating has ended, to the model learning unit 45.

Upon receiving the end notification from the learning data updating unit 44, in step S7 the model learning unit 45 updates the parameters of the time-sequence pattern storage network.

that is to say, the model learning unit 45 performs learning of the time-sequence pattern model 21 for each node of the time-sequence pattern storage network, using the new learning data stored in the learning data storage unit 22 following updating by the learning data updating unit 44, thereby updating the time-sequence pattern model 21.

Specifically, in the event that the time-sequence pattern model 21 of a node is an HMM for example, the new learning data stored in the learning data storage unit 22 which the node has is used for learning of the HMM. With this learning, the current state transition probability and output probability density function of the HMM are used as initial values, and a new current state transition probability and output probability density function are each obtained by the Baum-Welch method, using the new learning data. The current state transition probability and output probability density function of the HMM are each updated by the new current state transition probability and output probability density function.

Subsequently, the flow returns from step S7 to S2, and after awaiting for the next data to be processed to be input to the signal input unit 1, the same processing is thereafter repeated.

Figure 15:
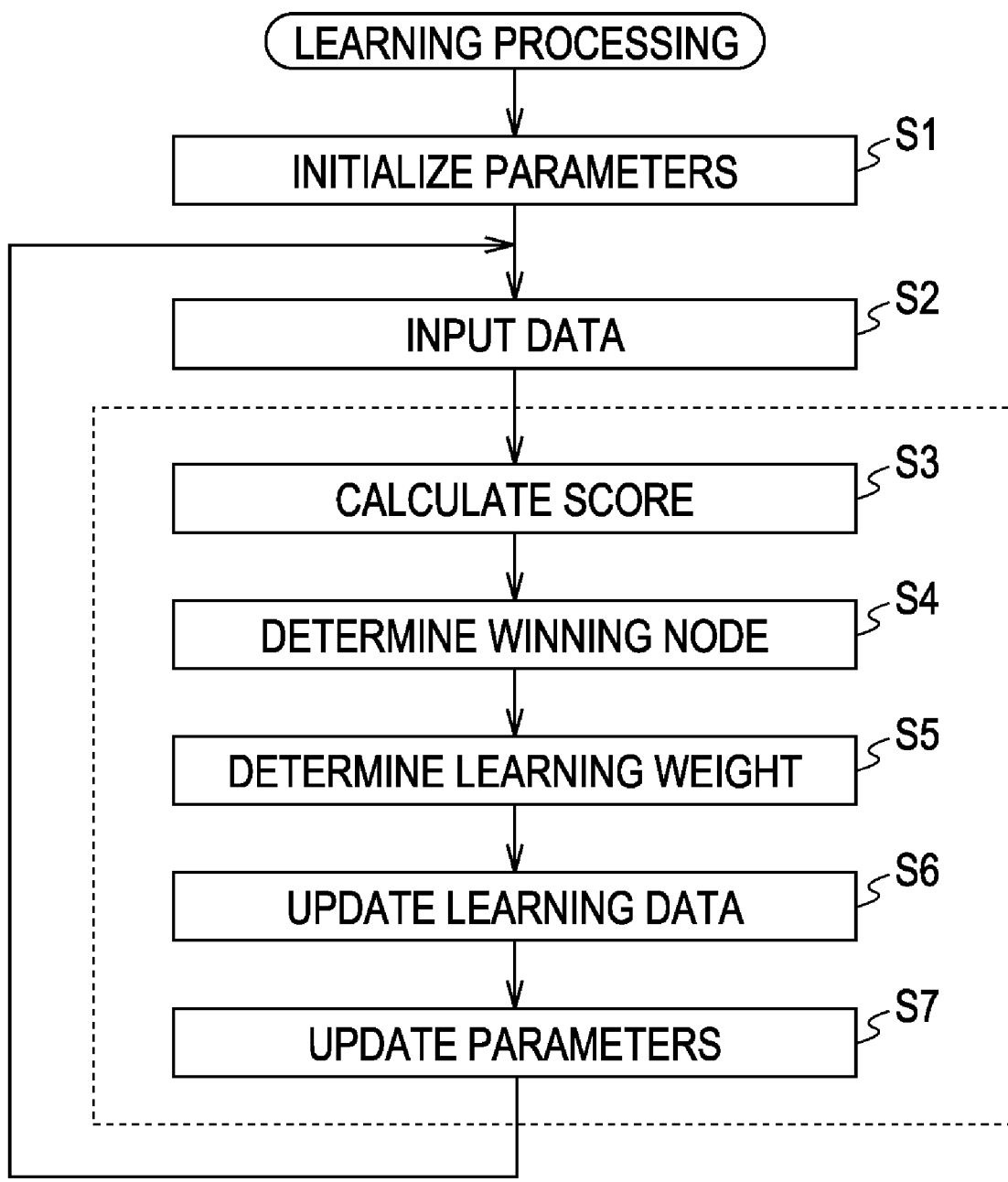
FIG. 15 is a flowchart for describing learning processing.

With the learning processing shown in FIG. 15, upon a single new set of time-sequence data being obtained, a winning node is determined regarding that new time-sequence data from the nodes making up the time-sequence pattern storage network (step S4). Further, with the winning node as a reference, the updating weight of each node making up the time-sequence pattern storage network is determined (step S5). Based on the updated weight, the parameters of the time-sequence pattern model 21 (FIG. 7) of each node making up the time-sequence pattern storage network are updated.

That is to say, with the learning processing in FIG. 15, updating of the parameters of the nodes making up the time-sequence pattern storage network is performed once for every new set of time-sequence data, and subsequently, updating of node parameters is repeated in the same way each time a new set of time-sequence data is obtained, thereby carrying out learning is a self-organizing manner.

By learning being sufficiently performed, the time-sequence pattern model 21 which each node of the time-sequence pattern storage network has learns (acquires) a certain time-sequence pattern. The number (types) of time-sequence patterns learnt in the entire time-sequence pattern storage network matches the number of nodes of the time-sequence pattern storage network, so in the event that the number of nodes which the time-sequence pattern storage network has is 100, this means that 100 types of time-sequence patterns are learnt. These time-sequence patterns enable the recognition unit 3 (FIG. 10) to perform recognition processing for recognizing time-sequence data (data to be processed), and the generating unit 6 (FIG. 10) to perform generating processing for generating time-sequence data.

Figure 16:
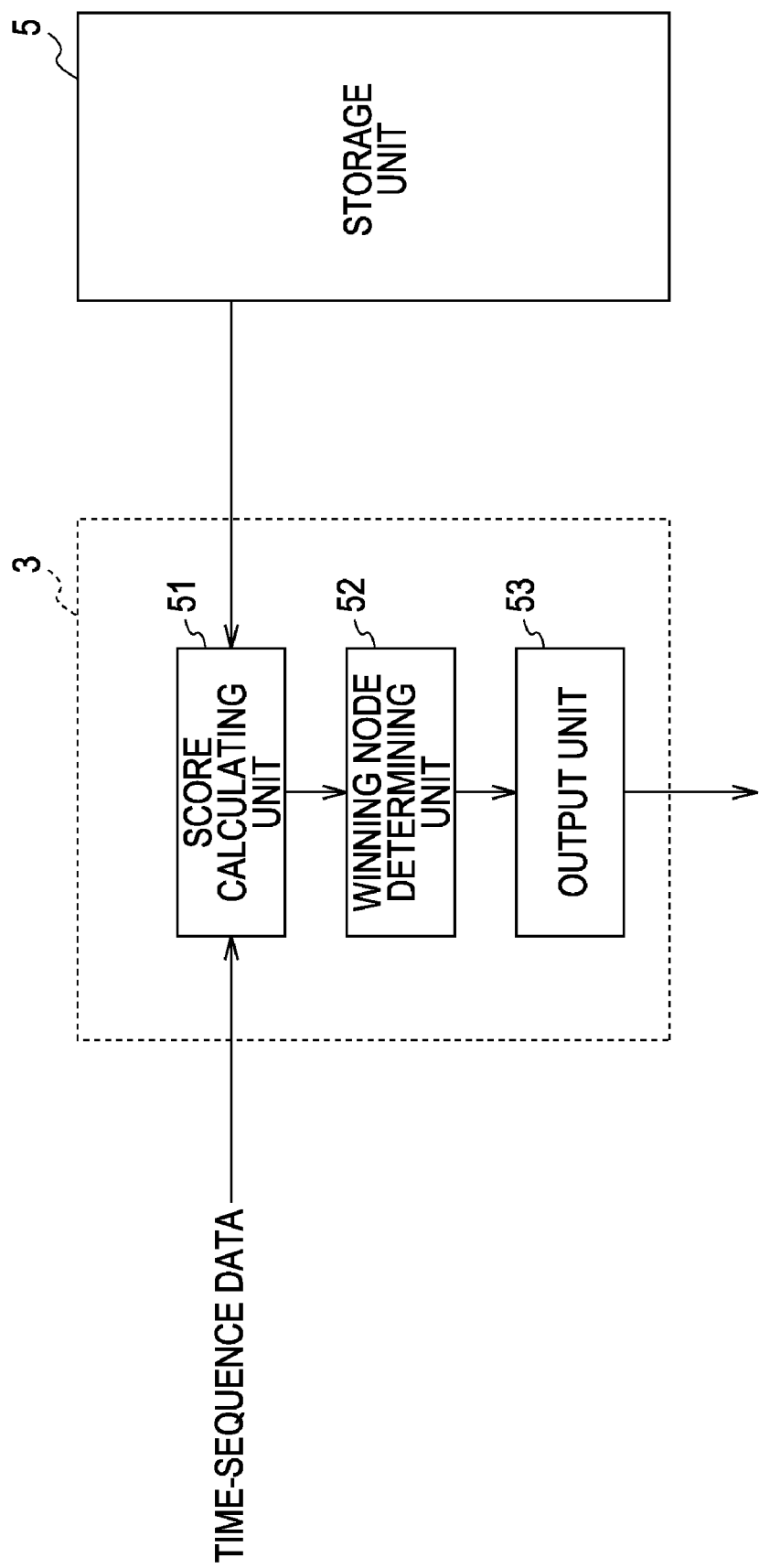
FIG. 16 is a block diagram illustrating a configuration example of a recognizing unit 3.

Next, FIG. 16 illustrates a configuration example of the recognizing unit 3 shown in FIG. 10.

As described with FIG. 10, the recognizing unit 3 is supplied with a single set of time-sequence data from the features extracting unit 2, and this time-sequence data is supplied to the score calculating unit 51.

As with the score calculating unit 41 of the learning processing unit 32 (FIG. 12), the score calculating unit 51 obtains, from each node making up the time-sequence pattern storage network stored in the storage unit 5, the score indicating the degree to which that score matches the time-sequence data, more particularly the observation value thereof, from the features extracting unit 2, and supplies this to a winning node determining unit 52.

As with the winning node determining unit 42 of the learning processing unit 32 (FIG. 12), the winning node determining unit 52 obtains the node in the time-sequence pattern storage network stored in the storage unit 5 most closely matching the time-sequence data from the features extracting unit 2, and determines that node to be the winning node.

That is to say, of the nodes making up the time-sequence pattern storage network stored in the storage unit 5, the winning node determining unit 52 determines the node which has the highest score from the score calculating unit 51 to be the winning node. The winning node determining unit 52 then supplies a node label, serving as information representing the winning node, to an output unit 53.

The output input 53 outputs the node label representing the winning node from the winning node determining unit 52 as recognition results of the data to be processed that has been input to the signal input unit 1, corresponding to the time-sequence data of the feature quantity from the features extracting unit 2, and consequently to the feature quantity thereof.

Note that one of the score calculating unit 51 of the recognizing unit 3 and the score calculating unit 41 of the learning processing unit 32 (FIG. 12) can double as the other. This also holds true for the winning node determining unit 52 of the recognizing unit 3 and the winning node determining unit 42 of the learning processing unit 32 (FIG. 12).

Next, recognition processing performed for recognition of the time-sequence data, which is performed at the data processing device shown in FIG. 10, will be described with reference to the flowchart in FIG. 17.

In step S21, upon a single set of data to be processed, i.e., audio data (time-sequence data) of a single audio section for example, being input to the signal input unit 1, the signal input unit 1 supplies the data to be processed to the features extracting unit 2. The features extracting unit 2 extracts feature quantity from the data to be processed, and supplies time-sequence data of the feature quantity to the recognizing unit 3.

In step S22, at the recognizing unit 3 (FIG. 16) the score calculating unit 51 obtains the score which represents the degree to which each node making up the time-sequence pattern storage network stored in the storage unit 5 matches the time-sequence data from the features extracting unit 2, and supplies this to the winning node determining unit 52.

In step S23, the winning node determining unit 52 obtains the node of the nodes making up the time-sequence pattern storage network which has the highest score from the score calculating unit 51, and determines that node to be the winning node. The winning node determining unit 52 then supplies a node label serving as information representing the winning node to the output unit 53.

The output unit 53 outputs the node label from the winning node determining unit 52 as the recognition results of the time-sequence data from the features extracting unit 2 (data to be processed which has been input to the signal input unit 1), and ends the processing.

Note that the node label (the node label of the winning node) which the output unit 53 outputs can be supplied to the generating unit 6 as control data.

According to recognition processing using a time-sequence pattern storage network such as described above, recognition results of a fineness corresponding to the number of the nodes in the time-sequence pattern storage network can be obtained.

That is to say, let us say that learning of the time-sequence pattern storage network is being performed using audio data obtained from voices of three categories, "A", "B", and "C", for example.

In the event that the audio data of the three categories, "A", "B", and "C" used for learning with the time-sequence pattern storage network include speech by a great number of speakers, there will be a wide variety of audio data for the same category "A" audio data for example, depending on speech speed, intonation, age of the speaker, gender, and so forth.

With supervised teaching, learning using the that the audio data of the categories, "A", "B", and "C" is performed separately, i.e., learning with the audio data of the category "A" is performed alone, learning with the audio data of the category "B" is performed alone, and learning with the audio data of the category "C" is performed alone, so there can be no variations due to speech speed and the like in the learning results for each category.

On the other hand, with learning with a time-sequence pattern storage network, the audio data of the categories, "A", "B", and "C" is performed with no distinction (classification) thereof. Further, as described above, with a time-sequence pattern storage network, time-sequence patterns of a number equal to the number of nodes of the time-sequence pattern storage network are learnt.

Accordingly, with a time-sequence pattern storage network, if the number of nodes thereof is greater than three, there may be cases wherein, though multiple nodes learn the same audio data of the category "A", one node learns one variation (or the time-sequence pattern thereof) of the audio data of the category "A", while another node learns another variation thereof.

Thus, in the event that multiple nodes learn various variations of the audio data of the category "A", upon the audio data of the category "A" being input as data to be processed, the node which most closely matches the data to be processed is determined as the winning node from the multiple nodes which have learnt the audio data of the category "A", and the node label of that winning node is output as the recognition results.

That is to say, with the recognition processing using a time-sequence pattern storage network, determination is not made based on which category audio data of the categories "A", "B", and "C" the data to be processed is, but rather which of the time-sequence patterns, of a number equivalent to the number of nodes, acquired by the time-sequence pattern storage network by learning, matches most closely (is similar).

That is to say, with learning with a time-sequence pattern storage network, time-sequence patterns are acquired at a fineness corresponding to the number of nodes of the time-sequence pattern storage network, and with recognition using a time-sequence pattern storage network, time-sequence data is classified at a fineness corresponding opt the number of nodes of the time-sequence pattern storage network.

Note that suitably applying true labels of the categories "A", "B", and "C" to each of the nodes of a time-sequence pattern storage network which has performed sufficient learning enables recognition results regarding to which category audio data of the categories "A", "B", and "C" the time-sequence data (the data to be processed) is to be obtained, in the recognition processing using the time-sequence pattern storage network.

Figure 18:
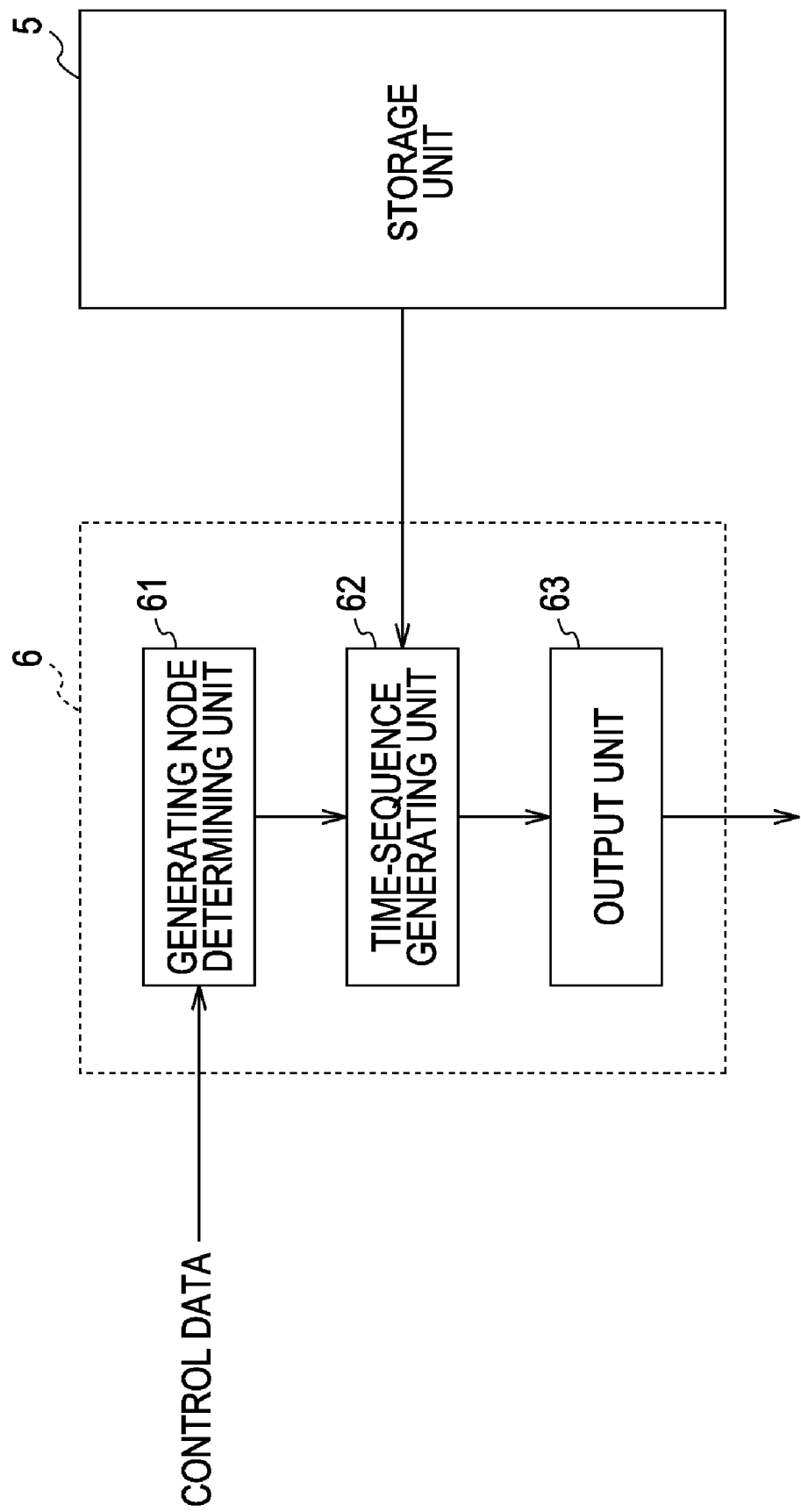
FIG. 18 is a block diagram illustrating a configuration example of a generating unit 6.

Next, FIG. 18 illustrates a configuration example of the generating unit 6 shown in FIG. 10. As described with FIG. 10, control data is supplied to the generating unit 6. The control data supplied to the generating unit 6 represents one of the time-sequence patterns stored in the time-sequence pattern storage network stored in the storage unit 5, and consequently represents one of the nodes making up the time-sequence pattern storage network, in the form of a node label for example.

The control data supplied to the generating unit 6 is supplied to a generating node determining unit 61. The generating node determining unit determines the node of the time-sequence pattern storage network stored in the storage unit 5 which the control data supplied to itself indicates, to be the node to be used for generating the time-sequence data (hereinafter referred to as "generating node"), and supplies the determination results thereof to the time-sequence generating unit 62.

That is to say, the generating node determining unit 61 determines the node which the node label serving as control data that has been supplied to itself to be the generating node, and supplies the determination results to the time-sequence generating unit 62.

Following the determination results from the generating node determining unit 61, the time-sequence generating unit 62 generates time-sequence data based on the time-sequence pattern model 21 (FIG. 7) which the generating node has, and supplies this to an output unit 63.

Now, in the event that the time-sequence pattern model 21 is an HMM for example, the time-sequence generating unit 62 generates time-sequence data wherein the output probability representing the likelihood that the time-sequence data in the HMM serving as the time-sequence pattern model 21 of the generating node is greatest. Note that there is a method regarding generating time-sequence data using an HMM, wherein time-sequence data can be generated which changes smoothly, by using dynamic feature quantity. The time-sequence generating unit 62 can generate time-sequence data by this method. Such a generating method of time-sequence pattern is described in, for example, K. Tokuda, T. Yoshimura, T Masuko, T. Kobayashi, T. Kitamura, "Speech Parameter Generation Algorithms for HMM-Based Speech Synthesis", Proc. of ICASSP 2000, vol 3, pp. 1315-1318, June 2000.

Also, another example of generating time-sequence data using an HMM that has been proposed is a method for repeating time-sequence data generation based on probabilistic trial using HMM parameters, which is then averaged, thereby generating time-sequence data from an HMM. Details thereof are described in, for example, T. Inamura, H. Tanie, Y. Nakamura, "Key-Frame Extraction of Time-Sequence Data Using a Continuous Distribution Type Hidden Markov Model", Proc. on JSME Conference on Robotics and Mechatronics 2003, 2P1-3F-C6, 2003.

The output unit 63 converts the time-sequence data from the time-sequence generating unit 62 into time-sequence data equivalent to the data to be processed, and outputs. That is to say, the time-sequence data generated at the time-sequence generating unit 62 is the time-sequence data of the feature quantity used for learning of the time-sequence pattern model 21 which the node has, and the output unit 63 converts the time-sequence data of that feature quantity into the data to be processed (or more particularly, into data equivalent to the data to be processed) and outputs.

Specifically, if we say that the data to be processed is audio data for example, and the features extracting unit 2 extracts a Mel frequency cepstrum coefficient from the audio data as the feature quantity, the Mel cepstrum time-sequence data is learnt by the time-sequence pattern model 21, so the time-sequence data generated by the time-sequence generating unit 62 based on the time-sequence pattern model 21 (FIG. 7) of the node is Mel cepstrum time-sequence data. The output unit 63 converts the Mel cepstrum (more particularly, the time-sequence data thereof) generated at the time-sequence generating unit 62 into audio data which is time-sequence data equivalent to the data to be processed.

As for a method for converting Mel cepstrum time-sequence data into audio data (audio of the time region), there is a method for filtering the Mel cepstrum time-sequence data with a synthesis filter called an MLSA filter (Mel Log Spectrum Approximation filter). Details of the MLSA filter are described in, for example, H. Imai, K. Sumida, C. Furuichi, "Mel Log Spectrum Approximation (MLSA) Filter for Audio Synthesis", Journal (A) of The Institute of Electronics, Information and Communication Engineers J66-A, 2, pp. 122-129, 1983, and K. Tokuda, T. Kobatashi, H. Saito, T. Fukada, H. Imai, "Spectral Estimation of Audio with Mel Cepstrum as a Parameter", Journal (A) of The Institute of Electronics, Information and Communication Engineers J74-A, 8, pp. 1240-1248, 1991.

Figure 19:
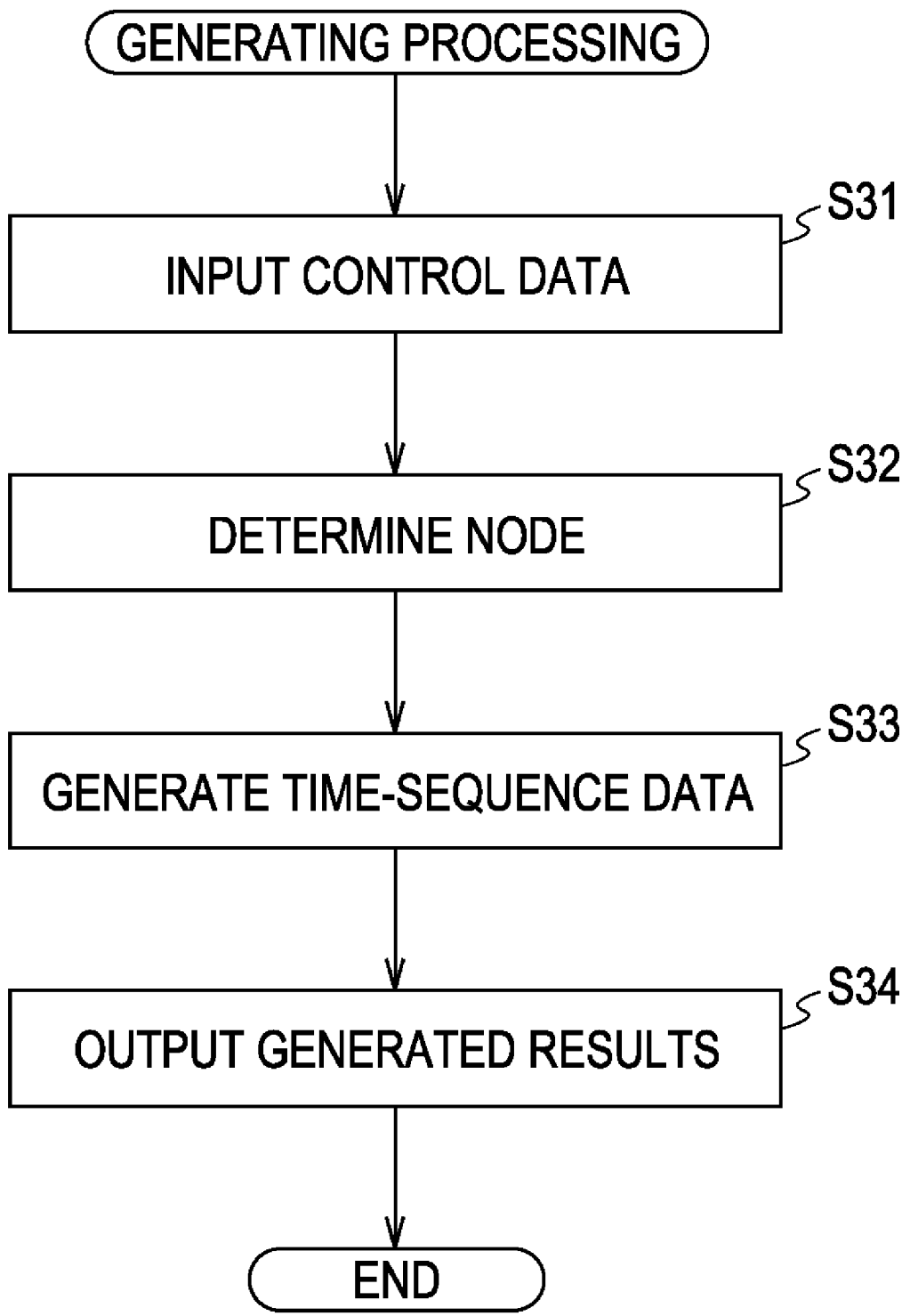
FIG. 19 is a flowchart for describing generating processing.

Next, the generating processing for generating the time-sequence data (data to be processed), which is performed at the data processing device shown in FIG. 10, will be described with reference to the flowchart in FIG. 19.

In step S31, the control data is input to the generating unit 6 (FIG. 18). The control data is supplied to the generating node determining unit 61. The generating node determining unit 61 determines the node of the nodes making up the time-sequence pattern storage network stored in the storage unit 5 which is represented by the node label serving as the control data to be the generating node, and supplies the determination results thereof to the time-sequence generating unit 62.

In step S33, the time-sequence generating unit 62 follows the determination results from the generating node determining unit 61 to generate time-sequence data based on the time-sequence pattern model 21 (more particularly, the parameters thereof) of the generating node, out of the nodes making up the time-sequence pattern storage network stored in the storage unit 5, and supplies this to the output unit 63. In step S34 the output unit 63 converts the time-sequence data from the time-sequence generating unit 62 into time-sequence data equivalent to the data to be processed, and outputs.

With generating processing using a time-sequence pattern storage network such as described above, time-sequence data of time-sequence patterns corresponding to the number of nodes of the time-sequence pattern storage network can be generated.

As described above, a time-sequence pattern storage network configured of multiple nodes each having a time-sequence pattern model 21 is updated in a self-organizing meaner, based on time-sequence data, so unsupervised learning of time-sequence data of which the length is not constant, not to mention time-sequence data of which the length is constant, i.e., what may be called autonomous learning of time-sequence data, can be performed easily, i.e., in a practical manner.

That is to say, each node of the time-sequence pattern storage network has a time-sequence pattern model 21, so in the learning of the time-sequence pattern storage network, updating of a node, i.e., updating of the time-sequence pattern model 21 of the node, does not affect updating of other nodes. Accordingly, even if there is one more node making up the time-sequence pattern storage network, the extra amount of calculations required for learning with the time-sequence pattern storage network is only that necessary for updating that one node, so even in the event that the magnitude of the time-sequence pattern storage network is made to be great, i.e., a great number of nodes make up the time-sequence pattern storage network, the amount of calculations necessary for learning of the time-sequence pattern storage network does not drastically increase. Accordingly, self-organizing learning can be easily performed even with a large-scale time-sequence pattern storage network.

Further, with learning with such a time-sequence pattern storage network, time-sequence patterns representing stochastic properties of the time-sequence data are stored in the nodes, so the time-sequence patterns can be used to easily recognize and generate time-sequence data.

Note that learning processing, recognition processing and generating processing, can be performed with regard to, for example, audio data, image data, motor driving signals (motor data), and any other time-sequence data. Specifically, an application may be made of the data processing device shown in FIG. 10 to an autonomous system such as that of an autonomous robot, wherein signals output by sensors equivalent to the vision, hearing, touch, and so forth, of the robot, signals controlling the motors driving portions of the robot corresponding to arms and legs, signals provided to a device for generating synthesized sound or LEDs corresponding to the eyes, and so forth, can be handled as the time-sequence data which is the object of learning processing, recognition processing, and generating processing.

Also, with the present embodiment, description has been made regarding an arrangement wherein an HMM, which is a type of state transition probability model, is employed as the time-sequence pattern model 21 (FIG. 7) of a node, but other state transition probability models may be used for the time-sequence pattern model 21.

An example of another state transition probability model which can be used as the time-sequence pattern model 21 is a Bayesian network. With a Bayesian network, dependency between variables are represented with a graph structure, and modeling is performed by assigning conditioned probabilities to the nodes, wherein time-sequence data can be modeled by constructing a state transition probability model following the time axis in particular.

Determination of the graph structure of a Bayesian network is performed by selecting a model taking into consideration, for example, the likelihood of learning data and the complexity of the graph structure. Estimation of conditioned probability uses, for example, maximum likelihood estimation or EM (Expectation Maximization) algorithms or the like. Details of Bayesian networks are described in, for example, Y. Motomura, "Information Representation for Uncertainty Modeling: Bayesian Networks", 2001, Bayesian Network Tutorial.

In addition to state transition probability models such as HMMs and Bayesian Networks as described above, models approximating functions (hereafter referred to "function approximation models" as appropriate) can be employed as the time-sequence pattern model 21 (FIG. 7).

A function approximation model is a model which uses a function f( ) to represent a time-sequence pattern with a differential equation $\{x(t)\}'=f(x(t))$, difference equation $x(t+1)=f(x(t))$, and so forth, wherein the function f( ) characterizes the time-sequence pattern. Note that t represents the point-in-time, i.e., the sampling point, and $x(t)$ represents the sampled value of the time-sequence data at the point-in-time t, or the time-sequence data observed up to point-in-time t (starting from 0). Further, $\{x(t)\}'$ represents the first derivation as to the time t of the time-sequence data $x(t)$.

We will refer to obtaining of a function f( ) representing (i.e., corresponding to) a certain time-sequence pattern from learning data (time-sequence data) as "functional approximation". Methods for functional approximation include, for example, representing the function f( ) using a polynomial and determining the coefficients of the polynomial form the learning data, representing the function f( ) with a neural network and determining the parameters of the neural network from the learning data, and so on.

With functional approximation of a function f( ) expressed as a polynomial, determination (estimation) of the coefficients of the polynomial can be made by, for example, the method of steepest descent. Also, with functional approximation of a function f( ) expressed as a neural network, determination of the parameters of the neural network can be made by, for example, back propagation. Note that with back propagation, input and output data is provided to a neural network, and the parameters of the neural network are learnt such that the relation between the input and output data is satisfied.

For example, in a case of employing a functional approximation model wherein the time-sequence pattern is represented with a difference equation $x(t+1)=f(x(t))$ using a function f( ), the weight (intermediate layer) between the input layer $x(t)$ and the output layer $x(t+1)$ is the parameter of the neural network, with this parameter being learnt using the learning data (time-sequence data). Learning of parameters of a neural network is performed by first providing an appropriate initial value, and then performing back propagation. Note that a recurrent neural network, for example, and be employed for the neural network.

In the same way as with the above case of employing an HMM as the time-sequence pattern model 21, there is the need to determine a winning node with learning with time-sequence pattern storage networks configured of nodes having time-sequence pattern models 21 wherein the function f( ) is expressed by a neural network, as well. There is the need for score calculation regarding new time-sequence data for each node of the time-sequence pattern storage network in order to determine the winning node.

This score may be, for example, error between the observation values (actual values) of the new time-sequence data, and the logical value of the new time-sequence data is obtained from the time-sequence pattern model 21 wherein the function f( ) is expressed by a neural network (e.g., the square sum of difference). In this case, the node with the smallest score value is determined to be the winning node which is the node most closely matching the new time-sequence data.

After determining the winning node, the updating weight of each node is determined, and subsequently, the parameters of each node of the neural network can be updated with the same procedures as those employed with the above-described time-sequence pattern model 21 using an HMM.

Note that in the event that the score is likelihood for example, the greater the score is, the better, and in the event that the score is error or distance for example, the smaller the score is, the better.

Next, description will be made regarding a forward model and inverse model to which a time-sequence pattern storage network such as described above is applied.

Figure 20:
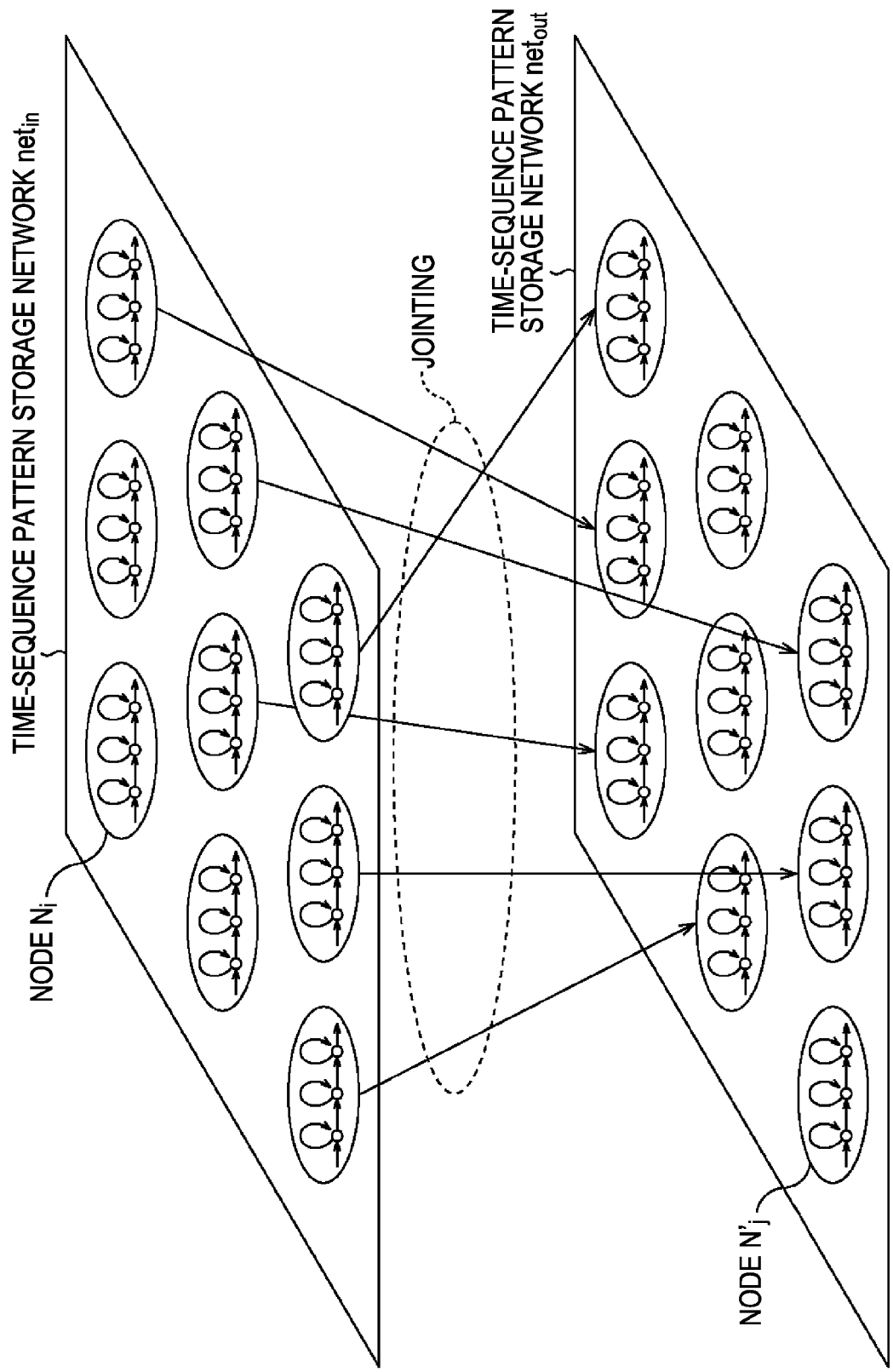
FIG. 20 is a diagram illustrating a configuration example of an input/output relation model.

FIG. 20 schematically illustrates a configuration example of an input/output relation model serving as a forward model or inverse model to which a time-sequence pattern storage network has been applied.

In FIG. 20, the input/output relation model has two time-sequence pattern storage networks, a time-sequence pattern storage network $net_{in}$ and a time-sequence pattern storage network $net_{out}$. Further, the input/output relation model is a jointed model wherein the nodes $N_i$ (wherein i=1, 2, and so on up to the total number of nodes) of the time-sequence pattern storage network $net_{in}$ and the nodes $N'_j$ (wherein j=1, 2, and so on up to the total number of nodes) of the time-sequence pattern storage network $net_{out}$ are jointed.

In FIG. 20, the arrows between the nodes $N_i$ of the time-sequence pattern storage network $net_{in}$ and the nodes $N'_j$ of the time-sequence pattern storage network $net_{out}$ represents the jointing of the nodes $N_i$ and $N'_j$.

Note that the time-sequence pattern storage networks $net_{in}$ and $net_{out}$ may have an equal number of nodes and links (including cases without links), or have different numbers of nodes and links. Also, the time-sequence pattern model 21 of the nodes $N_i$ of the time-sequence pattern storage network $net_{in}$ and the time-sequence pattern model 21 of the nodes node $N'_j$ of the time-sequence pattern storage network $net_{out}$ may be the same time-sequence pattern models, or may be different time-sequence pattern models.

Figure 21:
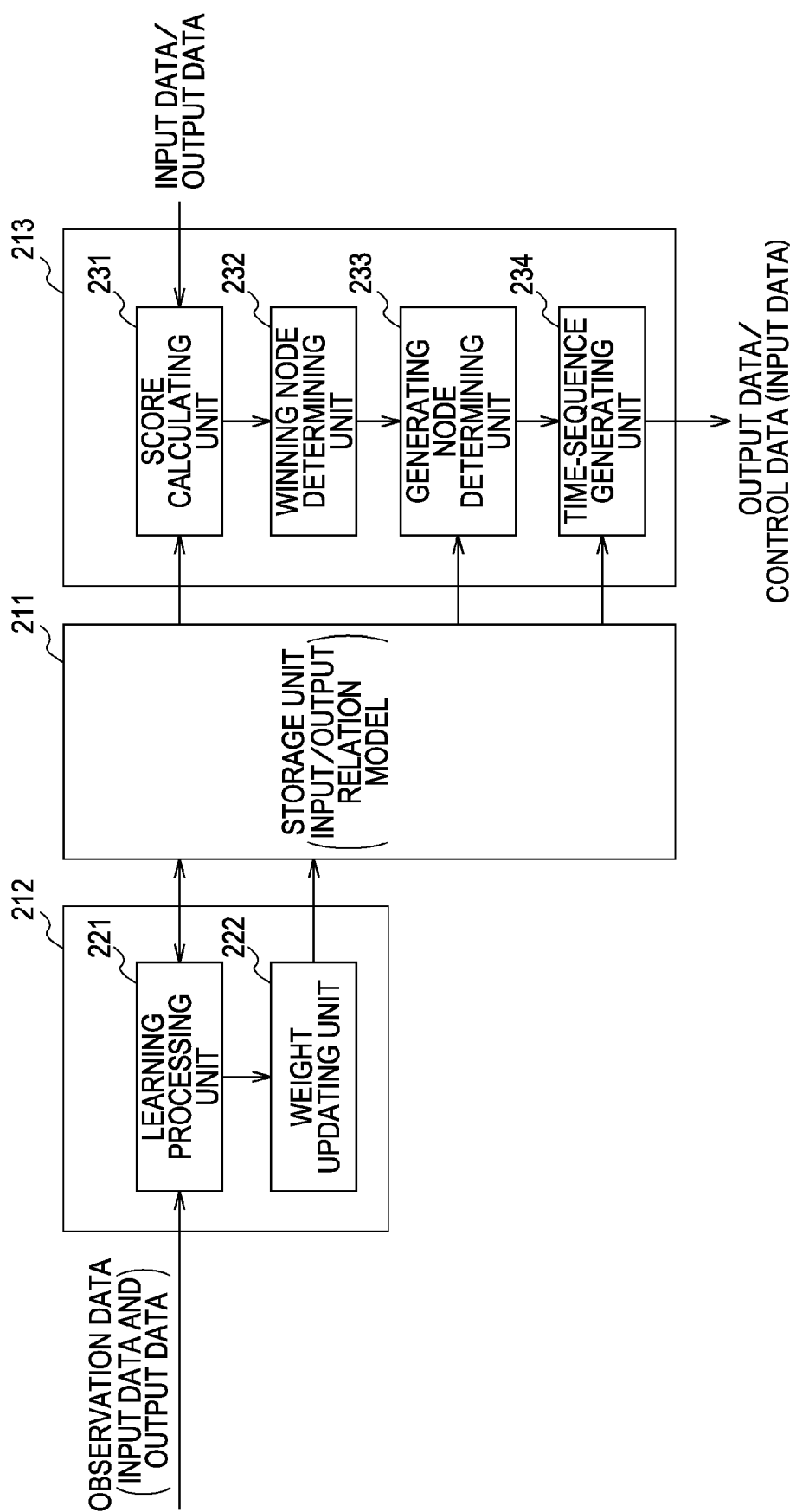
FIG. 21 is a block diagram illustrating a configuration example of a data processing device which performs processing using an input/output relation model.

Next, FIG. 21 illustrates a configuration example of a data processing device which performs various types of processing, using an input/output relation model.

With the data processing device shown in FIG. 21, the object of control is modeled into a forward model or inverse model with the input/output relation model shown in FIG. 20, and further, output data obtained from the object of control, and control data (input data) to be provided to the object of the control, are predicted using the input/output relation model serving as a forward model or inverse model.

In FIG. 21, the data processing device is configured of a storage unit 211, learning unit 212, and recognition generating unit 213. The storage unit 211 stores the input/output relation model shown in FIG. 20 for example, and so forth.

Supplied to the learning unit 212 is teaching data, which is a set of input data (more particularly, the observation values thereof) to be provided to the object of control which is to be modeled, and output data (more particularly, the observation values thereof) to be obtained from the object of control as to the input data. Here, the teaching data is a set of input data which is time-sequence data of a certain section (time-sequence data spanning a certain time span) and output data which is other time-sequence data of the section, obtained from the object of control with regard to the time-sequence data of that section.

The learning unit 212 performs learning of the input/output relation model serving as the forward model or inverse model of the object of control, using the teaching data supplied thereto.

The learning unit 212 is configured from a learning processing unit 221 and weight updating unit 222. The learning processing unit 221 is configured in the same way as the learning processing unit 32 shown in FIG. 12, and updates the time-sequence pattern storage network $net_{in}$ of the input/output relation model (FIG. 20) stored in the storage unit 211 in a self-organizing manner, in the same way as with the data processing device shown in FIG. 10, based on the input data portion of the teaching data supplied to the learning unit 212. Also, the learning processing unit 221 updates the time-sequence pattern storage network $net_{out}$ of the input/output relation model (FIG. 20) stored in the storage unit 221 in a self-organizing manner, in the same way as with the data processing device shown in FIG. 10, based on the output data portion of the teaching data (the output data portion of the teaching data, which forms a set with the input data) supplied to the learning unit 212.

Further, the learning processing unit 221 supplies to the weight updating unit 222 a label set, made up of a set of the node label of the node $N_i$ of the time-sequence pattern storage network $net_{in}$ (hereinafter referred to as "input label" where appropriate) which has become the winning node at the time of updating the time-sequence pattern storage network $net_{in}$, and the node label of the node $N'_j$ of the time-sequence pattern storage network $net_{out}$ (hereinafter referred to as "output label" where appropriate) which has become the winning node at the time of updating the time-sequence pattern storage network $net_{out}$.

The weight updating unit 222 updates the jointing relation between the nodes $N_i$ of the time-sequence pattern storage network $net_{out}$ and the nodes $N'_j$ of the time-sequence pattern storage network $net_{out}$ in the input/output relation model (FIG. 20) stored in the storage unit 211, based on the label set supplied from the learning processing unit 221.

Now, the label set supplied from the learning processing unit 221 to the weight updating unit 222 is a set of input label and output label, and the input label is the node label of the node $N_i$ of the time-sequence pattern storage network $net_{in}$ which has become the winning node at the time of updating the time-sequence pattern storage network $net_{in}$ based on the input data potion of the teaching data, and accordingly is the node label of the node $N_i$ which most closely matches the input data.

In the same way, the output label is the node label of the node $N'_j$ of the time-sequence pattern storage network $net_{out}$ which has become the winning node at the time of updating the time-sequence pattern storage network $net_{out}$ based on the output data potion of the teaching data, and accordingly is the node label of the node $N'_j$ which most closely matches the output data.

At the weight updating unit 222, the jointing relation between the node $N_i$, which, of the nodes of the time-sequence pattern storage network $net_{in}$, most closely matches the input data of the teaching data, and the nodes of the time-sequence pattern storage network $net_{out}$, is updated, and the jointing relation between the winning node $N'_j$, which, of the nodes of the time-sequence pattern storage network $net_{out}$, most closely matches the output data of the teaching data, and the nodes of the time-sequence pattern storage network $net_{in}$, is updated.

Now, the greater the degree of jointing is between the nodes of the time-sequence pattern storage network $net_{in}$ and the nodes of the time-sequence pattern storage network $net_{out}$ in the input/output relation model, a greater value of weight is used to represent the relation, so updating of the jointing relation between nodes means updating of the weight. Deltas of the method for updating the jointing relation among the nodes by the weight updating unit 222 will be described later.

Supplied to the recognition generating unit 213 is input data for predicting the output data obtained from the object of control, or output data for predicting the input data (control data) which is to be provided to the object of control such that the output data obtained from the object of control is a target value.

In the event that input data is supplied, the recognition generating unit 213 determines a winning node $N_i$ which most closely matches that input data in the time-sequence pattern storage network $net_{in}$ of the input/output relation model stored in the storage unit 211, and determines the node of the time-sequence pattern storage network $net_{out}$ which has the strongest weight with the winning node $N_i$ to be the generating node $N'_j$ for generating the time-sequence data serving as the prediction value of output data as to that input data. Further, the recognition generating unit 213 generates and outputs output data (more particularly, prediction values thereof), based on the time-sequence pattern model 21 (FIG. 7) which the generating node $N'_j$ has.

Also, in the event that output data is supplied, the recognition generating unit 213 determines a winning node $N'_j$ which most closely matches that output data in the time-sequence pattern storage network $net_{out}$ of the input/output relation model stored in the storage unit 211, and determines the node of the time-sequence pattern storage network $net_{in}$ which has the strongest weight with the winning node $N'_j$ to be the generating node $N_i$ for generating the time-sequence data serving as the prediction value of control data (input data) provided to the object of control at the time of that output data being obtained. Further, the recognition generating unit 213 generates and outputs control data (more particularly, prediction values thereof), based on the time-sequence pattern model 21 (FIG. 7) which the generating node $N_i$ has.

The recognition generating unit 213 is configured of a score calculating unit 231, winning node determining unit 232, generating node determining unit 233, and time-sequence generating unit 234.

The score calculating unit 231, winning node determining unit 232, generating node determining unit 233, and time-sequence generating unit 234 are arranged to be able to recognize whether the data supplied to the recognition generating unit 213 is input data or output data. That is to say, information is supplied to the recognition generating unit 213 separately from the data supplied thereto, or along with the data supplied thereto, indicating whether the data is input data or output data. Thus, the score calculating unit 231, winning node determining unit 232, generating node determining unit 233, and time-sequence generating unit 234 can recognize whether the data supplied to the recognition generating unit 213 is input data or output data.

The score calculating unit 231 calculates the score, which is the degree of matching of the nodes $N_i$ of the time-sequence pattern storage network $net_{in}$ or the nodes $N'_j$ of the time-sequence pattern storage network $net_{out}$ of the input/output relation model stored in the storage unit 211, as to the data supplied to the recognition generating unit 213, in the same way as with the case of the score calculating unit 51 of the recognizing unit 3 shown in FIG. 16, and supplies the winning node to the winning node determining unit 232.

That is to say, in the event that the data input to the winning node determining unit 232 is input data, the score calculating unit 231 calculates the score of the nodes $N_i$ of the time-sequence pattern storage network $net_{in}$ making up the input/output relation model stored in the storage unit 211, as to the input data, and supplies to the winning node determining unit 232. Also, in the event that the data input to the winning node determining unit 232 is output data, the score calculating unit 231 calculates the score of the nodes $N'_j$ of the time-sequence pattern storage network $net_{out}$ making up the input/output relation model stored in the storage unit 211, as to the output data, and supplies to the winning node determining unit 232.

The winning node determining unit 232 determines the node with the highest score supplied from the score calculating unit 231 to be the winning node, in the same way as with the winning node determining unit 52 of the recognizing unit 3 shown in FIG. 16, and supplies a node label representing the winning node to the generating node determining unit 233.

Accordingly, in the event that the data supplied to the recognition generating unit 213 is input data, the winning node determining unit 232 determines the node of the time-sequence pattern storage network $net_{in}$ making up the input/output relation model stored in the storage unit 211 which has the highest score as to the input data as supplied from the score calculating unit 231 to be the winning node $N_i$, and an input label representing the winning node $N_i$ is supplied to the generating node determining unit 233. Also, in the event that the data supplied to the recognition generating unit 213 is output data, the winning node determining unit 232 determines the node of the time-sequence pattern storage network $net_{out}$ making up the input/output relation model stored in the storage unit 211 which has the highest score as to the output data as supplied from the score calculating unit 231 to be the winning node $N'_j$, and an output label representing the winning node $N'_j$ is supplied to the generating node determining unit 233.

It should be understood that here that the highest (largest) score is the best score.

Upon an input label being supplied from the winning node determining unit 232, i.e., in the event that the data supplied from the recognition generating unit 213 is input data, the generating node determining unit 233 determines that of the nodes of the time-sequence pattern storage network $net_{out}$ making up the input/output relation model stored in the storage unit 211, the node $N'_j$, which has the strongest weight as to the node $N_i$ represented by the input label from the winning node determining unit 232, is to be the generating node, and supplies the output label representing the generating node $N'_j$ to the time-sequence generating unit 234. Also, upon an output label being supplied from the winning node determining unit 232, i.e., in the event that the data supplied from the recognition generating unit 213 is output data, the generating node determining unit 233 determines that of the nodes of the of the time-sequence pattern storage network $net_{in}$ making up the input/output relation model stored in the storage unit 211, the node $N_i$, which has the strongest weight as to the node $N'_j$ represented by the output label from the winning node determining unit 232, is to be the generating node, and supplies the input label representing the node $N_i$ to the time-sequence generating unit 234.

Upon an output label being supplied from the generating node determining unit 233, i.e., in the event that the data supplied to the recognition generating unit 213 is input data, the time-sequence generating unit 234 generates time-sequence data to serve as a prediction value of output data as to the input data supplied to the recognition generating unit 213, in the same way as with the time-sequence generating unit 62 of the generating unit 6 shown in FIG. 18 for example, based on, out of the nodes of the of the time-sequence pattern storage network $net_{out}$ making up the input/output relation model stored in the storage unit 211, the time-sequence pattern model 21 of the node $N'_j$ represented by the output label from the generating node determining unit 233.

Also, upon an input label being supplied from the generating node determining unit 233, i.e., in the event that the data supplied to the recognition generating unit 213 is output data, the time-sequence generating unit 234 generates time-sequence data to serve as a prediction value of control data (input data) as to the output data supplied to the recognition generating unit 213, in the same way as with the time-sequence generating unit 62 of the generating unit 6 shown in FIG. 18 for example, based on, out of the nodes of the of the time-sequence pattern storage network $net_{in}$ making up the input/output relation model stored in the storage unit 211, the time-sequence pattern model 21 of the node $N_i$ represented by the input label from the generating node determining unit 233.

Next, modeling of the object of control by the input/output relation model that is performed at the data processing device shown in FIG. 21, i.e., learning of the input/output relation model, will be described with reference to the flowchart in FIG. 22.

In step S101, upon teaching data, which is a set of input data and output data, being input to the data processing device shown in FIG. 21, the teaching data is supplied to the learning processing unit 221 of the learning unit 212.

In step S102, the learning processing unit 221 updates, in a self-organizing manner, the time-sequence pattern storage network $net_{in}$ making up the input/output relation model (FIG. 20) stored in the storage unit 211, based on the input data portion of the teaching data, and the flow proceeds to step S103. In step S103, the learning processing unit 221 updates, in a self-organizing manner, the time-sequence pattern storage network $net_{out}$ making up the input/output relation model stored in the storage unit 211, based on the output data portion of the teaching data.

The learning processing unit 221 then supplies to the weight updating unit 222 a label set, which is a set of the input label of the node $N_i$ of the time-sequence pattern storage network $net_{in}$ which has become the winning node at the time of updating the time-sequence pattern storage network $net_{in}$, and the output label of the node $N_j$ of the time-sequence pattern storage network $net_{out}$ which has become the winning node at the time of updating the time-sequence pattern storage network $net_{out}$.

In step S104, based on the label set supplied from the learning processing unit 221, the weight updating unit 222 updates the weight between the nodes of the time-sequence pattern storage network $net_{in}$ and the nodes of the time-sequence pattern storage network $net_{out}$ making up the input/output relation model (FIG. 20) stored in the storage unit 211, returns to step S101, stands by for input of the next teaching data, and subsequently the same processing is repeated.

Due to a great number of teaching data sets being input and the processing of steps S101 through S104 being repeated, the input/output relation model stored in the storage unit 211 is transformed into a forward model corresponding to the object of control, and also is transformed into an inverse model.

Figure 22:
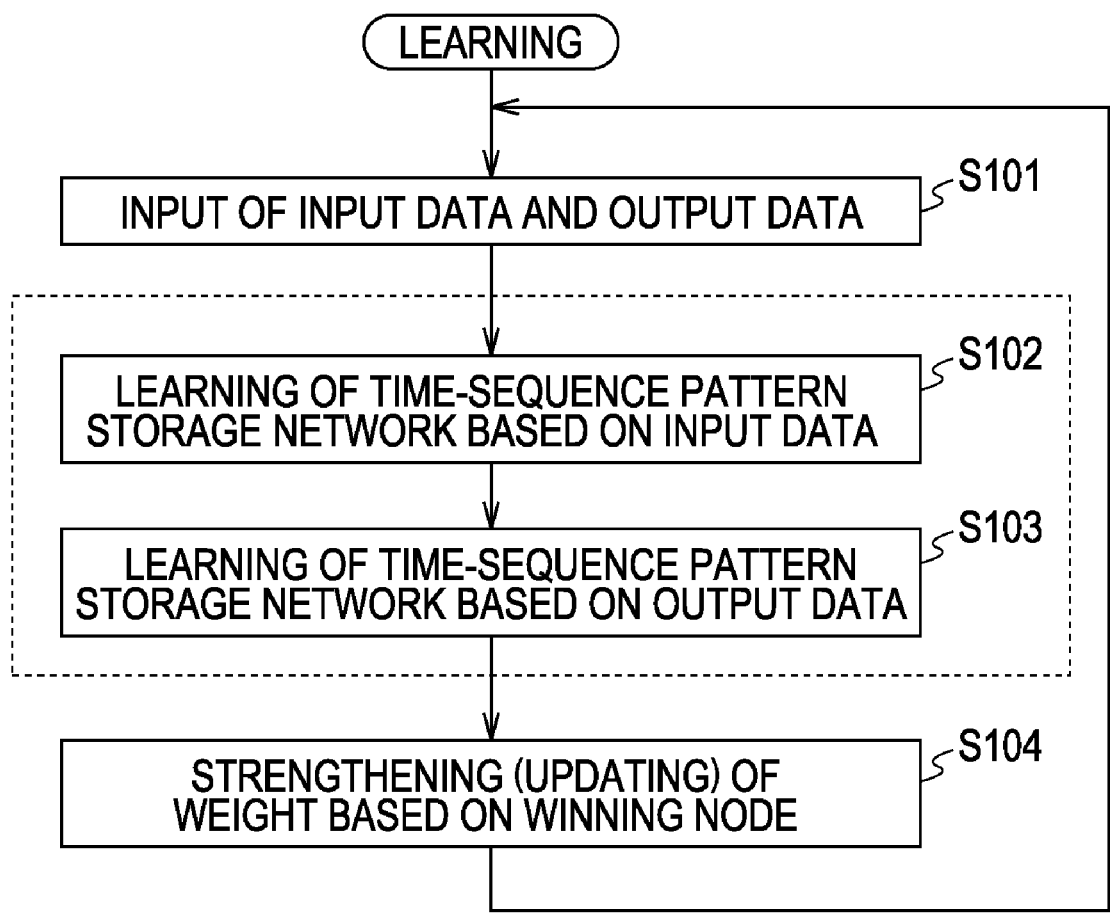
FIG. 22 is a flowchart for describing learning with an input/output relation model.

Note that the processing of steps S102 and S103 may be performed in parallel, or may be performed in reverse to the order shown in FIG. 22.

Next, updating of the weight (jointing relation between the nodes) which the weight updating unit 222 (FIG. 21) performs in step S104 in FIG. 22 will be described with reference to FIG. 23.

Note that in the following description, a time-sequence pattern storage network to which input data is provided, i.e., a time-sequence pattern storage network which is configured of multiple nodes having time-sequence pattern models 21 representing time-sequence patterns and whereby learning is performed using input data (e.g., the time-sequence pattern storage network $net_{in}$) will be referred to as an "input network", and a time-sequence pattern storage network to which output data is provided, i.e., a time-sequence pattern storage network which is configured of multiple nodes having time-sequence pattern models 21 representing time-sequence patterns and whereby learning is performed using output data (e.g., the time-sequence pattern storage network $net_{out}$) will be referred to as an "output network", as appropriate.

Further, where appropriate, nodes of an input network may be referred to as "input nodes", and nodes of an output network as "output nodes".

Also, in the following description, a case will be described wherein the input/output relation model is used as a forward model to which input data is provided so as to predict output data, and accordingly description of a case wherein the input/output relation model is used as an inverse model to which output data (target value) is provided so as to predict input data (control data) will be omitted as appropriate.

Figure 23:
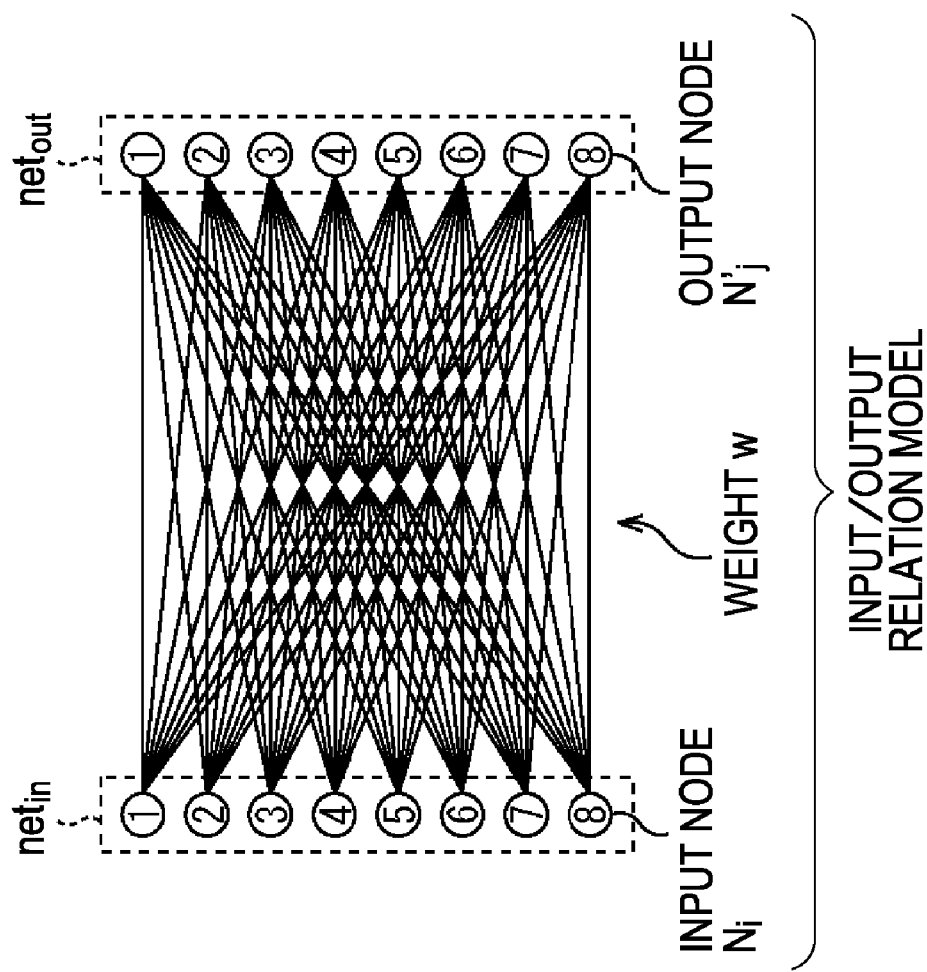
FIGS. 23A and 23B are diagrams illustrating a weight matrix.

FIGS. 23A and 23B indicate an input/output relation model. In FIG. 23A, the input/output relation model has one input network $net_{in}$ and one output network $net_{out}$, with each of the nodes of the input network $net_{in}$ and each of the nodes of the output network $net_{out}$ being jointed. Note that in FIG. 23, both the input network $net_{in}$ and the input network $net_{out}$ are configured of eight nodes.

In FIG. 23A, each input node of the input network $net_{in}$ is jointed with all of the output nodes of the output network $net_{out}$ (meaning that each output node of the output network $net_{out}$ is jointed with all of the input nodes of the input network $net_{in}$), and a weight w exists for all combinations of the input nodes of the input network $net_{in}$ and the output nodes of the output network $net_{out}$.

Now, if we take interest in two time-sequence pattern storage networks with nodes jointed, and form a weight matrix MTX wherein the nodes of one of the time-sequence pattern storage networks are made to correspond to the rows thereof and the nodes of the other time-sequence pattern storage network are made to correspond to the columns thereof, with a weight w of the i'th node of one time-sequence pattern storage network and the j'th node of the other time-sequence pattern storage network being situated at the element of row i and column j, the weight updating unit 222 (FIG. 21) updates the weights w which are the elements of the weight matrix MTX.

FIG. 23B illustrates a weigh matrix MTX regarding the input/output relation model in FIG. 23A.

With the weigh matrix MTX in FIG. 23B, the input nodes correspond to the rows and the output nodes correspond to the columns, with the weight w of the i'th input node and j'th output node being situated at the element of row i and column j. The weight updating unit 222 (FIG. 21) updates the weights w which are the elements of the weight matrix MTX.

That is to say, upon the power being turned on at first for example, the weight updating unit 222 initializes the all weights w in the weigh matrix MTX to an initial value of 0, for example. Each time a set of teaching data, i.e., input data and output data are input to the data processing device in FIG. 21, whereby the label set of the input label representing the winning node of the input network $net_{in}$ and the label set of the output label representing the winning node of the output network $net_{out}$ being provided from the learning processing unit 221, the weight updating unit 222 then updates the weights w, centering on the jointing of the winning nodes, as if it were.

Specifically, the weight updating unit 222 updates the weight w of the weigh matrix MTX according to Expression (4), for example.

$$w = (1-\beta)w + \beta \Delta w \quad (4)$$

Here, β is a learning rate representing the degree of updating of the weight w, and is within a range of 0 to 1. The smaller the learning rate β is, the less the weight w changes, and in the event that the learning rate β is 0, the weight w does not change. On the other hand, The greater the learning rate β is, the more the weight w changes, and in the event that the learning rate β is 1, the weight w is updated to the updating reference value Δw.

Note that the updating reference value Δw is obtained from Expression (5).

$$\Delta w = \frac{1}{d+1} \quad (5)$$

Here, d represents the inter-pattern distance as to the winning node as with the case in Expression (3), so that d=0 holds for the winning node. Accordingly, with the winning node the reference value Δw is 1, and the greater the inter-pattern distance d as to the winning node is, the closer the reference value Δw is to 0.

Now, expressing the input node which the input label supplied to the weight updating unit 222 from the learning processing unit 221 (FIG. 21) represents, i.e., the winning node in the input network $net_{in}$ as input node $N_i$, and expressing the output node which the input label supplied to the weight updating unit 222 from the learning processing unit 221 (FIG. 21) represents, i.e., the winning node in the output network $net_{out}$ as output node $N'_j$, the weight updating unit 222 (FIG. 21) updates the weigh matrix MTX as follows, in accordance with Expression (4) (and Expression (5)).

That is to say, the weight updating unit 222 obtains the reference value Δw for each output node of the output network $net_{out}$ according to Expression (5), using the inter-pattern distance d as to the output node $N'_j$ which is the winning node in the output network $net_{out}$, and further uses the reference value Δw to update the weight w with the i'th input node $N_i$ which is the winning node in the input network $net_{in}$, in accordance with Expression (4).

Accordingly, the weight w of the i'th row (each column) of the weight matrix MTX corresponding to the input node $N_i$ which is the winning node in the input network $net_{in}$.

Also, the weight updating unit 222 obtains the reference value Δw for each input node of the input network $net_{in}$ according to Expression (5), using the inter-pattern distance d as to the input node $N_i$ which is the winning node in the input network $net_{in}$, and further uses the reference value Δw to update the weight w with the j'th output node $N'_j$ which is the winning node in the output network $net_{out}$, in accordance with Expression (4).

Accordingly, the weight w of the j'th column (each row) of the weight matrix MTX corresponding to the output node $N'_j$ which is the winning node in the output network $net_{out}$.

Thus, the weight of the winning node $N_i$ of the input network $net_{in}$ and the winning node $N'_j$ of the output network $net_{out}$ is updated so as to maximize the degree of jointing.

Note that the updating of the weight w of the input node $N_i$ which is the winning node of the input network $net_{in}$ and the output node $N'_j$ which is the winning node of the output network $net_{out}$ is performed regarding only one of updating of the weight w of the nodes of the output network $net_{out}$ as to the input node $N_i$ which is the winning node, or updating of the weight w of the winning nodes of the input network $net_{in}$ as to the output node $N'_j$ which is the winning node.

Such updating of weight w (weight matrix MTX) is performed each time a set of input data and output data serving as teaching data is input to the data processing device shown in FIG. 21.

Further, learning based on input data of the input network $net_{in}$ learning based on output data of the output network $net_{out}$ of the input/output relation model is performed each time a set of input data and output data serving as teaching data is input to the data processing device shown in FIG. 21.

As learning of the input network $net_{in}$ and the output network $net_{out}$ progresses, the time-sequence pattern models 21 of the input nodes come to manifest a certain time-sequence pattern, and the time-sequence pattern models 21 of the output nodes also come to manifest another certain time-sequence pattern.

Consequently, In the event that there is some sort of relationship between the input data having a certain time-sequence pattern and the output data having another certain time-sequence pattern, and such a set of input data and output data (i.e., teaching data) is provided, the input node of the input network $net_{in}$ having a time-sequence pattern model 21 manifesting the certain time-sequence pattern becomes the winning node, and also the output node of the output network $net_{out}$ having a time-sequence pattern model 21 manifesting the other certain time-sequence pattern becomes the winning node.

Further, as described above, the weight of the input nodes of the input network $net_{in}$ as to the winning node of the output network $net_{out}$ is updated, focused around the winning node of the input network $net_{in}$, and the weight of the output nodes of the output network $net_{out}$ as to the winning node of the input network $net_{in}$ is updated, focused around the winning node of the output network $net_{out}$.

That is to say, the weight between the input nodes of the input network $net_{in}$ and the winning node of the output network $net_{out}$ is updated such that the weight between the input nodes closer in inter-pattern distance d as to the winning node of the input network $net_{in}$ is greater (i.e., the weight relation is stronger). Also, the weight between the output nodes of the output network $net_{out}$ and the winning node of the input network $net_{in}$ is updated such that the weight between the nodes closer in inter-pattern distance d as to the winning node of the output network $net_{out}$ is stronger.

Conversely, the weight between the input nodes of the input network $net_{in}$ and the winning node of the output network $net_{out}$ is updated such that the weight between the nodes farther in inter-pattern distance d as to the winning node of the input network $net_{in}$ is smaller (i.e., the weight relation is weaker). Also, the weight between the output nodes of the output network $net_{out}$ and the winning node of the input network $net_{in}$ is updated such that the weight between the output nodes farther in inter-pattern distance d as to the winning node of the output network $net_{out}$ is weaker.

As a great number of sets of teaching data is provided and learning of the input network $net_{in}$ and the output network $net_{out}$ progresses, an input/output relation model serving as a forward model or an inverse model, correlating the input data, more particularly the time-sequence pattern thereof, with the output data, more particularly the time-sequence pattern thereof, is obtained.

According to an input/output relation model serving as a forward model, in the event that certain input data is provided, a winning node most closely matching that input data can be determined in the input network $net_{in}$, and the output node of the output network $net_{out}$ which has the greatest weight was to that winning node can be determined. Further, generating time-sequence data based on the output node, or more particularly the time-sequence pattern model 21 thereof, enables output data as to the provided input data to be predicted.

Also, according to an input/output relation model serving as an inverse model, in the event that certain output data is provided (target value), a winning node most closely matching that output data can be determined in the output network $net_{out}$, and the input node of the input network $net_{in}$ which has the greatest weight was to that winning node can be determined. Further, generating time-sequence data based on the input node, or more particularly the time-sequence pattern model 21 thereof, enables control data (input data) as to the provided output data to be predicted.

Note that the weight matrix MTX is stored in the storage unit 211 (FIG. 21) as a part of the input/output relation model.

Figure 24:
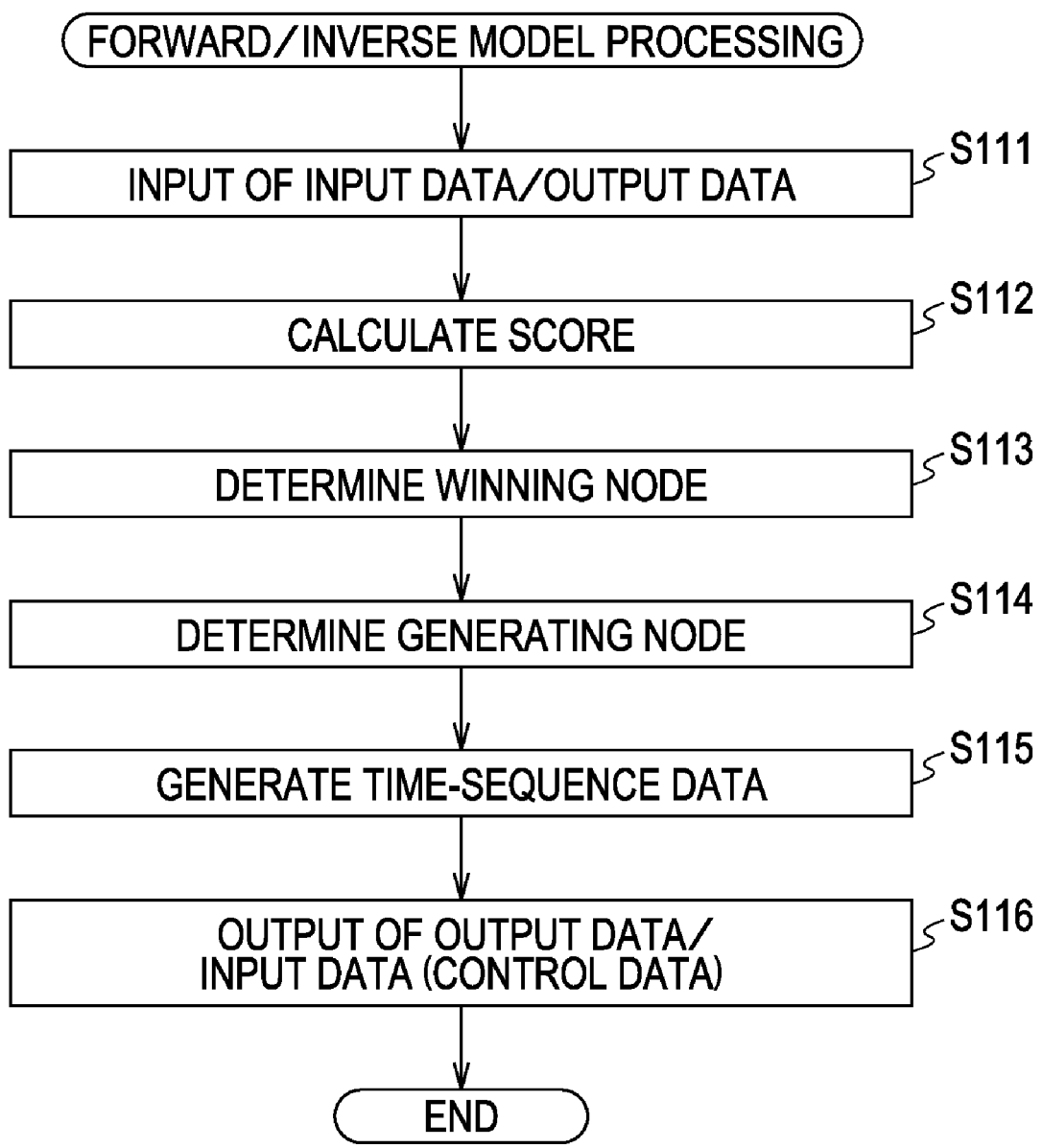
FIG. 24 is a flowchart for describing processing for predicting output data or control data using an input/output relation model.

Next, the processing for predicting output data as to input data, or control data (input data) as to output data, using an input/output relation model serving as a forward model or inverse model, will be described with reference to the flowchart in FIG. 24.

First, in a case of predicting output data as to input data with the data processing device shown in FIG. 21, in step S111, the input data is input to the data processing device shown in FIG. 21.

The input data input to the data processing device is provided to the score calculating unit 231 of the recognition generating unit 213.

In step S112, the score calculating unit 231 calculates the score of each of the nodes $N_i$ of the time-sequence pattern storage network $net_{in}$ making up the input/output relation model stored in the storage unit 211, and supplies the scores to the winning node determining unit 232.

In step S113, the winning node determining unit 232 determines the node of the time-sequence pattern storage network $net_{in}$ making up the input/output relation model stored in the storage unit 211 regarding which the highest score is provided from the score calculating unit 231 to be the winning node $N_i$, and supplies an input label representing the winning node $N_i$ to the generating node determining unit 233.

In step S114, the generating node determining unit 233 determines the node $N'_j$ of the time-sequence pattern storage network $net_{out}$ making up the input/output relation model stored in the storage unit 211 which has the greatest weight as to the node $N_i$ represented by the input label from the winning node determining unit 232 to be the generating node, and supplies an output label representing the generating node $N'_j$ to the time-sequence generating unit 234.

In step S115, the time-sequence generating unit 234 generates time-sequence data serving as a prediction value of the output data as to the input data supplied to the recognition generating unit 213, based on the time-sequence pattern model 21 (FIG. 7) of the node $N'_j$, represented by the output label from the generating node determining unit 233, of the nodes of the time-sequence pattern storage network $net_{out}$ making up the input/output relation model stored in the storage unit 211, proceeds to step S116, and outputs the time-sequence data.

Next, in a case of predicting control data (input data) as to output data with the data processing device shown in FIG. 21, in step S111, the output data is input to the data processing device shown in FIG. 21.

The output data input to the data processing device is provided to the score calculating unit 231 of the recognition generating unit 213.

In step S112, the score calculating unit 231 calculates the score of each of the nodes $N'_j$ of the time-sequence pattern storage network $net_{out}$ making up the input/output relation model stored in the storage unit 211, and supplies the scores to the winning node determining unit 232.

In step S113, the winning node determining unit 232 determines the node of the time-sequence pattern storage network $net_{out}$ making up the input/output relation model stored in the storage unit 211 regarding which the highest score is provided from the score calculating unit 231 to be the winning node $N'_j$, and supplies an output label representing the winning node $N'_j$ to the generating node determining unit 233.

In step S114, the generating node determining unit 233 determines the node $N_i$ of the time-sequence pattern storage network $net_{in}$ making up the input/output relation model stored in the storage unit 211 which has the greatest weight as to the node $N'_j$ represented by the output label from the winning node determining unit 232 to be the generating node, and supplies an input label representing the generating node $N'_j$ to the time-sequence generating unit 234.

In step S115, the time-sequence generating unit 234 generates time-sequence data serving as a prediction value of the control data (input data) as to the output data supplied to the recognition generating unit 213, based on the time-sequence pattern model 21 of the node $N_i$, represented by the input label from the generating node determining unit 233, of the nodes of the time-sequence pattern storage network $net_{in}$ making up the input/output relation model stored in the storage unit 211, proceeds to step S116, and outputs the time-sequence data.

As described above, an input/output relation model can be learned using a set of input data and output data, the object of control can be modeled as a forward model or inverse model, and the object of control can be represented with high precision, and output data and control data (input data) can be predicted with high precision.

Next, as described above, the data processing device shown in FIG. 21 supplies to the learning unit 212, as teaching data, a set of input data which is time-sequence data of a certain section (time-sequence data spanning a certain time span) that is provided to the object of control, and output data which is other time-sequence data observed from the object of control as to the time-sequence data of that section, and at the learning unit 212, this learning data is used to perform learning of the input/output relation model serving as a forward model of inverse model of the object of control.

Accordingly, in the event that learning is performed of an input/output relation model regarding a robot as the object of control for example, and a time-sequence of sensor data detected with a microphone serving as a sensor detecting a voice calling to the robot (audio data) being employed as input data to be provided to the robot, and a time-sequence of motor data provided to a motor for performing an action of moving an arm so as to cause the robot to wave being employed as the output data of the robot, self-organizing learning is performed at the learning unit 212 such that one or more nodes of the input network $net_{in}$ of the input/output relation model, or more particularly the time-sequence pattern model 21 thereof, expresses the time-sequence pattern of the input data which is sensor data corresponding to a voice calling the to the robot, and self-organizing learning is performed such that one or more nodes of the output network $net_{out}$ of the input/output relation model, or more particularly the time-sequence pattern 21 thereof, expresses the time-sequence pattern of the output data which is motor data corresponding to the action of waving.

Further, at the learning unit 212, the weight w between the nodes of the input network $net_{in}$ of the input/output relation model and the winning node of the output network $net_{out}$ is updated such that the weight is greater for nodes closer in inter-pattern distance d as to the winning node of the input network $net_{in}$, and the weight w between the nodes of the output network $net_{out}$ and the winning node of the input network $net_{in}$ is updated such that the weight is greater for output nodes closer in inter-pattern distance d as to the winning node of the output network $net_{out}$.

Consequently, the weight between the one or more nodes of the input network $net_{in}$ having a time-sequence pattern model 21 expressing the time-sequence pattern of input data which is sensor data corresponding to the voice calling the to the robot, and the one or more nodes of the output network $net_{out}$ having a time-sequence pattern model 21 expressing the time-sequence pattern which is motor data corresponding to the action of waving, is strengthened.

Subsequently, upon sensor data corresponding to the voice calling to the robot being provided to the recognition generating unit 213 (FIG. 21) as input data, at the input/output relation model, a node of the nodes of the input network $net_{in}$ which expresses the time-sequence pattern of sensor data corresponding to the voice calling to the robot becomes the winning node as to that input data. Then, at the recognition generating unit 213, a node of the output network $net_{out}$, i.e., in this case, a certain node of the nodes of the output network $net_{out}$ which expresses the time-sequence pattern of the motor data corresponding to the action of waving, is determined to be the generating node, and the generating node is used to generate output data, i.e., in this case, the motor data corresponding to the action of waving, which is then output.

Now, the term "perception" as used in the case of perceptive actions of a robot using an input/output relation model is equivalent to determining a winning node from the nodes of the input network $net_{in}$ of the input/output relation model, and the term "action" is equivalent to determining a generating node as to that winning node from the nodes of the output network $net_{out}$, and generating time-sequence data (output data).

According to the data processing device in FIG. 21, in a case of calling the robot, and providing a movement of waving in response to the voice, learning such as described above is performed, and consequently, the robot comes to perform perceptive actions in response to having been called.

However, with the data processing device shown in FIG. 21, it is difficult to cause a robot to perform tasks that are completed by recognition and action in a relatively short period of time, i.e., that require real-time operations.

That is to say, in the event that a robot is to perform a task of rolling a ball in front of itself to the left and right, the robot must repeatedly perform perception of comprehending (recognizing) the state of the ball, and action of appropriately moving the arm in response to the state of the ball, within a certain short period of time. We will refer to this certain period of time as a "frame". Even of a set of sensor data detecting the state of the ball in a certain frame on the time axis, and motor data corresponding to arm motions which must be made in that frame, is provided to the data processing device shown in FIG. 21 as teaching data, and the weight between the input node expressing the time-sequence pattern of the sensor data (node of the input network $net_{in}$) of the teaching data, and the output node expressing the time-sequence pattern of the motor data (node of the output network $net_{out}$) of the teaching data, is strengthened, the robot will not come to be able to perform the task of rolling a ball in front of itself to the left and right.

The reason is that, at the point in time that the sensor data of a certain frame is provided, the motions of the arm according to the motor data for that frame must already be underway.

Accordingly, in order for the robot to be able to perform the task of rolling a ball in front of itself to the left and right, learning of the input/output relation model must be performed such that, focusing on of a certain frame as a frame of interest, the weight is strengthened between an input node which expresses the time-sequence pattern of, out of the sensor data detecting the state of the ball with a sensor, the sensor data of the frame of interest (hereinafter may be referred to as "node corresponding to sensor data" as appropriate), and an output node which expresses the time-sequence pattern of, out of the motor data corresponding to the motions of the arm rolling the ball to the left and right, the motor data of a frame delayed from the point-in-time of the frame of interest by a predetermined amount of time (hereinafter may be referred to as "node corresponding to motor data" as appropriate).

Note that depending on the processing speed for recognizing the sensor data of a frame, i.e., determining a winning node as to the sensor data of the frame, a delay time of considerable proportions may occur between providing the sensor data of the frame of interest till the action of generating the motor data as to the sensor data. Which output node to have a stronger weight as to the node of the sensor data of the frame of interest, i.e., the amount of delay in time from the frame of interest to the frame having the motor data to be applied, should be determined as necessary, taking into consideration this delay time.

Figure 25:
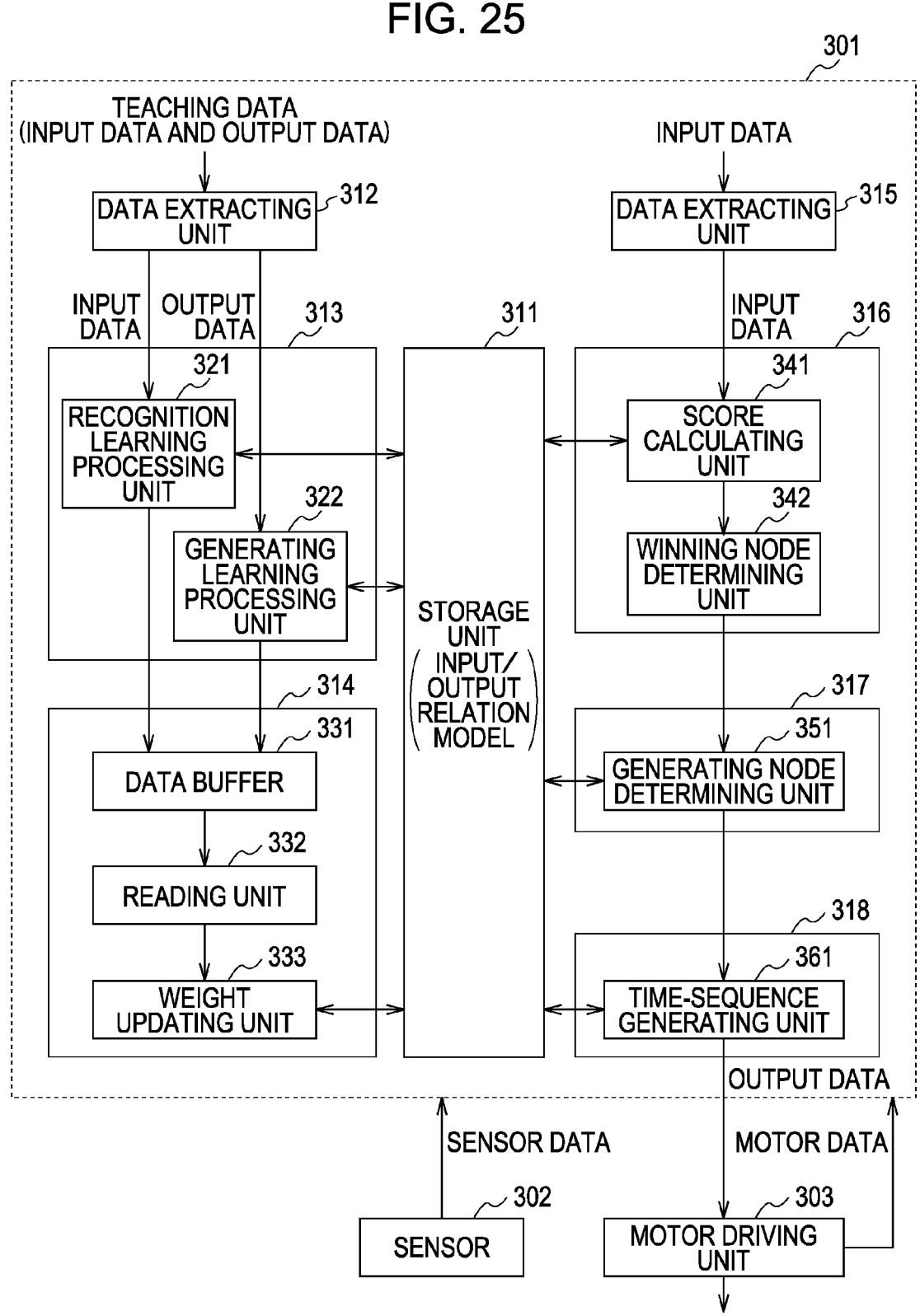
FIG. 25 is a block diagram illustrating a configuration example of a robot which performs a task regarding which real time operations are required.

FIG. 25 illustrates a configuration example of a robot which can perform tasks regarding which real time operations are required.

As shown in FIG. 25, the robot is configured of a data processing device 301, sensor 302, motor driving unit 303, and so forth.

The data processing device 301 uses time-sequence sensor data supplied from the sensor 302 and time-sequence motor data supplied from the motor driving unit 303 to perform self-organizing learning of the input/output relation model. Further, the data processing device 301 generates time-sequence motor data as to the time-sequence sensor data supplied from the sensor 302, which is supplied to the motor driving unit 303.

The sensor 302 is a camera, microphone, etc., which detects an external state, and supplies time-sequence sensor data representing that external state to the data processing device 301.

The motor driving unit 303 drives an unshown motor (actuator), for moving a robot arm or the like, for example, in response to motor data supplied from the data processing device 301. Also, in the event that the robot arm or the like for example is moved due to external force being applied thereto, the motor driving unit 303 generates motor data which is the same as motor data that should be provided to the motor driving unit 303 to cause such action, and supplies this motor data to the data processing device 301. Further, as described above, the motor driving unit 303 drives the motor in response to motor data supplied from the data processing unit 301, and also supplies (returns) the motor data to the data processing device 301 as necessary.

As shown in FIG. 25, the data processing unit 301 is configured of a storage unit 311, data extracting unit 312, learning processing unit 313, picture learning unit 314, data extracting unit 315, recognizing unit 316, picture unit 317, and generating unit 318. The storage unit 311 stores an input/output relation model.

Figure 26:
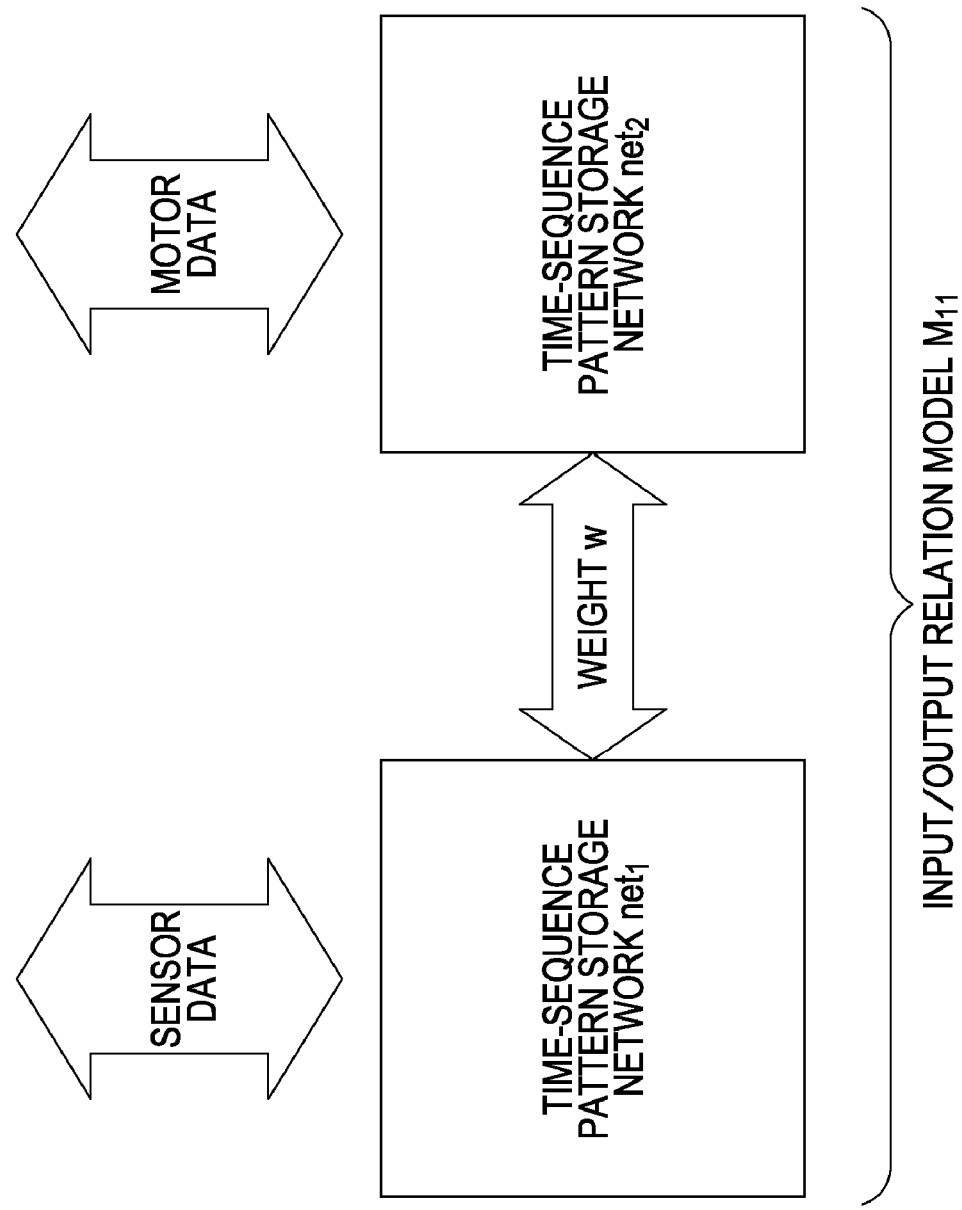
FIG. 26 is a diagram illustrating an input/output relation model $M_{11}$.

Now, FIG. 26 illustrates an input/output relation model $M_{11}$ stored in the storage unit 311. In the same way as the input/output relation models shown in FIGS. 20 and 23, the input/output relation model $M_{11}$ has an input network $net_1$ (input time-sequence pattern storage network) which is a time-sequence pattern storage network configured of multiple nodes each having time-sequence pattern models 21 (FIG. 7) expressing a time-sequence pattern which is a pattern of time-sequence data serving as input data, and an output network $net_2$ (output time-sequence pattern storage network) which is a time-sequence pattern storage network configured of multiple nodes each having time-sequence pattern models 21 expressing a time-sequence pattern which is a pattern of time-sequence data serving as output data.

The input/output relation model $M_{11}$ has the nodes of the input network $net_1$ and the nodes of the output network $net_2$ jointed by weighting.

Returning to FIG. 25, the data extracting unit 312 has supplied thereto sensor data which the sensor 302 outputs at each point-in-time, and motor data output at the same point-in-time by the motor driving unit 303. The data extracting unit 312 takes, from the teaching data, the sensor data as input data to be provided to the input/output relation model $M_{11}$ when performing perceptive action, and from the time-sequence of the input data, sequentially extracts input data in increments of frames, which is supplied to the learning processing unit 313.

Further, the data extracting unit 312 takes, from the teaching data, the motor data as input data to be generated from the input/output relation model $M_{11}$ when performing perceptive action, and from the time-sequence of the output data, sequentially extracts output data in increments of frames, which is supplied to the learning processing unit 313.

The learning processing unit 313 is configured of a recognition learning processing unit 321 and a generating learning processing unit 322, and uses both the input data and output data supplied in increments of frames from the data extracting unit 312 to perform self-organizing learning of the input network $net_1$ and output network $net_2$, of the input/output relation model $M_{11}$ (FIG. 26) stored in the storage unit 311.

That is to say, the recognition learning processing unit 321 updates, in a self-organizing manner, the input network $net_1$ of the input/output relation model $M_{11}$ stored in the storage unit 311, based on the input data supplied in increments of frames from the data extracting unit 312, in the same way as with the learning processing unit 221 shown in FIG. 21.

Specifically, the recognition learning processing unit 321 obtains a score as to the frame of input data from the data extracting unit 312 for each node in the input network $net_1$ of the input/output relation model $M_{11}$, and from the nodes of the input network $net_1$ determines a node with the best score to be the winning node (input winning node). Further, the recognition learning processing unit 321 updates the input network $net_1$ in a self-organizing manner, based on the input winning node as to the frame of input data from the data extracting unit 312.

Also, the recognition learning processing unit 321 supplies an input label, which is a node label representing the input winning node determined in time-sequence as to the frame of input data, to the picture learning unit 314 in time-sequence.

Also, the generating learning processing unit 322 updates, in a self-organizing manner, the output network $net_2$ of the input/output relation model $M_{11}$ (FIG. 26) stored in the storage unit 311, based on the output data supplied in increments of frames from the data extracting unit 312, in the same way as with the learning processing unit 221 shown in FIG. 21.

Specifically, the generating learning processing unit 322 obtains a score as to the frame of output data from the data extracting unit 312 for each node in the output network $net_2$ of the input/output relation model $M_{11}$, and from the nodes of the output network $net_2$ determines a node with the best score to be the winning node (output winning node). Further, the generating learning processing unit 322 updates the output network $net_2$ in a self-organizing manner, based on the output winning node as to the frame of output data from the data extracting unit.

Also, the generating learning processing unit 322 supplies an output label, which is a node label representing the output winning node determined in time-sequence as to the frame of output data, to the picture learning unit 314 in time-sequence.

The picture learning unit 314 is configured of a data buffer 331, reading unit 332, and weight updating unit 333, and updates the weight between the input winning node of the input network $net_1$ as to the frame of input data in the input/output relation model $M_{11}$ stored in the storage unit 331, and the nodes to the output network $net_2$, and also updates the weight of the output winning node of the output network $net_2$ as to the frame of output data delayed from the point-in-time of the frame of input data by a predetermined amount of time, and the nodes of the input network $net_1$.

That is to say, the data buffer 331 temporarily stores the time-sequence input label supplied from the recognition learning processing unit 321, and the time-sequence output label supplied from the generating learning processing unit 322.

The reading unit 332 sequentially reads out and correlates input labels representing the input winning node corresponding to the input data of the frame of interest, of the input labels stored in the data buffer 331, as the frame of interest, with output labels representing the output winning node corresponding to the output data of a frame delayed from the point-in-time of the frame of interest by a predetermined amount of time, of the input labels stored in the data buffer 331, and supplies the weight updating unit 333 with a label set which is a set of the correlated input label and output label.

The weight updating unit 333 updates the jointing relation between the node $N_i$ of the input network $net_1$ and the node $N'_j$ of the output network $net_2$ in the input/output relation model $M_{11}$ (FIG. 26) stored in the storage unit 311, by Hebb's learning rule or the like, based on the label set supplied from the reading unit 332 as with the case of the weight updating unit 222 shown in FIG. 21, described in FIG. 23.

That is to say, the weight updating unit 333 updates the weight between the input nodes of the input network $net_1$ and the output winning node of the output network $net_2$ which the output label of the label set represents, around the input winning node of the input network $net_1$ which the input label of the label set represents, and also updates the weight between the output nodes of the output network $net_2$ and the winning node of the input network $net_1$ around the winning node of the output network $net_2$.

Now, as described above, the input winning node is a winning node as to the input data of the frame of interest, and the output winning node is a winning node as to the output data of a frame delayed from the frame of interest by a certain amount of time, so according to updating of the weight by the weight updating unit 333, updating is performed at the input/output relation model $M_{11}$ stored in the storage unit 311 such that the weight between the input winning node of the input network $net_1$ as to the input data of the frame of interest, and the output winning node of the output network $net_2$ as to the output data of a frame delayed from the frame of interest by a certain amount of time, becomes stronger.

Consequently, upon input data of a certain frame F being provided to the input/output relation model $M_{11}$, at the input/output relation model $M_{11}$, a node of nodes of the input network $net_1$ corresponding to the input data of the frame F becomes the input winning node. Further, in the input/output relation model $M_{11}$, a node of the nodes of the output network $net_2$ corresponding to the output data of a frame delayed by a certain amount of time from the frame F is determined to be the generating node, as the node having the strongest weight as to the input winning node, thereby generating time-sequence data equivalent to the output data of the frame delayed from the frame F by a certain amount of time, based on that generating node.

Sensor data which the sensor 302 outputs at each point-in-time is supplied to the data extracting unit 315. The data extracting unit 315 takes sensor data from the sensor 302 as input data, and sequentially extracts input data in increments from the time-sequence of input data, which is supplied to the recognition unit 316. The recognition unit 316 is configured of a score calculating unit 341 and winning node determining unit 342.

Also, as shown in FIG. 25, the picture unit 317 is configured of a generating node determining unit 351. further, the generating unit 318 is configured of a time-sequence generating unit 361.

The score calculating unit 341, winning node determining unit 342, generating node determining unit 351, and time-sequence generating unit 361 each perform processing the same as that of the score calculating unit 231, winning node determining unit 232, generating node determining unit 233, and time-sequence generating unit 234 shown in FIG. 21.

Note that the output data which the time-sequence generating unit 361 generates is supplied as motor data to the motor driving unit 303.

Next, the processing of the data extracting unit 312 shown in FIG. 25 will be described with reference to FIG. 27.

As described with FIG. 25, the data extracting unit 312 is supplied with sensor data output by the sensor 302 at each point-in-time, and motor data which the motor driving unit 303 outputs at the same point-in-time.

Figure 27:
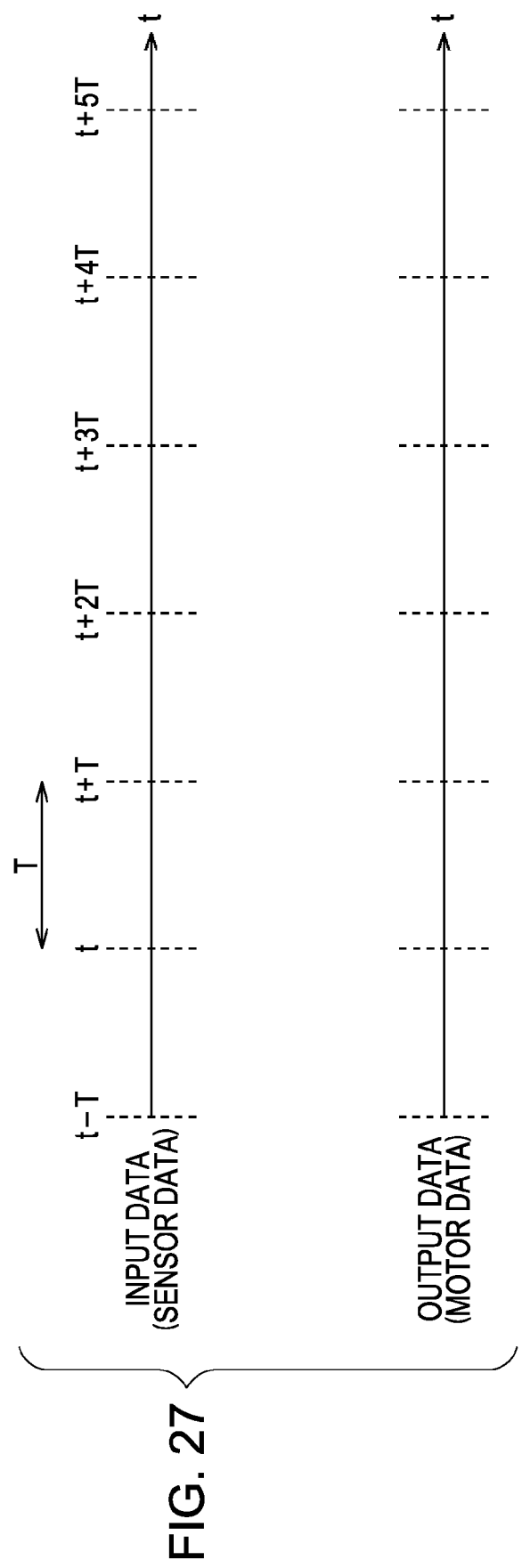
FIG. 27 is a diagram for describing processing of a data extracting unit 213.

Now, if we say that the length (duration in time) of a frame is T, the data extracting unit 312 extracts input data in increments of frames, which is the time-sequence of input data sectioned into time T increments as shown in FIG. 27, and supplies this to the learning processing unit 313 as input data of the sensor data.

Also, the data extracting unit 312 extracts output data in increments of frames, which is the time-sequence of output data sectioned into duration T increments as shown in FIG. 27, and supplies this to the learning processing unit 313 as output data of the motor data.

Note that hereinafter, a frame of a duration T of which the starting point-in-time is t and the ending point-in-time is t+T, will be referred to a frame of the point-in-time t. If we write input data from the input data at point-in-time t (more particularly, the sample value of the input data) to the input data at point-in-time t+t' as I[t, t+t'], the input data of the frame at point-in-time t can be written as I[t, t+T−1]. In the same way, of we write output data from the output data at point-in-time t to the output data at point-in-time t+t' as O[t, t+t'], the output data of the frame at point-in-time t can be written as O[t, t+T−1].

Note that the data extracting unit 315 shown in FIG. 25 also takes sensor data supplied from the sensor 302 as input data, and extracts input data in increments of frames of a duration T from the time-sequence of input data, which are supplied to the recognition unit 316, in the same way as with the data extracting unit 312.

Figure 28:
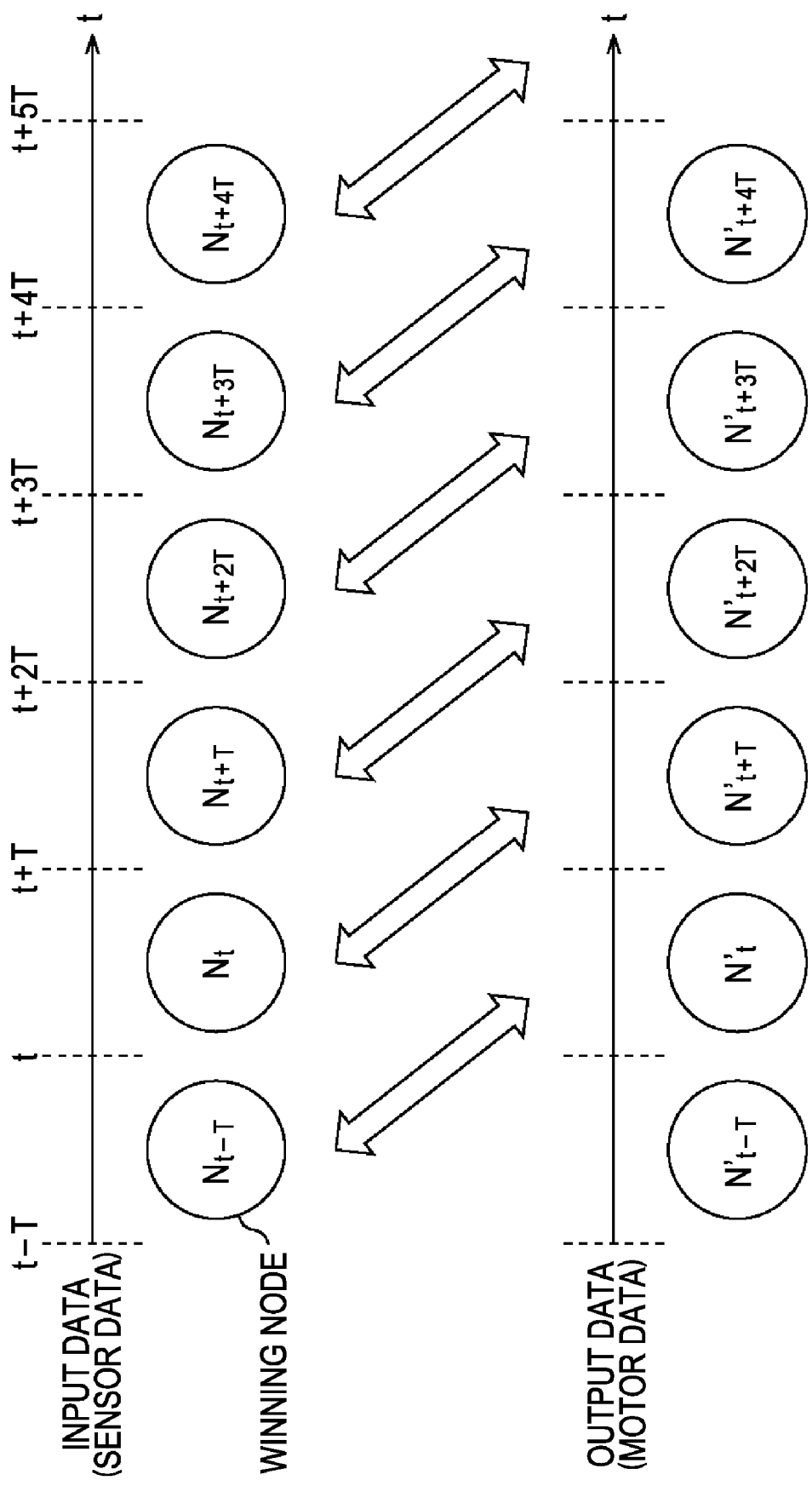
FIG. 28 is a diagram for describing processing of a reading unit 332.

Next, the processing performed by the reading unit 332 in FIG. 25 will be described with reference to FIG. 28. As described above, the reading unit 332 sequentially takes a frame of the input data as the frame of interest, and correlates an input label representing, of the input labels stored in the data buffer 331, the input winning node as to the input data of the frame of interest, and an output label representing, of the output labels stored in the data buffer 331, the output winning node as to the output data of a frame delayed by a certain amount of time from the point-in-time of the frame of interest.

That is to say, employing the same duration T as the duration of a frame as the certain time, the reading unit 332 correlates an input label representing the input winning node $N_t$ as to the input data of the frame at the point-in-time t (I[t, t+T−1]) and an output label representing the output winning node $N_{t+T}$ as to the output data of the frame at point-in-time t+T which is delayed from the frame at point-in-time t by an amount of time T (O[t+T, t+2T−1]).

Next, learning processing which the robot shown in FIG. 25 performs, i.e., learning processing of the input/output relation model $M_{11}$, will be described with reference to the flowchart in FIG. 29.

For example, in the event of causing a robot to perform a task of rolling a ball in front of itself to the left and right, the operator (the user training the robot to learn a task) places the ball in front of the robot, holds the arm of the robot, and moves the arm such that the ball is rolled to the left and right.

In this case, the sensor 302 detects the state of the ball rolling to the left and right, and time-sequence sensor data representing that state is supplied to the data extracting unit 312 of the data processing device 301.

Also, at the motor driving unit 303, motor data corresponding to the movement of the arm which the operator is moving is generated, and supplied to the data extracting unit 312 of the data processing device 301.

In step S301, the data extracting unit 312 takes the sensor data from the sensor 302 as input data, extracts input data in increments of frames from the time-sequence of input data, and supplies this to the recognition learning unit 321 of the learning processing unit 313, and also takes the motor data from the motor driving unit 303 as output data, extracts output data in increments of frames from the time-sequence of output data, and supplies this to the generating learning unit 322 of the learning processing unit 313. The flow then proceeds to step S302.

In step S302, the learning processing unit 313 uses the input data and output data in increments of frames from the data extracting unit 312 to perform self-organizing learning of the input network $net_1$ and output network $net_2$ of the input/output relation model $M_{11}$ (FIG. 26) stored in the storage unit 311. That is to say, in step S302, the processing of steps $S302_1$ and $S302_2$ is performed.

In step $S302_1$, the recognition learning processing unit 321 obtains a score regarding input data in increments of frames from the data extracting unit 312, regarding each node of the input network $net_1$ in the input/output relation model $M_{11}$ stored in the storage unit 311, and of the nodes of the input network $net_1$, determines the node with the best score to be the input winning node. Further, the recognition learning unit 321 updates the input network $net_1$ in a self-organizing manner based on the input winning node as to the input data in increments of frames from the data extracting unit, and supplies an input label representing the input winning node to the picture learning unit 314.

In step $S302_2$, the generating learning processing unit 322 obtains a score regarding output data in increments of frames from the data extracting unit 312, regarding each node of the output network $net_2$ in the input/output relation model $M_{11}$ stored in the storage unit 311, and of the nodes of the output network $net_2$, determines the node with the best score to be the output winning node. Further, the generating learning unit 322 updates the output network $net_2$ in a self-organizing manner based on the output winning node as to the output data in increments of frames from the data extracting unit 312, and supplies an output label representing the output winning node to the picture learning unit 314.

Following the processing in step S302, the flow proceeds to step S303, and the picture learning unit 314 takes a frame of the input data frames which has not yet been taken as a frame of interest, as the frame of interest, and correlates the input label representing the input winning node as to the input data of the frame of interest, from the learning processing unit 313, and the output label representing the output winning node as to the output data of a frame delayed from the frame of interest by the amount of time T, from the learning processing unit 313.

that is to say, in step S303, at the data buffer 331 of the picture learning unit 314, an input label indicating the input winner as to the input data, and an output label indicating the output winner as to the output data, supplied from the learning processing unit 313 in increments of frames, are temporarily stored.

Further, in step S303, the reading unit 332 of the picture learning unit 314 reads out and correlates, the input label representing the input winning node as to the input data of the frame of interest from the input labels stored in the data buffer 331, and the output label representing the output winning node as to the output data of a frame delayed from the point-of-time of the frame of interest by an amount of time T from the output labels stored in the data buffer 331, and supplies the label se to the correlated input label and output label to the weight updating unit 333.

The flow then proceeds from step S303 to step S304, and the weight updating unit 333 of the picture learning unit 314 updates the jointing relation between the nodes of the input network $net_1$ and the nodes of the output network $net_2$ in the input/output relation model $M_{11}$ (FIG. 26) based on the label set supplied from the reading unit 332.

That is to say, the weight updating unit 333 updates the input nodes of the input network $net_1$ of the input/output relation model $M_{11}$ stored in the storage unit 311 and the output winning node of the output network $net_2$ thereof which the output label of the label set represents, around the input winning node of the input network $net_1$ which the input label of the label set represents, and also updates the output nodes of the output network $net_2$ and the input winning node of the input network $net_1$, around the output winning node of the output network $net_2$.

Figure 29:
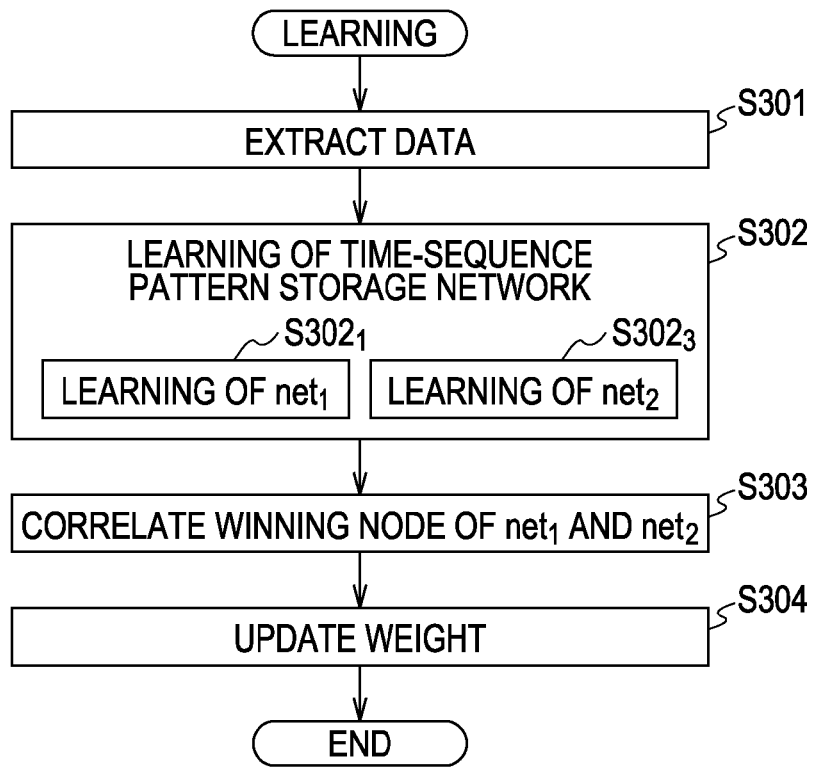
FIG. 29 is a flowchart for describing learning of the input/output relation model $M_{11}$.

Note that the learning processing shown in FIG. 29 may be performed with the leading frame through the end frame being sequentially taken as the frame of interest and the processing of steps S302 through S304 being repeated, or may be performed with the leading frame through the end frame being sequentially taken as the frame of interest and the processing of step S302 being repeatedly performed, following which the leading frame through the end frame are once more sequentially taken as the frame of interest and the processing of steps S303 and S304 is repeatedly performed.

Figure 30:
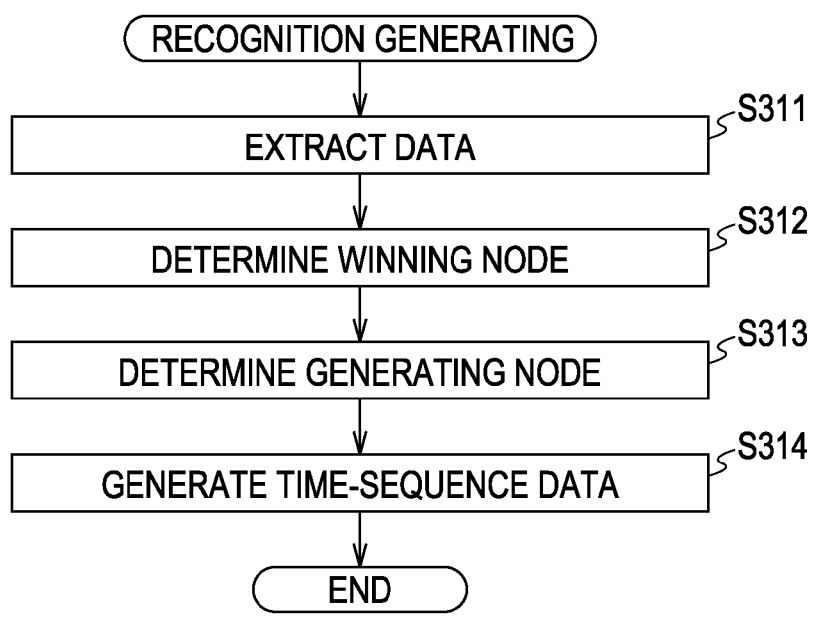
FIG. 30 is a flowchart for describing recognition generating processing of generating time-sequence data, using the input/output relation model $M_{11}$.

Next, description will be made regarding processing of perceptive actions of the robot shown in FIG. 25, i.e., the generating processing (recognition generating processing) of time-sequence data using the input/output relation model $M_{11}$, with reference to the flowchart in FIG. 30.

In a case wherein a robot has learned to perform the task of rolling a ball placed in front of it to the left and right, as described with reference to FIG. 29 for example, upon a ball being placed before the robot (and rolled if necessary), the state of the ball is detected at the sensor 302, and time-sequence sensor data representing that state is supplied to the data extracting unit 315 of the data processing device 301.

In step S311, the data extracting unit 315 takes the sensor data from the sensor 302 as input data, extracts input data in increments of frames from the time-sequence of the input data, supplies this to the recognizing unit 316, and proceeds to step S312.

In step S312, at the recognizing unit 316, the score calculating unit 341 sequentially takes input data in increments of frames from the data extracting unit 315 as input data of a frame of interest, calculates the score of each node of the input network $net_1$ making up the input/output relation model $M_{11}$ stored in the storage unit 311 as to the input data of the frame of interest, and supplies this to the winning node determining unit 342.

Further, in step S312, the winning node determining unit 342 determines the node of the input network $net_1$ making up the input/output relation model $M_{11}$ stored in the storage unit 311 which has the best score from the score calculating unit 341 to be the input winning node, supplies an input label representing the input winning node to the picture unit 317, and the flow proceeds to step S313.

In step S313, the generating node determining unit 351 of the picture unit 317 determines the node of the output network $net_2$ making up the input/output relation model $M_{11}$ stored in the storage unit 311 which has the greatest weight as to the node represented by the input label from the winning node determining unit 342 (input winning node) to be the generating node, and supplies an output label representing the generating node to the generating unit 318, and the flow proceeds to step S314.

In step S314, the time-sequence generating unit 361 of the generating unit 318 generates and outputs time-sequence data of a frame length, for example, to serve as output data (more particularly, precision values thereof) as to the input data of the frame of interest, based on the time-sequence pattern model 21 (FIG. 7) of the node of the output network $net_2$ making up the input/output relation model $M_{11}$ stored in the storage unit 311 which is represented by the output label from the generating node determining unit 351.

This time-sequence data serving as output data is supplied to the motor driving unit 303, and the motor driving unit 303 drives the motor using the output data from the time-sequence generating unit 361 as motor data, whereby the robot arm is moved.

Subsequently, the processing of steps S312 through S314 is performed regarding the input data in increments of frames that is supplied from the data extracting unit 315 to the recognizing unit 316.

As described above, the weight between the input winning node of the input network $net_1$ as to the input data in increments of frames, and the nodes of the output network $net_2$ is updated, and also, the weight between the output winning node of the output network $net_2$ as to the output data in increments of frames delayed by a predetermined amount of time from the point-in-time of the input data in increments of frames, and the nodes of the input network $net_1$ is updated, whereby the robot can be made to learn and further perform tasks regarding which real-time operations are required, such as the task of rolling a ball in front of it to the left and right.

Note that in the above-described example, output data of a frame delayed from the point-in-time of the frame of interest by an amount of time T which is the same as the duration of a frame, is employed as the output data of a frame delayed from the point-in-time of the frame of interest by a predetermined amount of time, that is to say, the amount of time T has been employed as the time difference between the frame of interest of the input data and the frame of the output data corresponding to the frame of interest (hereinafter referred to as "input/output time difference" as appropriate), but the input/output time difference is by no way restricted to the time T, and other examples of input/output time difference which may be employed include, but are not restricted to, 2T, 3T, 0.5T, and so forth.

Now, the operation of updating the weight between the input winning node of the input network $net_1$ as to the input data in increments of frames, and the nodes of the output network $net_2$, and also, updating the weight between the output winning node of the output network $net_2$ as to the output data in increments of frames delayed by the input/output time difference from the point-in-time of the input data in increments of frames, and the nodes of the input network $net_1$, at the weight updating unit 333 (FIG. 25) means that learning of the input/output relation model $M_{11}$ is performed so as to correlate the input data in increments of frames with the output data in increments of frames delayed by the input/output time difference from the point-in-time of the input data in increments of frames.

In the generating of output data as to the input data using the input/output relation model $M_{11}$ regarding which this learning has been performed, output data (more particularly, prediction values thereof) in increments of frames delayed by the input/output time difference from the point-in-time of the input data in increments of frames is generated as to the input data in increments of frames, so the generating of the output can be said to be predicting the output data in increments of frames (more particularly, actions corresponding to the output data) that is in the future as compared to the input data in increments of frames by an amount equivalent to the input/output time difference, based on the input data in increments of frames (e.g., sensor data).

Thus, the robot shown in FIG. 25 performs learning of the input/output relation model $M_{11}$, by correlating the input data in increments of frames with the output data in increments of frames delayed by the input/output time difference from the point-in-time of the input data in increments of frames.

Accordingly, at the time of perceptive actions of the robot, i.e., generating output data, as long as sensor data of a time-sequence pattern matching a time-sequence pattern which one of the input network $net_1$ nodes of the input/output relation model $M_{11}$ represents is input as sensor data which is the input data, motor data is appropriately generates as output data as to that sensor data, and consequently, the robot can reenact the learnt task.

Now, with the learning of the input/output relation model $M_{11}$ in FIG. 25, the sensor data is taken as input data, and the motor data is taken as output data, self-organizing learning of the input network $net_1$ is performed using input data in increments of frames, and also self-organizing learning of the output network $net_2$ is performed using output data in increments of frames, with the weight w being updated so as to strengthen the jointing relation between the winning node of the input network $net_1$ as to the input data in increments of frames and the winning node of the output network $net_2$ as to the output data in increments of frames that has been delayed by an amount of time equivalent to the input/output time difference from the input data in increments of frames, whereby output data of a frame delayed by the input/output time difference from the input data in increments of frames can be generated for example, with the input/output relation model $M_{11}$, i.e., output data of future frames can be predicted.

Accordingly, with the input/output relation model $M_{11}$, using data of the same time sequence as the input data and output data enables prediction from time-sequence data of a frame to be made for, for example, time-sequence data of the next frame.

Figure 31:
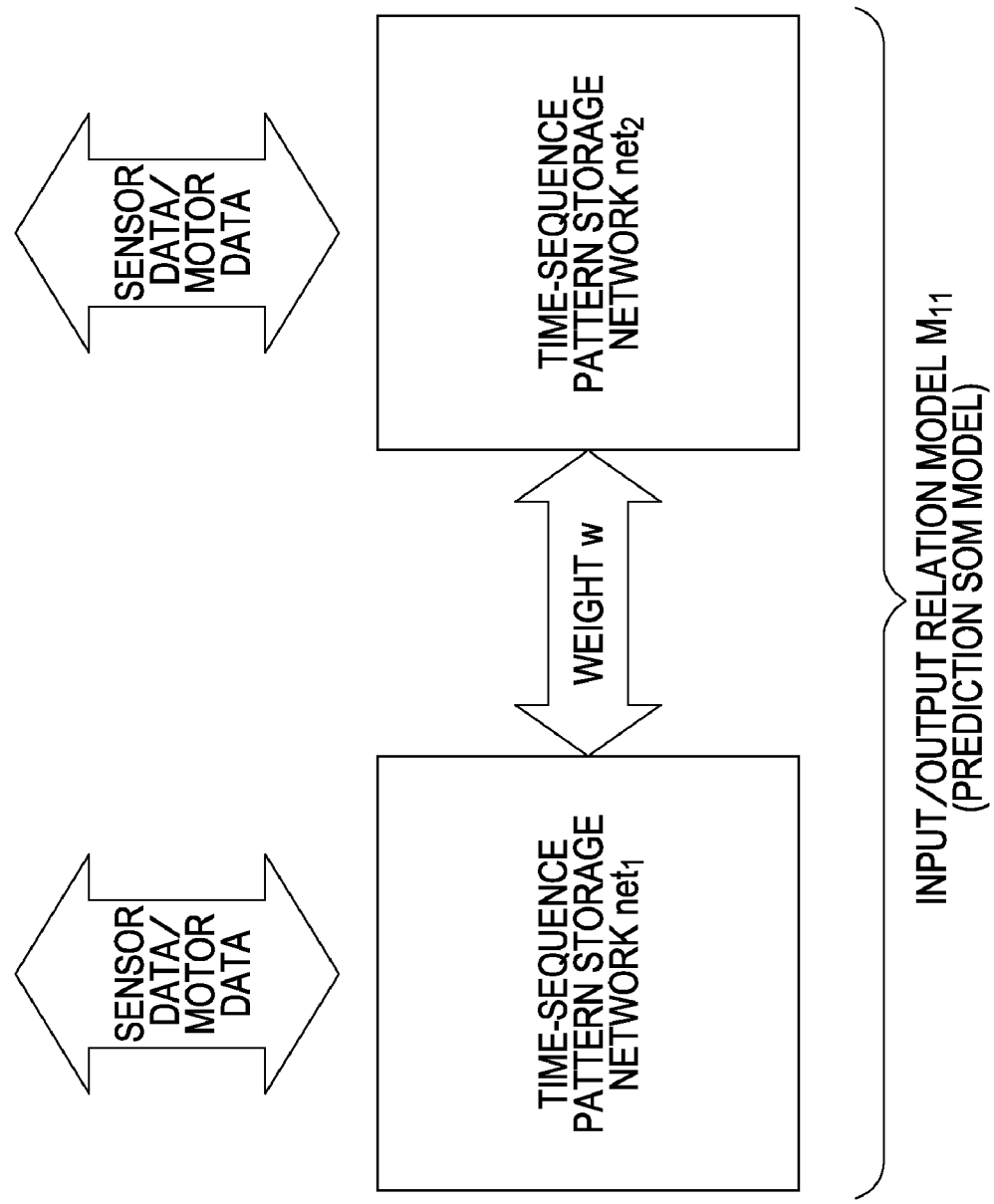
FIG. 31 is a diagram illustrating a prediction SOM model.

That is to say, with the learning of the input/output relation model $M_{11}$, as shown in FIG. 31 time-sequence data is extracted in increments of frames from time-sequence data such as sensor data and motor data for example, self-organizing learning of the input network $net_1$ and the output network $net_2$ is performed using the time-sequence data in increments of frames, with the weight w being updated so as to strengthen the jointing relation between the winning node of the input network $net_1$ as to the time-sequence data in increments of frames, and the winning node of the output network $net_2$ corresponding to the time-sequence data of the next frame in the time-sequence data in increments of frames.

In this case, with the input/output relation model $M_{11}$, the weight is strengthened between a node $N_A$ of the nodes of the input network $net_1$ which represents a time-sequence pattern of time-sequence data of a certain frame F, and a node $N_B$ of the nodes of the output network $net_2$ which represents the time-sequence pattern of the time-sequence data of the frame following the frame F.

Accordingly, upon the time-sequence data of the frame F being input as to the input network $net_1$ of the input/output relation model $M_{11}$, the node $N_A$ of the nodes of the input network $net_1$ becomes the winning node. Further, of the nodes of the output network $net_2$, the node $N_B$ becomes the node with the strongest weight as to the node $N_A$ which is the winning node, whereby that node $N_B$ is determined to be the generating node, and time-sequence data of the time-sequence pattern which the node $N_B$ represents, i.e., a prediction value of the time-sequence data of the frame following the frame F is generated.

On the other hand, the time-sequence pattern storage networks such as the input network $net_1$ and output network $net_2$ making up the input/output relation model $M_{11}$ are configured of multiple nodes and are capable of self-organizing learning, which is a point held in common with known SOMs. Accordingly, such time-sequence pattern storage networks are within the scope of SOMs and can be said to be a type of SOM.

Thus, according to the input/output relation model, time-sequence data of a future frame, e.g., the next frame, can be predicted from the time-sequence data of each frame, and further, the time-sequence pattern storage networks making up the input/output relation model are a type of SOM, so from this perspective, it can be said that the input/output relation model is a model for predicting future time-sequence data from current time-sequence data, using SOMs.

Accordingly, an input/output relation model which serves as a model for predicting future time-sequence data from current time-sequence data, using SOMs, will hereinafter also be referred to as a "prediction SOM model" as appropriate.

Now, the input network $net_1$ and output network $net_2$ of the input/output relation model $M_{11}$ which is a prediction SOM model may have the same number of nodes, links, and time-sequence pattern models 21 of the nodes, or these may be different, as with the case of the time-sequence pattern storage networks $net_{in}$ and $net_{out}$ of the input/output relation model shown in FIG. 20.

Also, with the prediction SOM model, the input network $net_1$ and output network $net_2$ both use time-sequence data of the same frame increments to perform self-organizing learning.

Accordingly, in a case of employing time-sequence pattern storage networks as the input network $net_1$ and output network $net_2$ both having the same number of nodes, links, and time-sequence pattern models 21 of the nodes, the input network $net_1$ and output network $net_2$ can be substituted with a single time-sequence pattern storage network.

Figure 32:
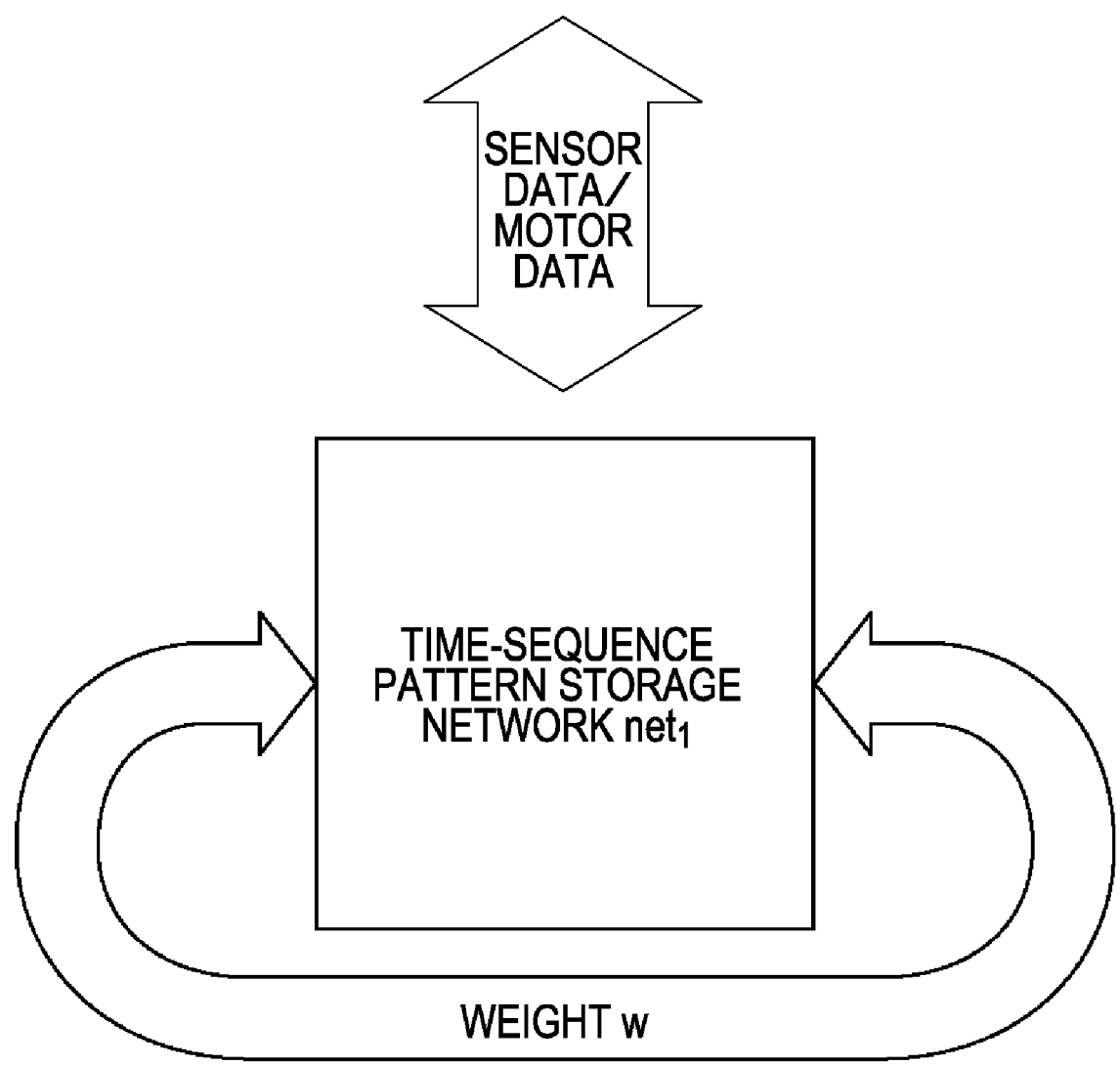
FIG. 32 is a diagram illustrating a new SOM.

FIG. 32 illustrates a prediction SOM model wherein the input network $net_1$ and output network $net_2$ of the input/output relation model $M_{11}$ have been substituted with a single time-sequence pattern storage network.

The prediction SOM model in FIG. 32 has a single time-sequence pattern storage network (input network) $net_1$, and the input network $net_1$ and output network $net_2$ serving as a prediction SOM model in FIG. 31 have been substituted with a single time-sequence pattern storage network $net_1$.

Due to the input network $net_1$ and output network $net_2$ of the input/output relation model $M_{11}$ serving as a prediction SOM model in FIG. 31 having been substituted with a single time-sequence pattern storage network $net_1$ with the prediction SOM model in FIG. 32, the nodes of the time-sequence pattern storage network $net_1$ are jointed to each other by the weight w.

A SOM wherein the nodes are jointed to each other by the weight was with the prediction SOM model in FIG. 32 will hereafter be referred to as a "new SOM" as appropriate.

With learning in a new SOM, a score corresponding to the time-sequence data is obtained in increments of frames, and a node with the best score is determined to be the winning node. The new SOM then performs self-organizing updating (learning), based on the winning node. Further, updating is performed such that, of the nodes of the new SOM, weight is strengthened between the winning node as to the time-sequence data in increments of frames, and a winning node corresponding to time-sequence data of a future frame, such as the next frame for example, of the time-sequence data in increments of frames.

With generating of time-sequence data using a new SOM, upon time-sequence data of a certain frame F being input to the new SOM, a score is obtained for each node of the new SOM regarding the time-sequence data of frame F, and the node with the best score is determined to be the winning node. The node of the new SOM which has the greatest weight with the winning node is determined to be the generating node, and the time-sequence data of the time-sequence pattern which the generating node represents is generated as a prediction value of the time-sequence data of the frame following the frame F, using the generating node.

As described above, with generating of time-sequence data using a new SOM, prediction values of time-sequence data of the next frame are generated as to time-sequence data of a frame F, i.e., time-sequence data of the next frame is predicted, so generating of time-sequence data using a new SOM is a type of prediction.

Also, this prediction is performed by using the node which has the greatest weight was to the winning node regarding the input data of frame F (weight from the winning node), based on the weight w, so of the self-organizing learning performed at a new SOM and weight learning (updating), weight learning is a type of prediction learning which is learning performed for prediction.

Note that input/output relation models (and also prediction SOM models with nodes jointed by the weight w, and new SOMs as well) can be configured using known SOMs having weight vectors of a predetermined order of dimensions (wherein weight vectors have been assigned to nodes), rather than being configured using time-sequence pattern storage networks of which nodes have time-sequence pattern models 21.

In the event of configuring an input/output relation model using known SOMs, the nodes represents a fixed-length time-sequence pattern of which the component of the weight vector is a sample value.

Note also in a case of configuring an input/output relation model using known SOMs, the SOMS serving as the input/output relation model have the weight w, and accordingly differ from known SOMs which do not have this weight w.

Now, the human brain is capable of processing great amounts of observation information and judge this in a comprehensive manner to predict what will happen next. The human brain is also capable of predicting its own next action.

Accordingly, the function of prediction learning is an extremely important component for intelligent information processing.

One stabilized mathematical framework for such prediction is the Markov process in the following expression. With the Markov process, observation results uniquely determine the next state.

$$S\_t+1 = f(S\_t, A\_t) \quad (6)$$

wherein S_t represents the state at point-in-time t, and A_t represents the observation value (observed result) at point-in-time t. Also, f(S_t, A_t) is a predetermined function wherein the state S_t and observation value A_t are arguments.

According to Expression (6), the state S_t+1 at point-in-time t+1 is predicted from the state S_t at the current (point-in-time t), and the current observation value A_t.

However, the actual environment is not as simplistic as that expressed by Expression (6), and even if the same observation value is observed, different phenomena often occur (different states emerge). The following expression carries the internal state (context) accumulated to the next point-in-time to represent such phenomena, thereby defining the next state as being determined by this internal state and the current observation.

$$X\_t+1 = f(X\_t, A\_t)$$
$$S\_t+1 = g(X\_t, A\_t) \quad (7)$$

wherein X_t represents the internal state at point-in-time t. Also, f(X_t, A_t) is a predetermined function wherein the internal state X_t and observation value A_t are arguments, and g(X_t, A_t) is another predetermined function wherein the internal state X_t and observation value A_t are arguments.

According to Expression (7), the state S_t+1 at the point-in-time t+1 is predicted from the current internal state X_t and the current observation value A_t. further, the internal state is updated to the internal state X_t+1 at the point-in-time t+1 by the current internal state X_t and the current observation value A_t.

While the learning for performing the prediction in Expressions (6) and (7) (prediction learning) is learnt from experiencing pictures of states at points-in-time (observation values), a problem in learning is that large-scale learning is difficult. With normal neural network learning, learning is difficult if the number of dimensions of input becomes great, so even if an attempt is made to input the signals of all the sensors and actuators of a humanoid robot for example into a single network to perform overall optimal learning, this is practically impossible.

Now, understanding of how the human brain works regarding information processing has progressed relatively far with regard to the lower-tier visual functions. The lowest visual cortex, known as V1, receives signals from the retina. It is known that here, particular processing is preformed only regarding a local region of the visual sensor made up of a great number of pixels. Also, situated in V2, which receives the results of this processing, is a region and processing contents, for handling processing of several of the neurons in V1 at once. Thus, the human brain is configured so as perform information processing to batch together processing results of local sensor information as the hierarchical level becomes higher, so that the higher order levels, information over a wider spatial and temporal range can be handled. It is said that at the IT cortex, situated above the visual cortex, there exists a neuron (grandma cell) which determines from the information of the entire visual field whether or not a particular object is present.

Hawkins states in Jeff Hawkins, Sandra Blakeslee, "On Intelligence", Owl Books, 2004, that the cerebral neocortex is configured uniformly of a neuron group having a six-layer structure, not just the visual cortex. They further provide explanation of the workings of each of the layers in the six-layer structure from physiological insight regarding the connection of actual neurons, and state that not only are signals from the lower order to higher order important, but that connections within each layer and signals from higher order to lower order have extremely important functions.

Accordingly, in the following, a specific calculation model will be proposed regarding recognition and prediction learning, and action (recognition generation), drawing upon Hawkins' claim that a large-scale network can be ultimately configured by accumulating local information processing of differing modals as with the brain, rather than having an entire neural network perform learning for a large-scale prediction learning problem through overall optimization.

Figure 33:
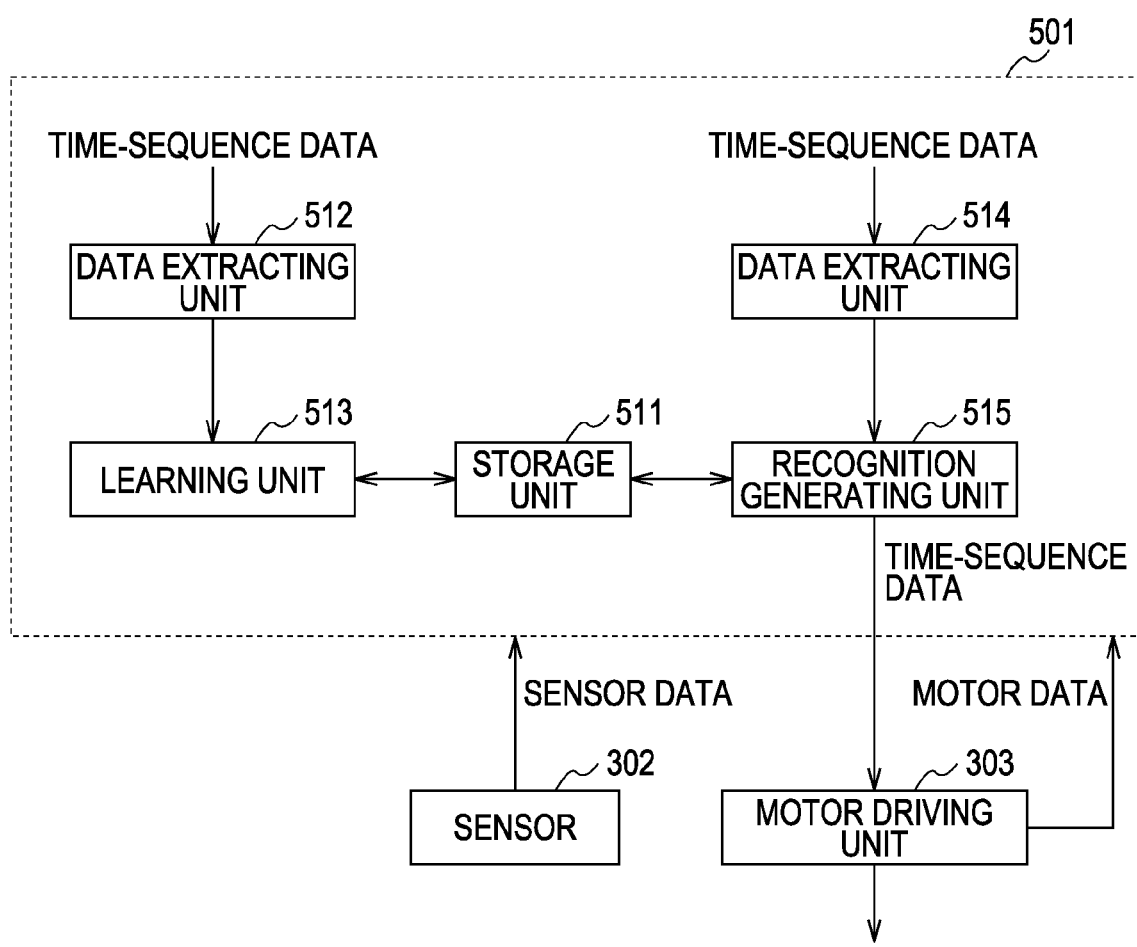
FIG. 33 is a block diagram illustrating a configuration example of a robot using a hierarchical SOM.

FIG. 33 illustrates a configuration example of a robot using a new SOM. Note that portions which correspond to parts of the robot shown in FIG. 25 are denoted with the same reference numerals, and description thereof will be omitted as appropriate in the following.

In FIG. 33, the data processing device 501 is configured of a storage unit 511, data extracting unit 512, learning unit 513, data extracting unit 514, and recognition generating unit 515.

The storage unit 511 stores a hierarchical SOM, wherein multiple new SOMs have been formed into a hierarchical structure.

Note that here, the hierarchical SOM is configured using the new SOM shown in FIG. 32, but a hierarchical SOM can be configured using the prediction SOM model shown in FIG. 31 for example, having an equivalent function as the new SOM.

The data extracting unit 512 is provided with time-sequence data such as sensor data output from the sensor 302 at each point-in-time (e.g., image data output from the sensor 302 serving as an image sensor), motor data output at the same point-in-time from the motor driving unit 303 (e.g., joint angle instruction values for instructing the angle of an arm joint), and so forth. The data extracting unit 512 classifies the time-sequence data supplied thereto into multiple types of time-sequence data, and supplies these to the learning unit 513.

That is to say, the data extracting unit 512 supplies the sensor data output from the sensor 302 as one type of time-sequence data to the learning unit 513, and also supplies the motor data output from the motor driving unit 303 as another one type of time-sequence data to the learning unit 513, for example.

Also, in the event that the motor data which the motor driving unit 303 outputs includes motor data for driving a left arm of the robot and motor data for driving the right arm, for example, the data extracting unit 512 can supply a vector time-sequence having motor data for driving the left arm and motor data for driving the right arm as components, as one type of time-sequence data to the learning unit 513, or can supply motor data for driving the left arm as one type of time-sequence data, and motor data for driving the right arm as another one type of time-sequence data, to the learning unit 513.

Note that what sorts of types of time-sequence data the sensor data output from the sensor 302 and motor data output from the motor driving unit 303 are to be classified into for supplying to the learning unit 513 by the data extracting unit 512, needs to be decided beforehand.

The learning unit 513 extracts time-sequence data in increments of frames from each of the multiple types of time-sequence data supplied from the data extracting unit 512, and uses the time-sequence data in increments of frames to perform learning of the hierarchical SOM stored in the storage unit 511.

That is to say, the learning unit 513 performs self-organizing learning of the new SOMs making up the hierarchical SOM, and prediction learning (weight learning).

The data extracting unit 514 has supplied thereto time-sequence data, such as the sensor data which the sensor 302 outputs at each point-in-time, and motor data output at the same point-in-time by the motor driving unit 303. The data extracting unit 514 classifies the multiple types of time-sequence data supplied thereto in the same way as with the data extracting unit 512, and supplies to the recognition generating unit 515.

The recognition generating unit 515 recognizes the time-sequence data regarding each of the multiple types of time-sequence data supplied from the data extracting unit 512, and performs recognition generating for generating future time-sequence data.

That is to say, the recognition generating unit 515 extracts time-sequence data in increments of frames from each of the multiple types of time-sequence data supplied from the data extracting unit 512, and recognizes (perceives) the time-sequence data in increments of frames using the hierarchical SOM stored in the storage unit 511. The recognition generating unit 515 then predicts, based on the recognition results of each of the multiple types of time-sequence data in increments of frames, time-sequence data of the next frame (hereinafter also referred to as "time-sequence data of next point-in-time" as appropriate) for example, serving as time-sequence data of a frame further in the future as compared with the point-in-time of the that time-sequence data in increments of frames, i.e., generates and outputs prediction values of time-sequence data of the next point-in-time.

Also, of the time-sequence data which the recognition generating unit 515 has generated, the motor data is supplied to the motor driving unit 303.

Description will now be made regarding processing which the learning unit 513 performs (learning processing) and processing which the recognition generating unit 515 performs (prediction of time-sequence data at the next frame (point-in-time) thereof (recognition generating processing))

Chapter 1: Overview

FIG. 34 shows a conceptual diagram of a hierarchical SOM. In this example, there is one type of input (image sensor) and one type of output (joint angle instruction value). Self-organizing is performed regarding classification of the signals, by new SOMs which differ one from another. The signals are time-sequence signals, so the node which fires (winning node) changes at each point-in-time. Each new SOM performs prediction learning regarding which node will fire at the next point-in-time. The higher-order new SOM performs learning of the new SOM with the firing position (winning node position) of these two new SOMS as the input thereof. Thus, the combinations of how the lower-order nodes fire can be stored and classified. The higher-order performs prediction learning of the next point-in-time as well, in the same way.

When executing (at the time of recognition generating processing), prediction is performed at the lower-order layer regarding the next signal based on the input/output signals. At the upper layer, the next prediction is performed with the classification of these signals, estimating (predicting) the lower-layer signals at the next point-in-time from the classification thereof. By making comprehensive determination regarding the estimations made at the upper level and lower level, information propagation is carried out between the lower-order layers which are not directly connected.

Repeating such information transmission among the three parties enables this hierarchical stricture to be horizontally expanded, and larger-scale information processing to be realized with combinations of local information processing.

FIG. 34 schematically illustrates a hierarchical SOM. The hierarchical SOM has multiple new SOMs, and the multiple new SOMs are connected so as to configure a hierarchical structure. In the following description, new SOMs will be referred to simply as SOMs, as appropriate.

In FIG. 34, the hierarchical SOM has three SOMs, i.e., SOMs #11, SOM #12, and SOM #21. SOMs #11 and #12 are lowest-order hierarchical level SOMs, and SOM #21 is a higher-order hierarchical level SOM, with the SOM #11, SOM #12, and SOM #21 being connected so as to configure a hierarchical structure.

At the time of learning of the hierarchical SOM, i.e., at the time of the learning unit 513 (FIG. 33) learning the hierarchical SOM, time-sequence data which is the object of learning is input to the lowest-order level SOMs #11 and #12.

That is to say, in the event that the time-sequence data to be learnt is sensor data output from the sensor 302 and motor data output from the motor driving unit 303 as shown in FIG. 33 for example, the sensor data is input to one of the two lowest-order level SOMs #11 and #12, SOM #11 for example, and motor data is input to the other SOM #12.

At the SOM #11, the sensor data input thereto is used to perform self-organizing learning. Further, prediction learning for updating weight is performed at the SOM #11.

That is to say, at the SOM #11, time-sequence data is extracted from the time-sequence sensor data in increments of frames, and self-organizing learning is performed using the time-sequence data in increments of frames. Winning nodes are determined in time-sequence by this self-organizing learning using time-sequence data in increments of frames.

Then at the SOM #11, prediction learning is performed so as to update the weight between the winning node at each point-in-time (frame) determined by the self-organizing learning, and the winning node of the next point-in-time.

Further, at the SOM #11, a time-sequence of node information representing the winning node determined in time-sequence in the self-organizing learning is input to the higher-order SOM which is the SOM of the higher hierarchical level that is connected to the SOM #11, i.e., in the example shown in FIG. 34, input to the SOM #21.

Now, the time-sequence data which serves as input to a SOM will be referred to as "SOM input data" as appropriate, and time-sequence data output (generated) from a SOM will be likewise referred to as "SOM output data".

At the SOM #12 also, learning is performed using the SOM input data input thereto, as with the case of the SOM #11.

That is to say, at the SOM #12, self-organizing learning is performed using the motor data input thereto, and also prediction learning for updating the weight between the winning node at each point-in-time that has been determined by this self-organizing learning, and the winning node at the next point-in-time, such that the weight is strengthened.

Further, at the SOM #12, a time-sequence of node information representing the winning node determined in time-sequence in the self-organizing learning is input to the higher-order SOM which is the SOM of the higher hierarchical level that is connected to the SOM #12, i.e., in the example shown in FIG. 34, input to the SOM #21.

At the SOM #21, which is the higher-order SOM to which the lower-order hierarchical level SOMs are connected, learning is performed using a time-sequence obtained by integrating node information obtained at the lower-order SOMs, which are SOMs at the hierarchical level below the SOM #21.

That is to say, in FIG. 34, two SOMs #11 and #12 are connected to the SOM #21 as lower-order SOMs, and as described above, the time-sequence of node information representing the winning nodes determined in time-sequence in the self-organizing learning at each of the SOMs #11 and #12 is taken as input to the SOM #21.

At the SOM #21, the node information obtained from each of the SOMs #11 and #12, which are lower-order SOMs, is integrated, and the time-sequence of node information following integration thereof is used as SOM input data, whereupon learning is performed.

That is to say, at the SOM #21, the time-sequence obtained by integrating the node information obtained from each of the SOMs #11 and #12 is used as SOM input data whereby self-organizing learning is performed, and prediction learning is performed so as to update the weight between the winning node at each point-in-time determined by the self-organizing learning and the winning node at the next point-in-time, such that the weight is strengthened.

As described above, the time-sequence obtained by integrating the node information obtained from each of the SOMs #11 and #12 is used at the SOM #21 which is the higher-order SOM, as SOM input data to perform self-organizing learning and prediction learning, thereby storing the combination of nodes firing at the SOMs #11 and #12 which are lower-order SOMs, i.e., the combination of the node which is the winning node at the SOM #11 and the node which is the winning node at the SOM #12.

Next, at the time of recognition generating at the hierarchical SOM, i.e., at the time of the recognition generating unit 515 performing recognition generating using the hierarchical SOM, time-sequence data which is the object of recognition is input to the lowest-order hierarchical level SOMs #11 and #12.

That is to say, if we say that the time-sequence data to be recognized is the sensor data output from the sensor 302 and the motor data output from the motor driving unit 303 in FIG. 33 for example, sensor data is input to the SOM #11 and motor data is input to the SOM #12 in the same way as with the time of learning.

At the SOM #11, recognition processing for recognizing the sensor data input thereto is performed. That is to say, at the SOM #11, time-sequence data is extracted from the time-sequence sensor data in increments of frames, and the nodes to fire with regard to the time-sequence data in increments of frames, i.e., the winning nodes, are determined in time-sequence.

Further, at the SOM #11, the time-sequence of node information representing the winning nodes as to the time-sequence data in increments of frames is taken as input of the SOM #21 which is the higher-order SOM connected to the SOM #11.

At the SOM #12, as well, recognition processing for recognizing the motor data input thereto, which is SOM input data, is performed in the same way as with the SOM #11.

That is to say, time-sequence data in increments of frames is extracted from the time-sequence motor data at the SOM #12, and the nodes to fire with regard to the time-sequence data in increments of frames, i.e., the winning nodes, are determined in time-sequence.

Further, at the SOM #12, the time-sequence of node information representing the winning nodes as to the time-sequence data in increments of frames is taken as input of the SOM #21 which is the higher-order SOM connected to the SOM #12.

At the SOM #21 which is the higher-order SOM connected to the lower-order hierarchical level SOMs, the time-sequence obtained by integrating the node information obtained from the lower-order SOMs, which are SOMs at the lower-order hierarchical level, is used as SOM input data to perform recognition processing.

That is to say, in FIG. 34, the two SOMs #11 and #12 are connected to the #21 as the lower-order SOMs thereof, and as described above, at the SOMs #11 and #12, time-sequences of node information representing the winning node determined in time-sequence are taken as input to the SOM #21.

At the SOM #21, the node information obtained from each of the SOMs #11 and #12, which are lower-order SOMs, is integrated, and the time-sequence of node information following integration thereof is used as SOM input data, whereupon recognition processing is performed.

Specifically, at the SOM #21, time-sequence data in increments of frames is extracted from the SOM input data which is a time-sequence obtained by integrating the node information obtained from each of the SOMs #11 and #12, and the winning nodes which are nodes to fire with regard to the time-sequence data in increments of frames are determined in time-sequence.

At the SOM #21, prediction processing is performed for predicting a node which is predicted to be the winning node at the next point-in-time, as to the winning node regarding the time-sequence data in increments of frames, and the results of prediction from the prediction processing are provided to the lower-order SOMs #11 and #12.

At the lower-order SOMs #11 and #12, which are lower order from the SOM #21, prediction processing is performed for predicting nodes to be predicted to be the winning node at the next point-in-time (hereinafter also referred to as "prediction node" as appropriate), as to the winning node regarding the time-sequence data in increments of frames, based on the results of prediction from the SOM #21 which is the higher-order SOM.

That is to say, at the SOM #11, a prediction node which is predicted to be the winning node at the next point-in-time in the time-sequence data at a certain point-in-time (frame) when the winning node was determined is obtained, based on the weight of the winning node as to the time-sequence data at the certain point-in-time, and the results of prediction from the SOM #21 which is the higher-order SOM. At the SOM #11, the prediction node is used as the generating node to generate and output time-sequence data serving as the sensor data at the next point-in-time.

At the SOM #12 also, a prediction node which is predicted to be the winning node at the next point-in-time in the time-sequence data at a certain point-in-time when the winning node was determined is obtained, based on the weight of the winning node as to the time-sequence data at the certain point-in-time, and the results of prediction from the SOM #21 which is the higher-order SOM. At the SOM #12, the prediction node is used as the generating node to generate and output time-sequence data serving as the motor data at the next point-in-time.

As described above, in a hierarchical SOM, lower-order SOMs perform recognition of SOM input data, and output node information representing the winning nodes as a result of the recognition thereat to the higher-order node. At the higher-order SOM, the time-sequence data obtained by integrating the node information from the lower-order SOMs is taken as SOM input data, and recognition is performed of the SOM input data. This is sequentially performed from the lower-order hierarchical level SOM toward the higher-order hierarchical level SOM.

Also, at each SOM of the hierarchical SOM, prediction processing is performed based on the weight of the winning node and the prediction results from the prediction processing at the higher-order SOM, and prediction results from the prediction processing are provided (returned) to the lower order SOMs. This is sequentially performed from the higher-order hierarchical level SOM toward the lower-order hierarchical level SOM.

Accordingly, with a hierarchical SOM, multiple lower-order SOMS not directly connected, and consequently, time-sequence data which the multiple lower-order SOMS have each learned, can be correlated, such that, for example, multiple types of time-sequence data (multiple modals) such as sensor data and motor data, can be correlated.

Chapter 2: Settings for Principle Experiment

FIG. 35 illustrates the settings for an experiment for confirming the principle. As described in the overview, three new SOMs are used. Each new SOM is two-dimensional, having 9×9 nodes for a total of 81 nodes. Each node is provided with an HMM for learning input time-sequence signals. The time-sequence data is input at the lower-order new SOMs such that 40 steps (sample points) make up one window (frame), and the window is shifted every 10 steps while input is being performed (FIG. 36). Accordingly, input/output occurs every 10 steps. At the higher-order new SOM, 20 steps worth is input while shifting the window 5 steps at a time for lower-order output. Consequently, the higher-order new SOM is affected by 200 steps worth of the original time width (due to 10×20=200), with information over a long period of time being handled while decimating.

For input data, we use a set of two types of waves, sine waves and cosine waves. One is input to one of the lower-order new SOM, and the other is input to the other lower-order new SOM. Thought each individual new SOM can only predict and generate waveforms input to itself, the higher-order new SOM has learned the relation between the two signals, and accordingly, the one waveform signal can be recalled based on the other.

FIG. 35 schematically illustrates the hierarchical SOM which the Present Inventor has used for experimenting. A hierarchical SOM #E used for the experiment has the same configuration as the hierarchical SOM shown in FIG. 34, the hierarchical SOM has three SOMs, i.e., SOMs #11, SOM #12, and SOM #21. SOMs #11 and #12 are lowest-order SOMs, and SOM #21 is a higher-order SOM, with the SOM #11, SOM #12, and SOM #21 being connected so as to configure a hierarchical structure.

Each of the three SOMs #11, #12, and #21 making up the hierarchical SOM #E have a 9×9 nodes for a total of 81 nodes. With a two-dimensional array structure as shown in FIG. 8. Also, the nodes have HMMs of 20 states, as the time-sequence pattern storage models 21 (FIG. 7).

At the time of learning and recognition generating, a window with a predetermined window duration (time length) is shifted by a predetermined shift amount at a time as to the SOM input data which is time-sequence data, as shown in FIG. 36, thereby extracting and using SOM input data in increments of frames, wherein the predetermined window duration is a frame duration of one frame.

That is to say, FIG. 36 illustrates an extracting method for extracting SOM input data in increments of frames from time-sequence data.

Hereinafter, time-sequence data provided to the hierarchical SOM, e.g., the sensor data or motor data supplied from the data extracting unit 512 to the learning unit 513 shown in FIG. 33 for example, and further sensor data and motor data supplied from the data extracting unit 514 to the recognition generating unit 515, will also called "input time-sequence data" as appropriate.

Also hereinafter, time-sequence data output from the hierarchical SOM, that is to say, future time-sequence data which the recognition generating unit 515 outputs (predicts) as to the input time-sequence data supplied from the data extracting unit 514 to the recognition generating unit 515, will also called "prediction time-sequence data" as appropriate.

At the time of learning and recognition generating, at the lowest-order hierarchical level SOMs #11 and #12, a window having a window length of 40 samples (steps) for example, is applied to the SOM input data which is also the time-sequence data while shifting every 10 samples, thereby extracting SOM input data in increments of frames 40 samples in duration. This was used for learning and recognition generating.

Accordingly, at the SOMs #11 and #12, node information representing winning nodes is obtained every 10 samples, which is the shift amount, and input to the higher-order SOM.

Also, at the SOM #21 which is the higher-order SOM, an integrated time-sequence obtained by integrating the node information from the lower-order SOMs #11 and #12 is subjected to a window having 20 samples as the window duration for example, shifting 5 samples at a time, thereby extracting SOM input data in increments of frames 20 samples in frame duration. This was used for learning and recognition generating.

Now, the time-sequence of node information serving as the SOM input data input to the SOM #21 which is the higher-order SOM is time-sequence data in 20-sample increments, but each sample of the SOM input data of the 20 samples input to the SOM #21 is data obtained for each 10-sample shift amount at the lower-order SOMs #11 and #12, so the 20 samples of SOM input data input to the SOM #21 is equivalent to 200 samples of the input time-sequence data (due to 10×20=200).

Accordingly, at the higher-order SOM, decimating the time-sequence data allows time-sequence data which is of a longer amount of time that that of the lower-order SOM to be handled.

That is to say, SOM input data in increments of frames is input time-sequence data of a longer amount of time, the higher the higher-order SOM using the SOM input data is.

Note that with the experiment, two types of sine waves, sine wave #A and sine wave #B, and two types of cosine waves, cosine wave #A and cosine wave #B, were prepared. With the sine wave #A and cosine wave #A as a set of time-sequence data, one of the time-sequence data was provided to one SOM of the lowest-order SOMs #11 and #12, and the other of the time-sequence data was provided to the other SOM.

Also, with the sine wave #B and cosine wave #B as a set of time-sequence data, one of the time-sequence data was provided to one SOM of the lowest-order hierarchical level SOMs #11 and #12 as time-sequence data, and the other of the time-sequence data was provided to the other SOM as time-sequence data.

When learning, SOM input data of 40 samples per frame was repeatedly provided to the two lowest-order SOMs #11 and #12, and SOM input data of 20 samples per frame was repeatedly provided to the highest-order SOM #21. Counting providing one frame of SOM input data to a SOM as one time of learning, learning was performed 10,000 times.

Following learning, the lowest-order hierarchical level SOMs #11 and #12 individually can only obtain time-sequence data (more particularly, the prediction values thereof) for the next point-in-time from the time-sequence data input to itself.

That is to say, if time-sequence data is input to one of the SOMs #11 and #12, SOM #11 for example, time-sequence data of time-sequence patterns which the nodes of the SOM #11 have acquired is all that is generated from the SOM input data input to the SOM #11 at the time of learning, and no time-sequence data is generated at the other SOM #12 thereby.

In the same way, if time-sequence data is input to the other SOM #12, time-sequence data of time-sequence patterns which the nodes of the SOM #12 have acquired is all that is generated from the SOM input data input to the SOM #12 at the time of learning, and no time-sequence data is generated at the other SOM #11 thereby.

Conversely, with the hierarchical SOM #E which has the three SOMs #11, #12, and #21, the SOM #21 which is the higher-order SOM learns the relation between the time-sequence data input to the SOM #11 and the time-sequence data input to the SOM #12 at the time of learning, so upon SOM input data being input to one of the SOMs #11 and #12, SOM #11 for example, not only is the time-sequence data of the time-sequence pattern which the nodes of the SOM #11 have acquired generated at the SOM #11, but also, by way of the higher-order SOM #21, time-sequence data of the time-sequence pattern which the nodes of the SOM #11 have acquired is generated at the SOM #12.

That is to say, with the hierarchical SOM #E, from time-sequence data of a time-sequence pattern acquired by SOM nodes of one of the SOMs #11 and #12, the time-sequence data of a time-sequence pattern acquired by nodes of the other SOM can be recalled via the SOM #21, which is the higher-order SOM.

Chapter 3: Learning of Hierarchical SOM (Self-Organizing Learning of SOM)

There are two types of learning of a hierarchical SOM; self-organizing learning of each new SOM making up the hierarchical SOM, and prediction learning.

In a cause of using SOMs having weight vectors of a predetermined dimension as the nodes of the new SOMs making up the hierarchical SOM, as with known SOMs, rather than the time-sequence pattern models 21 (FIG. 7), the self-organizing learning thereof is the same as with known SOM learning (self-organizing learning).

Now, a known SOM learning method is described in "Self-Organization Map" by Teuvo Kohonen, published by Springer Japan, as mentioned earlier.

On the other hand, self-organizing learning using a time-sequence pattern storage network having HMMs for example, as time-sequence pattern models 21 for the nodes, as the new SOMs making up the hierarchical SOM, is performed as described earlier with reference to FIG. 15.

Note that self-organizing learning using a time-sequence pattern storage network having HMMs as time-sequence pattern models 21 is described in, for example, Katsuki Minamino, Kazumi Aoyama, and Hideki Shimomura, "Voice Imitation Based on Self-Organizing Maps with HMMS", The International Workshop on Intelligence Dynamics at Humanoids 2005.

Chapter 4: Prediction Learning (Connect Hebb Learning)

Figure 43:
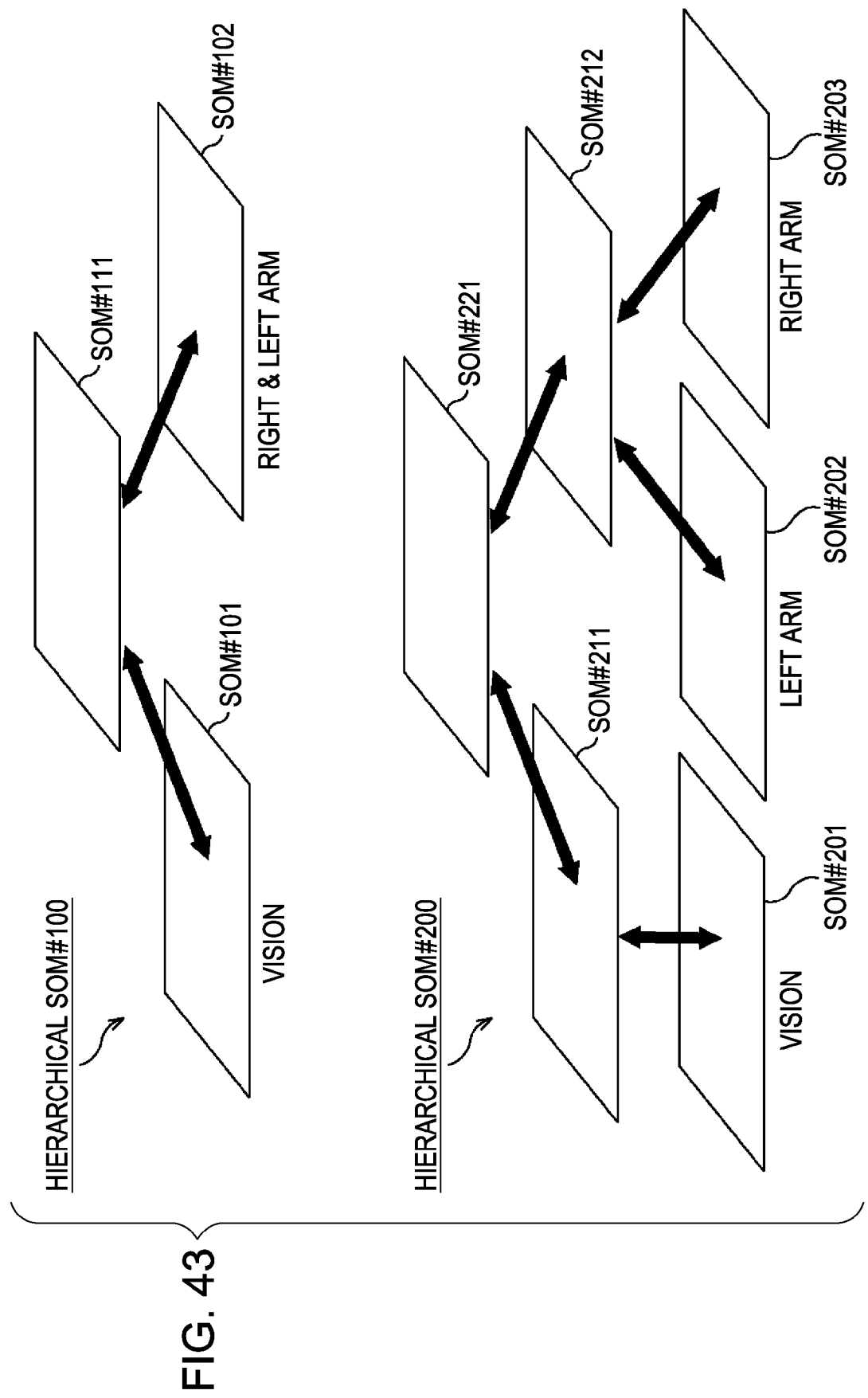
FIG. 43 is a diagram schematically illustrating a hierarchical SOM.

With prediction learning, weight is updated so as to strengthen the degree of jointing from the winning node of the new SOM as to SOM input data at a certain point-in-time (frame) to a winning node of a new SOM corresponding to SOM input data at the next point-in-time, as described with FIG. 43.

That is to say, with prediction learning, the weight between the nodes of the new SOMs is learnt by Hebb's rule, around the winning node of the new SOM as to the SOM input data at the certain point-in-time, and the winning node of the new SOM as to the SOM input data at the next point-in-time.

Learning (updating) weight under Hebb's rule is as described above with Expressions (4) and (6).

Now, let us say that a new SOM has N nodes, and of the N nodes of the new SOM, with the weight from a node #i to a node #j being expressed as $w_{ij}$. The weight $w_{ij}$ represents the probability that the node #j will be the winning node at the next point-in-time after the point-in-time at which the node #i has become the winning node.

Now, if we say that the winning node of the new SOM as to SOM input data at a certain point-in-time is expressed as #i, and the winning node of the new SOM as to SOM input data at the next point-in-time is expressed as #J, updating of the weight $w_{ij}$ for prediction learning is performed according to Expression (8).

$$w_{i,J}=(1-\beta)w_{i,J}+\beta\Delta w$$

$$w_{I,j}=(1-\beta)w_{I,j}+\beta\Delta w \qquad (8)$$

This Expression (8) is the same expression as the above-described Expression (4), and accordingly, $\beta$ in Expression (8) represents the learning rate, the same as with Expression (4). The greater the learning rate $\beta$ is, the faster the weight $w_{ij}$ approaches the reference value $\Delta w$.

Further, in Expression (8), the reference value $\Delta w$ is provided by

1/((inter-pattern distance between winning node #i(#J) and node #i(#j) on the new SOMs)+1), the value of reference value $\Delta w$ being within the range of 0.0 to 1.0.

Also, in Expression (8), i and j both assume integer values between 1 and N, N being the number of nodes of the new SOM. Accordingly, with the two equations in Expression (8), the weights $w_{1,J}, w_{2,J}, \ldots, w_{i,J}, \ldots, w_{N,J}$, are updated by the first equation, and the weights $w_{I,1}, w_{I,2}, \ldots, w_{I,j}, \ldots, w_{I,N}$, are updated by the second equation. Note however, that the updating weight $w_{I,J}$ is updated only by one of the two equations in Expression (8).

Self-organizing learning and prediction learning as learning for a hierarchical SOM as described above is performed at the learning unit 513 shown in FIG. 33.

FIG. 37 illustrates learning procedures for learning of the new SOMs at the lowest hierarchical level, of the new SOMs making up the hierarchical SOM.

Note that with the robot shown in FIG. 33, the data extracting unit 512 supplies to the learning unit 513 multiple types of time-sequence data, such as sensor data output from the sensor 302, and motor data output from the motor unit 303, for example, and the learning unit 513 uses the multiple types of time-sequence data (input time-sequence data) supplied from the data extracting unit 512, to perform hierarchical SOM learning. In the following, description will be made regarding learning at the new SOMs at the lowest-order hierarchical level of the hierarchical SOM, wherein input time-sequence data of multiple types, such as sensor data output from the sensor 302, and motor data output from the motor unit 303, for example, that have been synchronized with regard to point-in-time, are provided beforehand, and the learning is performed using the multiple steps of input time-sequence data.

Now, an example of the multiple types of input time-sequence data that are synchronized with regard to point-in-time is as follows. In the case of the robot shown in FIG. 33 learning a task of rolling a ball in front of itself to the left and right, and the operator places the ball in front of the robot and holds and moves the arm of the robot so as to roll the ball to the left and right, the sensor data of the time-sequence corresponding to the state of the ball rolling to the left and right, and the motor data corresponding to the motion of the arm which the operator is moving, generated by the motor driving unit 303, make up an example of the multiple types of input time-sequence data that are synchronized with regard to point-in-time.

We will say that the number of the SOMs at the lowest-order hierarchical level of the hierarchical SOM is the same as the number of types of input time-sequence data provided beforehand.

In step S501, the learning unit 513 selects, from the multiple types of input time-sequence data provided beforehand, one type of input time-sequence data which has not been used yet for learning, as time-sequence data of interest, and also selects, from the new SOMs at the lowest-order hierarchical level of the hierarchical SOM, a new SOM regarding which learning has not yet been performed, as a SOM of interest, and stores in the storage unit 511.

Subsequently, the learning unit 513 sets a window of a window duration for the lowest-order hierarchical level at the head of the time-sequence data of interest, the flow proceeds to step S502, and the time-sequence data within the window, i.e., the time-sequence data of a time duration (frame duration) equal to the window duration for the lowest-order hierarchical level, is extracted as SOM input data of the frame of interest.

The learning unit 513 then advances the flow from step S502 to step S503 and S504 in order, and uses the SOM input data of the frame of interest to perform self-organizing learning of the SOM of interest.

That is to say, in step S503, the learning unit 513 obtains the winning node of the SOM of interest as to the SOM input data of the frame of interest, in the same way as with step S3 and S4 in FIG. 15, for example.

Specifically, in the event that each node of the SOM of interest has an HMM for example, in step S503 the node having the HMM with the highest observation likelihood of the SOM input data of the frame of interest being observed is obtained as the winning node.

Note that data sequences can be generated at each node of arrangements within the scope of SOMs, such as time-sequence pattern storage networks including new SOMs, known SOMs (SOMs with weight vectors assigned to the nodes), etc., (hereinafter referred to as "SOM in the broad sense" as appropriate).

For example, with known SOMs, components of weight vectors assigned to nodes can be generated (output) as data sequences. Also, with time-sequence pattern storage networks for example, time-sequence data of time-sequence patterns held by the nodes can be generated, as described with reference to FIG. 19 for example.

Moreover, we will refer to a data sequence which each node in a SOM in the broad sense generates as a "prototype". With this understanding, in step S503, processing can be performed wherein the error between the prototype of each node in the SOM of interest and the SOM input data of the frame of interest is obtained, and the node with the smallest error is obtained as the winning node.

In step S503, the learning unit 513 obtains the winning node of the SOM of interest as to the SOM input data as to the frame of interest, then proceeds to step S504, and performs SOM learning for updating the nodes of the SOM of interest (more particularly, the time-sequence pattern of the HMM thereof) using the SOM input data of the frame of interest, around the winning node obtained in step S503.

That is to say, in step S504, the learning unit 513 determines the updating weight $\alpha$ of each node making up the SOM of interest, with the winning node obtained in step S503 as the winning node according to Expression (3), as described with steps S5 through S7 in FIG. 15. further, the learning unit 513 updates the learning data stored in the learning data storage unit 22 (FIG. 22) of each node of the SOM of interest, according to the updating weight $\alpha$ of that node, and performs learning of the HMMs serving as time-sequence pattern models 21 for each of the nodes of the SOM of interest, using the new learning data stored in the learning storage unit 22 following learning, thereby updating the HMMs.

Thus, in step S504, SOM learning for updating the nodes of the SOM of interest is performed such that the closer the inter-pattern distance is to the winning node, the greater the influence of the SOM input data of the frame of interest is.

Now, in stricter terms, self-organizing learning includes, in addition to the processing in steps S503 and S504, the processing in step S506, to be described later.

Subsequently, the flow proceeds from step S504 to step S505, where the learning unit 513 performs prediction learning of the SOM of interest, and the flow proceeds to step S506.

That is, if we say that the winning node of the SOM of interest as to SOM input data of the frame of interest is expressed as #J, and the winning node of the SOM of interest at the next point-in-time, i.e., as to the SOM input data of the frame immediately prior to the frame of interest is expressed as #i, prediction learning for updating the weight $w_{ij}$ between the nodes #i and #j of the SOM of interest (weight w from the node #i as to the node #j) is performed according to Expression (8) in step S505.

In step S506, the learning unit 513 updates a reduction coefficient $\Delta$ used for obtaining the updating weight $\alpha$ in the Expression (3), in accordance with the number of times of learning which is the number of times that the self-organizing learning has been performed in steps S503 and S504 and the prediction learning has been performed in step S505, with regard to the SOM of interest.

That is to say, as described above, updating of the nodes (more particularly, HMMs serving as the time-sequence pattern models 21 thereof) is initially performed such that a relatively wide range of nodes around the winning node (from nodes with a small inter-pattern distance d as to the winning node, to those with a greater inter-pattern distance d to a certain degree) are affected by the SOM input data of the frame of interest, but as learning progresses, the range of nodes which are affected by the SOM input data of the frame of interest is gradually reduced, and it is to this end that the attenuation coefficient $\Delta$ is updated by the learning unit 513 such that the attenuation coefficient $\Delta$ is reduced as the number of times of learning increases, as described with Expression (3).

In step S506, the learning unit 513 updates the attenuation coefficient $\Delta$ in Expression (3), and then proceeds to step S507, where determination is made regarding whether or not the number of times of learning of the SOM of interest has reached a predetermined number of times, 10,000 for example.

In the event that determination is made in step S507 that the number of times of learning of the SOM of interest has not reached the predetermined number of times, the learning unit 513 increments the number of times of learning by 1, and the flow proceeds to step S508.

In step S508, the learning unit 513 shifts the window set in the time-sequence data of interest by the shifting amount for the lowest-order hierarchical level (shifts forward in the temporal axis direction). Further, in step S508, the learning unit 513 newly extracts the time-sequence data within the shifted window as the SOM input data of the frame of interest, the flow returns to step S503, and the same processing is subsequently repeated.

Also, in the event that determination is made in step S507 that the number of times of learning of the SOM of interest has reached the predetermined number of times, the learning unit 513 skips S508 to proceed to step S509, where the number of times of learning is reset to zero, for example.

Further, in step S509, the learning unit 513 newly selects, from the multiple types of input time-sequence data provided beforehand, one type of input time-sequence data which has not been used yet for learning, as time-sequence data of interest, and also newly selects, from the new SOMs at the lowest-order hierarchical level of the hierarchical SOM, a new SOM regarding which learning has not yet been performed, as a SOM of interest. The flow then returns to step S502, and the same processing is subsequently repeated.

At the point that all of the multiple types of input time-sequence data provided beforehand have been selected as the time-sequence data of interest, all of the new SOMs at the lowest-order hierarchical level of the hierarchical SOM stored in the storage unit 511 have been selected as the SOM of interest, and all learning of the new SOMs at the lowest-order hierarchical level of the hierarchical SOM stored in the storage unit 511 has ended, the learning unit 513 ends the processing thereof.

Note that while FIG. 37 shows SOM input data in increments of frames having the window duration being extracted from the time-sequence data of interest in temporal order, learning of the SOMs at the lowest-order hierarchical level can be performed without extracting SOM input data in increments of frames in such temporal order.

That is to say, learning of the SOMs at the lowest-order hierarchical level of the hierarchical SOM can be performed by extracting SOM input data in increments of frames beforehand for example, or extracting SOM input data in increments of frames with an arbitrary point-in-time as the head of the window, and selecting SOM input data of the frame of interest from that SOM input data in increments of frames, i.e., performing batch processing.

It should be noted however, that of the learning of the SOMs at the lowest-order hierarchical level of the hierarchical SOM, prediction learning cannot be performed unless the winning node of the SOM for each SOM input data in continuous points-in-time (frames) has been determined, so in cases of performing learning of the SOMs at the lowest-order hierarchical level of the hierarchical SOM by batch processing there is the need to perform processing as follows. That is, for example, either the winning nodes of the SOMs obtained with regard to the SOM input data of each point-in-time are stored during self-organizing learning, and following ending of the self-organizing learning, prediction learning is performed using the winning nodes stored during the self-organizing learning, or, following the self-organizing learning, the winning nodes of the SOMs corresponding to each of the SOM input data at continuous points-in-time are obtained again, and the winning nodes are used to perform prediction learning.

Figure 38A:
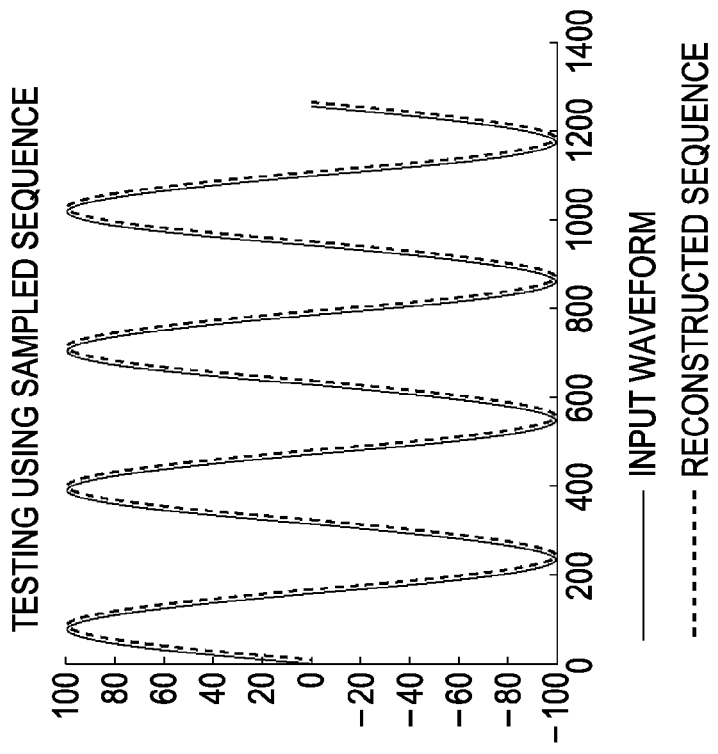
FIGS. 38A and 38B are diagrams illustrating an example of the results of self-organizing learning of a new SOM.
Figure 38B:
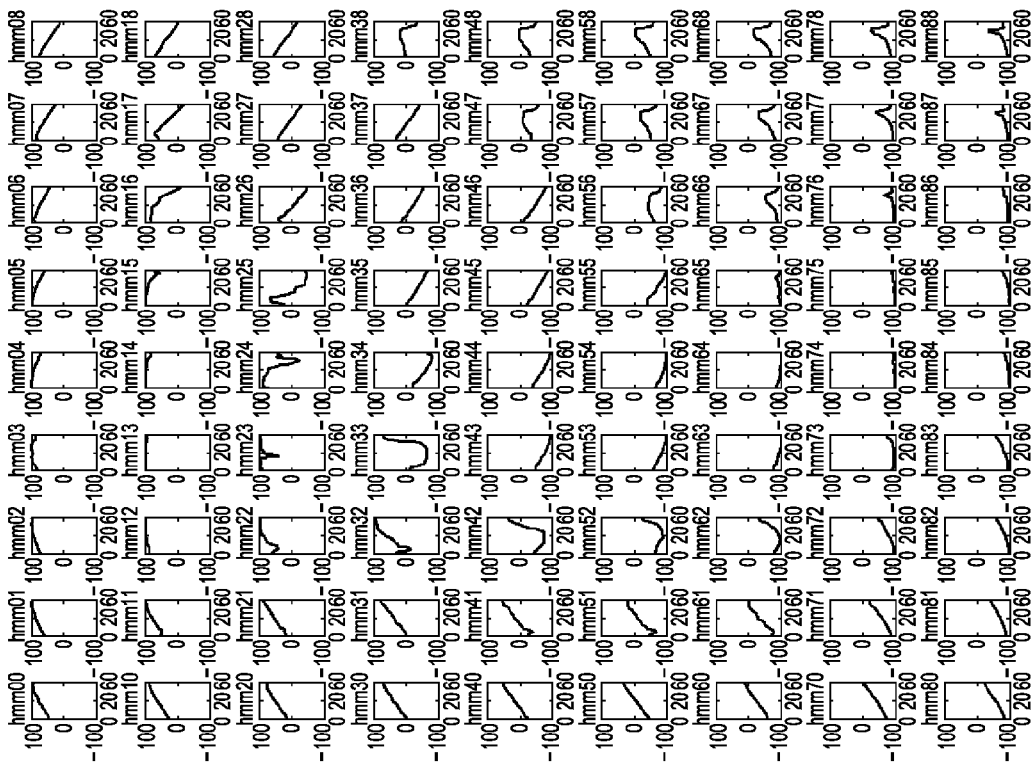

FIGS. 38A and 38B illustrate the results of self-organizing learning with a new SOM having 9×9 nodes, performed using a simple sine waveform as the SOM input data.

FIG. 38B illustrates the time-sequence patterns which the 9×9 nodes of the new SOM following self-organizing learning have.

It can be seen from FIG. 38B that SOM learning has been performed such that each node represents a partial region of the sine wave (expresses a waveform pattern (time-sequence pattern) of a partial region).

FIG. 38A illustrates the sine wave serving as the time-sequence data (the solid line) provided to the new SOM following self-organizing learning shown in FIG. 38B, and the time-sequence data obtained by connecting the prototypes generated from the winning nodes corresponding to the sine wave (the dotted line).

Providing the new SOM following self-organizing learning shown in FIG. 38B with the SOM input data serving as time-sequence data in increments of frames extracted from the sine wave drawn with a solid line in FIG. 38A causes the node to be the winning node to make sequential transition, and connecting the prototypes of the nodes which have become the winning node yields time-sequence data the same as the sine wave provided to the new SOM, as shown with the dotted line in FIG. 38A.

Next, FIG. 39 illustrates the learning procedures for learning with a higher-order SOM which is of a higher hierarchical level that then lowest-order hierarchical level, of the new SOMs making up the hierarchical SOM, that is performed with the learning unit 513 shown in FIG. 33.

Now, with the robot shown in FIG. 33, the learning unit 513 is supplied with time-sequence data of multiple types, such as sensor data output from the sensor 302, and motor data output from the motor driving unit 303, for example, and the learning unit 513 performs hierarchical SOM learning using the multiple types of time-sequence data (input time-sequence data) from the data extracting unit 512. Here, description will be made regard to hierarchical SOM learning wherein input time-sequence data of multiple types, such as sensor data output from the sensor 302, and motor data output from the motor unit 303, for example, that have been synchronized with regard to point-in-time, are provided beforehand, and the hierarchical SOM learning is performed using the time-sequence data of multiple types.

Also, to simplify description here, we will say that the SOM one hierarchical level above the lowest-order hierarchical level (the higher-order SOM thereof) is the SOM of interest, and that all of the lowest-order hierarchical level SOMs are connected to the SOM of interest.

In step S521, the learning unit 513 uses the multiple types of input time-sequence data provided beforehand (training data), to perform self-organizing learning of the lowest-order hierarchical level SOM as described with FIG. 37.

Note that in the event that learning of the lowest-order hierarchical level SOM described in FIG. 37 has already ended, the processing of step S521 can be skipped.

Following the processing of step S521, the flow proceeds to step S522, where the learning unit 513 inputs, to each SOM at the lowest-order hierarchical level, the SOM input data in increments of frames extracted from the time-sequence data used for the self-organizing learning of that SOM, thereby obtaining the winning node.

Note that extracting of the SOM input data in increments of frames from the time-sequence data is performed by applying a window with the window duration for the lowest-order hierarchical level to the input time-sequence data, while performing shifting by the shifting amount for the lowest-order hierarchical level. In step S522, the winning node is obtained in time-sequence for each SOM input data extracted by shifting the window by the shifting amount, and accordingly, the time-sequence of node information representing the winning node is obtained for each SOM at the lowest-order hierarchical level.

As for node information representing the winning node, position data, or more particularly, position coordinates (x, y) representing the position on the SOM of the winning node, or the above-described node labels, or the like, for example, can be used. Here, position data (x, y) representing the position of the winning node on the SOM will be used as node information representing the winning node.

Also, in the following description, obtaining a winning node as to the SOM input data will be referred to as "recognition of SOM input data", or simply "recognition", as appropriate.

Upon obtaining of time-sequences of node information representing the winning nodes as to the SOMs of the lowest-order hierarchical level in step S522, the learning unit 513 advances the flow to step S523, integrates the time-sequences of the SOMs of the lowest-order hierarchical level, obtains integrated time-sequence data, and the flow proceeds to step S524.

Now, to simplify the description, let us say that there are two SOMs #11 and #12 as the SOMs of the lowest-order hierarchical level, as illustrated in FIGS. 34 and 35, for example. Also, let us express the time-sequence of node information of the SOM #11 as $a_1, a_2, a_3$, and so on, the time-sequence of node information of the SOM #12 as $b_1, b_2, b_3$, and so on, and vectors having as the components thereof the node information $a_i$ of the SOM #11 and the node information $b_i$ of the SOM #12 at the same point-in-time as $c_i = (a_i, b_i)^T$ (wherein the raised T indicates transposition) In this case, the integrated time-sequence data is $c_1, c_2, c_3$, and so on.

In step S524, the learning unit 513 performs self-organizing learning of the SOM of interest which is the higher-order SOM, using the integrated time-sequence data of $c_1, c_2, c_3$, and so on, obtained by integrating the time-sequences of the node information of the SOMs at the lowest-order hierarchical level, as the SOM input data, and the flow proceeds to step s525.

That is to say, the learning unit 513 extracts SOM input data in increments of frames having the window duration of the SOM of interest as the frame duration for one frame, from the integrated time-sequence data of $c_1, c_2, c_3$, and so on, by applying the window having the window duration for the hierarchical level of the SOM of interest to the integrated time-sequence data of $c_1, c_2, c_3$, and so on, and shifting by a shifting amount for that hierarchical level. The SOM input data in increments of frames is then used to perform self-organizing learning of the SOM of interest.

Note that extracting of the SOM input data in increments of frames to be used in the self-organizing learning in step S524, from the integrated time-sequence data of $c_1, c_2, c_3$, and so on, may be performed with a random point-in-time as the head thereof.

In step S525, the learning unit 513 performs prediction learning of the SOM of interest, and the processing ends.

That is to say, in step S525, prediction learning for updating the weight $w_{ij}$ between the node #i and node #j of the SOM of interest is performed according to Expression (8), so as to strengthen the weight from the winning node in the SOM of interest as to the SOM input data of the frames extracted from the integrated time-sequence data of $c_1, c_2, c_3$, and so on, as to the winning node of the SOM of interest as the SOM input data of the next frame.

Note that in the event that there is a higher-order SOM at the higher-order hierarchical level above the SOM of interest, to which the SOM of interest is connected, learning of this higher-order SOM is performed using the integrated time-sequence data obtained by integrating node information obtained from each of the lower-order SOMs, including the SOM of interest, of the lower-order hierarchical level one level below the hierarchical level of the higher-order SOM with which there is connection, as the SOM input data. This holds true for SOMs of further higher hierarchical levels, as well.

Chapter 5: Execution Method of Hierarchical SOM

Next, description will be made regarding the recognition generating processing performed by the recognition generating unit 515 shown in FIG. 33.

Figure 40A:
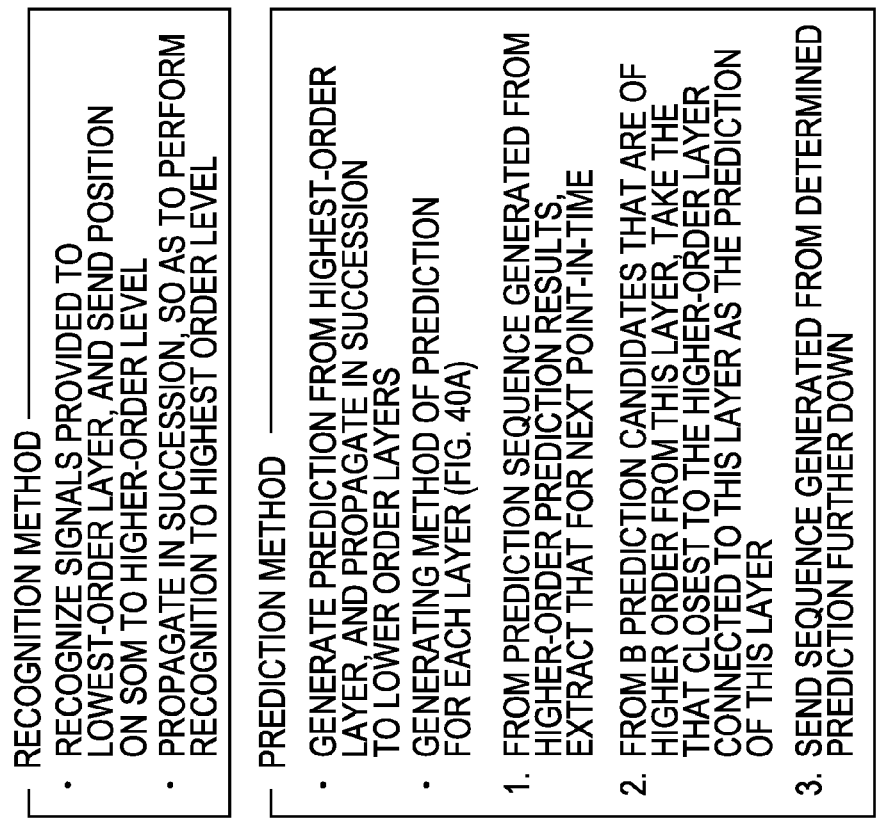
FIGS. 40A and 40B are diagrams for describing a hierarchical SOM which performs recognition generating processing.
Figure 40B:
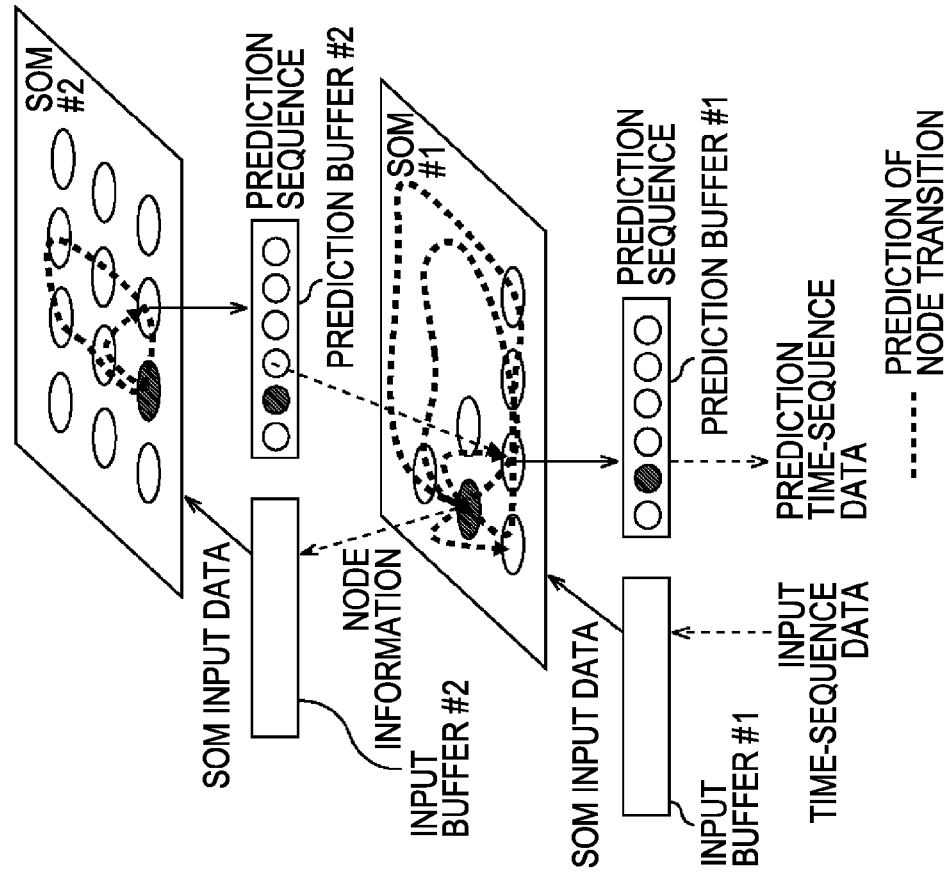

FIG. 40 schematically illustrates a hierarchical SOM.

Note that in FIG. 40, in order to simplify description, only two of the SOMs making up the hierarchical SOM, i.e., SOMs #1 and #2, are illustrated. SOM #1 is the lowest-order hierarchical level SOM, and SOM #2 is a SOM of the hierarchical level of higher order. SOMs #1 and #2 are connected.

The SOMs #i making up the hierarchical SOM shown in FIG. 40 have an input buffer #i and a prediction buffer #i. Note that the entity of the input buffer #i and prediction buffer #i is a storage region of a part of the storage unit 511 (FIG. 33).

Data, which is a part of the input to the SOM #i is supplied to the input buffer #i of the SOM #i, with the input buffer #i of the SOM #i storing the data supplied thereto. SOM input data is extracted in increments of frames from the data stored in the input buffer #i and supplied to the SOM #i.

In FIG. 40, input time-sequence data such as sensor data and motor data is supplied to and stored in the input buffer #1 of the SOM #1 which is the lowest-order hierarchical level SOM. The input time-sequence data stored in the input buffer #1 is taken as SOM input data in increments of frames by being subjected to the window as described above, and is supplied to the SOM #1 as input as to the SOM #1.

At the SOM #1, the SOM input data in increments of frames from the input buffer #1 is recognized, i.e., the winning node regarding the SOM input data is obtained, and the position data (x, y) representing the position of the winning node, serving as the node information representing the winning node, is supplied to the SOM of higher order that is connected to the SOM #1, i.e., in FIG. 40, to the input buffer #2 of the SOM #2.

In addition to the node information from the SOM #1, the input buffer #2 of the SOM #2 is also supplied with other lower-order SOMs connected to the SOM #2.

At the input buffer #2, node information from the SOM #1 and node information from other lower-order SOMs connected to the SOM #2 are stored in an integrated manner.

Each time that recognition of SOM input data (determination of a winning node) in increments of frames is performed, node information is supplied to the input buffer #2 from the SOM #1 and other lower-order SOMs connected to the SOM #2, so consequently, the input buffer #2 stores integrated time-sequence data obtained by integrating the time-sequence of node information from the SOM #1 and the time-sequence of node information from the other lower-order hierarchical level SOMs connected to the SOM #2.

The time-sequence data stored in the input buffer #2 is taken as SOM input data in increments of frames by being subjected to the window as described above, and is supplied to the SOM #2 as input as to the SOM #1.

At the SOM #2, the SOM input data in increments of frames from the input buffer #2 is recognized, i.e., the winning node regarding the SOM input data is obtained, in the same way as with SOM #1, and the same processing is subsequently performed.

Information obtained from the prediction node, obtained by the prediction processing for predicting a prediction node, which is a node of the SOM #i predicted to be the winning node regarding input SOM data at the next point-in-time from a certain point-in-time (frame), is supplied to the prediction buffer #i as SOM output data, and the prediction buffer #i stores the information supplied thereto.

Now, with regard to higher-order SOMs which are SOMs of higher-order hierarchical levels from the lowest-order hierarchical level of the hierarchical SOM, i.e., with regard to SOM #2 for example in FIG. 40, self-organizing learning is performed using integrated time-sequence data obtained by integrating the time-sequences of node information representing the winning nodes of the SOM #1 connected to the SOM #2, and each of the other lower-order SOMs of the lower hierarchical levels, so the nodes of the SOM #2 can generate, as prototypes, time-sequence data the same as with the integrated time-sequence data used for self-organizing learning (time-sequence data of time-sequence patterns obtained by the nodes in self-organizing learning), i.e., prediction values of a time-sequence predicting the integrated time-sequence data.

Accordingly, the prediction buffer #2 of the higher-order SOM #2 stores integrated time-sequence data, serving as prediction values of the time-sequence generated from the prediction nodes of the higher-order SOM #2. The integrated time-sequence data includes information predicting a time-sequence of node information representing the winning node of the lower-order SOM #1, i.e., information predicting the winning nodes of the SOM #1 in time-sequence.

Now, if we say that each individual node information in the time-sequence of node information representing the winning node of the lower-order SOM #1, included in the integrated time-sequence data stored in the prediction buffer #2 of the higher-order SOM #2, is prediction information of winning nodes, this means that at the prediction processing at the lower-order SOM #1, the prediction information of the winning node at the lower-order SOM #1 at the next point-in-time is extracted from the integrated time-sequence data stored in the prediction buffer #2 of the higher-order SOM #2, and a prediction node, which is a node of the lower-order SOM #1 regarding which prediction is made to become the winning node at the next point-in-time, is obtained using the above prediction information, i.e., information of the winning node at the lower-order SOM #1 predicted at the higher-order SOM #2, and the weight of the winning node of the lower-order SOM #1 at the current point-in-time.

At the lower-order SOM #1 as well, information obtained from the prediction node obtained by prediction processing is supplied to and stored in the prediction buffer #1, as with the case of the higher-order SOM #2.

With the SOM #1 which is the lowest-order hierarchical level SOM, self-organizing learning is performed using the time-sequence data such as input sensor data and motor data and the like, so at the nodes of the SOM #1, time-sequence data the same as the input time-sequence data used for self-organizing learning (time-sequence data of the time-sequence patterns which the nodes acquired in self-organizing learning) can be generated as prototypes, i.e., time-sequence prediction values predicting the time-sequence data can be generated.

Accordingly, input time-sequence data serving as the time-sequence prediction values generated from the prediction node of the SOM #1, i.e., prediction time-sequence data predicting the input time-sequence data supplied to the recognition generating unit 515 from the data extracting unit 514 shown in FIG. 33, is stored in the prediction buffer of the SOM #1.

Prediction time-sequence data stored in the prediction buffer #1 of the SOM #1, and in prediction buffers of other SOMs at the lowest-order hierarchical level, is output as output of the hierarchical SOM as suitable.

Next, FIG. 41 illustrates processing procedures (Algorithm 1) for recognition generating processing for recognizing time-sequence data for each of the multiple types of time-sequence data supplied from the data extracting unit 512, and generating future time-sequence data, which is performed by the recognition generating unit 515 in FIG. 33.

In step S541, the recognition generating unit 515 supplies, to the input buffer of a corresponding SOM of the lowest-order hierarchical level SOMs of the hierarchical SOM stored in the storage unit 511, sample values S(t) of each of the points-in-time t of the multiple types of input time-sequence data supplied from the data extracting unit 512, so as to be stored in that input buffer.

That is to say, if we take interest in one of the multiple steps of input time-sequence data as a type of interest, the recognition generating unit 515 supplies the sample value S(t) of the input time-sequence data of the type of interest to the input buffer of the lowest-order hierarchical level SOM which has performed learning using input time-sequence data of the type of interest.

Subsequently, the flow proceeds to step S542, where the recognition generating unit 515 selects, from SOMs in the hierarchical SOM which have not yet been taken as a SOM of interest, the SOM first discovered in the order from the lower-order hierarchical level toward the higher-order hierarchical level, takes this as the SOM of interest, and the flow proceeds to step s543.

In step S543, the recognition generating unit 515 determines whether or not the residue Mod(t, shift) obtained by dividing the point-in-time t by shift, which is the amount of shift, is zero, i.e., whether or not there is new SOM input data for the shift amount (the amount of shift for the hierarchical level of the SOM of interest) stored in the input buffer of the SOM of interest.

In step S543, in the event that determination is made that there is not yet stored new SOM input data for the shift amount in the input buffer of the SOM of interest, the flow returns to step S542, a new SOM of interest is selected, and subsequently the same processing is repeated.

Also, in the event that determination is made in step S543 that there has been stored new SOM input data for the shift amount in the input buffer of the SOM of interest, the flow proceeds to step S544, and the recognition generating unit 515 applies the window (a window of the window direction for the hierarchical level of the SOM of interest) to the SOM input data stored in the input buffer of the SOM of interest, thereby extracting the newest SOM input data of the window direction (hereafter also referred to as "current point-in-time SOM input data" as appropriate).

Figure 17:
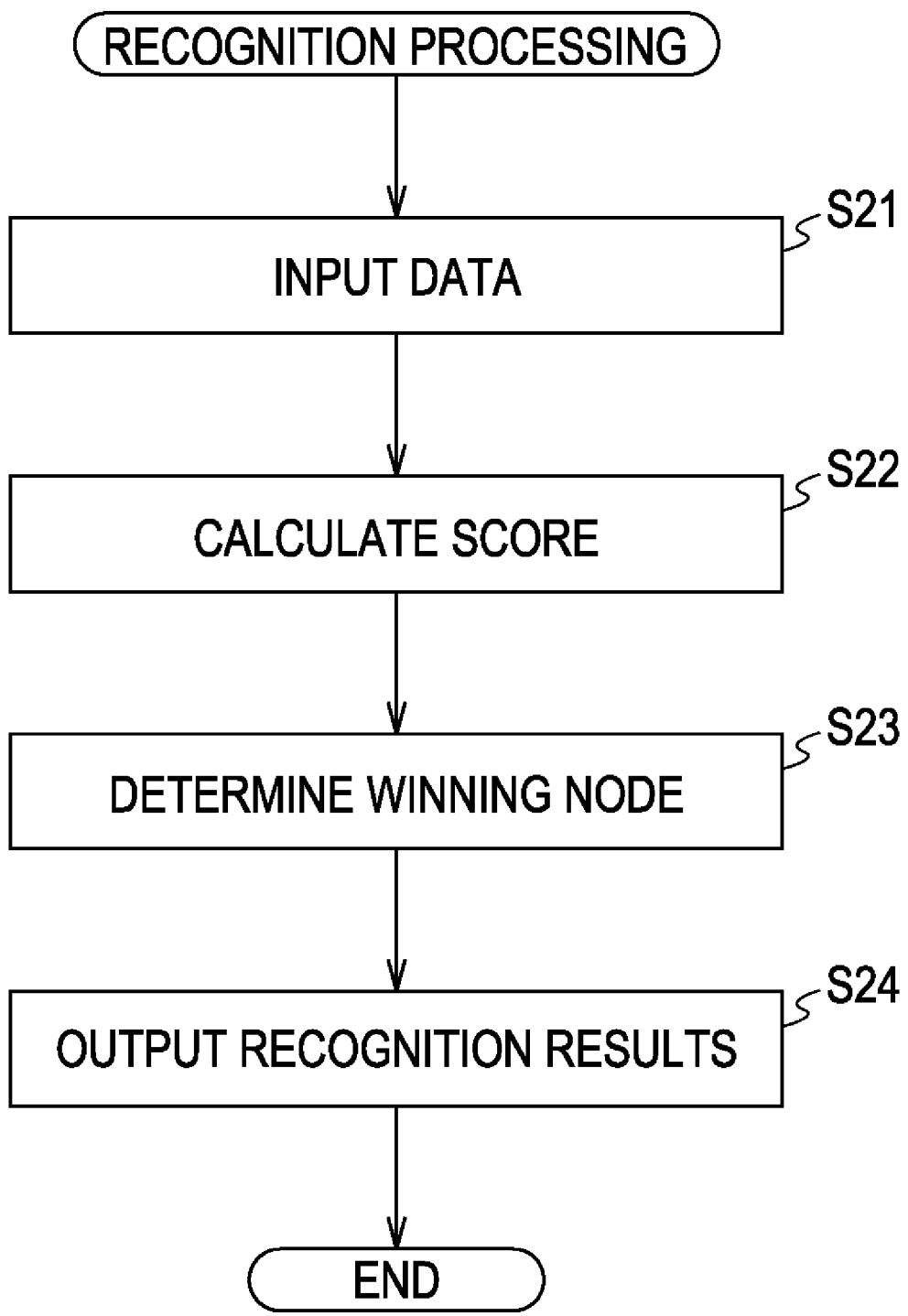
FIG. 17 is a flowchart for describing recognition processing.

Further, in step S544, the recognition generating unit 515 obtains the winning node of the SOM of interest, as to the current point-in-time SOM input data, as described in steps S22 and S23 in FIG. 17 for example (i.e., performs recognition of the current point-in-time SOM input data), and the flow proceeds to step S545.

In step S545, the recognition generating unit 515 supplies, as node information representing the winning node of a SOM of interest as to the current point-in-time SOM input data, position data (x, y) representing the position of the winning node for example, to the input buffer of the higher-order SOM at the hierarchical level above the SOM of interest and connected thereto, so as to be stored therein, and the flow proceeds to step S546.

In step S546, the recognition generating unit 515 discards (deletes) SOM input data of an amount corresponding to the shift amount (the amount of shifting for the hierarchical level of the SOM of interest) from the input buffer of the SOM of interest, from the oldest, and the flow proceeds to step S547.

In step S547, the recognition generating unit 515 determines whether or not the processing of steps S543 through S546 has been performed on all SOMs of the hierarchical SOM.

In the event that determination is made in step s547 that the processing of steps S543 through S546 has not been performed on all SOMs of the hierarchical SOM, i.e., in the event that there still is a SOM in the SOMs of the hierarchical SOM which has not yet been selected as the SOM of interest, the flow returns to step S542, and the recognition generating unit 515 selects, from SOMs in the hierarchical SOM which have not yet been taken as a SOM of interest, the SOM first discovered in the order from the lower-order hierarchical level toward the higher-order hierarchical level, as the SOM of interest, and subsequently the same processing is repeated.

Also, in step S547, in the event that determination has been made that the processing of steps S543 through S546 has been performed on all SOMs of the hierarchical SOM, the recognition generating unit 515 resets the information that all SOMs have been taken as the SOM of interest, advances the flow to step S548, and selects from SOMs in the hierarchical SOM which have not yet been taken as a SOM of interest, the SOM first discovered in the order from the lower-order hierarchical level toward the higher-order hierarchical level, as the SOM of interest, and the flow proceeds to step S549.

In step S549, the recognition generating unit 515 determines whether or not here is a SOM of a higher hierarchical level (higher-order SOM) to which the SOM of interest is connected.

In the event that determination is made in step S549 that there is no higher-order SOM to which the SOM of interest is connected, that is to say, the SOM of interest is the highest-order hierarchical level SOM for example, the steps S550 through S552 are skipped, and the flow proceeds to step S553.

Also, in the event that determination is made in step S549 that there is a higher-order SOM to which the SOM of interest is connected, the flow proceeds to step S550, where the recognition generating unit 515 reads out the prediction information of the next point-in-time from the prediction buffer of the higher-order SOM to which the SOM of interest is connected, i.e., the position data (x, y) serving as node information in this case, and the flow proceeds to step S551.

In step S551, the recognition generating unit 515 obtains the winning node of the SOM of interest as to the current point-in-time SOM input data, and obtains a B number of candidate nodes based on the winning node, to serve as candidates for the prediction node.

That is to say, expressing the winning node of the SOM of interest as to the current point-in-time SOM input data as node #i, the recognition generating unit 515 obtains B higher-order nodes #j which have a strong weight $w_{Ij}$ in Expression (8) as to the node #i, as candidate nodes.

The flow then proceeds to step S552, where the recognition generating unit 515 obtains, of the B candidate nodes for the SOM of interest, the candidate node which is the closest to the position represented by the position data (x, y) serving as prediction information of the next point-in-time which has been read out from the prediction buffer of the higher-order SOM connected to the SOM of interest, as the prediction node of the SOM of interest at the next point-in-time, and the flow proceeds to step S553.

In step S553, the recognition generating unit 515 determines whether or not there is a higher-order SOM to which the SOM of interest is connected.

In step S553, in the event that determination is made that there is a higher-order SOM to which the SOM of interest is connected, step S554 is skipped, and the flow proceeds to step S555.

Also, in the event that determination is made in step S553 that there is no higher-order SOM to which the SOM of interest is connected, that is to say, the SOM of interest is the highest-order hierarchical level SOM for example, the flow proceeds to step S554, where the recognition generating unit 515 obtains a prediction node based on the winning node of the SOM of interest as to the current point-in-time SOM input data, and the flow proceeds to step S555.

That is to say, expressing the winning node of the SOM of interest as to the current point-in-time SOM input data as node #i, the recognition generating unit 515 obtains a node #j which has the strongest weight $w_{Ij}$ in Expression (8) as to the node #i, as the prediction node for the next point-in-time.

In step S555, the recognition generating unit 515 determines whether or not there is a lower-order hierarchical level SOM (lower-order SOM) connected to the SOM of interest.

In the event that determination is made in step S555 that there is no lower-order SOM connected to the SOM of interest, i.e., in the event that the SOM of interest is a lowest-order hierarchical level SOM, the steps S556 and S557 are skipped, and the flow proceeds to step S558.

Also, in the event that determination is made in step S555 that there is a lower-order SOM connected to the SOM of interest, the flow proceeds to step S556, where the recognition generating unit 515 generates time-sequence data of a window duration as a prototype, based on the prediction node for the SOM of interest at the next point-in-time, i.e., the prediction node for the next point-in-time that has been obtained at the steps S552 or S554 performed immediately before.

In the event that there is a lower-order SOM connected to the SOM of interest, the prototype of the prediction node of the SOM of interest at the next point-in-time is integrated time-sequence data including the prediction information of the winning nodes of one or more lower-order SOMs connected to the SOM of interest, so in the event that a sequence of prediction information of the winning nodes of the multiple lower-order SOMs is included in the integrated time-sequence data, the recognition generating unit 515 divides the integrated time-sequence data into prediction information sequences for each of the individual lower-order SOMs, and proceeds from step S556 to step S557.

In step S557, the recognition generating 515 supplies the prediction information sequences obtained for each of the lower-order SOMs in step S556 to the prediction buffer of the SOM of interest so as to be stored, and proceeds to step S558.

Now, the prediction information sequences for each lower-order SOM has the same time duration as the SOM input data input in increments of frames to the SOM of interest, i.e., the same time duration as the window duration of the window applied to the time-sequence data when extracting SOM input data in increments of frames from the time-sequence data stored in the input buffer of the SOM of interest, but the prediction buffer of the SOM of interest only stores the newest data of the prediction information sequence for each lower-order SOM of an amount that is equivalent to the shifting amount (shifting amount of the window used for extracting the SOM input data in increments of frames that is input to the SOM of interest).

Accordingly, in this case, the prediction information sequences for each lower-order SOM other than the newest data an amount that is equivalent to the shifting amount is discarded. However, an arrangement may be made wherein, of the prediction information sequences for each of the lower-order SOMs, data other than the newest data of an amount that is equivalent to the shifting amount is not discarded by overwritten on the prediction buffer of the SOM of interest so as to be stored.

In step S558, the recognition generating unit 515 determines whether or not the processing of steps S549 through S557 has been performed on all SOMs of the hierarchical SOM.

In step S558, in the event that determination has been made that the processing has not been performed on all SOMs of the hierarchical SOM, i.e., in the event that there still is a SOM in the SOMs of the hierarchical SOM which has not yet been selected as the SOM of interest, the flow returns to step S548, and the recognition generating unit 515 selects, from SOMs in the hierarchical SOM which have not yet been taken as a SOM of interest, the SOM first discovered in the order from the higher-order hierarchical level toward the lower-order hierarchical level, as the SOM of interest, and subsequently the same processing is repeated.

Also, in the event that determination is made in step S558 that the processing has been performed on all SOMs of the hierarchical SOM, i.e., in the event that there is no SOM in the SOMs of the hierarchical SOM which has not yet been selected as the SOM of interest, the flow proceeds to step S559, where the recognition generating unit 515 generates time-sequence data as a prototype from the node that is the prediction node for the next point-in-time, for each of the lowest-order hierarchical level SOMs (lowest-order SOMs), outputs the newest data therefrom of an amount that is equivalent to the shifting amount (shifting amount of the window used for extracting the SOM input data in increments of frames that is input to the lowest-order SOM), and the flow proceeds to step S560.

In step S560, the recognition generating unit 515 determines whether or not a new sample value of the input time-sequence data has been supplied from the data extracting unit 512. In the event that determination is made in step S560 that a new sample value of the input time-sequence data has been supplied from the data extracting unit 512 to the recognition generating unit 515, the flow returns to step S541, and the recognition generating unit 515 supplies the new sample value of the input time-sequence data that has been supplied from the data extracting unit 512 to the input buffer of the lowest-order hierarchical level SOM so as to be stored, and subsequently repeats the same processing.

Also, in the event that determination is made in step S560 that a new sample value of the input time-sequence data has been not supplied from the data extracting unit 512 to the recognition generating unit 515, the recognition generating unit 515 ends the processing.

Figure 42:
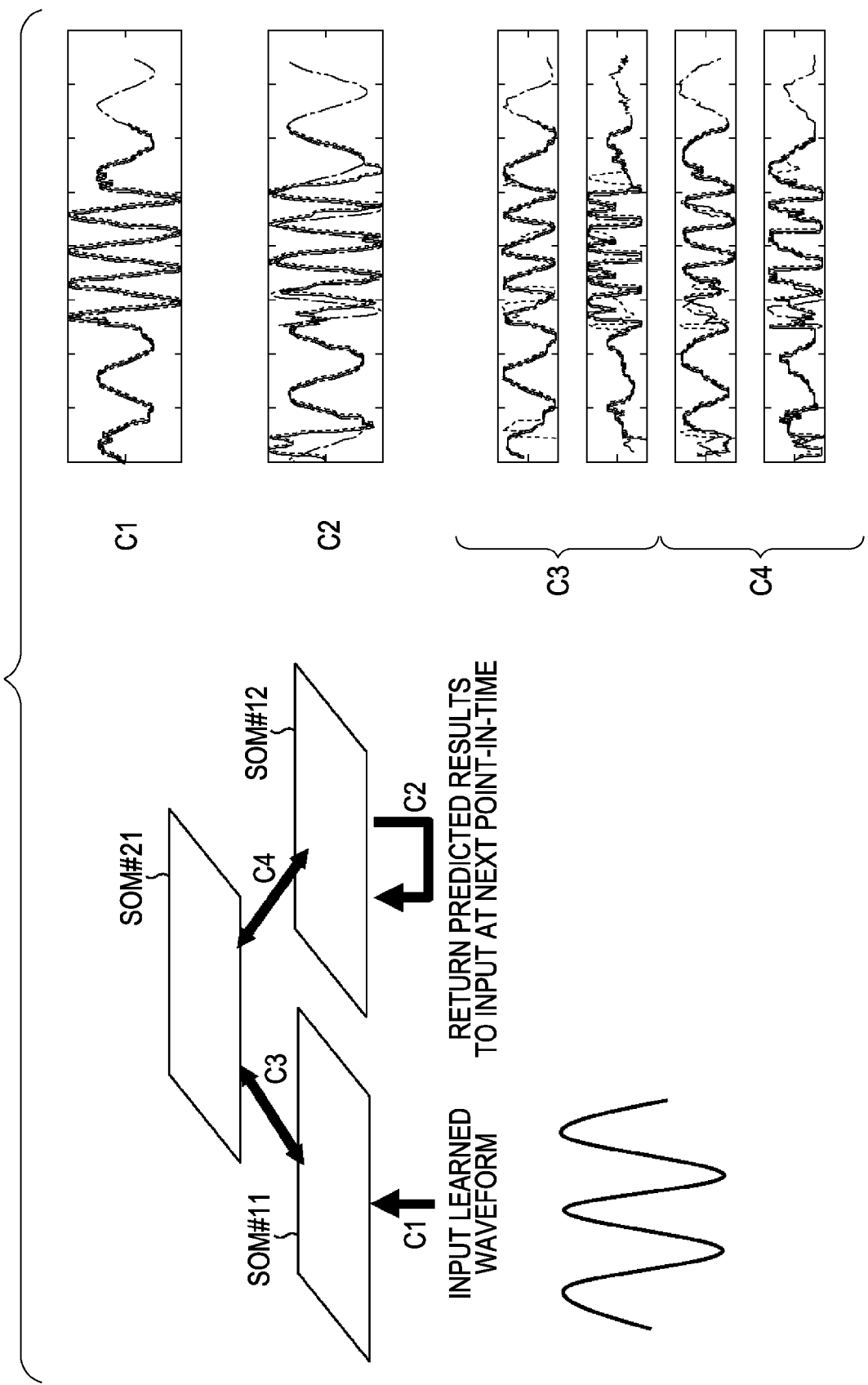
FIG. 42 is a diagram for describing the results of recognition generating processing experimentation.

Next, FIG. 42 illustrates the results of a recognition generating processing experiment performed using the hierarchical SOM shown in FIG. 34 (FIG. 35).

Here, the hierarchical SOM configured of the two lowest-order hierarchical level SOMs #11 and #12, and the higher-order SOM #21 connected to the two SOMs #11 and #12, has a symmetrical configuration regarding input and output, as if it were, so which of the two lowest-order hierarchical level SOMs #11 and #12 will be used as the input or output for the hierarchical SOM (to which the input data or output data of the robot shown in FIG. 33 will be provided) can be arbitrarily determined.

In the experiment, SOM #11 was assigned to the input of the hierarchical SOM (the SOM to which input data of the robot is provided), SOM #12 was assigned to the output of the hierarchical SOM (the SOM to which output data of the robot is provided), and as shown to the left in FIG. 42, the input time-sequence data used for learning was input to the SOM #11 of the hierarchical SOM, and prediction time-sequence data which the SOM #12 output (generated) corresponding to the input time-sequence data was input without change to the SOM #12 as input time-sequence data for the next point-in-time, thereby performing recognition generating processing.

In such recognition generating processing, the data observed at each of the SOMs #11, #12, and #21, of the hierarchical SOM, are shown to the right side of FIG. 42, the time axis being the horizontal axis.

To the right in FIG. 42, the graph C1 illustrates input and output to and from the SOM #11, the graph C2 illustrates input and output to and from the SOM #12, the graph C3 illustrates input and output between the SOMs #11 and #21, and the graph C4 illustrates input and output between the SOMs #12 and #21.

Also, in graphs C1 through C4, the two-dot broken lines indicates the data at the time of learning of the hierarchical SOM. Further, the solid lines indicate the SOM input data to be recognized in the recognition generating processing, and the dotted lines indicate the time-sequence data generated from prediction nodes in recognition generating processing (prototypes).

Note that graph C3 is a graph of the position data (x, y) serving as node information representing the nodes of SOM #11, and at the right side in FIG. 42, one of the two graphs illustrated as graph C3 represents, of the position data (x, y) representing the position on the SOM #11, the x coordinates, and the other represents the y coordinates thereof. In the same way, at the right side in FIG. 42, one of the two graphs illustrated as graph C4 represents, of the position data (x, y) representing the position on the SOM #12, the x coordinates, and the other represents the y coordinates thereof.

At the graph C1, the input time-sequence data used for learning is input to the SOM #11 at the time of recognition generating processing, so data at the time of learning of the hierarchical SOM (two-dot broken line) and the SOM input data for recognition (solid line) agree.

At the graph C2, the prediction time-sequence data which the SOM #12 outputs (generates) is input without change to the SOM #12 as the input time-sequence data for the next point-in-time at the time of recognition generating processing, so time-sequence data generated from the prediction nodes (dotted line) and the SOM input data for recognition (solid line) agree.

At the right in FIG. 42, it can be seen that the time-sequence data generated from the prediction nodes of the SOM #11 in the graph C1 (dotted line), i.e., the prediction values of SOM input data to the SOM #11, tracks the data at the time of learning of the hierarchical SOM (two-dot broken line) and the SOM input data for recognition (solid line), with some error.

Also, in the graph C2, it can be sent that the time-sequence data generated from the prediction nodes of the SOM #12 (dotted line) is unstable at first, but comes to match the data at the time of learning of the hierarchical SOM (two-dot broken line) as recognition generating processing progresses.

Further, to the right in FIG. 42, it can be seen that the SOM input data for recognition (solid line) switches to a different pattern of data from that so far at around ⅓ from the left in graph C1, and immediately following the switching, the time-sequence data generated from the prediction nodes of the SOM #12 (dotted line) becomes unstable (upset), but thereafter gradually comes to match the data at the time of learning of the hierarchical SOM (two-dot broken line).

Chapter 6: Experiment Using Robot, and Configuration of Hierarchy

An example of applying a hierarchical SOM to object handling of a robot will be described.

The robot has a visual sensor (stereo camera), whereby color region extraction is performed and center-of-gravity position is obtained, thereby obtaining the three-dimensional position of a single-colored object. Also, the left and right robot arm joints each have 4-degree-of-freedom actuators (motors), whereby servo control can be preformed by providing angle instruction values.

Now, an object is placed in front of an actual robot, and a human takes the arms of the robot and teaches the robot how to move the arms as to that object. The position and motion of the object at this time, and the path of the arm, are taken as input data, and the actions taught are reenacted when the object is actually presented thereto.

Input data incoming from the visual sensor, and the path of the arm regarding which execution is desired (output values) are provided as input data to the hierarchical SOM. Each are placed into separate new SOMs, hierarchical learning is performed (self-organizing learning and prediction learning of the new SOMs making of the hierarchical SOM), and output is generated for predicting the next path of the arm from the image input and the path of the arm (recognition generating processing is performed).

Also, as shown to the lower side in FIG. 43, the same algorithm can be used to configure and learn a more complex network, by arranging for self-organizing learning for the right and left arms separately.

This FIG. 43 illustrates an example of a hierarchical SOM applied to a robot which moves its arms to handle an object.

At the upper side of FIG. 43, a hierarchical SOM #100 is illustrated which is configured from the three SOMs #101, #102, and #111, wherein the SOMs #101 and #102 are lowest-order hierarchical level SOMs, and SOM #111 is a higher-order SOM at the hierarchical level above the two SOMs #101 and #102, and connected thereto.

The above-described three-dimensional position time-sequence of an object is input to the SOM #101 as sensor data, and also, the time-sequence of angle instruction values of the left and right arms is input to the SOM #102 as motor data, and learning is performed with the hierarchical SOM #100, whereby, upon inputting three-dimensional position representing the position of an object to the SOM #101 and further inputting the current angle instruction values of the left and right arms to the SOM #102 as necessary, recognition generating processing can be performed, in which the next angle instruction values for realizing the motions of the left and right arms which the human has taught are output from the SOM #102.

At the lower side of FIG. 43, a hierarchical SOM #200 is illustrated which is configured from the six SOMs #201, #202, #203, #211, #212, and #221. In the hierarchical SOM #200, the SOMs #201, #202, and #203 are lowest-order hierarchical level SOMs, the SOMs #211 and #212 are higher-order SOMs one hierarchical level higher, and the SOM #221 is the highest-order hierarchical level SOM.

The lowest-level hierarchical level SOM #201 is connected to the higher-order SOM #211, and the lowest-level hierarchical level SOMs #202 and #203 are connected to the higher-order SOM #212. Further, the higher-order SOMs #211 and #212 are connected to the highest-order hierarchical level SOM #221.

The above-described three-dimensional position time-sequence of an object is input to the SOM #201 as sensor data, and also, the time-sequence of angle instruction values of the left arm is input to the SOM #202 as first motor data and the time-sequence of angle instruction values of the right arm is input to the SOM #203 as second motor data, and learning is performed with the hierarchical SOM #200, whereby, upon inputting three-dimensional position representing the position of an object to the SOM #201 and further inputting the current angle instruction values of the left arm to the SOM #202 and inputting the current angle instruction values of the right arm to the SOM #203 as necessary, recognition generating processing can be performed, in which the next angle instruction values for realizing the motions of the left arm which the human has taught are output from the SOM #202 and the next angle instruction values for realizing the motions of the right arm which has been taught are output from the SOM #203.

Chapter 7: Probabilistic Formulation

The above has been a description of basic learning with a hierarchical SOM (self-organizing learning and prediction learning of the new SOMs making up the hierarchical SOM) and execution thereof (recognition generating processing). In this Chapter, probabilistic formation is performed and a modified version of the recognition generating processing algorithm is presented.

We can say that comparing prediction at each new SOM with a probabilistic cause-and-effect model yields a relation such as shown in FIG. 44. That is to say, FIG. 44 illustrates the relationship between a new SOM and a cause-and-effect model.

The cause-and-effect model shown to the right in FIG. 44 is based on the generative model which states that at a certain state $X_i(t)$ at a certain point-in-time t, an observation value I(t) is observed at a certain probability, and a probabilistic Markov process which states that the next state $X_{i'}(t)$ is determined by the current state $X_i(t)$. The state probability $P(X_i(t))$ from this cause-and-effect model can be estimated from Expression (9) (Connect Hebb). $P(I(t)|X_i(t))$ in Expression (9) represents the probability that the observation value I(t) will be observed, and $P(X_i(t)|X_j(t-1))$ represents transition probability. Propagating this from the first point-in-time t=1 at which the observation value I(t) is observed in order enables the current state probability $P(X_i(t))=P(X_i(t)|I(1), I(2), \ldots, I(t))$ to be obtained.

$$m_i^{t,t+1} = P(I(t) | X_i(t)) \sum_j P(X_i(t) | X_j(t-1)) m_j^{t-1,t} \qquad (9)$$

With the time-sequence SOM model shown to the left in FIG. 44 which indicates the new SOM at each point-in-time that time-sequence data is input, there are N (discrete) nodes obtained by performing self-organizing learning using the SOM input data as observation values. Defining the probability of taking one of the N nodes enables correlation with the state probability of the cause-and-effect model. Also, using each node for predicting the next node can be understood as the next node being determined from the current node by probabilistic Markov process.

Now, in Expression (9), $m_i^{t,\,t+1}$ is a message to be propagated from the current state $X_i(t)$ of the point-in-time t to the state $X_i(t+1)$ at the next point-in-time t+1, and represents the state probability $P(X_i(t))$ that the state at the present (point-in-time t) is the state $X_i(t)$, i.e., the probability that the node #i is the winning node at point-in-time t at the new SOM, that is to say, the probability $P(X_i(t)|I(1), I(2), \ldots, I(t))$ that the observation values $I(1), I(2), \ldots, I(t)$, will be input by point-in-time t and as a result the node #i will be the winning node.

Also, in Expression (9), $P(I(t)|X_i(t))$ represents the observation probability (observation likelihood) that the observation value $I(t)$ will be observed in state $X_i(t)$ at point-in-time t, i.e., the probability that the node #i will be the winning node as to the SOM input data as observation value $I(t)$ at the new SOM.

Further, in Expression (9), $P(X_i(t)|X_j(t-1))$ represents the transition probability of state $X_j(t-1)$ at point-in-time t−1 making transition to the state $X_i(t)$ at point-in-time t, i.e., the probability that the node #i will be the winning node, following which the node #j will be the new node, at the new SOM.

Thus, according to Expression (9), the probability $P(X_i(t))= m_i^{t,\,t+1}$ that the node #i will be the winning node at point-in-time t is obtained as follows. The probability $P(X_j(t-1))=m_j^{t-1,\,t}$ that the node #j is the winning node at point-in-time t−1, and the probability $P(X_i(t)|X_j(t-1))$ that the node #i will be the winning node at point-in-time t after the node #j is the winning node at point-in-time t−1 are multiplied to obtain the multiplied value $P(X_i(t)|X_j(t-1))m_j^{t-1,\,t}$. The summation $\Sigma P(X_i(t)|X_j(t-1))m_j^{t-1,\,t}$ is obtained for all nodes #j making up the new SOM, and the summation $\Sigma P(X_i(t) X_j(t-1))m_j^{t-1,\,t}$ and the probability $P(I(t)|X_i(t))$ that the node #i will be the winning node as to the SOM input data as observation value $I(t)$ are multiplied.

Note that hereinafter, in the event that a variable which has been written with a subscript, is written without a subscript, this information relating to all states (all nodes of the new SOM). That is, if we say that the number of all states (all nodes of the new SOM) is N, a variable without subscript represents information regarding all N states (N nodes of the new SOM).

Specifically, for example, with regard to message $m_i^{t,\,t+1}$ or state probability $P(X_i(t)|I(1), I(2), \ldots, I(t))=P(X_i(t))$, notation thereof without the subscript i representing the states (nodes), i.e., message $m^{t,\,t+1}$ or state probability $P(X(t)|I(1), I(2), \ldots, I(t))=P(X(t))$, represent a vector (a matrix of N rows by 1 column) having the state probabilities of each of all states (all nodes of the new SOM) as components thereof, as shown in Expression (10).

$$m^{t,t+1} = P(X(t) \mid I(1), \ldots, I(t)) \qquad (10)$$
$$= \begin{bmatrix} P(X_1(t) \mid I(1), \ldots, I(t)) \\ P(X_2(t) \mid I(1), \ldots, I(t)) \\ \vdots \\ P(X_N(t) \mid I(1), \ldots, I(t)) \end{bmatrix}$$

Also, with regard to transition probability $P(X_i(t)|X_j(t-1))$, notation thereof without the subscripts i and j representing the states (nodes), i.e., $P(X(t)|X(t-1))$, represents a matrix of N rows by N columns having the transition probabilities from each of all states (all nodes of the new SOM) as components thereof, as shown in Expression (11).

$$P(X(t)|X(t-1)) = \qquad (11)$$
$$\begin{bmatrix} P(X_1(t)|X_1(t-1)) & P(X_1(t)|X_2(t-1)) & \cdots & P(X_1(t)|X_N(t-1)) \\ P(X_2(t)|X_1(t-1)) & & \ddots & \vdots \\ \vdots & & & \\ P(X_N(t)|X_1(t-1)) & \cdots & & P(X_N(t)|X_N(t-1)) \end{bmatrix}$$

Further, with regard to observation likelihood $P(I(t)|X_i(t))$, notation thereof without the subscript i representing the states (nodes), i.e., $P(I(t)|X(t))$ represents a vector (a matrix of N rows by 1 column) having the observation likelihood that the observation value $I(t)$ will be observed at each of all states (the probability that each of all of the nodes of the new SOM will be the winning node as to the observation value $I(t)$) as components thereof, as shown in Expression (12).

$$P(I(t) \mid X(t)) = \begin{bmatrix} P(I(t) \mid X_1(t)) \\ \vdots \\ P(I(t) \mid X_N(t)) \end{bmatrix} \qquad (12)$$

Now, rewriting Expression (9) with variables without the subscripts yields Expression (13).

$$m^{t,t+1} = P(I(t)|X(t)) * P(X(t)|X(t-1))m^{t-1,t} \qquad (13)$$

Note that in computation of matrices A and B (including vectors), AB represents the product of matrices A and B, and A*B represents a matrix, having as the components thereof, the product of the components of matrix A and the components of matrix B.

Figure 45:
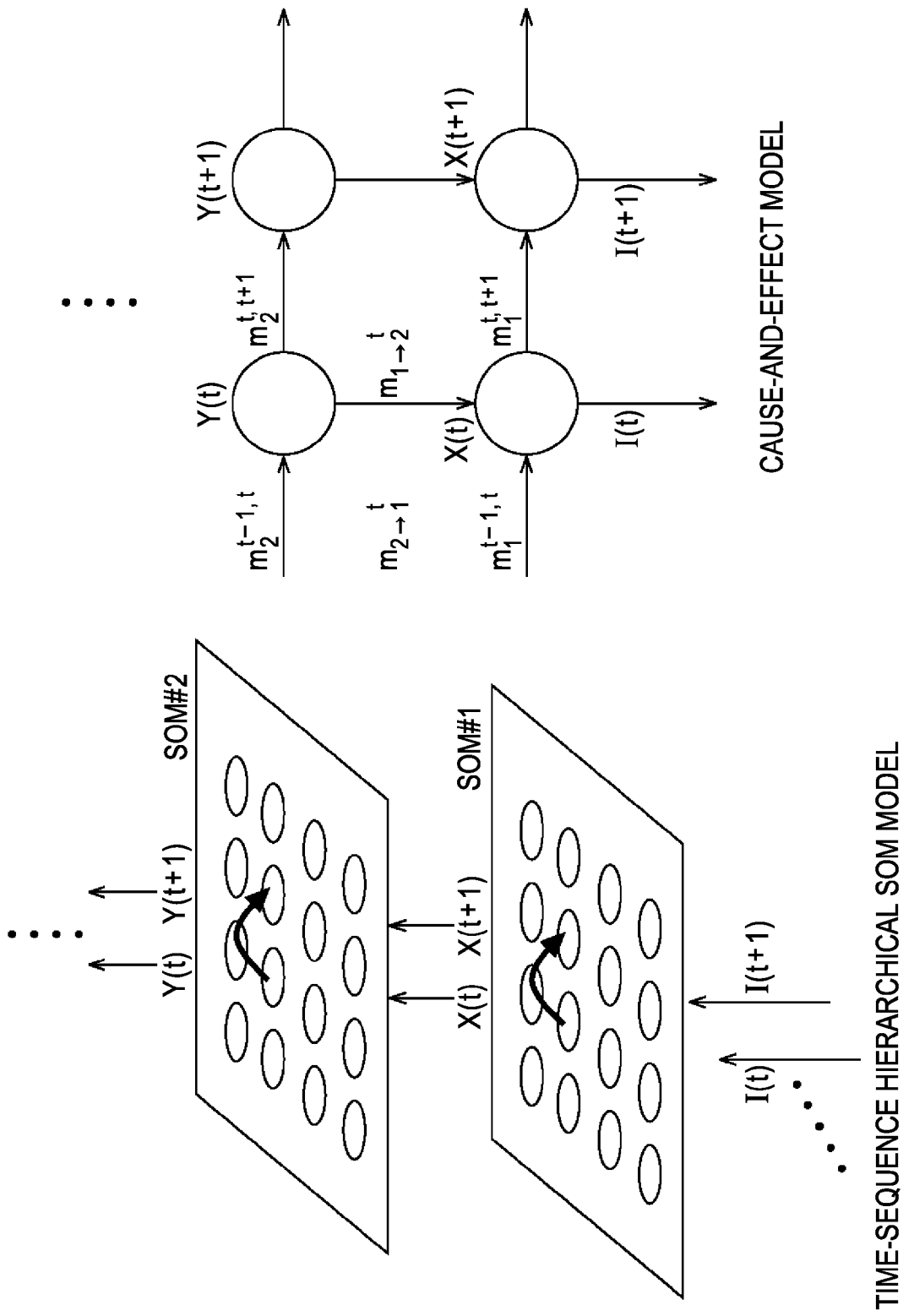
FIG. 45 is a diagram for describing a time-sequence hierarchical SOM model.

Next, FIG. 45 illustrates the relation between a hierarchical SOM (left side of FIG. 45) which is configured of a lowest-order hierarchical level SOM #1, and a higher-order SOM #2 that is connected one hierarchical level immediately above, and a two-hierarchical level cause-and-effect model (hierarchical cause-and-effect) model (right side of FIG. 45).

The hierarchical cause-and-effect model in FIG. 45 is described as a generating model wherein the state Y(t) of the higher-order hierarchical level determines the state X(t) of the lower-order hierarchical level. The hierarchical SOM can be understood as a model wherein a node of the lower-order hierarchical level SOM #1 (lowest-order hierarchical level) corresponding to the winning node of the higher-order hierarchical level SOM #2 becomes the winning node, and accordingly, the hierarchical SOM can be applied to the hierarchical cause-and-effect model.

Now, in FIG. 45, message $m_c^{a \to b}$ represents a message for propagation from the state at point-in-time a to the state at point-in-time b at the hierarchical level c. Message $m_{b \to c}^{a}$ represents a message for propagation from the state at the hierarchical level b to the state at the hierarchical level c at point-in-time a.

Figure 46:
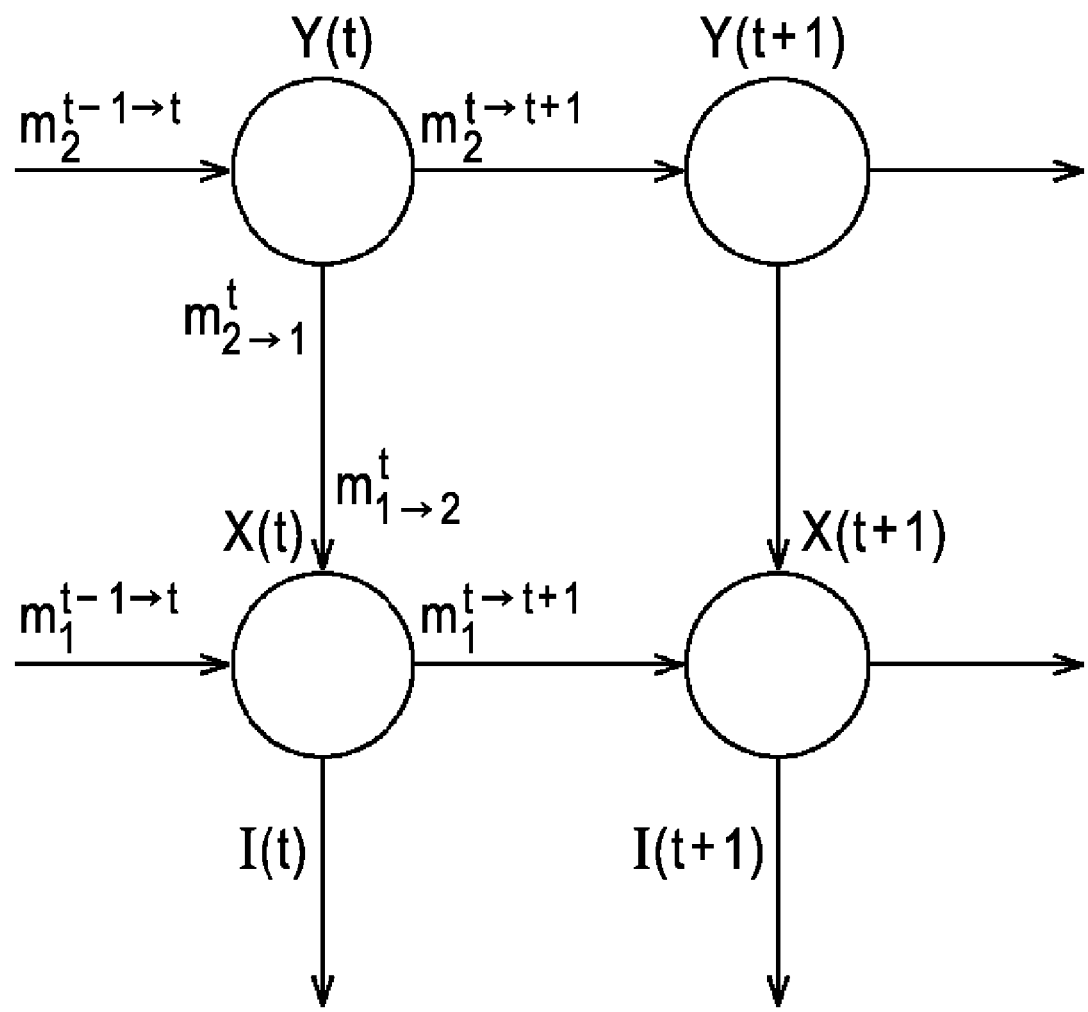
FIG. 46 is a diagram for describing a loopy BP of a 2-layer dynamic graph model.

FIG. 46 illustrates a method for performing state estimation of a hierarchical cause-and-effect model.

State estimation of a hierarchical cause-and-effect model is complex, and is performed by computing Expression (14) based on a technique shown in FIG. 46 called "Loopy BP". Note that in the computation in Expression (14), probabilities $P(X_k(t)|Y_i(t), X_j(t-1))$ and $P(X_i(t)|Y_j(t), X_k(t-1))$ which are combinations of states X(t) and Y(t) of two hierarchical elves, so in the event that the hierarchical cause-and-effect model has a great number of states, i.e., in the event that the SOMs making up the hierarchical SOM have a great number of nodes, the amount of computations is great.

$$m_{1 \to 2, i}^{t} = \sum_{j} \sum_{k} P(X_k(t) \mid Y_i(t), X_j(t-1)) m_{1,j}^{t-1 \to t} P(I(t) \mid X_k(t)) \quad (14)$$

$$m_{2 \to 1, i}^{t} = \sum_{j} P(Y_i(t) \mid Y_j(t-1)) m_{2,j}^{t-1 \to t}$$

$$m_{1,i}^{t \to t+1} = P(I(t) \mid X_i(t)) \times \left( \sum_{j} \sum_{k} P(X_i(t) \mid Y_j(t), X_k(t-1)) m_{2 \to 1,j}^{t} m_{1,k}^{t-1 \to t} \right)$$

$$m_{2,i}^{t \to t+1} = m_{1 \to 2,i}^{t} \left( \sum_{j} P(Y_i(t) \mid Y_j(t-1)) m_{2,j}^{t-1 \to t} \right)$$

Now, in Expression (14), $m_{1 \to 2, i}^{t}$ represents a message for propagation from the first hierarchical level (lowest-order hierarchical level) to the state $Y_i(t)$ at the second hierarchical level (the hierarchical level one hierarchical level above the first hierarchical level) at point-in-time t.

Also, $P(X_k(t)|Y_i(t), X_j(t-1))$ represents the transition probability in the event of at state $Y_i(t)$ at point-in-time t at the second hierarchical level, that the state at the first hierarchical level at point-in-time t−1 is $X_j(t-1)$ and will make transition to state $X_k(t)$ at point-in-time t.

Further, $m_{1, j}^{t-1 \to t}$ represents a message for propagation from the state $X_j(t-1)$ at the first hierarchical level at point-in-time t−1 to the state $X_j(t)$ at point-in-time t.

Also, $P(I(t)|X_k(t))$ represents the observation likelihood that the observation value I(t) will be observed at state $X_k(t)$ at point-in-time t.

Further, $m_{2 \to 1, i}^{t}$ represents a message for propagation from the state $Y_i(t)$ at the second hierarchical level to the first hierarchical level at point-in-time t.

Also, $P(Y_i(t)|Y_j(t-1))$ represents the transition probability that the state at the second hierarchical level at point-in-time t−1 is $Y_j(t-1)$ and will make transition to state $Y_i(t)$ at point-in-time t.

Further, $m_{2, j}^{t-1 \to t}$ represents a message for propagation from the state $Y_j(t-1)$ at the second hierarchical level at point-in-time t−1 to the state $Y_j(t)$ at point-in-time t.

Also, $m_{1, i}^{t \to t+t}$ represents a message for propagation from the state $X_i(t)$ at the first hierarchical level at point-in-time t to the state $X_i(t+1)$ at point-in-time t+1.

Also, $P(I(t)|X_i(t))$ represents the observation likelihood that the observation value I(t) will be observed at state $X_i(t)$ at point-in-time t.

Also, $P(X_i(t)|Y_j(t), X_k(t-1))$ represents the transition probability in the event of at state $Y_j(t)$ at point-in-time t at the second hierarchical level, that the state at the first hierarchical level at point-in-time t−1 is $X_k(t-1)$ and will make transition to state $X_i(t)$ at point-in-time t.

Further, $m_{2 \to 1, j}^{t}$ represents a message for propagation from the second hierarchical level to the state $X_j(t)$ at the first hierarchical level at point-in-time t.

Also, $m_{1, k}^{t-1 \to t}$ represents a message for propagation from the state $X_k(t-1)$ at the first hierarchical level at point-in-time t−1 to the state $X_k(t)$ at point-in-time t.

Further, $m_{2, i}^{t \to t+1}$ represents a message for propagation from the state $Y_i(t)$ at the second hierarchical level at point-in-time t to the state $Y_i(t+1)$ at point-in-time t+1.

Figure 47:
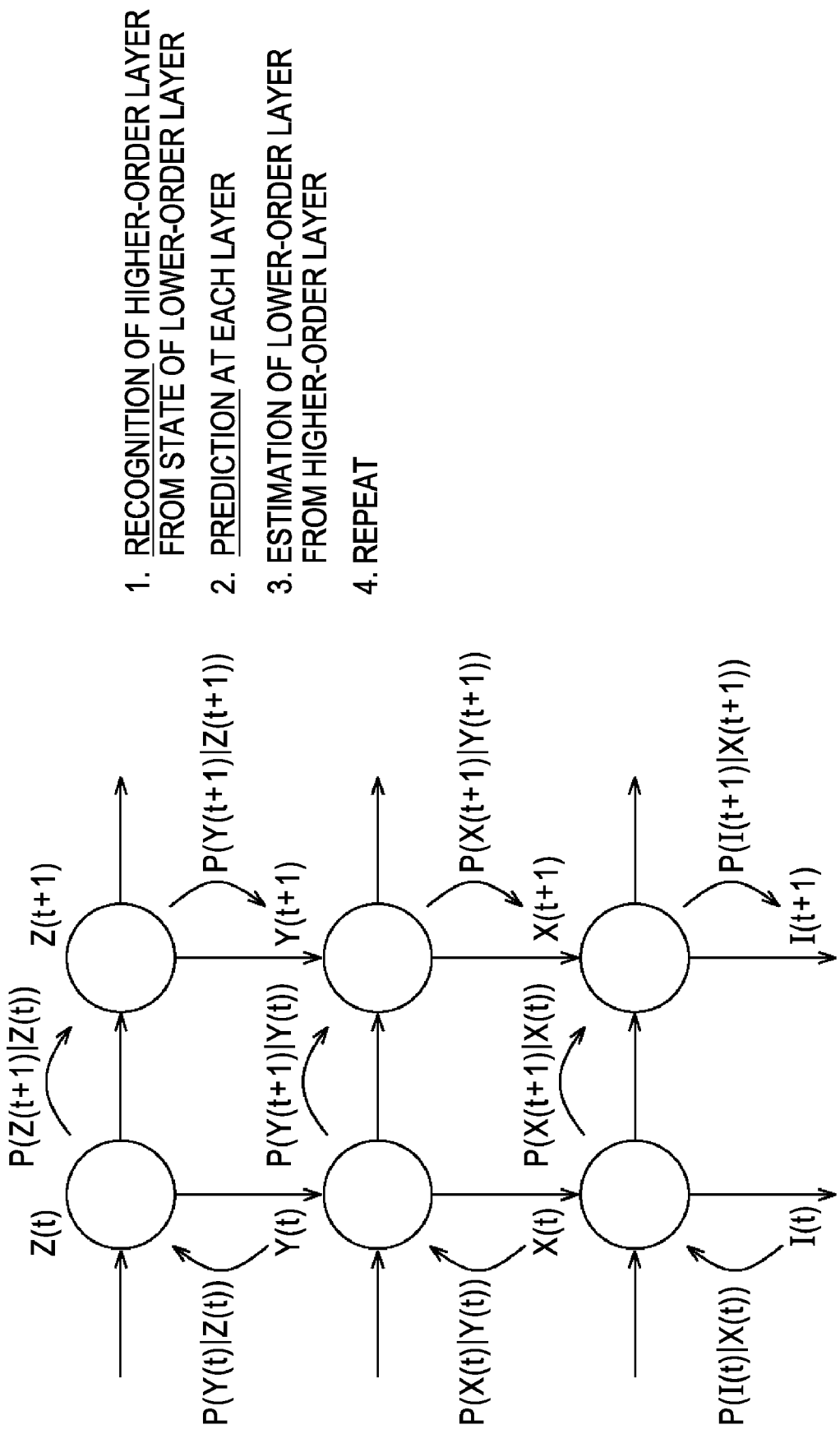
FIG. 47 is a diagram for describing probability propagation in a hierarchical SOM.

Now, FIG. 47 shows the hierarchical SOM execution technique (recognition generating processing) described with FIG. 41, rewritten in the form of probability propagation. In FIG. 47, the arrows pointing upwards represent recognition from lower-order to higher-order, the horizontal arrows represent prediction at the next point-in-time at each SOM, and the arrows pointing downwards represent estimation (prediction) from higher-order to lower-order. The recognition generating processing in FIG. 41 also keeps this order for calculation.

That is to say, FIG. 47 illustrates probability propagation corresponding to the recognition generating processing procedures in FIG. 41.

FIG. 47 illustrates probability propagation of a hierarchical cause-and-effect model having three hierarchical levels states, i.e., the state X(t) of the lowest-hierarchical level (first hierarchical level), the state Y(t) which is a higher-order hierarchical level from the lowest-order hierarchical level by one hierarchical level, and the state Z(t) which is a higher-order hierarchical level from the lowest-order hierarchical level by two hierarchical levels. This hierarchical cause-and-effect model corresponds to a hierarchical SOM configured of three hierarchical levels of new SOMs.

The state X(t) of the first hierarchical level corresponds to the nodes of the first hierarchical level SOMs of the hierarchical level SOM, the state Y(t) of the second hierarchical level corresponds to the nodes of the second hierarchical level SOMs of the hierarchical level SOM, and the state Z(t) of the third hierarchical level (highest-order hierarchical level) corresponds to the nodes of the third hierarchical level SOMs of the hierarchical level SOM.

In FIG. 47, P(I(t)|X(t)) represents the observation likelihood that the observation value I(t) which is the input time-sequence data will be observed in state X(t) at point-in-time t, i.e., the probability (observation likelihood) that the node X(t) of the first hierarchical level SOM will be the winning node as to the observation value I(t).

Also, P(X(t)|Y(t)) represents the observation likelihood that the node X(t) will be observed as an observation value in state Y(t) at point-in-time t, i.e., the probability (observation likelihood) that the node Y(t) of the second hierarchical level SOM will be the winning node as to position data serving as node information representing the node X(t) of the first hierarchical level SOM.

Further, P(Y(t)|Z(t)) represents the observation likelihood that the node Y(t) will be observed as an observation value in state Z(t) at point-in-time t, i.e., the probability (observation likelihood) that the node Z(t) of the third hierarchical level SOM will be the winning node as to position data serving as node information representing the node Y(t) of the second hierarchical level SOM.

Moreover, P(Z(t+1)|Z(t)) represents the transition probability of transition from the state Z(t) to state Z(t+1) from point-in-time t to point-in-time t+1, i.e., the probability (transition probability) at the third hierarchical level SOM that when the node Z(t) becomes the winning node at point-in-time t, the node Z(t+1) will become the winning node at the next point-in-time t+1.

Also, P(Y(t+1)|Y(t)) represents the transition probability of transition from the state Y(t) to state Y(t+1) from point-in-time t to point-in-time t+1, i.e., the probability (transition probability) at the second hierarchical level SOM that when the node Y(t) becomes the winning node at point-in-time t, the node Y(t+1) will become the winning node at the next point-in-time t+1.

Moreover, P(X(t+1)|X(t)) represents the transition probability of transition from the state X(t) to state X(t+1) from point-in-time t to point-in-time t+1, i.e., the probability (transition probability) at the first hierarchical level SOM that when the node X(t) becomes the winning node at point-in-time t, the node X(t+1) will become the winning node at the next point-in-time t+1.

Further, P(Y(t+1)|Z(t+1)) represents the observation likelihood that the node Y(t+1) will be observed as an observation value in state Z(t+1) at point-in-time t+1, i.e., the probability (observation likelihood) that, if the node Z(t+1) of the third hierarchical level SOM is the winning node, position data serving as node information representing the node Y(t+1) of the second hierarchical level SOM will be observed.

Further, P(X(t+1)|Y(t+1)) represents the observation likelihood that the node X(t+1) will be observed as an observation value in state Y(t+1) at point-in-time t+1, i.e., the probability (observation likelihood) that, if the node Y(t+1) of the second hierarchical level SOM is the winning node, position data serving as node information representing the node X(t+1) of the first hierarchical level SOM will be observed.

Further, P(I(t+1)|X(t+1)) represents the observation likelihood that input time-sequence data I(t+1) serving as observation value will be observed in state X(t+1) at point-in-time t+1, i.e., the probability (observation likelihood) that, if the node X(t+1) of the first hierarchical level SOM is the winning node, the input time-sequence data I(t+1) will be observed.

Next, FIG. 48 illustrates handling SOM firing and probability distribution. Determining of a winning node of a SOM is performed by obtaining the distance (error) between an input signal and a prototype of each node, and selecting that with the smallest error. Assuming additive noise of the normal distribution of the original signal, normal distribution can be used for the observation probability (likelihood) of signals at each node.

That is to say, FIG. 48 illustrates how to obtain the observation likelihood that an observation value, which is a node of a new SOM, will be observed.

Of SOMs making up a hierarchical SOM, let us take the k'th SOM i.e., SOM #k, as the SOM of interest, and represent observation value which is SOM input data input to the SOM #k of interest at point-in-time t as $I_k(t)$, and a prototype of node #i which is the i'th node of the SOM #k of interest as $u_i$.

Further, let us define the error $e_i$ between the observation value $I_k(t)$ and the prototype $u_i$ of the node #i with the expression $e_i=(I_k(t)-u_i)^2$, with the node #i with the smallest error $e_i$ at the SOM #k of interest as the winning node.

If we way that the observation value $I_k(t)$ includes the signal component (true value) s(t) and additive noise component with average of 0 and variance $\sigma^2$ for normal distribution of n(0, $\sigma^2$), the observation value $I_k(t)$ can be expressed by the expression $I_k(t)=s(t)+n(0, \sigma^2)$.

In this case, the observation likelihood $P(J_k(t)|X_i(t))$ that the observation value $I_k(t)$ will be observed at the node #i (state $X_i(t)$) can be obtained by the expression $P(I_k(t)|X_i(t))=1/\sqrt{2\pi}\sigma\times\exp\{-I_k(t)-u_i\}^2/(2\sigma^2)\}$.

Here, exp{ } represents an exponential function with Napier's constant e as the base.

Note that weight $w_{ij}$ which is a weight coefficient of Connect Hebb learning is used as the transition probability for prediction. In Connect Hebb learning, upon the winning node making transition from node #i to node #j, the weight $w_{ij}$ connecting these is increased by a reference value Δw, but also, the weight of nearby nodes is also increased according to the inter-pattern distance to the winning node. Accordingly, the weight $w_{ij}$ is proportionate to the frequency of transition from node #i to node #j. The summation of the probability of transition for each node is 1, so the following normalization is performed to use as the transition probability.

$$P(X_j(t+1) | X_i(t)) = \frac{w_{ij}}{\sum_j w_{ij}} \quad (15)$$

That is to say, with prediction learning (Connect Hebb learning), in the event that the node #i becomes the winning node, the weight $w_{ij}$ is updated according to Expression (8) so as to strengthen the jointing between the node #i and the node #j which becomes the winning node at the next point-in-time. Accordingly, the weight $w_{ij}$ can be said to be representing the frequency of the winning node making transition from node #i to #j, and can be used as the probability that, if the node #i is the winning node at point-in-time t, the node #j will be the winning node at the following point-in-time t+1, i.e., the transition probability $P(X_j(t+1) X_i(t))$ of transition from state $X_i(t)$ to state $X_j(t+1)$ from point-in-time t to point-in-time t+1.

Now, in Expression (15), the summation $\Sigma w_{ij}$ which is the denominator at the right-hand side represents the node to which transition is to be made in the new SOM, i.e., the summation of weight $w_{ij}$ of all nodes of the new SOM.

With a hierarchical SOM after learning, the probabilistic cause-and-effect relation necessary for a cause-and-effect model, i.e., the observation likelihood $P(I_k(t)|X_i(t))$ at which the observation value $I_k(t)$ which is SOM input data to the SOM #k at node $X_i(t)$ of the SOM #k making up the hierarchical SOM is observed, and the transition probability $P(X_j(t+1) X_i(t))$ of transition from node $X_i(t)$ to node $X_j(t+1)$ from point-in-time t to point-in-time t+1, can be obtained. Using this observation likelihood $P(I_k(t)|X_i(t))$ and transition probability $P(X_j(t+1) X_i(t))$ allows state estimation to be performed at each point-in-time.

FIG. 49 illustrates the processing procedures (Algorithm 2) for recognition generating processing to which a hierarchical cause-and-effect model has been applied, which is performed by the recognition generating unit 515 shown in FIG. 33.

In step S601, the recognition generating unit 515 initializes the state probability P(X(t)) of each node by uniform distribution at each SOM making up the hierarchical SOM stored in the storage unit 511, and the flow proceeds to step S602.

That is to say, taking the k'th SOM i.e., SOM #k, of the SOMs making up the hierarchical SOM as the SOM of interest, if we say that the SOM #k of interest has N nodes $X_1(t)$, $X_2(t)$, and so on through $X_N(t)$, the recognition generating unit 515 initializes the state probability $P(X_i(t))$ of node $X_i(t)$ to 1/N.

In step S602, the recognition generating unit 515 supplies, to the input buffer of a corresponding SOM of the lowest-order hierarchical level SOMs of the hierarchical SOM stored in the storage unit 511, sample values S(t) of each of the points-in-time t of the multiple types of input time-sequence data supplied from the data extracting unit 512, so as to be stored in that input buffer, in the same way as with step S541 in FIG. 41, and the flow proceeds to step S603.

In step S603, the recognition generating unit 515 selects from SOMs in the hierarchical SOM which have not yet been taken as a SOM of interest, the SOM first discovered in the order from the lower-order hierarchical level toward the higher-order hierarchical level, as the SOM of interest, and the flow proceeds to step S604.

Now, let us say that in step S603, of the SOMs making up the hierarchical SOM, the k'th SOM #k has been selected as the SOM of interest.

In step S604, the recognition generating unit 515 determines whether or not the residue Mod(t, shift) obtained by dividing the point-in-time t by shift, which is the amount of shift, is zero, i.e., whether or not there is new SOM input data for the shift amount (the amount of shift for the hierarchical level of the SOM of interest) stored in the input buffer of the SOM #k of interest.

In step S604, in the event that determination is made that there is not yet stored new SOM input data for the shift amount in the input buffer of the SOM #k of interest, the flow returns to step S603, a new SOM of interest is selected, and subsequently the same processing is repeated.

Also, in the event that determination is made in step S604 that there has been stored new SOM input data for the shift amount in the input buffer of the SOM #k of interest, the flow proceeds to step S605, and the recognition generating unit 515 applies the window to the SOM input data stored in the input buffer of the SOM #k of interest, thereby extracting the newest SOM input data of the window duration as SOM input data at the point-in-time t.

Further, in step S605, with the SOM input data at the point-in-time t as the observation value $I_k(t)$ observed at the SOM #k of interest at the point-in-time t, the recognition generating unit 515 obtains the observation likelihood $P(I_k(t)|X(t))$ that the observation value $I_k(t)$ will be observed at each of N nodes $X(t)$ of the SOM #k of interest, and the flow proceeds to step S606.

In step S606, the recognition generating unit 515 updates the state probabilities $P(X(t))$ of each of the N nodes $X(t)$ of the SOM #k of interest, using the observation likelihood $P(I_k(t)|X(t))$, according to the Expression $P(X(t))=(P(I_k(t)|X(t)))P(X(t))/Z$, for example.

Now, in the Expression $P(X(t))=P(I_k(t)|X(t))P(X(t))/Z$, Z is a value for normalizing $P(I_k(t)X(t))P(X(t))$, i.e., a normalization factor, and is the summation $P(X_1(t))+P(X_2(t))+\ldots+P(X_N(t))$ of the state probability $P(X(t))$ of each of the N nodes $X(t)$ of the SOM #k of interest.

After updating the state probability $P(X(t))$ in step S606, the flow proceeds to step S607, where the recognition generating unit 515 obtains the node $X_i(t)$ having the highest state probability $P(X_i(t))$ following updating, as the winning node as to the observation value $I_k(t)$ (i.e., recognizes observation value $I_k(t)$).

Further, in step S607, the recognition generating unit 515 supplies, as node information representing the winning node $X_i(t)$ of the SOM #k of interest as to the observation value $I_k(t)$, position data (x, y) representing the position of the winning node $X_i(t)$, to the input buffer of the higher-order SOM at the hierarchical level above the SOM #k of interest and connected thereto, so as to be stored therein, and the flow proceeds to step S608.

In step S608, the recognition generating unit 515 discards (deletes) SOM input data of an amount corresponding to the shift amount from the input buffer of the SOM #k of interest, from the oldest, and the flow proceeds to step S609.

In step S609, the recognition generating unit 515 determines whether or not the processing of steps S604 through S608 has been performed on all SOMs of the hierarchical SOM.

In the event that determination is made in step S609 that the processing of steps S604 through S608 has not been performed on all SOMs of the hierarchical SOM, i.e., in the event that there still is a SOM in the SOMs of the hierarchical SOM which has not yet been selected as the SOM of interest, the flow returns to step S603, and the recognition generating unit 515 selects, from SOMs in the hierarchical SOM which have not yet been taken as a SOM of interest, the SOM first discovered in the order from the lower-order hierarchical level toward the higher-order hierarchical level, as the SOM of interest, and subsequently the same processing is repeated.

Also, in step S609, in the event that determination has been made that the processing of steps S604 through S608 has been performed on all SOMs of the hierarchical SOM, that is to say, that there are no SOMs in the SOMs of the hierarchical SOM which have not yet been selected as the SOM of interest, the recognition generating unit 515 resets the information that all SOMs have been taken as the SOM of interest, advances the flow to step S610, and selects from SOMs in the hierarchical SOM which have not yet been taken as a SOM of interest, the SOM first discovered in the order from the lower-order hierarchical level toward the higher-order hierarchical level, as the SOM of interest, and the flow proceeds to step S611.

In step S611, the recognition generating unit 515 determines, in the same way as with step S604, whether or not the residue Mod(t, shift) obtained by dividing the point-in-time t by the amount of shift, is zero, i.e., whether or not there is new SOM input data for the shift amount stored in the input buffer of the SOM of interest.

In step S611, in the event that determination is made that there is not yet stored new SOM input data for the shift amount in the input buffer of the SOM of interest, the flow returns to step S610, a new SOM of interest is selected, and subsequently the same processing is repeated.

Also, in the event that determination is made in step S611 that there has been stored new SOM input data for the shift amount in the input buffer of the SOM of interest, the flow proceeds to step S612, and the recognition generating unit 515 obtains the transition probability $P(X(t+1)|X(t))$ of the winning node to make transition from node $X(t)$ to node $X(t+1)$ from point-in-time t to point-in-time t+1 in the SOM of interest, according to Expression (15), using the weight $w_{ij}$ of the SOM of interest.

Further, in step S612, the recognition generating unit 515 multiplies the state probability $P(X(t))$ of the node x(t) of the SOM of interest by the transition probability $P(X(t+1)|X(t))$, thereby obtaining the state probability $P(X(t+1))=P(X(t+1)|X(t))P(X(t))$ for the node $X(t+1)$ at the next point-in-time t+1.

Now, the transition probability $P(X(t+1)|X(t))$ does not change according to the point-in-time t, so once obtained for each SOM making up the hierarchical SOM, the obtained transition probability $P(X(t+1)|X(t))$ can be stored thereafter and does not need to be obtained again.

Upon obtaining the state probability $P(X(t+1))=P(X(t+1)|X(t))P(X(t))$ for the node $X(t+1)$ at the next point-in-time t+1 in step S612, the recognition generating unit 515 advances to step S613, and determines whether or not there is a higher-order hierarchical level SOM (higher-order SOM) connected to the SOM of interest.

In the event that determination is made in step S613 that there is no higher-order SOM to which the SOM of interest is connected, that is to say, the SOM of interest is the highest-order hierarchical level SOM for example, step S614 is skipped, and the flow proceeds to step S615.

Also, in the event that determination is made in step S613 that that there is a higher-order SOM to which the SOM of interest is connected, the flow proceeds to step S614, the recognition generating unit 515 reads out node information representing the prediction node $Y_{win}(t+1)$ predicted to be the winning node at the next point-in-time t+1 in the higher-order SOM, from the prediction buffer of the higher-order SOM to which the SOM of interest is connected, and obtains the observation likelihood $P(X(t+1)|Y_{win}(t+1))$ that the node X(t+1) of the SOM of interest will be observed as the observation value at point-in-time t+1 at the prediction node $Y_{win}$(t+1) indicated by the node information that is predicted to be the winning node at the next point-in-time t+1 (i.e., the probability that the node X(t+1) will be the winning node at point-in-time t+1).

Further, in step S614, the recognition generating unit 515 uses the observation likelihood $P(X(t+1)|Y_{win}(t+1))$ to update state probability P(X(t+1)) of the node X(t+1) at the point-in-time t+1 (the state probability P(X(t+1))=P(X(t+1)|X(t))P(X(t)) for the node X(t+1) at the next point-in-time t+1 obtained in step S612), following the Expression $P(X(t+1))=P(X(t+1)|Y_{win}(t+1))*P(X(t+1))$.

Now, at the higher-order SOM connected to the SOM of interest, the node information representing the prediction node $Y_{win}$(t+1) predicted to be the winning node at the next point-in-time t+1 is subjected first to the processing in later-described step S615 with the higher-order SOM as the SOM of interest, and thus stored in the prediction buffer of the higher-order SOM.

Also, an arrangement can be made wherein instead of updating of the state probability P(X(t+1)) of the node X(t+1) at the point-in-time t+1 with Expression $P(X(t+1))=P(X(t+1)|Y_{win}(t+1))*P(X(t+1))$, this is updated rather with an Expression $P(X(t+1))=P(X(t+1)|Y(t+1))P(Y(t+1))*P(X(t+1))$ using the observation likelihood P(X(t+1)|Y(t+1)) that each of the nodes X(t+1) of the SOM of interest will be observed at each of all nodes Y(t+1) at the higher-order SOM.

It should be noted however, that performing updating of the state probability P(X(t+1)) of the node X(t+1) at the point-in-time t+1 with the Expression $P(X(t+1))=P(X(t+1)|Y(t+1))P(Y(t+1))*P(X(t+1))$ does improve computation precision over performing this with $P(X(t+1))=P(X(t+1)|Y_{win}(t+1))*P(X(t+1))$, the amount of computation of the observation likelihood P(X(t+1)|Y(t+1)) is great, so the overall amount of computation is great, also.

Further, the observation likelihood $P(X(t+1)|Y_{win}(t+1))$ used to update the state probability P(X(t+1)) of the node X(t+1) at point-in-time t+1, or X(t+1) serving as the observation value at P(X(t+1)|Y(t+1)), is position data (x, y) serving as node information representing the winning node of the SOM of interest, so in order to accurately calculate the observation likelihood $P(X(t+1)|Y_{win}(t+1))$ or P(X(t+1)|Y(t+1)), there is the need to have the time-sequence of the position data (x, y) of an amount equivalent to the window duration of the hierarchical level of the higher-order SOM to which the SOM of interest is connected. Accordingly, position data (x, y) of an amount equivalent to the window duration must be stored.

However, assuming the window duration of the hierarchical level of the higher-order SOM to which the SOM of interest is connected to be 1, for example, the value obtained as observation likelihood $P(X(t+1)|Y_{win}(t+1))$ or P(X(t+1)|Y(t+1)) is an approximation value, but this does away with the need to store the position data (x, y) of an amount equivalent to the window duration of the higher-order SOM to which the SOM of interest is connected.

In this case, the error between the position data (x, y) serving as node information representing the SOM of interest, and the newest sample (sample with the latest point-in-time) of the time-sequence data as prototype of the node Y(t+1) at the higher-order SOM to which the SOM of interest is connected can be used to obtain the observation likelihood $P(X(t+1)|Y_{win}(t+1))$ or P(X(t+1)|Y(t+1)), as described with FIG. 48.

Note that at the node Y(t+1) at the higher-order SOM, the observation likelihood P(X(t)|Y(t)) of the node X(t) being observed at the lower-order hierarchical level SOM connected to the higher-order SOM is not dependent on the point-in-time t, so the observation likelihood P(X(t)|Y(t)) at point-in-time t for example, and observation likelihood P(X(t+1)|Y(t+1)) at the next point-in-time t+1, are equal.

Accordingly, once the observation likelihood P(X(x)|Y(x)) is obtained, the obtained observation likelihood P(X(x)|Y(x)) can be thereafter stored and there is no need to obtain it again.

After the recognition generating unit 515 updates the state probability P(X(t+1)) of the node X(t+1) at point-in-time t+1 as described above in step S614, the flow proceeds to step S615, the node of the SOM with the highest state probability P(X(t+1)) is obtained as a prediction node, node information representing the prediction node is supplied to and stored in the prediction buffer of the SOM of interest, and the flow proceeds to step S616.

In step S616, the recognition generating unit 515 determines whether or not the SOM of interest is the lowest-order hierarchical level SOM (lowest-order SOM).

In the event that determination is made in step S616 that the SOM of interest is not the lowest-order SOM, step S617 is skipped and the flow proceeds to step S618.

Also, in the event that determination is made in step S616 that the SOM of interest is the lowest-order SOM, the flow proceeds to step s617 and the recognition generating unit 515 recognizes the prediction nodes of the lowest-order SOM, which is the SOM of interest obtained in the immediately-previous step S615, by referencing the prediction buffer of the SOM of interest. Further, in step S617, the recognition generating unit 515 generates time-sequence data from the prediction node of the SOM of interest as a prototype thereof, and of this, outputs the newest data of the shift amount (the shift amount of the window used for extracting SOM input data in increments of frames to be input to the lowest-order SOM), as prediction time-sequence data, and the flow proceeds to step S618.

In step S618, the recognition generating unit 515 determines whether or not the processing of steps S611 through S617 has been performed on all SOMs of the hierarchical SOM.

In step S618, in the event that determination has been made that the processing has not been performed on all SOMs of the hierarchical SOM, i.e., in the event that there still is a SOM in the SOMs of the hierarchical SOM which has not yet been selected as the SOM of interest, the flow returns to step S610, and the recognition generating unit 515 selects, from SOMs in the hierarchical SOM which have not yet been taken as a SOM of interest, the SOM first discovered in the order from the higher-order hierarchical level toward the lower-order hierarchical level, as the SOM of interest, and subsequently the same processing is repeated.

Also, in the event that determination is made in step S618 that the processing has been performed on all SOMs of the hierarchical SOM, i.e., in the event that there is no SOM in the SOMs of the hierarchical SOM which has not yet been selected as the SOM of interest, the flow proceeds to step S619, where the recognition generating unit 515 updates the state probability P(X(t)) of the SOM at the point-in-time t to the state probability P(X(t+1)) at point-in-time t+1 obtained at step S614 with that SOM as the SOM of interest (in the case of the highest-order hierarchical level SOM, the state probability of the point-in-time t+1 obtained in step S612), for each of the SOMs, and the flow proceeds to step S620.

In step S620, the recognition generating unit 515 determines whether or not a new sample value of the input time-sequence data has been supplied from the data extracting unit 512. In the event that determination is made in step S620 that a new sample value of the input time-sequence data has been supplied from the data extracting unit 512 to the recognition generating unit 515, the flow returns to step S602, and the recognition generating unit 515 supplies the new sample value of the input time-sequence data that has been supplied from the data extracting unit 512 to the input buffer of the lowest-order hierarchical level SOM so as to be stored, and subsequently repeats the same processing.

Also, in the event that determination is made in step S620 that a new sample value of the input time-sequence data has been not supplied from the data extracting unit 512 to the recognition generating unit 515, the recognition generating unit 515 ends the processing.

Chapter 8: Implementation by Particle Filter

In the event that there is a great number of SOM nodes making up a hierarchical SOM, a great amount of computation is necessary for the recognition generating processing for calculating the state probability for all nodes, as described with FIG. 49.

Now, the amount of computation of recognition generating processing can be reduced by applying a particle filter to the SOMs making up the hierarchical SOM and obtaining the state probability thus.

A particle filter is a probability calculation technique based on the Monte Carlo method, and does not have state probability for all states, but an increment called a particle represents one state, and holds the state probability. The entire probability distribution is represented by the state probability of all particles.

A description of particle filters can be found in Michal Isard and Andrew Blake, "Condensation—conditional density propagation for visual tracking", Int. J. Computer Vision, 29, 1, 5-28 (1998).

An overview of recognition generating processing to which a particle filter has been applied will be described with reference to FIGS. 50 and 51.

With recognition generating processing to which a particle filter has been applied, as shown in FIG. 50, first, M particles (indicated by small circles in FIG. 50) are assigned to each SOM making up the hierarchical SOM.

That is to say, with the number of nodes of a SOM as N, the SOM is assigned M particles, which is a number smaller than the number of nodes N.

Now, if we say that the j'th particle of the M particles is s(j), the particle s(j) assigned to the SOM assumes one state $X_i(t)$ of the N nodes (states) $X_1(t), X_2(t)$, and so on through $X_N(t)$ of the SOM. We will express the state $X_i(t)$ which the particle s(j) assumes as state $X_{s(j)}(t)$.

Expressing an observation value which is the SOM input data provided to the k'th SOM #k making up the hierarchical SOM as $I_k(t)$ as described earlier, the observation likelihood $P(I_k(t) X_{s(j)}(t))$ that the observation value $I_k(t)$ provided to the SOM #k will be observed in the state $X_{s(j)}(t)$ which the particle s(j) of the SOM #k assumes can be obtained.

Further, the state probability of $P(X_{s(j)}(t))$ of the state $X_{s(j)}(t)$ which the particle s(j) assumes is updated using the observation likelihood $P(I_k(t) X_{s(j)}(t))$, and particle re-sampling (reassigning) is performed according to the state probability $P(X_{s(j)}(t))$ following updating. That is to say, particle re-sampling is performed such that the higher the state probability $P(X_{s(j)}(t))$ following updating is, the more particles are assigned.

Voting is then performed based on the particles following re-sampling, i.e., the number of particles assigned to each node (state) of the SOM #k is counted, and the node with the greatest number thereof is determined to be the winning node as to the observation value $I_k(t)$.

Subsequently, as shown in FIG. 51, the particles are moved (reassigned) in accordance with the transition probability $P(X(t+1)|X(t))$. That is to say, the particles having the state $X_i(t)$ are moved such that, the higher the transition probability $P(X_i(t+1) X(t))$ of the state $X_i(t+1)$ serving as the destination of transition is, the more particles are moved.

Further, particle re-sampling (reassignment) is performed based on the state probability $P(X_{s(j)}(t))$ of the state $X_{s(j)}(t+1)$ which the particle s(j) after moving assumes. That is to say, particle re-sampling is performed such that the higher the state probability $P(X_{s(j)}(t+1))$ is, the more particles are assigned.

Voting is then performed based on the particles following re-sampling, i.e., the number of particles assigned to each node (state) of the SOM #k is counted, and the node with the greatest number thereof is determined to be the prediction node.

Following determination of the prediction node, in the event that the SOM #k is the lowest-order hierarchical level SOM, the prediction node thereof is used to generate prediction time-sequence data.

Next, FIG. 52 illustrates the processing procedures (Algorithm 3) for recognition generating processing performed by the recognition generating unit 515 shown in FIG. 33, to which a particle filter has been applied to obtain a state probability.

In step S701, the recognition generating unit 515 uniformly assigns M particles to each SOM making up the hierarchical SOM stored in the storage unit 551. Further, with the state (node) $X_i(t)$ which the M particles each assume as state $X_{s(j)}$, the recognition generating unit 515 initializes the state probability $P(X_{s(j)}(t))$ of the particles s(j) to M/1, and the flow proceeds from step S701 to step S702.

In step S702, the recognition generating unit 515 supplies, to the input buffer of a corresponding SOM of the lowest-order hierarchical level SOMs of the hierarchical SOM stored in the storage unit 511, sample values S(t) of each of the points-in-time t of the multiple types of input time-sequence data supplied from the data extracting unit 512, so as to be stored in that input buffer, in the same way as with step S541 in FIG. 41, and the flow proceeds to step S703.

In step S703, the recognition generating unit 515 selects from SOMs in the hierarchical SOM which have not yet been taken as a SOM of interest, the SOM first discovered in the order from the lower-order hierarchical level toward the higher-order hierarchical level, as the SOM of interest, and the flow proceeds to step S704.

Now, let us say that in step S703, of the SOMs making up the hierarchical SOM, the k'th SOM #k has been selected as the SOM of interest.

In step S704, the recognition generating unit 515 determines whether or not the residue Mod(t, shift) obtained by dividing the point-in-time t by shift, which is the amount of shift, is zero, i.e., whether or not there is new SOM input data for the shift amount (the amount of shift for the hierarchical level of the SOM of interest) stored in the input buffer of the SOM #k of interest.

In step S704, in the event that determination is made that there is not yet stored new SOM input data for the shift amount in the input buffer of the SOM #k of interest, the flow returns to step S703, a new SOM of interest is selected, and subsequently the same processing is repeated.

Also, in the event that determination is made in step S704 that there has been stored new SOM input data for the shift amount in the input buffer of the SOM #k of interest, the flow proceeds to step S705, and the recognition generating unit 515 applies the window to the SOM input data stored in the input buffer of the SOM #k of interest, thereby extracting the newest SOM input data of the window duration as SOM input data at the point-in-time t.

Further, in step S705, with the SOM input data at the point-in-time t as the observation value $I_k(t)$ observed at the SOM #k of interest at the point-in-time t, the recognition generating unit 515 obtains the observation likelihood $P(I_k(t)$ $X_{s(j)}(t))$ that the observation value $I_k(t)$ will be observed at each of the M particles s(j) assigned to the SOM #k of interest, and the flow proceeds to step S706.

In step S706, the recognition generating unit 515 updates the state probabilities $P(X_{s(j)}(t))$ of each of the particles s(j) assigned to the SOM #k of interest, using the observation likelihood $P(I_k(t)|X_{s(j)}(t))$, according to the Expression $P(X_{s(j)}(t))=(P(I_k(t)|X_{s(j)}(t))P(X_{s(j)}(t))/Z$, for example.

Now, in the Expression $P(X_{s(j)}(t))=P(I_k(t)|X_{s(j)}(t))P(X_{S(j)}(t))/Z$, Z is a value for normalizing $P(I_k(t)|X_{s(j)}(t))P(X_{s(j)}(t))$, i.e., a normalization factor, and is the summation of the state probability $P(X_{s(j)}(t))$ of each of the M particles assigned to the SOM #k of interest.

After updating the state probability $P(X_{s(j)}(t))$ in step S706, the recognition generating unit 515 proceeds to step S707 and performs re-sampling of particles according to the state probability $P(X_{s(j)}(t))$ following updating.

That is to say, the recognition generating unit 515 generates random numbers which appear at a high probability proportionate to the size of the value representing the state (node) $X_i(t)$ of the SOM of interest which the particles s(j) with high state probability $P(X_{s(j)}(t))$ assume, performs this M times, and assigns the state $X_i(t)$ which the j'th random number indicates to the particle s(j), thereby newly assigning the M particles s(j) to the states (nodes) $X_i(t)$ of the SOM #k of interest.

After performing re-sampling of M particles s(j) as described above in step S707, the recognition generating unit 515 proceeds to step S708, where voting is performed based on the particles following re-sampling, i.e., the number of particles assigned to each node (state) of the SOM #k of interest is counted, and the flow proceeds to step S709.

In step S709, the recognition generating unit 515 determines the node with the greatest number of particles to be the winning node as to the observation value $I_k(t)$.

Further, in step S709, the recognition generating unit 515 supplies, as node information representing the winning node of the SOM #k of interest, position data (x, y), to the input buffer of the higher-order SOM at the hierarchical level above the SOM #k of interest and connected thereto, so as to be stored therein, and the flow proceeds to step S710.

In step S710, the recognition generating unit 515 discards (deletes) SOM input data of an amount corresponding to the shift amount from the input buffer of the SOM #k of interest, from the oldest, and the flow proceeds to step S711.

In step S711, the recognition generating unit 515 determines whether or not the processing of steps S704 through S710 has been performed on all SOMs of the hierarchical SOM.

In the event that determination is made in step S711 that the processing of steps S704 through S710 has not been performed on all SOMs of the hierarchical SOM, i.e., in the event that there still is a SOM in the SOMs of the hierarchical SOM which has not yet been selected as the SOM of interest, the flow returns to step S703, and the recognition generating unit 515 selects, from SOMs in the hierarchical SOM which have not yet been taken as a SOM of interest, the SOM first discovered in the order from the lower-order hierarchical level toward the higher-order hierarchical level, as the SOM of interest, and subsequently the same processing is repeated.

Also, in step S711, in the event that determination has been made that the processing of steps S704 through S710 has been performed on all SOMs of the hierarchical SOM, that is to say, that there are no SOMs in the SOMs of the hierarchical SOM which have not yet been selected as the SOM of interest, the recognition generating unit 515 resets the information that all SOMs have been taken as the SOM of interest, advances the flow to step S712, and selects from SOMs in the hierarchical SOM which have not yet been taken as a SOM of interest, the SOM first discovered in the order from the lower-order hierarchical level toward the higher-order hierarchical level, as the SOM of interest, and the flow proceeds to step S613.

In step S713, the recognition generating unit 515 determines, in the same way as with step S704, whether or not the residue Mod(t, shift) obtained by dividing the point-in-time t by the amount of shift, is zero, i.e., whether or not there is new SOM input data for the shift amount stored in the input buffer of the SOM of interest.

In step S713, in the event that determination is made that there is not yet stored new SOM input data for the shift amount in the input buffer of the SOM of interest, the flow returns to step S712, a new SOM of interest is selected, and subsequently the same processing is repeated.

Also, in the event that determination is made in step S713 that there has been stored new SOM input data for the shift amount in the input buffer of the SOM of interest, the flow proceeds to step S714, and the recognition generating unit 515 obtains the transition probability $P(X(t+1)|X(t))$ of the winning node to make transition from node X(t) to node X(t+1) from point-in-time t to point-in-time t+1, according to Expression (15), using the weight $w_{ij}$ of the SOM of interest.

Now, as described with FIG. 49, the transition probability $P(X(t+1)|X(t))$ does not change according to the point-in-time t, so once obtained for each SOM making up the hierarchical SOM, the obtained transition probability $P(X(t+1)|X(t))$ can be stored thereafter and does not need to be obtained again.

Further, in step S714, the recognition generating unit 515 moves (reassigns) the M particles assigned to the SOM of interest according to the transition probability $P(X(t+1)|X(t))$, and thereby obtaining the state probability $P(X_{S(j)}(t+1))$ at the next point-in-time t+1.

That is to say, the recognition generating unit 515 generates random numbers which appear at a high probability proportionate to the size of the value representing the state (node) $X_{i'}(t+1)$ to be the destination of transition regarding which the transition probability $P(X_{i'}(t+1) X(t))$ is high, and assigns the particles, assigned to the state $X_i(t)$, to the state $X_{i'}(t+1)$ indicated by the random numbers, thereby newly assigning the M particles s(j) to the states (nodes) X(t+1) of the SOM #k of interest.

Subsequently, the flow proceeds from step S714 to step S715, and in the event that there is a higher-order hierarchical level SOM (higher-order SOM) to which the SOM of interest is connected, the recognition generating unit 515 stores position data (x, y) serving as node information representing the states (nodes) $X_{s(j)}(t+1)$ which the particles s(j) following moving (transition) assume in a moving history buffer of the higher-order SOM to which the SOM of interest is connected, discards (deletes) position data (x, y) serving as node information stored in the moving history buffer, from the oldest, thereby holding a time-sequence of the position data (x, y) serving as a trail of movement of the particles on the SOM of interest, in the moving history buffer of the higher-order SOM to which the SOM of interest is connected, of an amount at least equivalent to the window duration of the hierarchical level of the higher-order SOM.

Note that the moving history buffer of the SOMs making up the hierarchical SOM is a part of the storage region of the storage unit 511 (FIG. 33), for holding the movement trails of the particles at the lower-order hierarchical level SOM connected to that SOM.

The recognition generating unit 515 then advances from step S715 to step S716, and determines whether or not there is a higher-order SOM connected to the SOM of interest.

In the event that determination is made in step S716 that there is no higher-order SOM to which the SOM of interest is connected, that is to say, the SOM of interest is the highest-order hierarchical level SOM for example, step S717 is skipped, and the flow proceeds to step S718.

Also, in the event that determination is made in step S716 that that there is a higher-order SOM to which the SOM of interest is connected, the flow proceeds to step S717, the recognition generating unit 515 reads out node information representing the prediction node $Y_{win}(t+1)$ predicted to be the winning node at the next point-in-time t+1 in the higher-order SOM, from the prediction buffer of the higher-order SOM to which the SOM of interest is connected, and obtains the observation likelihood $P(X_{s(j)}(t+1)|Y_{win}(t+1))$ that the state (node) $X_{s(j)}(t+1)$ of the particles of the SOM of interest will be observed as the observation value at point-in-time t+1 at the prediction node $Y_{win}(t+1)$ represented by the node information (i.e., the probability that the node $X_{s(j)}(t+1)$ assumed by the particles will be the winning node at point-in-time t+1).

Further, in step S717, the recognition generating unit 515 uses the observation likelihood $P(X_{s(j)}(t+1)|Y_{win}(t+1))$ to update state probability $P(X_{s(j)}(t+1))$ of particle s(j) at point-in-time t+1, following the Expression $P(X_{s(j)}(t+1))=P(X_{s(j)}(t+1))P(X_{s(j)}(t+1)|Y_{win}(t+1))$.

Now, at the higher-order SOM connected to the SOM of interest, the node information representing the prediction node $Y_{win}(t+1)$ predicted to be the winning node at the next point-in-time t+1 is subjected first to the processing in later-described step S719 with the higher-order SOM as the SOM of interest, and thus stored in the prediction buffer of the higher-order SOM.

Also, in step S717, an arrangement can be made wherein instead of updating of the state probability $P(X_{s(j)}(t+1))$ of the particle s(j) at the point-in-time t+1 with Expression $P(X_{s(j)}(t+1))=P(X_{s(j)}(t+1))P(X_{s(j)}(t+1)|Y_{win}(t+1))$, this is updated rather with an Expression $P(X_{s(j)}(t+1))=P(X_{s(j)}(t+1)(\Sigma P(X_{s(j)}(t+1)|Y_{q(m)}(t+1))P(Y_{q(m)}(t+1)))$ using the states (nodes) $Y_{q(m)}(t+1)$ which the M particles q(m) assigned to the higher-order SOM assume.

Note that the summation $\Sigma$ in the Expression $P(X_{s(j)}(t+1))=P(X_{s(j)}(t+1))(\Sigma P(X_{s(j)}(t+1)|Y_{q(m)}(t+1))P(Y_{q(m)}(t+1)))$ represents the summation of changing the variable m representing the M particles q(m) assigned to the higher-order SOM from 1 through M.

In order to accurately calculate the probability $P(X_{s(j)}(t+1)|Y_{win}(t+1))$ in Expression $P(X_{s(j)}(t+1))=P(X_{s(j)}(t+1))(P(X_{s(j)}(t+1)|Y_{win}(t+1))$, or the $P(X_{s(j)}(t+1)|Y_{q(m)}(t+1))$ in Expression $P(X_{s(j)}(t+1))=P(X_{s(j)}(t+1))(\Sigma P(X_{s(j)}(t+1)|Y_{q(m)}(t+1))P(Y_{q(m)}(t+1))$ there is the need for the position data (x, y) serving as a trail of movement of the particles assigned to the SOM of interest, of an amount equivalent to the window duration of the hierarchical level of the higher-order SOM to which the SOM of interest is connected, which is stored in the moving history buffer of the higher-order SOM to which the SOM of interest is connected, as described above.

After the recognition generating unit 515 updates the state probability $P(X(t+1))$ of the node $X(t+1)$ at point-in-time t+1 as described above in step S717, the flow proceeds to step S718, and as with step S707, performs re-sampling of M particles according to the state probability $P(X_{s(j)}(t+1))$, and the flow proceeds to step S719.

In step S719, voting is performed at the recognition generating unit 515 based on the particles following re-sampling, i.e., the number of particles assigned to each node (state) of the SOM of interest is counted, and the node with the greatest number thereof is determined to be the prediction node of the SOM of interest. Further, in step S719, the recognition generating unit 515 supplies the node information of the prediction node to the prediction buffer of the SOM of interest where it is stored, and the flow proceeds to step S720.

In step S720, the recognition generating unit 515 determines whether or not the SOM of interest is the lowest-order hierarchical level SOM (lowest-order SOM).

In the event that determination is made in step S720 that the SOM of interest is not the lowest-order SOM, step S721 is skipped and the flow proceeds to step S722.

Also, in the event that determination is made in step S720 that the SOM of interest is the lowest-order SOM, the flow proceeds to step S721, and the recognition generating unit 515 recognizes the prediction nodes of the lowest-order SOM, which is the SOM of interest obtained in the immediately-previous step S719, by referencing the prediction buffer of the SOM of interest. Further, in step S721, the recognition generating unit 515 generates time-sequence data from the prediction node of the SOM of interest as a prototype thereof, and of this, outputs the newest data of the shift amount (the shift amount of the window used for extracting SOM input data in increments of frames to be input to the lowest-order SOM), as prediction time-sequence data, and the flow proceeds to step S722.

In step S722, the recognition generating unit 515 determines whether or not the processing of steps S713 through S721 has been performed on all SOMs of the hierarchical SOM.

In step S722, in the event that determination has been made that the processing has not been performed on all SOMs of the hierarchical SOM, i.e., in the event that there still is a SOM in the SOMs of the hierarchical SOM which has not yet been selected as the SOM of interest, the flow returns to step S712, and the recognition generating unit 515 selects, from SOMs in the hierarchical SOM which have not yet been taken as a SOM of interest, the SOM first discovered in the order from the higher-order hierarchical level toward the lower-order hierarchical level, as the SOM of interest, and subsequently the same processing is repeated.

Also, in the event that determination is made in step S722 that the processing has been performed on all SOMs of the hierarchical SOM, i.e., in the event that there is no SOM in the SOMs of the hierarchical SOM which has not yet been selected as the SOM of interest, the flow proceeds to step S723, where the recognition generating unit 515 determines whether or not a new sample value of the input time-sequence data has been supplied from the data extracting unit 512. In the event that determination is made in step S723 that a new sample value of the input time-sequence data has been supplied from the data extracting unit 512 to the recognition generating unit 515, the flow returns to step S702, and the recognition generating unit 515 supplies the new sample value of the input time-sequence data that has been supplied from the data extracting unit 512 to the input buffer of the lowest-order hierarchical level SOM so as to be stored, and subsequently repeats the same processing.

Also, in the event that determination is made in step S723 that a new sample value of the input time-sequence data has not been supplied from the data extracting unit 512 to the recognition generating unit 515, the recognition generating unit 515 ends the processing.

Chapter 9: Bayesian Network Formulation

If we interpret a hierarchical SOM as a common graphical model, and ignore development along the temporal axis, the hierarchical SOM can be understood as belonging to a type of graph called a "polytree" (wherein multiple children belong to a single parent).

Also, with a hierarchical SOM, if we interpret a state (node) at point-in-time t−1 in the temporal direction as being the causative (parent) node of the state at point-in-time t, the hierarchical SOM can be comprehended as being an open-ended polytree (continuing infinitely).

A solution for a Bayesian network having a polytree configuration is described in Pearl, "Probabilistic Reasoning in Intelligent System: Network of Plausible Inference". 1988. An overview of recognition generating processing of a hierarchical SOM to which this solution has been applied is shown in FIGS. 53 and 54.

If a Bayesian network having a polytree configuration is strictly applied to a hierarchical SOM, all states must be updated back in time, but an approximation wherein belief propagation is implemented only in the forward direction from one point-in-time in the past to the current point-in-time, with the belief propagation retracing time, makes recognition generating processing relatively easy, since there are only three types of belief propagation, i.e., belief propagation of recognition ascending hierarchical levels similar to the description made with FIG. 49 regarding recognition generating processing, belief propagation of prediction of the next point-in-time, and belief propagation of estimation of lower-order hierarchical level (predicting the winning node at the next point-in-time at the lower-order hierarchical level).

Figure 55:
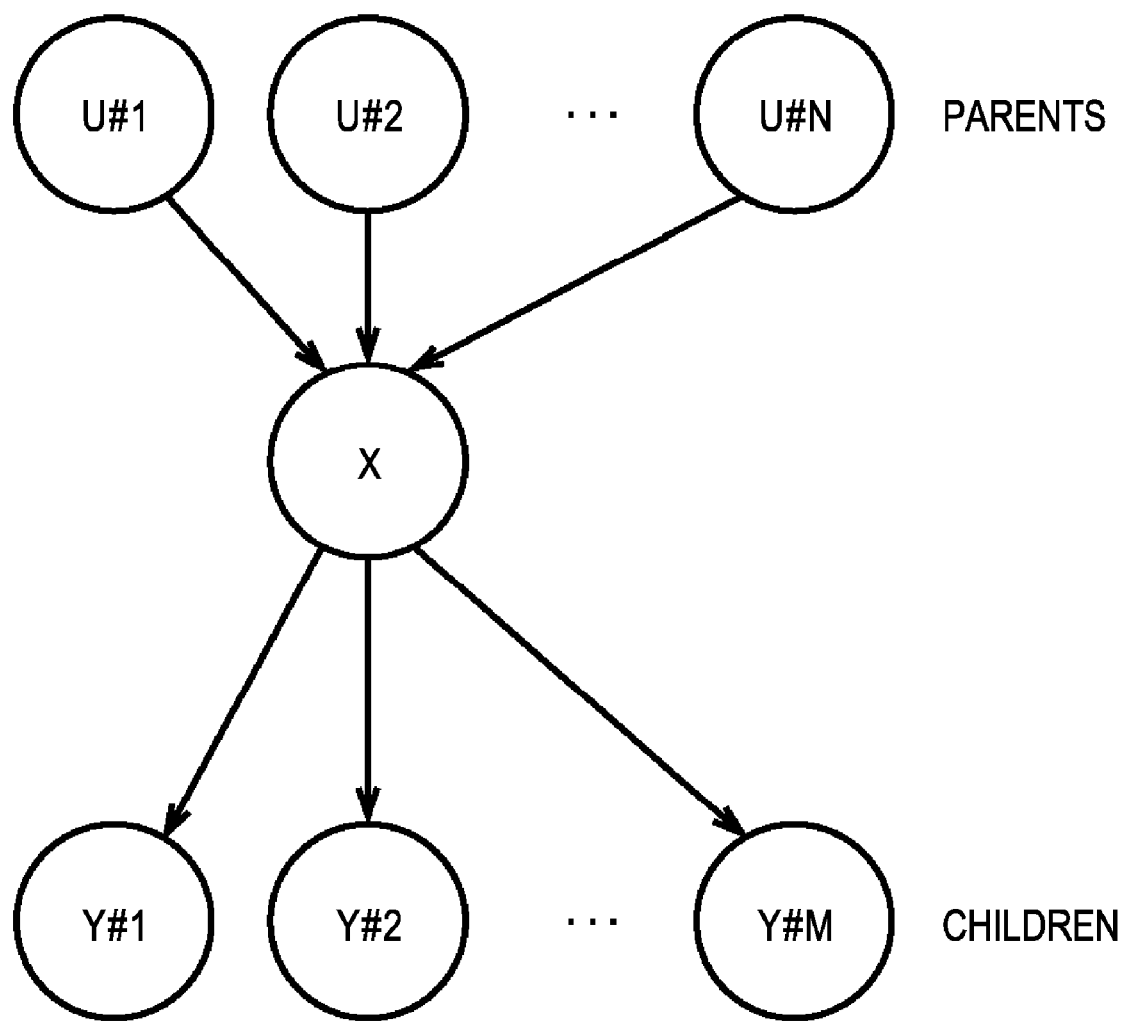
FIG. 55 is a diagram for describing a hierarchical SOM to which a Bayesian network having a polytree configuration has been applied.

FIG. 55 illustrates a hierarchical SOM to which a Bayesian network having a polytree configuration has been applied.

Taking interest in a certain SOM(X) which is one of the SOMs making of the hierarchical SOM, the m'th of the M SOMS connected to the SOM(X) of interest at the lower hierarchical level will be represented as SOM(Y#m), and the n'th of the N SOMs connected to the SOM(X) of interest at the higher hierarchical level will be represented as SOM (U#n).

As shown in FIG. 55, SOM(Y#1), SOM(Y#2), and so on through SOM(Y#M), which are the M lower-order hierarchical level SOMs (lower-order SOMs), and SOM(U#1), SOM (U#2), and so on through SOM(U#N), which are the N higher-order hierarchical level SOMs (higher-order SOMs), are connected to the SOM(X) of interest.

From the SOM(X) of interest, the SOMs(U#n) at the higher hierarchical level are parents, and the SOMs(Y#n) at the lower hierarchical level are children.

FIG. 56 illustrates messages exchanged between SOMs (more particularly, the nodes thereof) making up the hierarchical SOM to which a Bayesian network having a polytree configuration has been applied.

In FIG. 56, the heavy arrows indicate the direction of cause-and-effect (from cause to effect). Messages propagated in the same direction as the direction of cause-and-effect are called π messages, and messages propagated in the direction opposite to the direction of cause-and-effect are called λ messages.

In FIG. 56, messages exchanged at the SOM(X(t)) of interest at point-in-time t include $\pi_{X(t-1)}(X(t))$, $\pi_{X(t)}(X(t+1))$, $\pi_{U\#1(t)}(X(t))$, $\pi_{X(t)}(Y\#m(t))$, $\lambda_{X(t)}(U\#1(t))$, $\lambda_{Y\#m}(t)(X(t))$, and so forth.

The message $\pi_{X(t-1)}(X(t))$ is a π message from a node at the SOM(X(t−1)) of interest at point-in-time t−1, to a node at the SOM(X(t)) of interest at point-in-time t, and message $\pi_{X(t)}(X(t+1))$ is a π message from a node at the SOM(X(t)) of interest at point-in-time t, to a node at the SOM(X(t+1)) of interest at point-in-time t+1.

Also, message $\pi_{U\#1(t)}(X(t))$ is a π message from a node at the SOM(U#1(t)) at point-in-time t which is a higher-order SOM (parent SOM) to a node at the SOM(X(t)) of interest, at point-in-time t, and message $\pi_{X(t)}(Y\#m(t))$ is a π message from a node at the SOM(X(t)) of interest at point-in-time t to a node at the SOM(Y#m(t)) at point-in-time t which is a lower-order SOM (child SOM).

Further, message $\lambda_{X(t)}(U\#1(t))$ is a λ message from a node at the SOM(X(t)) of interest at the point-in-time t to a node at the SOM(U#1(t)) at point-in-time t which is a higher-order SOM, and message $\lambda_{Y\#m(t)}(X(t))$ is a λ message from a node at the SOM(Y#m(t)) at point-in-time t which is a lower-order SOM to a node at the SOM(X(t)) of interest at point-in-time t.

With the recognition generating processing to which the solution of the Bayesian network using λ message and π messages is applied to a hierarchical SOM, the belief probability BEL(X) of each of the nodes of the SOM(X) of interest is obtained according to Expression (16).

$$BEL(X) = a\lambda(X)\pi(X) \tag{16}$$

Now, in Expression (16), λ(X) is a value called the λ value of the SOM(X) of interest, and is obtained by multiplying all of the messages $\lambda_{Y\#m}(X)$ from the lower-order SOMs (Y#m) to the SOM(X) of interest, according to Expression (17).

$$\lambda(X) = \prod_m \lambda_{Y\#m}(X) \tag{17}$$

Further, in Expression (16), π (X) is a value called the π value of the SOM(X) of interest, and is obtained by employing the messages $\pi_X(U\#m)$ from the higher-order SOMs (U#n) to the SOM(X) of interest, according to Expression (18).

$$\pi(X) = \sum_{U\#1,\ldots,U\#N} P(X \mid U\#1, \ldots, U\#N) \prod_n \pi_X(U\#n) \tag{18}$$

Also, in Expression (16), "a" is a normalization term for normalizing the belief probability BEL(X), and as shown in Expression (19), is set such that the summation of the belief probability BEL(X) of all nodes of the SOM(X) of interest is 1.

$$\sum_X BEL(X) = 1 \tag{19}$$

Further, with the recognition generating processing to which the solution of the Bayesian network is applied, a message $\lambda_X(U\#n)$ which is a λ message from the SOM(X) of interest to a higher-order SOM(U#n) is obtained from Expression (20), and a message $\pi_X(Y\#m)$ which is a $\pi$ message from the SOM(X) of interest to a lower-order SOM (Y#m) is obtained from Expression (21).

$$\lambda_X(U\#n) = b \sum_X \lambda(X) \sum_{U\#n':n'\neq n} P(X \mid U\#1, \ldots, U\#N) \prod_{n'\neq n} \pi_X(U\#n') \quad (20)$$

$$\pi_X(Y\#m) = a \left[ \prod_{m'\neq m} \lambda_{Y\#m'}(X) \right] \sum_{U\#1,\ldots,U\#N} P(X \mid U\#1, \ldots, U\#N) \prod_n \pi_X(U\#n) \quad (21)$$

$$= a \frac{BEL(X)}{\lambda_{Y\#m}(X)}$$

Chapter 10: Implementation by $\lambda \cdot \pi$ Messages

FIG. 57 illustrates processing procedures (Algorithm 4) for recognition generating processing of a hierarchical SOM to which the solution of a Bayesian network having a polytree configuration has been applied, carried out by the recognition generating unit 515 shown in FIG. 33.

In step S801, the recognition generating unit 515 initializes the $\lambda$ messages and $\pi$ messages of each of the nodes of the SOMs making up the hierarchical SOM stored in the storage unit 511 to a uniform distribution, and the flow proceeds to step S802.

In step S802, the recognition generating unit 515 supplies, to the input buffer of a corresponding SOM of the lowest-order hierarchical level SOMs of the hierarchical SOM stored in the storage unit 511, sample values S(t) of each of the points-in-time t of the multiple types of input time-sequence data supplied from the data extracting unit 512, so as to be stored in that input buffer, in the same way as with step S541 in FIG. 41, and the flow proceeds to step S803.

In step S803, the recognition generating unit 515 selects from SOMs in the hierarchical SOM which have not yet been taken as a SOM of interest, the SOM first discovered in the order from the lower-order hierarchical level toward the higher-order hierarchical level, as the SOM of interest, and the flow proceeds to step S804.

In step S804, the recognition generating unit 515 determines whether or not the residue Mod(t, shift) obtained by dividing the point-in-time t by shift, which is the amount of shift, is zero, i.e., whether or not there is new SOM input data for the shift amount stored in the input buffer of the SOM of interest.

In step S804, in the event that determination is made that there is not yet stored new SOM input data for the shift amount in the input buffer of the SOM of interest, step S805 is skipped, and the flow proceeds to step S806.

Also, in the event that determination is made in step S804 that there has been stored new SOM input data for the shift amount in the input buffer of the SOM of interest, the flow proceeds to step S805, and the recognition generating unit 515 applies the window to the SOM input data stored in the input buffer of the SOM of interest, thereby extracting the newest SOM input data of the window duration as SOM input data at the point-in-time t.

Further, in step S805, with the SOM input data at the point-in-time t as the observation value I(t) observed at the SOM of interest at the point-in-time t, the recognition generating unit 515 obtains the observation likelihood P(I(t)|X(t)) that the observation value I(t) will be observed at each of the N nodes X(t) of the SOM of interest, as the $\lambda$ value ($\lambda(X(t))$) of each node of the SOM of interest, following Expression (22), and the flow proceeds to step S806.

$$\lambda(X(t)) = P(I(t) \mid X(t)) \quad (22)$$

In step S806, determination is made by the recognition generating unit 515 regarding whether or not no new SOM input data of an amount equivalent to the shift amount has been stored in the input buffer of the SOM of interest, and also that there is a lower-order SOM to which the SOM of interest is connected.

In the event that the result of the determination is step S806 regarding whether or not no new SOM input data of an amount equivalent to the shift amount has been stored in the input buffer of the SOM of interest, and also that there is a lower-order SOM to which the SOM of interest is connected, is false, step S807 is skipped, and the flow proceeds to step S808.

Also, in the event that determination is made in step S806 that no new SOM input data of an amount equivalent to the shift amount has been stored in the input buffer of the SOM of interest, and that there is a lower-order SOM to which the SOM of interest is connected, the flow proceeds to step S807, where the recognition generating unit 515 obtains the $\lambda$ value of the SOM of interest ($\lambda(X(t))$), by multiplying all of the $\lambda$ messages ($\lambda_{Y\#m}(X(t))$) from the lower-order SOMs (Y#m(t)) to which the SOM of interest is connected to the nodes X(t) of the SOM of interest, according to Expression (23).

$$\lambda(X(t)) = \prod_m \lambda_{Y\#m(t)}(X(t)) \quad (23)$$

In step S808, in the event that there is no new SOM input data of an amount equivalent to the shift amount has been stored in the input buffer of the SOM of interest, and that there is a lower-order SOM to which the SOM of interest is connected, the recognition generating unit 515 takes the $\lambda$ value of the SOM of interest ($\lambda(X(t))$) to be 1, according to Expression (24), and the flow proceeds to step S809.

$$\lambda(X(t)) = 1 \quad (24)$$

In step S809, the recognition generating unit 515 uses the time sequence of the $\lambda$ value ($\lambda(X(t))$) of the window duration for the hierarchical level of the higher-order SOM(U) to which the SOM of interest is connected, to obtain the $\lambda$ messages to the higher-order SOM(U) ($\lambda_X(U)$) according to Expression (25), and the flow proceeds to step S810.

$$\lambda_X(U) = b \prod_w^W P(X \mid U)^T \lambda(X(t-w)) \quad (25)$$

In Expression (25), b is a normalization term, and W is the window duration of the window for the hierarchical level of the higher-order SOM(U) to which the SOM of interest is connected.

In step S810, the recognition generating unit 515 stores the newest λ value (λ(X(t))) of the SOM of interest by a duration equal to the window duration of the window for the hierarchical level of the higher-order SOM(U) to which the SOM of interest is connected, in the storage unit 511, deletes other old λ values (λ(X(t))), and the flow proceeds to step S811.

In step S811, the recognition generating unit 515 determines whether or not the processing of steps S803 through S810 has been performed on all SOMs of the hierarchical SOM.

In the event that determination is made in step S811 that the processing of steps S803 through S810 has not been performed on all SOMs of the hierarchical SOM, i.e., in the event that there still is a SOM in the SOMs of the hierarchical SOM which has not yet been selected as the SOM of interest, the flow returns to step S803, and the recognition generating unit 515 selects, from SOMs in the hierarchical SOM which have not yet been taken as a SOM of interest, the SOM first discovered in the order from the lower-order hierarchical level toward the higher-order hierarchical level, as the SOM of interest, and subsequently the same processing is repeated.

Also, in step S811, in the event that determination has been made that the processing of steps S803 through S810 has been performed on all SOMs of the hierarchical SOM, that is to say, that there are no SOMs in the SOMs of the hierarchical SOM which have not yet been selected as the SOM of interest, the recognition generating unit 515 resets the information that all SOMs have been taken as the SOM of interest, advances the flow to step S812, and selects from SOMs in the hierarchical SOM which have not yet been taken as a SOM of interest, the SOM first discovered in the order from the lower-order hierarchical level toward the higher-order hierarchical level, as the SOM of interest, and the flow proceeds to step S813.

In step S813, the recognition generating unit 515 determines whether or not the residue Mod(t, shift) obtained by dividing the point-in-time t by the shift, which is the amount of shift, is zero, i.e., whether or not there is new SOM input data for the shift amount stored in the input buffer of the SOM of interest.

In step S813, in the event that determination is made that there is not yet stored new SOM input data for the shift amount in the input buffer of the SOM of interest, the flow returns to step S812, a new SOM of interest is selected, and subsequently the same processing is repeated.

Also, in the event that determination is made in step S813 that there has been stored new SOM input data for the shift amount in the input buffer of the SOM of interest, the flow proceeds to step S814, and the recognition generating unit 515 obtains the transition probability P(X(t+1)|X(t)) of the winning node to make transition from node X(t) to node X(t+1) from point-in-time t to the next point-in-time t+1, using the weight $w_{ij}$ of the SOM of interest.

Further, in step S814, the recognition generating unit 515 obtains $\pi_1$, which is the π value, using the SOM of interest at point-in-time t−1, i.e., one point-in-time ago, from the transition probability P(X(t+1)|X(t)) and the π messages ($\pi_{X(t-1)}$(X(t))) from the SOM of interest at point-in-time t−1 to the SOM of interest at the current point-in-time, in accordance with Expression (26).

$$\pi_1 = P(X(t)|X(t-1))\pi_{X(t-1)}(X(t)) \tag{26}$$

Thereafter, the flow proceeds from step S814 to step S815, where, in the event that there is a higher-order SOM to which the SOM of interest is connected, and the point-in-time t is the timing at which the winning node is obtained at the higher-order SOM (i.e., the firing timing), the recognition generating unit 515 obtains $\pi_2$, which is the π value from the node U(t) of the higher-order SOM, using the observation likelihood (PX|U) that the position data (x, y) serving as node information representing the node which is the winning node at the SOM of interest will be observed at the node U of the higher-order SOM, and π messages ($\pi_{U(t)}$(X(t))) from the node (t) of the higher-order SOM to the node X(t) of the SOM of interest X(t), in accordance with Expression (27).

$$\pi_2 = P(X|U)\pi_{U(t)}(X(t)) \tag{27}$$

The flow then proceeds from step S815 to step S816, where the recognition generating unit 515 uses the $\pi_1$ obtained with expression (26) and the $\pi_2$ obtained with expression (27) to obtain the π value (π(X(t))) of the SOM of interest, in accordance with Expression (28), and the flow proceeds to step S817.

$$\pi(X(t)) = \pi_1 * \pi_2 \tag{28}$$

In step S817, the recognition generating unit 515 uses the λ value (λ(X(t))) obtained with one of Expressions (22) through (24), and the πvalue (π(X(t))) obtained with Expression (28), to obtain the state probability BEL of the nodes of the SOM of interest at point-in-time t, in accordance with Expression (29) and the flow proceeds to step S818.

$$BEL = a\lambda(X(t))\pi(X(t)) \tag{29}$$

In step S818, the recognition generating unit 515 follows Expression (30) to take the state probability BEL of the nodes of the SOM of interest at point-in-time t obtained with Expression (29) as π messages ($\pi_{X(t)}$(X(t+1))) from the node X(t) of the SOM of interest at point-in-time t to the node X(t+1) of the SOM of interest at point-in-time t+1, and the flow proceeds to step S819.

$$\pi_{X(t)}(X(t+1)) = BEL \tag{30}$$

In step S819, the recognition generating unit 515 follows Expression (31) to take the state probability BEL of the nodes of the SOM of interest at point-in-time t, multiplied by the normalization term a, and divide this with the λ messages ($\lambda_{Y\#m}$(X(t))) from the node Y#m(t) of the lower-order SOM connected to the SOM of interest to the node X(t) of the SOM of interest, thereby obtaining the π messages ($\pi_{X(t)}$(Y#m(t))) from the node x(t) of the SOM of interest at point-in-time t to the node Y#m(t) of the lower-order SOM, and the flow proceeds to step S820.

$$\pi_{X(t)}(Y\#m(t)) = \frac{aBEL}{\lambda_{Y\#m}(X(t))} \tag{31}$$

In step S820, in the event that the SOM of interest is the lowest-order hierarchical level SOM (lowest-order SOM), the recognition generating unit 515 uses the transition probability P(X(t+1)|X(t)), and π messages ($\pi_{X(t)}$(X(t+1))) from the node X(t) of the SOM of interest at point-in-time t to the node X(t+1) of the SOM of interest at point-in-time t+1 to obtain the state prediction probability $P_{prev}$, according to Expression (32), and the flow proceeds to step S821.

$$P_{prev} = P(X(t+1)|X(t))\pi_{X(t)}(X(t+1)) \tag{32}$$

In step S821, the recognition generating unit 515 obtains, of the nodes of the SOM of interest which is the lowest-order SOM, the node with the highest state prediction probability $P_{prev}$, as the prediction node, and advances to step S822.

In step S822, the recognition generating unit 515 generates time-sequence data as a prototype from the prediction node of the SOM of interest, and of this, outputs the newest data of an amount equivalent to the shift amount (the shift amount of the window used for extracting SOM input data in increments of frames input to the lowest-order SOM) as prediction time-sequence data, and the flow proceeds to step S823.

In step S823, the recognition generating unit 515 determines whether or not the processing of steps S813 through S822 has been performed on all SOMs of the hierarchical SOM.

In step S823, in the event that determination has been made that the processing has not been performed on all SOMs of the hierarchical SOM, i.e., in the event that there still is a SOM in the SOMs of the hierarchical SOM which has not yet been selected as the SOM of interest, the flow returns to step S812, and the recognition generating unit 515 selects, from SOMs in the hierarchical SOM which have not yet been taken as a SOM of interest, the SOM first discovered in the order from the higher-order hierarchical level toward the lower-order hierarchical level, as the SOM of interest, and subsequently the same processing is repeated.

Also, in the event that determination is made in step S823 that the processing has been performed on all SOMs of the hierarchical SOM, i.e., in the event that there is no SOM in the SOMs of the hierarchical SOM which has not yet been selected as the SOM of interest, the flow proceeds to step S824, where the recognition generating unit 515 determines whether or not a new sample value of the input time-sequence data has been supplied from the data extracting unit 512. In the event that determination is made in step S824 that a new sample value of the input time-sequence data has been supplied from the data extracting unit 512 to the recognition generating unit 515, the flow returns to step S802, and the recognition generating unit 515 supplies the new sample value of the input time-sequence data that has been supplied from the data extracting unit 512 to the input buffer of the lowest-order hierarchical level SOM so as to be stored, and subsequently repeats the same processing.

Also, in the event that determination is made in step S824 that a new sample value of the input time-sequence data has been not supplied from the data extracting unit 512 to the recognition generating unit 515, the recognition generating unit 515 ends the processing.

Thus, large-scale learning can be performed in a practical manner with hierarchical SOMs. Also, performing learning using multiple self-organization maps (SOMs) in a hierarchical manner for each of various sensor/control signals enables simple local calculation of the various types of signals to be consequently reconstructed as an integrated prediction.

That is to say, performing self-organizing learning of SOMS making up a hierarchical SOM wherein multiple SOMs are connected so as to form a hierarchical structure, using a time-sequence of node information representing the winning node of a lower-order SOM which is a lower-order hierarchical level SOM of that SOM, as SOM input data, enables time-sequence data to be assigned for learning to each SOM at the lowest-order hierarchical level of the hierarchical SOM, and also enables learning for correlating the lowest-level hierarchical level SOMs at SOMs at a higher level. Consequently, large-scale learning such as learning of multiple types or great numbers of time-sequence data, or time-sequence data of multi-dimensional vectors, can be performed at a practical level.

Further, time-sequence data is assigned to each SOM at the lowest-order hierarchical level of the hierarchical SOM and learning is performed, and also, learning for correlating the lowest-order hierarchical level SOMs is performed at SOMs at a higher level, and consequently, all of the time-sequence data input to each of the lowest-order hierarchical level SOMs can be taken comprehensively, so as to generate prediction time-sequence data predicting the time-sequence data at the next point-in-time.

Note that weight vectors can be assigned to the nodes of the new SOMs making up the hierarchical SOM, as with known SOMs, instead of the time-sequence pattern model 21 (FIG. 7). In this case, the winning node will be obtained according to Expression (33).

$$c = \underset{i}{\mathrm{argmin}} |x - m_i| \qquad (33)$$

In Expression (33), x represents a vector (input vector) having as the components thereof sample values of SOM input data in increments of frames. Also, $m_i$ represents a weight vector assigned to the i'th node #i of the new SOM.

According to Expression (33), the node #c with the node No. #c, which has the shortest Euclidian distance $|x-m_i|$ between the end point of the input vector x and the weight vector $m_i$, can be obtained as a winning node.

Also, with self-organizing learning of a new SOM to which vectors have been assigned to the nodes, updating of the weight vector of each node #i is performed according to Expression (34).

$$m_i(t+1) = m_i(t) + h_{ci}(t)[x(t) - m_i(t)] \qquad (34)$$

Now, in Expression (34), $m_i(t+1)$ represents a weight vector after updating of the node #i (point-in-time t+1), and $m_i(t)$ represents a weight vector before updating of the node #i (point-in-time t). Also, x(t) represents an input vector at point-in-time t. Further, $h_{ci}(t)$ is a function expressed by Expression (35).

$$h_{ci}(t) = \alpha(t) \cdot \exp\left(-\frac{|r_c - r_i|}{2\sigma^2(t)}\right) \qquad (35)$$

In Expression (35), $\alpha(t)$ is a learning coefficient which monotonically decreases as points-in-time t passes (number of times of learning). Also, $\sigma(t)$ is a coefficient which monotonically decreases as points-in-time t passes, and is known as kernel width. Further, $r_c$ is a position vector indicating the position of a winning node as to the input vector x(t) at point-in-time t, and $r_i$ is a position vector indicating the position of a node #i to which the weight vector $m_i(t)$ to be updated is assigned.

Next, the above-described series of processing can be carried out with dedicated hardware, or with software. In the event of performing the series of processing by software, the program configuring the software is installed in a general-use computer, micro-computer (controller), etc.

FIG. 58 illustrates a configuration example of an embodiment of the computer to which a program for executing the above-described series of processing is installed.

The program may be stored in a hard disk 10105 or ROM 10103 serving as a recording medium, built into the computer, beforehand.

Or, the program may be temporarily or permanently stored (recorded) in a removable recording medium 10111 such as a flexible disk, CD-ROM (Compact Disc Read Only Memory), MO (magneto-optical) disk, DVD (Digital Versatile Disc), magnetic disk, semiconductor memory, or the like. Such removable recording media 10111 can be provided as so-called packaged software.

Note that the program is not restricted to being installed to a computer from a removable recording medium 10111 such as described above, by may also be wirelessly transmitted to the computer from a download site via a digital satellite broadcasting satellite, or transmitted to the computer by cable via a network such as the Internet or the like. At the computer, the program transferred thereto in this way can be received with a communication unit 10108 and installed in the built-in hard disk 10105.

The computer has built in a CPU (Central Processing Unit) 10102. The CPU 10102 is connected via a bus 10101 to an input/output interface 10110, and upon commands being input via the input/output interface 10110 by a user operating an input unit 10107 made up of a keyboard, mouse, microphone, or the like, the CPU 10102 executes the programs stored in ROM (Read Only Memory) 10103 in accordance therewith. Also, the CPU 10102 loads to RAM (Random Access Memory) 10104 the program stored in the hard disk 10105, the program transmitted by satellite or network and received at the reception unit 10108 and installed in the hard disk 10105, or the program read out from the removable recording medium 10111 mounted to a drive 10109 and installed to the hard disk 10105, and executes the program. Thus, the CPU 10102 performs processing according to the above-described flowcharts, or processing performed according to the configuration of the above-described block diagrams. The CPU 10102 further outputs the processing results from an output unit 10106 configured of an LCD (Liquid Crystal Display) or speakers or the like, for example, via the input/output interface 10111, or transmits the processing results from the communication unit 10108, or further records the processing results in the hard disk 10105 or the like, as necessary.

Note that in the present specification, the processing steps described in the program for causing a computer to perform the various types of processing do not necessarily need to be performed in the time-sequence described in the flowcharts, and processing executed in parallel or individually is also encompassed in the scope of the present invention (e.g., parallel processing, or object-oriented processing).

Also, the program may be processed with a single computer, or may be processed in a scattered manner with multiple computers. Further, the program may be transferred to and executed at a remote computer.

Also, it should be noted that motor data includes not only data for driving the motor, but a broad range of data for driving devices externally acting or devices providing external stimuli. Examples of devices acting externally or devices providing external stimuli include a display for displaying images by emitting light, a speaker for outputting audio, and so forth, and accordingly motor data includes, besides data for driving motors, image data corresponding to images to be displayed on a display, audio data corresponding to audio to be output from a speaker, and so forth.

It should be understood by those skilled in the art that various modifications, combinations, sub-combinations and alterations may occur depending on design requirements and other factors insofar as they are within the scope of the appended claims or the equivalents thereof.

What is claimed is:

1. A data processing device for processing time-sequence data, said data processing device comprising:
    learning means for performing self-organizing learning of a SOM (self-organization map) making up a hierarchical SOM in which a plurality of SOMs are connected so as to construct a hierarchical structure, using, as SOM input data which is input to said SOM, a time-sequence of node information representing a winning node of a lower-order SOM which is at a lower hierarchical level from said SOM,
    wherein said learning means performs
        self-organizing learning of a SOM making up said hierarchical SOM using SOM input data, and
        prediction learning which updates so as to intensify a weighting which represents the degree of jointing between
            a winning node of a SOM as to SOM input data of a predetermined frame length and
            a winning node of a SOM as to SOM input data of said predetermined frame length at the next point-in-time.

2. The data processing device according to claim 1, wherein self-organizing learning and prediction learning of a SOM of interest of the plurality of SOMs making up said hierarchical SOM is performed using a time-sequence of node information representing a winning node of a lower-order SOM which is at a lower hierarchical level from said SOM.

3. The data processing device according to claim 2, wherein a plurality of lower-order SOMs are connected to said SOM of interest;
    and wherein said learning means perform self-organizing learning and prediction learning of the SOM of interest using, as SOM input data, a time-sequence wherein is integrated said node information obtained from each of the plurality of lower-order SOMs connected to said SOM of interest.

4. The data processing device according to claim 2, further comprising
    recognition generating means for generating prediction time-sequence data predicting time-sequence data of a point-in-time subsequent to time-sequence data at a certain point-in-time, using said hierarchical SOM regarding which self-organizing learning and prediction learning has been performed.

5. The data processing device according to claim 4, wherein said recognition generating means
    in an order from a lower hierarchical level toward a higher hierarchical level
        obtain a node which is a winning node for each SOM of said hierarchical SOM;
    in an order from a higher hierarchical level toward a lower hierarchical level
        obtain a prediction node, which is a node predicted to serve as the winning node in the subsequent point-in-time, based on said weight of said winning node for SOMs regarding which there is no higher order SOM which is a higher order hierarchical level SOM, and
        obtain a prediction node based on said weight of said winning node and a prediction node of the higher order SOM for SOMs regarding which there is a higher order SOM; and
    generate said prediction time-sequence data using, of the plurality of SOMs making up said hierarchical SOM, the prediction node of the lowest hierarchical level.

6. The data processing device according to claim 4, wherein said recognition generating means obtain a node to be a winning node in a SOM, in an order from a lower hierarchical level toward a higher hierarchical level, and take a time-sequence of node information representing said winning node as SOM input data to a higher order SOM which is a SOM of a higher hierarchical level;

and obtain a prediction node which is a node of a SOM predicted to be a winning node at the next point-in-time, in an order from a higher hierarchical level toward a lower hierarchical level, based on a prediction node of a higher order SOM of said SOM.

7. The data processing device according to claim 6, wherein said recognition generating means further obtain a transition probability which is a probability that a winning node makes transition in a SOM, based on said weight;

and obtain a prediction node of the SOM of interest, based on said transition probability of the SOM of interest and a prediction node of a higher order SOM of said SOM.

8. The data processing device according to claim 7, wherein said recognition generating means in an order from a lower hierarchical level toward a higher hierarchical level obtain an observation likelihood that SOM input data will be observed in a node of a SOM making up said hierarchical SOM, obtain a state probability at the current point-in-time, which represents the probability that a node of a SOM is a winning node, based on said observation likelihood, obtain the winning node of a SOM, based on said state probability at the current point-in-time, and take a time-sequence of node information representing a winning node of the SOM of interest as SOM input data to a higher order SOM of the SOM of interest;

in an order from a higher hierarchical level toward a lower hierarchical level obtain a transition probability of the SOM of interest using said weight, obtain a transition probability of the next point-in-time, based on the transition probability of the SOM of interest and a prediction node of a higher order SOM to said SOM of interest, and obtain a prediction node of said SOM of interest based on said state probability at the subsequent point-in-time; and generate said prediction time-sequence data using, of the plurality of SOMs making up said hierarchical SOM, the prediction node of the lowest hierarchical level.

9. The data processing device according to claim 8, wherein said recognition generating means obtain said state probability by applying a particle filter to a SOM making up said hierarchical SOM.

10. The data processing device according to claim 2, wherein the higher the hierarchical level SOM that said SOM input data of a predetermined length is used at is, the longer the time-wise length of said input data is.

11. The data processing device according to claim 4, wherein said recognition generating means obtain a prediction node of the SOM of the lowest hierarchical level of the plurality of SOMs making up said hierarchical SOM, by applying to said hierarchical SOM a Bayesian network solution using a λ message and a π message, and using the prediction node to generate said prediction time-sequence data.

12. A data processing method for processing time-sequence data, said method comprising the step of:

performing self-organizing learning of a SOM (self-organization map) making up a hierarchical SOM in which a plurality of SOMs are connected so as to construct a hierarchical structure, using, as SOM input data which is input to said SOM, a time-sequence of node information representing a winning node of a lower-order SOM which is at a lower hierarchical level from said SOM; and performing prediction learning which updates so as to intensify a weighting which represents the degree of jointing between a winning node of a SOM as to SOM input data of a predetermined frame length and a winning node of a SOM as to SOM input data of said predetermined frame length at the next point-in-time.

13. A program, tangibly embodied in a computer-readable storage medium, for causing a computer to execute data processing for processing time-sequence data, said program comprising the step of:

performing self-organizing learning of a SOM (self-organization map) making up a hierarchical SOM in which a plurality of SOMs are connected so as to construct a hierarchical structure, using, as SOM input data which is input to said SOM, a time-sequence of node information representing a winning node of a lower-order SOM which is at a lower hierarchical level from said SOM; and performing prediction learning which updates so as to intensify a weighting which represents the degree of jointing between a winning node of a SOM as to SOM input data of a predetermined frame length and a winning node of a SOM as to SOM input data of said predetermined frame length at the next point-in-time.

14. A data processing device for processing time-sequence data, said data processing device comprising:

storage means for storing a hierarchical SOM in which a plurality of SOMs are connected so as to construct a hierarchical structure; and recognition generating means for generating prediction time-sequence data wherein time-sequence data at a point-in-time subsequent to time-sequence data at a certain point in time is predicted, using said hierarchical SOM.

15. The data processing device according to claim 14, wherein said hierarchical SOM stored in said storage means is a hierarchical SOM obtained by performing self-organizing learning of a SOM making up said hierarchical SOM, using SOM input data which is input to the SOM, and prediction learning which updates so as to intensify a weighting which represents the degree of jointing between a winning node of a SOM as to SOM input data of a predetermined frame length and a winning node of a SOM as to SOM input data of said predetermined frame length at the next point-in-time; and wherein self-organizing learning and prediction learning of a SOM of interest of the plurality of SOMs making up said hierarchical SOM is performed using a time-sequence of node information representing a winning node of a lower-order SOM which is at a lower hierarchical level from said SOM.

16. The data processing device according to claim 15, wherein said recognition generating means in an order from a lower hierarchical level toward a higher hierarchical level
obtain a node which is a winning node for each SOM of said hierarchical SOM;

in an order from a higher hierarchical level toward a lower hierarchical level
obtain a prediction node, which is a node predicted to serve as the winning node in the subsequent point-in-time, based on said weight of said winning node for SOMs regarding which there is no higher order SOM which is a higher order hierarchical level SOM, and
obtain a prediction node based on said weight of said winning node and a prediction node of the higher order SOM for SOMs regarding which there is a higher order SOM in hierarchical SOM; and generate said prediction time-sequence data using, of the plurality of SOMs making up said hierarchical SOM, the prediction node of the lowest hierarchical level.

17. The data processing device according to claim 15, wherein said recognition generating means obtain a node to be a winning node in a SOM, in an order from a lower hierarchical level toward a higher hierarchical level, and take a time-sequence of node information representing said winning node as SOM input data to a higher order SOM which is a SOM of a higher hierarchical level;

and obtain a prediction node which is a node of a SOM predicted to be a winning node at the next point-in-time, in an order from a higher hierarchical level toward a lower hierarchical level, based on a prediction node of a higher order SOM of said SOM.

18. The data processing device according to claim 17, wherein said recognition generating means further obtain a transition probability which is a probability that a winning node makes transition in a SOM, based on said weight;

and obtain a prediction node of the SOM of interest, based on said transition probability of the SOM of interest and a prediction node of a higher order SOM of said SOM.

19. The data processing device according to claim 18, wherein said recognition generating means in an order from a lower hierarchical level toward a higher hierarchical level
obtain an observation likelihood that SOM input data will be observed in a node of a SOM making up said hierarchical SOM,
obtain a state probability at the current point-in-time, which represents the probability that a node of a SOM is a winning node, based on said observation likelihood,
obtain the winning node of a SOM, based on said state probability at the current point-in-time, and
take a time-sequence of node information representing a winning node of the SOM of interest as SOM input data to a higher order SOM of the SOM of interest;

in an order from a higher hierarchical level toward a lower hierarchical level
obtain a transition probability of the SOM of interest using said weight,
obtain a state probability of the next point-in-time, based on the transition probability of the SOM of interest and a prediction node of a higher order SOM to said SOM of interest, and
obtain a prediction node of said SOM of interest based on said state probability at the subsequent point-in-time; and generate said prediction time-sequence data using, of the plurality of SOMs making up said hierarchical SOM, the prediction node of the lowest hierarchical level.

20. The data processing device according to claim 19, wherein said recognition generating means obtain said state probability by applying a particle filter to a SOM making up said hierarchical SOM.

21. The data processing device according to claim 15, wherein the higher the hierarchical level SOM that said SOM input data of a predetermined length is used at is, the longer the time-wise length of said input data is.

22. The data processing device according to claim 15, wherein said recognition generating means obtain a prediction node of the SOM of the lowest hierarchical level of the plurality of SOMs making up said hierarchical SOM, by applying to said hierarchical SOM a Bayesian network solution using a $\lambda$ message and a $\pi$ message, and using the prediction node to generate said prediction time-sequence data.

23. A data processing method for processing time-sequence data, said method comprising the step of:
generating prediction time-sequence data wherein time-sequence data at a point-in-time subsequent to time-sequence data at a certain point in time is predicted, using a hierarchical SOM in which a plurality of SOMs are connected so as to construct a hierarchical structure.

24. A program, tangibly embodied in a computer-readable storage medium, for causing a computer to execute data processing for processing time-sequence data, said program comprising the step of:
generating prediction time-sequence data wherein time-sequence data at a point-in-time subsequent to time-sequence data at a certain point in time is predicted, using a hierarchical SOM in which a plurality of SOMs are connected so as to construct a hierarchical structure.

25. A data processing device for processing time-sequence data, said data processing device comprising:
a learning unit for performing self-organizing learning of a SOM (self-organization map) making up a hierarchical SOM in which a plurality of SOMs are connected so as to construct a hierarchical structure, using, as SOM input data which is input to said SOM, a time-sequence of node information representing a winning node of a lower-order SOM which is at a lower hierarchical level from said SOM,
wherein said learning unit performs
self-organizing learning of a SOM making up said hierarchical SOM using SOM input data, and
prediction learning which updates so as to intensify a weighting which represents the degree of jointing between
a winning node of a SOM as to SOM input data of a predetermined frame length and
a winning node of a SOM as to SOM input data of said predetermined frame length at the next point-in-time.

26. A data processing device for processing time-sequence data, said data processing device comprising:
a storage unit for storing a hierarchical SOM in which a plurality of SOMs are connected so as to construct a hierarchical structure; and
a recognition generating unit for generating prediction time-sequence data wherein time-sequence data at a point-in-time subsequent to time-sequence data at a certain point in time is predicted, using said hierarchical SOM.

* * * * *